(12) United States Patent
Honjo et al.

(10) Patent No.: US 7,885,529 B2
(45) Date of Patent: Feb. 8, 2011

(54) LENS DRIVING APPARATUS, IMAGING APPARATUS, AND LENS BARREL AND CAMERA MAIN BODY USED FOR THIS

(75) Inventors: Kenichi Honjo, Osaka (JP); Keiji Sakamoto, Osaka (JP); Takumi Kuwahara, Nara (JP); Hiroyuki Kawahara, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/857,229

(22) Filed: Aug. 16, 2010

(65) Prior Publication Data

US 2010/0310245 A1 Dec. 9, 2010

Related U.S. Application Data

(62) Division of application No. 12/496,327, filed on Jul. 1, 2009, now Pat. No. 7,801,435, which is a division of application No. 10/576,944, filed as application No. PCT/JP2004/018395 on Dec. 9, 2004, now Pat. No. 7,574,126.

(30) Foreign Application Priority Data

| Dec. 9, 2003 | (JP) | ............................. 2003-410594 |
| Feb. 10, 2004 | (JP) | ............................. 2004-033886 |
| Apr. 2, 2004 | (JP) | ............................. 2004-110280 |
| Jul. 20, 2004 | (JP) | ............................. 2004-211302 |
| Aug. 24, 2004 | (JP) | ............................. 2004-243344 |
| Aug. 31, 2004 | (JP) | ............................. 2004-252709 |

(51) Int. Cl.
*G03B 3/10* (2006.01)
*G03B 13/34* (2006.01)

(52) U.S. Cl. ........................ 396/133; 359/824; 348/345

(58) Field of Classification Search ............ 324/207.11, 324/207.12, 207.13; 348/345, 347; 359/554, 359/721, 819, 820, 824; 396/52–55, 79, 396/83, 97, 133
See application file for complete search history.

(56) References Cited

U.S. PATENT DOCUMENTS

| 4,897,683 | A | 1/1990 | Suzuki et al. |
| 5,124,738 | A | 6/1992 | Yamashita |
| 5,333,028 | A | 7/1994 | Akashi et al. |

(Continued)

FOREIGN PATENT DOCUMENTS

JP 63-237040 10/1988

(Continued)

*Primary Examiner*—Christopher E Mahoney
*Assistant Examiner*—Autumn Parker
(74) *Attorney, Agent, or Firm*—Hamre, Schumann, Mueller & Larson, P.C.

(57) ABSTRACT

A lens position calculator is provided that determines a phase of a driving signal as a reference position of an imaging lens when an output value of a position detection sensor reaches a threshold value. The lens position calculator determines a position obtained by performing addition or subtraction on the reference position read out from a reference position storage as a judgment position, detects an output value of the position detection sensor at a timing in synchronization with the driving signal that drives a driver and at the judgment position, and judges whether the output value of the position detection sensor at the judgment position reaches the threshold value or not, so as to determine the reference position again.

4 Claims, 59 Drawing Sheets

U.S. PATENT DOCUMENTS

| | | | |
|---|---|---|---|
| 5,630,180 A | 5/1997 | Kusaka | |
| 5,664,238 A | 9/1997 | Nishiyama | |
| 5,708,870 A | 1/1998 | Sugita et al. | |
| 5,839,002 A | 11/1998 | Miyake et al. | |
| 5,983,032 A | 11/1999 | Miyamoto | |
| 6,055,378 A | 4/2000 | Oono et al. | |
| 6,118,945 A | 9/2000 | Tanaka | |
| 6,118,948 A | 9/2000 | Akamatsu et al. | |
| 6,330,398 B1 | 12/2001 | Tanaka et al. | |
| 6,389,231 B1 | 5/2002 | Onda | |
| 7,474,845 B2 | 1/2009 | Hayashi et al. | |
| 2003/0160885 A1 | 8/2003 | Sasaki | |
| 2003/0179301 A1 | 9/2003 | Kawanishi et al. | |

FOREIGN PATENT DOCUMENTS

| | | | |
|---|---|---|---|
| JP | 2-262112 | | 10/1990 |
| JP | 4-184309 | | 7/1992 |
| JP | 5-313055 | | 11/1993 |
| JP | 6-174999 | | 6/1994 |
| JP | 7-270931 | | 10/1995 |
| JP | 8-76005 | | 3/1996 |
| JP | 9-23366 | | 1/1997 |
| JP | 9-105850 | | 4/1997 |
| JP | 9-117194 | | 5/1997 |
| JP | 10-224680 | | 8/1998 |
| JP | 11-223757 | | 8/1999 |
| JP | 11-275897 | | 10/1999 |
| JP | 2000089329 A | * | 3/2000 |
| JP | 2002-214667 | | 7/2002 |
| JP | 2003-98418 | | 4/2003 |
| JP | 11-231197 | | 8/2007 |

* cited by examiner

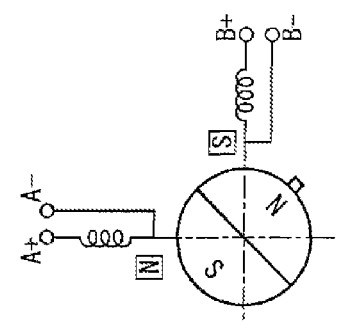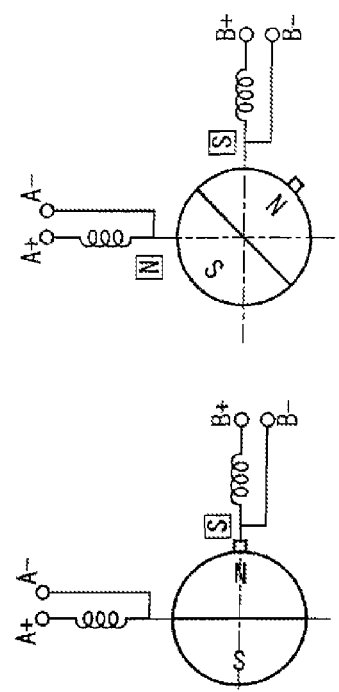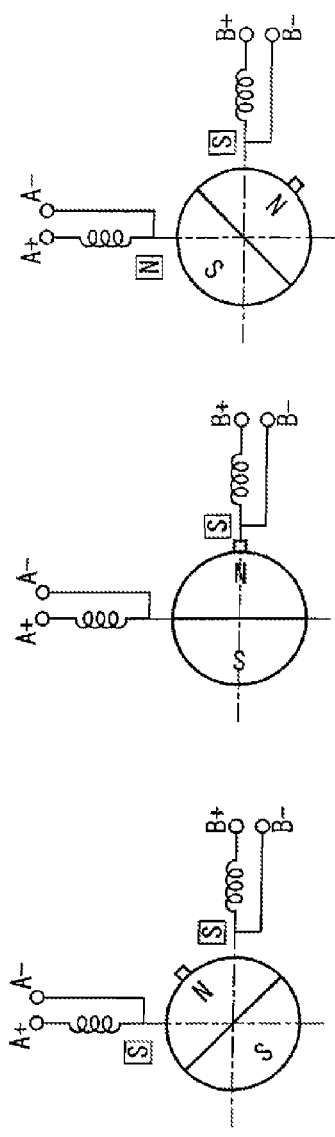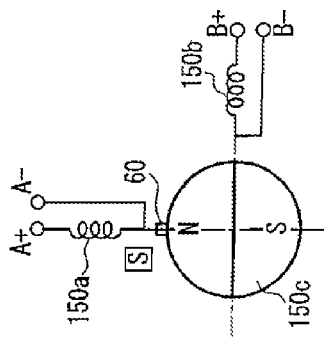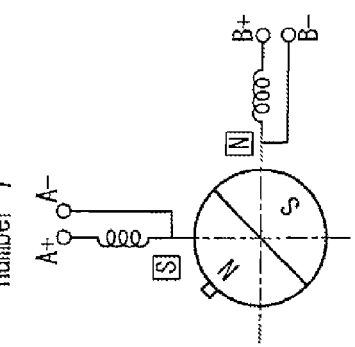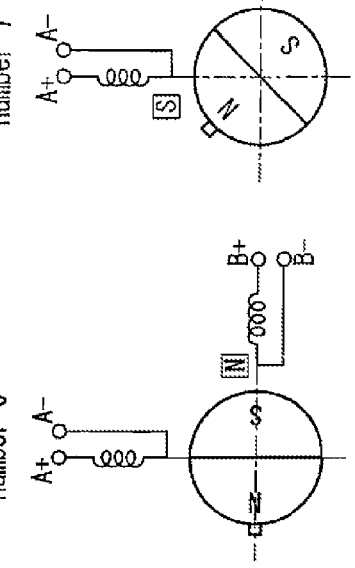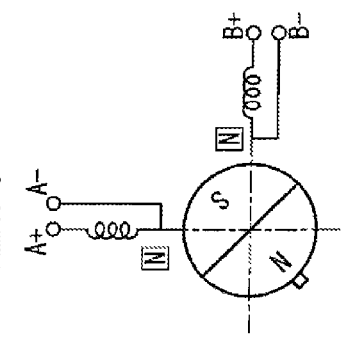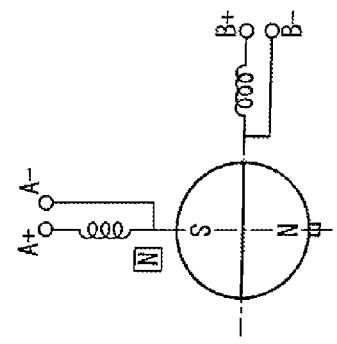

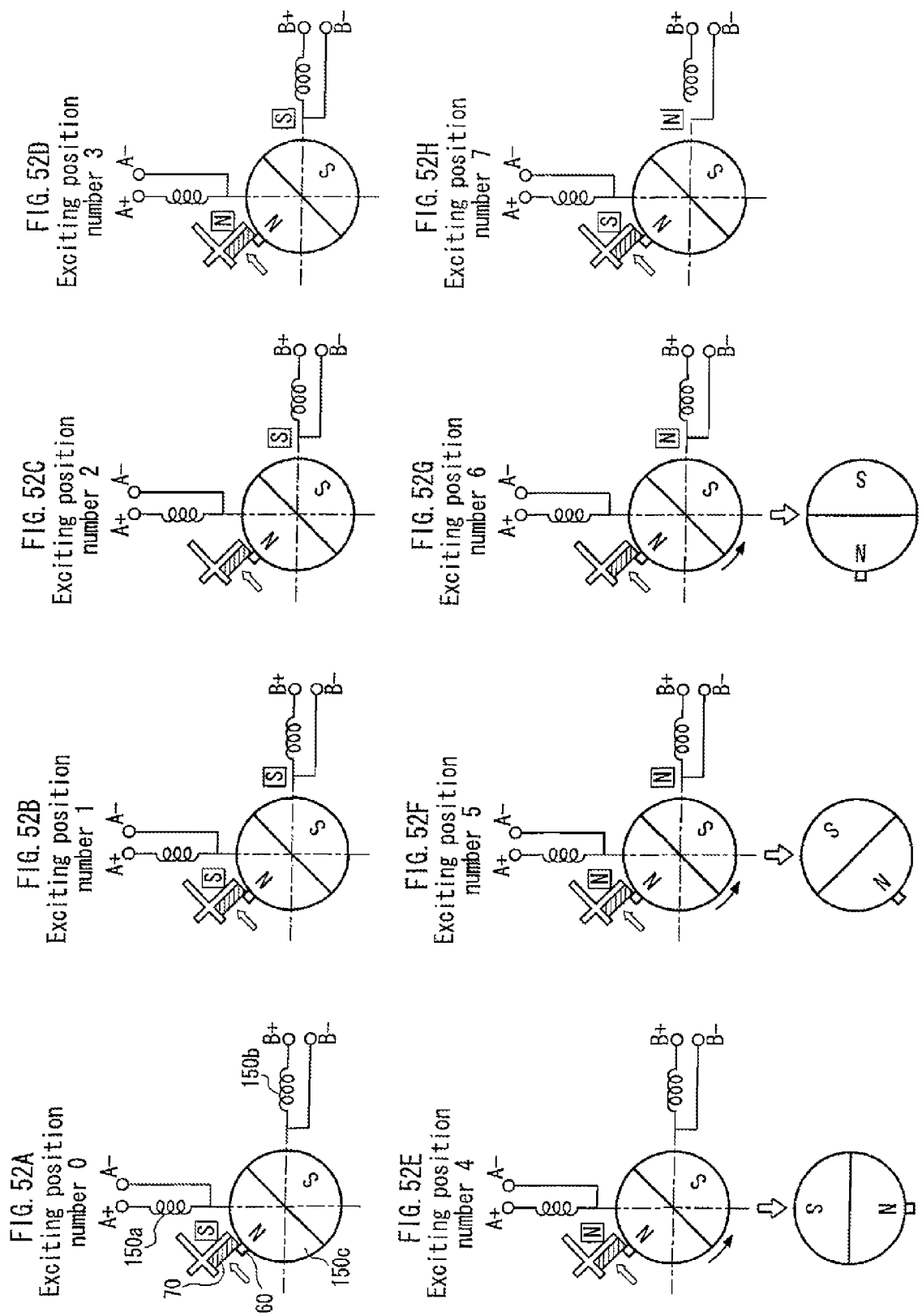

LENS DRIVING APPARATUS, IMAGING APPARATUS, AND LENS BARREL AND CAMERA MAIN BODY USED FOR THIS

CROSS-REFERENCE TO RELATED APPLICATIONS

This application is a Division of application Ser. No. 12/496,327, filed Jul. 1, 2009, which is a Division of application Ser. No, 10/576,944, filed Apr. 25, 2006, which is a U.S. National Stage of International Application No. PCT/JP2004/018395, filed Dec. 9, 2004, which applications are incorporated herein by reference.

TECHNICAL FIELD

The present invention relates to an imaging apparatus such as a still camera or a video movie, a lens driving apparatus that controls a position of a lens of such an apparatus and relates to a lens barrel and a camera main body used for an imaging apparatus.

BACKGROUND ART

Conventionally, a method for detecting the origin of a lens unit is proposed in which when the lens unit is driven by a motor, a photo-interruption member attached to the lens unit and a photosensor are used so as to monitor an output level of the photosensor at the time when the photo-interruption member transverses the photosensor (Patent Document 1, for example).

A conventional lens driving apparatus is described below, with reference to FIG. 58. FIG. 58 includes a schematic diagram and a block diagram of an exemplary conventional lens driving apparatus. In an imaging device 75, an image of a subject captured through a fixed lens 72 fixed a barrel 71, a zoom lens 73 and a focus lens 74 is converted into an electric signal. Based on the electric signal output from the imaging device 74, a signal processing unit 82 generates image data and contrast information for performing focus adjustment.

When the power of a main unit is turned on, a system control unit 81 outputs an instruction to a focus motor control unit 80 so as to drive the focus lens 74 to the side of the imaging device 75. Based on the information concerning a moving direction and a moving step from the focus motor control unit 80, a focus motor driving unit 83 outputs a driving signal to a motor 79 so that a desired rotation direction and such a rotation movement amount can be obtained. The focus motor control unit 80 also receives a rotation position of a zoom ring 76 that is detected by a zoom ring position detection unit 84.

When the focus lens 74 reaches the proximity of the position indicated by the dotted line of FIG. 58, a photosensor 78 is interrupted by a photo-interruption member 77, so that an output signal level of the photosensor 78 changes. When this output signal level exceeds a certain threshold level (or falls below a threshold value in some circuit configurations), a counter provided for the focus motor control unit 80 beforehand is reset so as to detect an absolute position of the focus lens 74. Concurrently with this, positional information of the focus lens 74 for focus adjustment is output to the system control unit 81.

In this way, the absolute position of the focus lens 74 and a positional relationship with the zoom lens 73 are controlled, whereby various applications can be considered. For example, even in the case of performing a zooming operation, the position of the focus lens 74 can be controlled while maintaining the focusing condition, a retracting speed in an auto-focus function can be increased and a distance from a subject can be estimated from the absolute position information of the focus lens 74.

Meanwhile, in the case where a focus lens in an interchangeable lens type imaging device is driven by a motor, an example of a lens barrel equipped with a motor that shifts a focus lens, a driving circuit that drives the motor and a microcomputer that controls a position of the motor is known conventionally.

Such a conventional imaging apparatus is described below, with reference to FIG. 59. FIG. 59 includes a schematic diagram and a block diagram of an exemplary conventional imaging apparatus. FIG. 59 shows an example of an interchangeable lens type imaging apparatus capable of detaching a lens barrel 88 from a camera main body 89, where the detaching can be conducted at a junction part (not illustrated) of a signal line between a motor control unit 86 and a system control unit 81.

An imaging device 75 converts an image of a subject captured through a fixed lens group 72 and 85 fixed to the lens barrel 88 and a focus lens 74 into an electric signal. Based on the electric signal output from the imaging device 75, a signal processing unit 82 generates image data and contrast information for performing focus adjustment.

When the power of a camera main body 89 is turned on, the system control unit 81 outputs an instruction to the motor control unit 86 so as to drive the focus lens 74 to the side of the imaging device 75. The motor control unit 86 reads out information indicating a relationship between a subject distance and a focus lens position that is stored in a storage device 85. Based on the information concerning a moving direction and a moving step from the motor control unit 86, a motor driving unit 87 outputs a driving signal to a motor 79 so that a desired rotation direction and such a rotation movement amount can be obtained.

When the focus lens 74 reaches the proximity of the position indicated by the dotted line of FIG. 59, a photosensor 78 is interrupted by a photo-interruption member 77, so that an output signal level of the photosensor 78 changes. When this output signal level exceeds a certain threshold level (or falls below a threshold value in some circuit configurations), a counter provided for the motor control unit 86 beforehand is reset so as to detect an absolute position of the focus lens 74.

With the use of the thus detected absolute position of the focus lens 74, a retracting speed in an auto-focus function can be increased, and a distance from a subject can be estimated from the absolute position information of the focus lens 74. Further, by using information on focus deviation that is output from the system control unit 81 and information on the focus lens position read out from the storage device 85, the motor control unit 86 can control the focus lens position.

The technology described in the following Patent Document 2 also relates to interchangeable lens type audiovisual equipment. A control unit 119 provided in a lens unit 127 refers to not only lens cam data 120 stored beforehand inside a lens microcomputer but also an AF evaluation signal sent from a main body microcomputer 114, whereby a scaling operation can be conducted while keeping a position where an AF evaluation value is the maximum.

Further, Patent Document 3 describes a mechanism for detecting the origin of a lens unit. FIG. 60 is a schematic perspective view of a main portion of another exemplary conventional imaging apparatus. In FIG. 60, numeral 91 denotes a reset switch as a reference position (reset position) detector that is fixed to a stationary member (not illustrated).

The reset switch 91 has a U-shaped main body as illustrated, and an upper horizontal strip portion 91a (hereinafter called "top plate portion") and a lower horizontal strip portion 91b (hereinafter called "bottom plate portion") of the main body are arranged parallel to an optical axis of an optical system described later. A detection target plate protruding from a lens holder described later can enter in a space between the top plate portion 91a and the bottom plate portion 91b.

A photo-transmission element, is attached to a lower face of the top plate portion 91a, and a photo-reception element is attached to an upper face of the bottom plate portion 91b so as to be opposed to the photo-transmission element. The photo-reception element and the photo-transmission element make up a photo-interrupter, where the photo-reception element is connected electrically with a controller 90 on a electronic circuit board via an electric wiring W1.

Numeral 92 denotes a focus lens holder that holds a focus lens group. A feed screw engaging strip (or female helicoid member) 92b provided with a screw hole threadably engaged with a feed screw 98 is provided around the holder 92. Further, a sleeve-shaped sliding unit 92c axially slidably fitted to a first guide bar 96 and a projection strip 92d with a U-shaped groove axially slidably fitted to a second guide bar 97 are provided. Moreover, a detection target plate 92a capable of entering into the space between the top plate portion 91a and the bottom plate portion 91b of the reset switch 91 is provided.

The feed screw 98 extends parallel to the optical axis of the lens and is fixed to a shaft of a stepping motor 94 for driving the focus lens. The first guide bar 96 and the second guide bar 97 extend parallel to the optical axis of the lens and are fixed to a stationary member (not illustrated).

Numeral 93 denotes a zoom lens holder that holds a zoom lens group, and is disposed coaxially with and at a predetermined interval from the focusing lens holder 92. A feed screw engaging strip (or female helicoid member) 93b provided with a screw hole threadably engaged with a feed screw 99 is provided around the zoom lens holder 93.

Further, sleeve-shaped sliding portion 93c axially slidably fitted to the first guide bar 96 and a projection strip with 93d with a U-shaped groove axially slidably fitted to the second guide bar 97 are provided. Moreover, a detection target plate 93a capable of entering into the space between the top plate portion 91a and the bottom plate portion 91b of the reset switch 91 is provided. The feed screw 99 extends parallel to the optical axis of the lens and is fixed to a shaft of a stepping motor 95 for driving the zoom lens.

The stepping motor 94 is connected to the controller 90 via a wiring W2 and the stepping motor 95 is connected to the controller 90 via a wiring W3.

In the thus configured conventional imaging apparatus, when the power is supplied by a power supply switch (not illustrated), firstly the stepping motor 95 begins to rotate, so that the feed screw 99 rotates. Thereby, the zoom lens holder 93 is shifted toward the front end of the screw 99 along the feed screw 99.

Then, when the detection target plate 93a enters into the space between the top plate portion 91a and the bottom plate portion 91b of the reset switch 91, light bundle from the photo-transmission element as a photo-reflector is intercepted by the detection target plate 93a, and in response to this, the controller 90 drives the stepping motor 95 while counting the step number, so as to shift the zoom lens holder 93 to the initial set position.

Next, the stepping motor 94 rotates so that the focus lens holder 92 is shifted toward the front end of the feed screw 98. When the detection target plate 92a enters into the space between the top plate portion 91a and the bottom plate portion 91b of the reset switch 91, thus intercepting light from the photo-transmission element, the controller 90 accordingly drives this stepping motor 94 while counting the step number, so as to shift the zoom lens holder 92 to the initial set position.

In this way, in this conventional apparatus, the detection of the reset positions of the zoom lens and the focus lens, i.e., the detection of the origins can be accomplished with the detection target plates provided for the respective lens holders and one reset switch common to the two lenses.

Patent Document 4 discloses a focus adjustment apparatus for camera in which a lens group and a stop are driven by a pulse (stepping) motor that is pulse-driven in a one to two phase excitation manner. The focus adjustment apparatus for camera described in Patent Document 4 has three pulse motors including a pulse motor M1 for stop, a motor M2 for focus adjustment and a zoom motor M3. The origins of the pulse motor M1 for stop and the motor M2 for focus adjustment are detected using a photosensor that is provided separately from a lens group and wings for stop that are members to be driven. As for the zoom motor M3, the absolute position of the lens group is detected by a volume (variable resistor), and therefore the origin therefor is not detected.

Patent Document 5 discloses a lens driving apparatus having a stepping motor. In the lens driving apparatus described in Patent Document 5, the origin is detected by shifting a lens as a member to be driven at a limiting position that is regulated mechanically and then reverse-driving the lens from the limiting position by a predetermined moving amount. According to Patent Document 5, such control allows the origin to be detected with high precision.

However, in the conventional lens driving apparatus like FIG. 58, the positional relationship between the photo-interruption member attached to the lens unit and the photosensor differs in absolute position for each detection operation because of errors in looseness of the lens unit in the driving direction and variations in mechanism and electrical properties due to temperature and humidity changes in the operation environment, thus making it difficult to obtain suitable performance for realizing a high quality image, etc.

Meanwhile, there is proposed a method in which two photosensors having different variation sensitivities in output level with respect to the shift amount of a photo-interruption member when the photo-interruption member traverses the photosensors are used. An output of the photosensor having a larger variation sensitivity is set at a start signal and the origin is detected from an output of the photosensor having a smaller variation sensitivity. This method is advantageous for enhancing the detection accuracy of the absolute position, but is disadvantageous in terms of compact size and cost.

Further, in the conventional imaging apparatus like FIG. 59, a large scale of microcomputer is required for controlling both of the lens barrel side and the camera main body side. Therefore, in an interchangeable lens type imaging apparatus, it is difficult to realize a compact lens barrel and a low cost. Further, there is a variation in focus position because of errors of variations in mechanism and electrical properties due to a temperature and humidity change the operation environment of the lens barrel, thus making it difficult to obtain sufficient performance.

Further, according to the origin detection method in the conventional imaging apparatus like FIG. 60, the movement of the photo-interruption members is detected with a common photosensor so as to detect the origins. However, the photosensor is disposed between both lens units and that is located around the units. Therefore, the outer dimensions of the lens units increase, thus increasing the lens barrel in size.

Moreover, when storing the lens units, the lens units have to be closer to each other. However, in order to avoid the contact between the respective photo-interruption members at this time, the outer dimensions of the photosensor should be increased. This becomes a factor of limiting downsizing in the optical axis direction and its orthogonal direction, which means an obstacle to downsizing of the lens barrel.

Further, in the origin detection method shown in FIG. 60, the following problems occur in the case of abnormal completion. The abnormal completion refers to the completion caused by a decrease in voltage because the battery for supplying to the imaging device becomes exhausted or careless detachment of a connection terminal to an external power supply during an operation using the external power supply, for example. In this case, when the power of the imaging device is turned on next, a process for detecting the origin of the zoom lens unit will be normally performed. In this case, if the light of the photosensor is interrupted by the photo-interruption member of the focus lens unit because of a decrease in voltage, the process for detecting the origin cannot be performed normally and a malfunction will occur. In this way, the conventional example having a photosensor used common to the zoom lens unit and the focus lens unit has several problems.

Further, the focus adjustment apparatus described in Patent Document 4 requires the configuration such as a photosensor separately provided to detect the origin of the stepping motor, thus having a problem of being incapable of achieving the downsizing of the imaging apparatus.

Further, the lens driving apparatus described in Patent Document 5 detects the origin by shifting a member to be driven to the limiting position that is regulated mechanically. Therefore, there is a problem that an error occurs when the shifting amount from the origin is specified from the pulse number applied to the stepping motor. This results from, when the member to be driven is allowed to contact with the limiting position regulated mechanically, the member to be driven will receive a magnetic force applied to a rotor magnet in a different direction depending on the exciting position corresponding to the limiting position, and therefore the member to be driven is driven in two ways depending on the timing when the origin is set, i.e., in the direction toward the limiting position and in the direction away from the limiting position.

Patent document 1: JP H06(1994)-174999 A

Patent document 2: JP H09(1997)-23366 A

Patent document 3: JP H04(1992)-184309 A

Patent document 4: JP H10(1998)-224680 A

Patent document 5: JP H08(1996)-76005 A

DISCLOSURE OF INVENTION

The present invention is for solving the above-stated conventional problems, and it is an object, of the present invention to provide a lens driving apparatus that prevents the generation of a detection error of the origin without impairing the compact size, to realize a compact lens barrel at a low cost in an imaging apparatus, and further to provide an imaging apparatus and a lens driving apparatus capable of smooth origin detection and precise alignment control.

In order to fulfill the above-stated object, a first lens driving apparatus of the present invention includes: an imaging lens including a focus adjustment lens that forms an image of a subject; an imaging device that images light of the subject by way of the imaging lens; a lens position controller including a driver that shifts the imaging lens in a direction of an optical axis with respect to a lens barrel, the lens position controller outputting a periodic driving signal and controlling a position of the imaging lens using the driver; a position detection sensor whose output value varies with a position of the imaging lens; a lens position calculator that determines a phase of the driving signal as a reference position of the imaging lens when the output value of the position detection sensor reaches a threshold value; and a reference position storage that stores the reference position. The lens position calculator determines a position obtained by performing addition or subtraction on the reference position read out from the reference position storage as a judgment position, detects an output value of the position detection sensor at a timing in synchronization with the driving signal that drives the driver and at the judgment position, and judges whether the output value of the position detection sensor at the judgment position reaches the threshold value or not, so as to determine the reference position again.

In order to fulfill the above-stated object, a second lens driving apparatus of the present invention includes: an imaging lens including a focus adjustment lens that forms an image of a subject; an imaging device that images light of the subject by way of the imaging lens; a lens position controller including a driver that shifts the imaging lens in a direction of an optical axis with respect to a lens barrel, the lens position controller outputting a periodic driving signal and controlling a position of the imaging lens using the driver; a position detection sensor whose output value varies with a position of the imaging lens; a lens position calculator that determines a phase of the driving signal as a reference position of the imaging lens when the output value of the position detection sensor reaches a first threshold value; and a reference position storage that stores the reference position. The lens position calculator designates as a judgment position a position having a same phase as a phase of the reference position read out from the reference position storage, detects an output value of the position detection sensor at a timing in synchronization with the driving signal that drives the driver and at the judgment position, and judges whether the output value of the position detection sensor at the judgment position reaches a second threshold value different from the first, threshold value or not, so as to determine the reference position again.

A first imaging apparatus of the present invention is such that a lens barrel and a camera main body are detachable. The lens barrel includes: an imaging lens group that includes a focus lens and forms an image of a subject; a motor driver that includes a motor that shifts the focus lens in a direction of an optical axis; a storage in which an information table containing control information of the focus lens is stored; and a first data transmitter/receptor that transmits information output from the storage to the camera main body. The camera main body includes: an imaging device that images light of the subject by way of the imaging lens group; a second data transmitter/receptor that receives information transmitted from the first data transmitter/receptor; and a motor controller that controls the motor in accordance with received information output from the second data transmitter/receptor. The focus lens is controlled in accordance with information that the motor controller transmits to the first data transmitter/receptor via the second data transmitter/receptor.

A lens barrel of the present invention includes: an imaging lens group that includes a focus lens and forms an image of a subject; a motor driver that includes a motor that shifts the focus lens in a direction of an optical axis; a storage in which an information table containing control information of the focus lens is stored; and a first data transmitter/receptor that transmits information output from the storage to a camera main body. The lens barrel is used for the camera body including a motor controller that outputs information for controlling the focus lens via a second data transmitter/receptor, and the focus lens is controlled in accordance with information that the motor controller transmits to the first data transmitter/receptor via the second data transmitter/receptor.

In a camera main body of the present invention that is used for a lens barrel, the lens barrel includes: an imaging lens group that includes a focus lens and forms an image of a subject; a motor driver that includes a motor that shifts the focus lens in a direction of an optical axis; a storage in which an information table containing control information of the focus lens is stored; and a first data transmitter/receptor that transmits information output from the storage to the camera main body. The camera main body includes: an imaging device that images light of the subject by way of the imaging lens group; a second data transmitter/receptor that receives information transmitted from the first data transmitter/receptor; and a motor controller that controls the motor in accordance with received information output from the second data transmitter/receptor. The motor controller transmits information for controlling the focus lens to the first data transmitter/receptor via the second data transmitter/receptor.

A second imaging apparatus of the present invention includes: a lens barrel provided with a first lens unit and a second lens unit, each of which is movable in a direction of an optical axis; a first driver that shifts the first lens unit in the direction of the optical axis; a second driver that shifts the second lens unit in the direction of the optical axis; a controller that outputs a control signal to each of the first driver and the second driver; and a position detector that detects a position of the second lens unit and also detects a position of the first lens unit by movement resulting from contact of the first lens unit with the second lens unit.

A third imaging apparatus of the present invention includes: a power supply; a lens barrel provided with a first lens unit and a second lens unit, each of which is movable in a direction of an optical axis; a first driver that shifts the first lens unit in the direction of the optical axis; a second driver that shifts the second lens unit in the direction of the optical axis; a controller, when electric power is supplied from the power supply or when the power supply is shut off, making the first driver shift the first lens unit so as to perform predetermined process operations for supplying the electric power or shutting off the power supply; and a storage that stores information different between a normal completion state and an abnormal completion state, in which in the normal completion state the first lens unit and the second lens unit are shifted to storage positions in accordance with a predetermined process operation when the power supply is shut off from a state of the supplying the electric power, and in the abnormal completion state the apparatus to which electric power is being supplied is completed in a state different from the normal completion state. When electric power is supplied after the abnormal completion state, the first lens unit and the second lens unit are returned to the normal completion state in accordance with the information stored in the storage.

A driving apparatus of the present invention that drives a body to be driven includes: a restriction end that restricts movement of the body to be driven; a stepping motor that drives the body to be driven by rotation of a rotor resulting from a change in exciting position in accordance with a pattern of an exciting current; a driver that supplies the exciting current to the stepping motor; an origin storage unit that stores an exciting position corresponding to an origin of the body to be driven beforehand; a counting unit that counts the exciting position varying with the pattern of the exciting current supplied by the driver and an absolute position of the body to be driven corresponding to the exciting position; and a calculation unit that resets the origin. At the exciting position stored in the origin storage unit, the rotor receives a magnetic force in such a manner that the body to be driven is separated from the restriction end after the exciting position is advanced so that the body to be driven is closer to the restriction end and when the exciting position is advanced further from a state where movement of the body to be driven is restricted by the restriction end.

A third lens driving apparatus of the present invention includes the above-stated driving apparatus. The body to be driven is a lens supporting frame that supports a lens element.

BRIEF DESCRIPTION OF DRAWINGS

FIG. 51 is a schematic diagram showing the relationship between the exciting positions of the motor unit and the driving positions at positions far away from the restriction end in the imaging apparatus according to Embodiment 14 of the present invention.

FIG. 52 is a schematic diagram showing the relationship between the exciting positions of the motor unit and the driving positions at positions closer to the restriction end in the imaging apparatus according to Embodiment 14 of the present invention, FIG. 53 schematically shows the relationship between the directions of forces that a rotor magnet of the imaging apparatus according to Embodiment 14 receives and the exciting position numbers.

DESCRIPTION OF THE INVENTION

Figure 1:
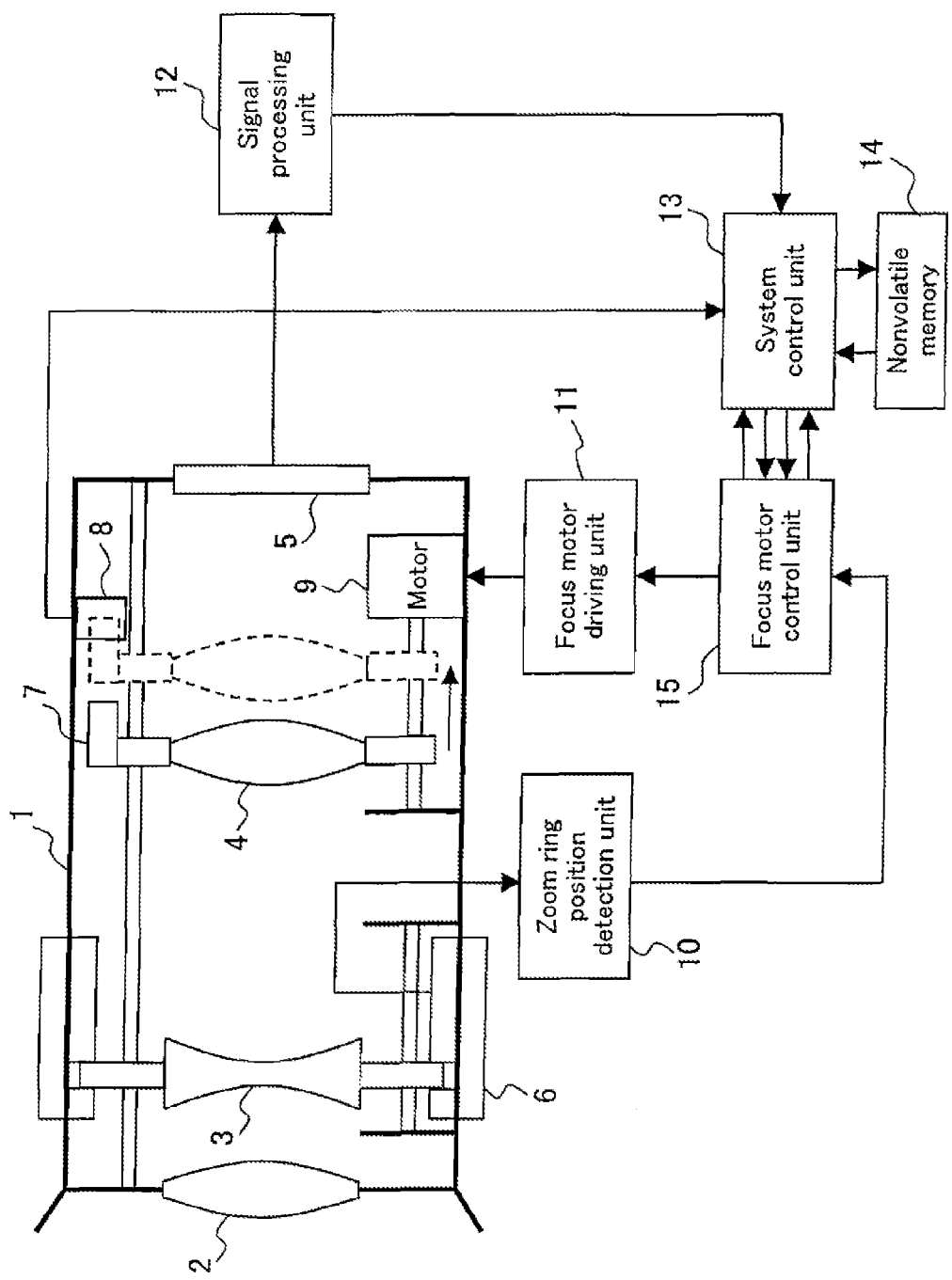
FIG. 1 includes a schematic diagram and a block diagram of a lens driving apparatus according to Embodiment 1 of the present invention.

According to the first lens driving apparatus of the present invention, a reference position determined during the process adjustment is not detected directly during the normal operation. Instead, at a judgment position different from the reference position, a reference position is detected by judgment. Therefore, the generation of detection errors in origin, resulting from a variation in mechanism and electrical properties of a lens unit, can be prevented.

In the first lens driving apparatus of the present invention, preferably, the driving signal that drives the driver for determining the reference position is a substantially sine wave signal. With this configuration, the reference position accuracy can be improved significantly.

In the first lens driving apparatus of the present invention, preferably, assuming that a time of one cycle of the driving signal that drives the driver for determining the reference position is T, a driving signal that drives the driver for determining the reference position again is a M/N periodic driving signal whose one cycle is (M/N)·T, where N=2n. (n is an integer of 2 or more) and M is an integer satisfying 2n>M>2. With this configuration, the origin detection operation during the normal operation can be performed at N/M times the speed during the process adjustment.

Preferably, the judgment position is located at a position ½ cycle of the driving signal away from the reference position read out from the reference position storage.

Preferably, the judgment position is located at a position ½ cycle of the M/N periodic driving signal away from the reference position read out from the reference position storage. With these configurations, a distance between the judgment positions equals one cycle of the driving signal, which means that the origin (reference position) is included between the judgment positions. Therefore, the origin can be reproduced securely.

Preferably, the lens position calculator designates the judgment position as a stopping position, and the lens position controller shifts the imaging lens to the stopping position before turning a power supply of the lens driving apparatus off. With this configuration, the number of times of judgment can be reduced, thus shortening the time of reproducing the origin.

Preferably, the lens position calculator determines as a stopping position a position obtained by performing addition or subtraction to the reference position, the lens controller shifts the imaging lens to the stopping position before turning a power supply of the lens driving apparatus off, and the stopping position is a position ½ cycle of the driving signal away from the reference position.

Preferably, the lens position calculator determines as a stopping position a position obtained by performing addition or subtraction to the reference position, the lens controller shifts the imaging lens to the stopping position before turning a power supply of the lens driving apparatus off, and the stopping position is a position ½ cycle of the M/N periodic driving signal away from the reference position. With these configurations, only once judgment at first allows secure origin detection.

Preferably, the lens driving apparatus further includes an angular sensor that detects an inclination angle of the lens barrel. The lens position calculator determines, based on inclination angle information of the lens barrel output from the angular sensor, a correction distance corresponding to a displacement from a reference angle. The lens position calculator designates a position obtained by performing addition or subtraction of the correction distance with respect to the judgment position as a new judgment position, and designates the new judgment position as the position where the output value of the position detection sensor is detected for the judgment. With this configuration, even when an inclination angle of the lens barrel is different between the normal operation and the process adjustment and a position of a change in the photosensor output level varies therebetween, a variation in the origin detection can be prevented.

Preferably, the lens driving apparatus further includes an angular sensor that detects an inclination angle of the lens barrel. The lens position controller controls a position of the imaging lens based on correction position information that is based on information of the reference position and inclination angle information of the lens barrel output from the angular sensor.

Preferably, the lens position calculator determines as an upper end position of the imaging lens a phase of the driving signal when the output value of the position detection sensor reaches a threshold value in a state of the lens barrel facing upward, determines as a lower end position of the imaging lens a phase of the driving signal when the output value of the position detection sensor reaches a threshold value in a state of the lens barrel facing downward, and calculates the reference position based on the upper end position and the lower end position. With this configuration, even when an orientation of the lens barrel is different between the normal operation and the process adjustment, a variation in the origin detection can be prevented.

Preferably, the lens position calculator calculates an intermediate position between the upper end position and the lower end position us the reference position.

Preferably, the lens position calculator determines as an upper or a lower end position of the imaging lens a phase of the driving signal when the output value of the position detection sensor reaches a threshold value in a state of the lens barrel facing upward or downward, and calculates the reference position by performing addition or subtraction of a predetermined distance with respect to the upper or the lower end position. With this configuration, even when an orientation of the lens barrel is different between the normal operation and the process adjustment, a variation in the origin detection can be prevented. This configuration is suitable for an imaging apparatus whose variation in origin detection due to attitude differences is specified by specifications.

Preferably, the lens driving apparatus further includes a temperature sensor that detects a temperature of the lens barrel. The lens position calculator determines, based on temperature information of the lens barrel output from the temperature sensor, a correction distance corresponding to a displacement from a reference temperature. The lens position calculator designates a position obtained by performing addition or subtraction of the correction distance with respect to the judgment position as a new judgment position, and designates the new judgment position as the position where the output value of the position detection sensor is detected for the judgment. With this configuration, even when a temperature of the lens barrel is different between the normal operation and the process adjustment and a position of a change in the photosensor output level varies therebetween, a variation in the origin detection can be prevented.

Preferably, the lens driving apparatus further includes a temperature sensor that detects a temperature of the lens barrel. The lens position controller controls a position of the imaging lens based on correction position information that is based on information of the reference position and temperature information of the lens barrel output from the temperature sensor.

Preferably, the lens driving apparatus further includes an angular sensor that detects an inclination angle of the lens barrel and a temperature sensor that detects a temperature of the lens barrel. The lens position calculator determines, based on inclination angle information of the lens barrel output from the angular sensor, an angle correction distance corresponding to a displacement from a reference angle, and determines, based on temperature information of the lens barrel output from the temperature sensor, a temperature correction distance corresponding to a displacement from a reference temperature. The lens position calculator designates a position obtained by performing addition or subtraction of a total distance of the angle correction distance and the temperature correction distance with respect to the judgment position as a new judgment position, and designates the new judgment position as the position where the output value of the position detection sensor is detected for the judgment. With this configuration, even when an inclination angle and a temperature of the lens barrel are different between the normal operation and the process adjustment and a position of a change in the photosensor output level varies therebetween, a variation in the origin detection can be prevented.

According to the second lens driving apparatus of the present invention, a threshold value of the output value of the position detection sensor that is used as the reference of the judgment during the normal operation is made a value different from the threshold value of the process adjustment. The reference position is detected in such a manner, so that the generation of detection errors in origin, resulting from a variation in mechanism and electrical properties of a lens unit, can be prevented.

In the second lens driving apparatus of the present invention, preferably assuming that a time of one cycle of the driving signal that drives the driver for determining the reference position is T, a driving signal that drives the driver for determining the reference position again is a 1/N periodic driving signal whose one cycle is T/N (N is an integer of 2 or more), With this configuration, the origin detection operation during the normal operation can be performed at N times the speed during the process adjustment.

Preferably the second threshold value is a value within a range of an output value of the position detection sensor between the reference position and a position one cycle of the driving signal away from the reference position. Preferably, the second threshold value is an output value of the position detection sensor at a position ½ cycle of the driving signal away from the reference position. With these configurations, a section between the judgment positions that has the output value of the position detection sensor corresponding to the second threshold value always exists, and therefore the origin can be reproduced securely.

Preferably, the lens position calculator designates the judgment position as a stopping position, and the lens position controller shifts the imaging lens to the stopping position before turning a power supply of the lens driving apparatus off. With this configuration, the number of times of judgment can be reduced, thus shortening the time of reproducing the origin.

Preferably, the lens position calculator designates as a stopping position a judgment position that is an immediately preceding of a judgment position corresponding to the reference position determined again, and the lens position controller shifts the imaging lens to the stopping position before turning a power supply of the lens driving apparatus off. With this configuration, only once judgment at first allows secure origin detection.

Preferably, the lens driving apparatus further includes an angular sensor that detects an inclination angle of the lens barrel. The lens position calculator determines, based on inclination angle information of the lens barrel output from the angular sensor, a correction distance corresponding to a displacement from a reference angle. The lens position calculator designates a position obtained by performing addition or subtraction of the correction distance with respect to the judgment position as a new judgment position, and designates the new judgment position as the position where the output value of the position detection sensor is detected for the judgment. With this configuration, even when an inclination angle of the lens barrel is different between the normal operation and the process adjustment and a position of a change in the photosensor output level varies therebetween, a variation in the origin detection can be prevented.

Preferably, the lens driving apparatus further includes an angular sensor that detects an inclination angle of the lens barrel. The lens position controller controls a position of the imaging lens based on correction position information that is based on information of the reference position and inclination angle information of the lens barrel output from the angular sensor.

Preferably, the lens position calculator determines as an upper end position of the imaging lens a phase of the driving signal when the output value of the position detection sensor reaches the first threshold value in a state of the lens barrel facing upward, determines as a lower end position of the imaging lens a phase of the driving signal when the output value of the position detection sensor reaches the first threshold value in a state of the lens barrel facing downward, and calculates the reference position based on the upper end position and the lower end position. With this configuration, even when an orientation of the lens barrel is different between the normal operation and the process adjustment, a variation in the origin detection can be prevented.

Preferably, the lens position calculator calculates an intermediate position between the upper end position and the lower end position as the reference position.

Preferably, the lens position calculator determines as an upper or a lower end position of the imaging lens a phase of the driving signal when the output value of the position detection sensor reaches the first threshold value in a state of the lens barrel facing upward or downward, and calculates the reference position by performing addition or subtraction of a predetermined distance with respect to the upper or the lower end position. With this configuration, even when an orientation of the lens barrel is different between the normal operation and the process adjustment, a variation in the origin detection can be prevented. This configuration is suitable for an imaging apparatus whose variation in origin detection due to attitude differences is specified by specifications.

Preferably, the lens driving apparatus further includes a temperature sensor that detects a temperature of the lens barrel. The lens position calculator determines, based on temperature information of the lens barrel output from the temperature sensor, a correction distance corresponding to a displacement from a reference temperature. The lens position calculator designates a position obtained by performing addition or subtraction of the correction distance with respect to the judgment position as a new judgment position, and designates the new judgment position as the position where the output value of the position detection sensor is detected for the judgment. With this configuration, even when a temperature of the lens barrel is different between the normal operation and the process adjustment and a position of a change in the photosensor output level varies therebetween, a variation in the origin detection can be prevented.

Preferably, the lens driving apparatus further includes a temperature sensor that detects a temperature of the lens barrel. The lens position controller controls a position of the imaging lens based on correction position information that is based on information of the reference position and temperature information of the lens barrel output from the temperature sensor.

Preferably the lens driving apparatus further includes an angular sensor that detects an inclination angle of the lens barrel and a temperature sensor that detects a temperature of the lens barrel. The lens position calculator determines, based on inclination angle information of the lens barrel output from the angular sensor, an angle correction distance corresponding to a displacement from a reference angle, and determines, based on temperature information of the lens barrel output from the temperature sensor, a temperature correction distance corresponding to a displacement from a reference temperature. The lens position calculator designates a position obtained by performing addition or subtraction of a total distance of the angle correction distance and the temperature correction distance with respect to the judgment position as a new judgment position, and designates the new judgment position as the position where the output value of the position detection sensor is detected for the judgment. With this configuration, even when an inclination angle and a temperature of the lens barrel are different between the normal operation and the process adjustment and a position of a change in the photosensor output level varies therebetween, a variation in the origin detection can be prevented.

According to the imaging apparatus of the present invention, the motor control unit is provided in the camera main body and therefore the circuit configuration of the lens barrel can be simplified significantly, thus making the lens barrel compact and reducing a cost. Further, since the control information of the focus lens in a lens barrel is stored in the storage in the lens barrel, the focus lens can be controlled precisely irrespective of the types of the lens barrels.

The lens barrel of the present invention is on the precondition of being used for a camera main body provided with a motor control unit. Therefore, the circuit configuration of the lens barrel can be simplified significantly, thus making the lens barrel compact and reducing a cost. Further, since the control information of the focus lens in a lens barrel is stored in the storage in the lens barrel, by transmitting this control information to the motor control unit of the camera main body, the motor control unit can obtain control information depending on the type of the lens barrel, and therefore the focus lens can be controlled precisely.

According to the present invention, the camera main body is provided with the motor control unit. Therefore, the motor control unit can be eliminated from the lens barrel, thus simplifying the circuit configuration of the lens barrel and making the lens barrel compact and reducing a cost.

In the first imaging apparatus of the present invention, the motor driver outputs a periodic driving signal in accordance with received information output from the motor controller, and the motor shifts the focus lens in the direction of the optical axis in accordance with the output driving signal. The lens barrel further includes a position detection sensor whose output value varies with a position of the focus lens. The motor controller determines as a reference position of the focus lens a phase of the driving signal when an output value of the position detection sensor reaches a threshold value, and transfers information of the reference position via the second and the first data transmitter/receptor so as to allow the information of the reference position to be stored as information in the information table of the storage. With this configuration, information concerning a reference position stored beforehand in the information table during the process adjustment can be used as information setting a reference position again during the normal operation.

Preferably, the motor controller determines as a judgment position a position obtained by performing addition or subtraction with respect to the reference position read out from the storage via the first and the second data transmitter/receptor, detects an output value of the position detection sensor via the first and the second data transmitter/receptor at a timing in synchronization with the driving signal that drives the motor driver and at the judgment position, and judges whether the output value of the position detection sensor at the judgment position reaches the threshold value or not, so as to determine the reference position again. With this configuration, a reference position determined during the process adjustment is not detected directly during the normal operation. Instead, at a judgment position different from the reference position, a reference position is detected by judgment. Therefore, the generation of detection errors in origin, resulting from a variation in mechanism and electrical properties of a lens unit, can be prevented.

Preferably, the judgment position is located at a position ½ cycle of the driving signal away from the reference position read out from the storage. With this configuration, a distance between the judgment positions equals one cycle of the driving signal, which means that the reference position is included between the judgment positions. Therefore, the origin can be reproduced securely.

Preferably, the information table includes at least one of information on the number of magnetic poles of the motor, information on a rotation resolution of the motor, information on a driving voltage of the motor and information on a maximum driving rate of the motor.

Preferably, the imaging apparatus further includes a temperature sensor. The information table includes correction information by a temperature on a position of the focus lens, and the motor controller corrects the position of the focus lens in accordance with a temperature change based on temperature information of the temperature sensor and the correction information. With this configuration, even when the temperature changes, a focusing position can be kept.

Preferably, the imaging apparatus further includes an angular sensor. The information table includes correction information by an attitude angle on a position of the focus lens, and the motor controller corrects the position of the focus lens in accordance with an angle change based on angle information of the angular sensor and the correction information. With this configuration, even when an attitude angle changes, a focusing position can be kept.

Preferably, the information table includes information on the operation cycle of the motor, and the information on the operation cycle is updated in accordance with a movement distance or a movement time of the focus lens from turning on of a power supply of the imaging apparatus to completion of the power supply. With this configuration, the information on the operation cycle can be utilized as information relating to the maintenance such as a timing for replacing the motor.

Preferably, the motor is at least one selected from the group consisting of a stepping motor, a linear motor, an ultrasound motor, a motor configured with a smooth impact driving mechanism, an electrostatic motor and a piezoelectric motor.

Preferably, parity is added to transmission/reception data between the first transmitter/receptor and the second transmitter/receptor. With this configuration, it can be confirmed whether the transmission/reception data can be transmitted/received securely.

Preferably, the lens barrel further includes a position detection sensor whose output value varies with a position of the focus lens. The motor is driven by a periodic driving signal. When the focus lens is shifted in the direction of the optical axis in accordance with the driving signal, a phase of the driving signal when an output value of the position detection sensor reaches a threshold value is designated as a reference position of the focus lens, and information of the reference position is stored as information in the information table of the storage. With this configuration, information concerning a reference position stored beforehand in the information table during the process adjustment can be used as information setting a reference position again during the normal operation.

Preferably, the information table includes at least one of information on the number of magnetic poles of the motor, information on a movement distance resolution of the motor, information on a driving voltage of the motor and information on a maximum driving rate of the motor.

Preferably, the information table includes correction information by a temperature on a position of the focus lens. With this configuration, even when the temperature changes, a focusing position can be kept using the correction information of the focus lens position.

Preferably, the information table includes correction information by an attitude angle on a position of the focus lens. With this configuration, even when an attitude angle changes, a focusing position can be kept using the correction information of the focus lens position.

Preferably, the information table can store information on operation cycle of the motor. With this configuration, the information on the operation cycle can be utilized as information relating to the maintenance such as a timing for replacing the motor.

Preferably, the motor is at least one selected from the group consisting of a stepping motor, a linear motor, an ultrasound motor, a motor configured with a smooth impact driving mechanism, an electrostatic motor and a piezoelectric motor.

Preferably, parity is added to transmission/reception data between the first transmitter/receptor and the second transmitter/receptor. With this configuration, it can be confirmed whether the transmission/reception data can be transmitted/received securely.

According to the second imaging apparatus of the present invention, the origins of the first lens unit and the second lens unit can be detected using a common position detector. Thus, the number of components can be decreased, and the lens barrel can be miniaturized in the optical axis direction and in the outer rim direction.

In the second imaging apparatus of the present invention, preferably, the position detector includes a member to be detected that moves together with the second lens unit in the direction of the optical axis and a sensor that detects a position of the member to be detected in the direction of the optical axis.

Preferably, the position of the first lens unit is detected by bringing the first lens unit into contact with the second lens unit by shifting the first lens unit by the first driver, followed by movement of the second lens unit together with the first lens unit., and by detecting a position of the member to be detected, which moves together with the movement, by means of the position detector.

Preferably, the position of the second lens unit is detected by shifting the first lens unit together with the second lens unit by the first driver, followed by shifting of the second lens unit by the second driver, and by detecting a position of the member to be detected, which moves together with the shifting of the second lens unit, by means of the position detector.

Preferably the second lens unit is moveable along a supporting member in the direction of the optical axis. Shifting of the second lens unit by the second driver is performed by way of a movement restriction unit that is shifted by the second driver. Shifting of the second lens unit by the first driver is performed by way of a movement conveying unit that moves to be linked with the first lens unit. The movement restriction unit and the movement conveying unit both are disposed closer to the supporting member.

Preferably, the position detector is a light-transmission type sensor, and the member to be detected is a photo-interruption member of the light-transmission type sensor.

Preferably the first lens unit is a zoom lens unit, and the second lens unit is a focus lens unit.

According to the third imaging apparatus of the present invention, even in the case of the abnormal stopping where electric power is supplied externally and such power supply is shut off abruptly, for example, the origin detection process can be performed smoothly and the apparatus can be returned to the normal state when electric power is supplied again.

In the third imaging apparatus of the present invention, preferably, when electric power is supplied after the abnormal completion state, the first lens unit and the second lens unit are returned to the normal completion state in accordance with the information stored in the storage, and the first lens unit is shifted at least by the first driver so as to perform the predetermined process operation for supplying the electric power.

Preferably, the storage is a nonvolatile memory or a volatile memory driven by a secondary power supply.

Preferably, the first lens unit is a zoom lens unit, and the second lens unit is a focus lens unit.

According to the driving apparatus of the present invention, the rotor can be controlled for alignment accurately without using a sensor or the like.

In the driving apparatus of the present invention, the calculation unit resets the origin by reading out the exciting position stored in the origin storage unit, making the driver drive the stepping motor so as to advance the exciting position so that the body to be driven is brought closer to the restriction end, and advance the exciting position from a state where the movement of the body to be driven is restricted by the restriction end to the position corresponding to the read out exciting position, and resetting a value of the absolute position corresponding to this exciting position.

Preferably, the number of patterns of the exciting current supplied to the stepping motor is n+1 from 0 to n (n+1 is an even number of 4 or more). As the number of the patterns of the exciting current is advanced from 0 to n, the body to be driven approaches the restriction end, assuming that when restriction of movement of the body to be driven is started, the number of the pattern of the exciting current is n, and the exciting positions have the number of 0 to n corresponding to the respective numbers of the patterns of the exciting current, the number of the exciting position corresponding to the origin is within a range from (n+1)/2 to n−1.

Preferably, the driving apparatus further includes an offset storage unit that stores an offset movement amount corresponding to a movement, amount from the exciting position stored in the origin storage unit to a specific position that is a predetermined distance away from the exiting position stored in the origin storage unit. The calculation unit controls, after resetting the origin of the body to be driven, the driver so as to make the body to be driven move by the offset movement amount stored in the offset storage unit. With this configuration, the time required to make the imaging apparatus ready for the operation after turning the power on can be shortened.

Preferably, the body to be driven is a stop that controls a light amount of a subject light.

In the fourth lens driving apparatus of the present invention, preferably, the body to be driven is the lens supporting frame and a stop that controls a light amount of a subject light.

The following describes one embodiment of the present invention, with reference to the drawings.

Embodiment 1

FIG. 1 includes a schematic diagram and a block diagram of a lens driving apparatus according to Embodiment 1 of the present invention. In FIG. 1, numeral 1 denotes a lens barrel, 2 denotes a fixed lens fixed to the lens barrel 1 and 3 denotes a zoom lens. The zoom lens 3 moves in the optical axis direction so as to adjust a zoom magnification along with the rotation of a zoom ring 6 along the perimeter of the lens barrel 1. Numeral 4 denotes a focus lens. When a motor 9 as a driver rotates, the focus lens 4 moves in the optical axis direction along a lead screw with threads cut therein so as to enable the adjustment of focus.

In the example of FIG. 1, the motor 9 is a stepping motor that rotates in accordance with a phase of a driving signal (exciting signal) for a motor coil output from a focus motor driving unit 11. Numeral 5 denotes an imaging device that converts an image of a subject captured through the fixed lens 2, the zoom lens 3 and the focus lens 4 into an electric signal. Numeral 7 denotes a photo-interruption member that is fixed to a frame of the focus lens 4. As illustrated by the dotted lines of FIG. 1, the focus lens 4 is shifted toward the imaging device 5 so as to interrupt a photosensor 8 as a position detection sensor by the photo-interruption member 7, whereby the origin (reference position) of the focus lens 4 is detected.

Numeral 10 denotes a zoom ring position detection unit that detects a rotation position of the zoom ring 6. The position is detected for example using a pulse generated in accordance with the rotation of the zoom ring 6 or a linear position sensor whose resistance value varies in accordance with the shifting distance of the zoom lens 3 in the optical axis direction. Numeral 12 denotes a signal processing unit that generates image data and contrast information for performing focus adjustment based on an electric signal output from the imaging device 5.

Numeral 13 denotes a system control unit as lens position calculator. The system control unit 13 functions so as to provide an instruction for driving the focus lens 4 to a focus motor control unit 15, which allows a user to perform focus adjustment based on an image processed by the signal processing unit 12, or to give an instruction for driving the focus lens 4 so as to maximize the contrast based on the contrast information of the signal processing unit 12 for enabling automatic focus adjustment (auto-focus function).

Figure 2:
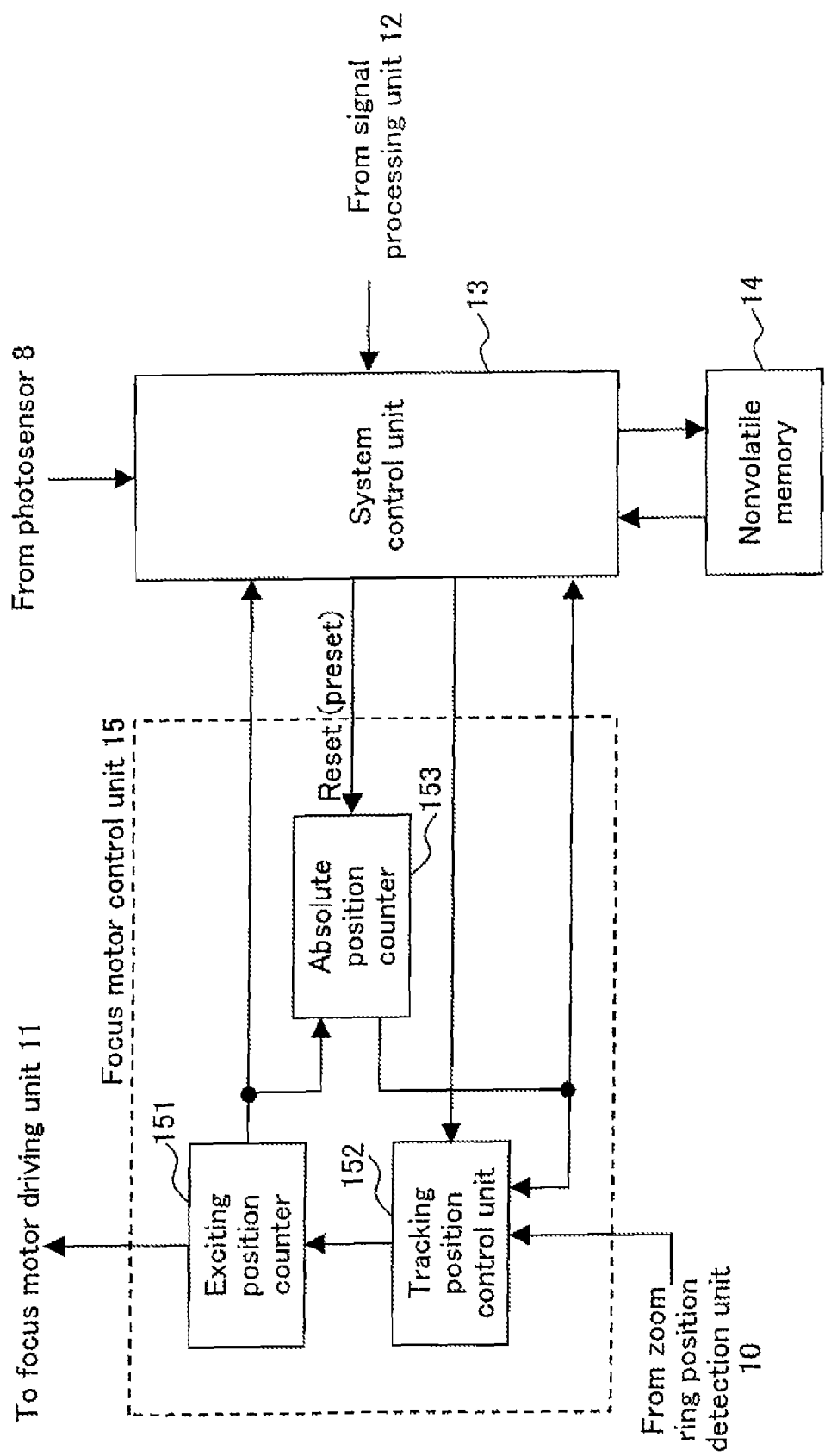
FIG. 2 is a detailed block diagram of a focus motor control unit according to Embodiment 1 of the present invention.

FIG. 2 is a detailed block diagram of the focus motor control unit 15 shown in FIG. 1. In FIG. 2, the focus motor control unit 15 is made up of an exciting position counter 151, a tracking position control unit 152 and an absolute position counter 153. The exciting position counter 151 counts up or counts down the exciting position counter for controlling a phase of a driving signal for the motor 9 based on a focus moving direction and moving step information output from the tracking position control unit 152.

The tracking position control unit 152 outputs the focus moving direction and the moving step information for controlling the position of the focus lens 4 in accordance with instruction information from the system control unit 13 based on the zoom position information output from the zoom ring position detection unit 10 and the focus position information output from the absolute position counter 153.

In the above-stated configuration, the position of the focus lens 4 is controlled by the rotation of the motor 9. Further, the rotation of the motor 9 is controlled by a driving signal from the focus motor driving unit 11 that receives a signal from the focus motor control unit 15. That is, the motor 9, the focus motor driving unit 11 and the focus motor control unit 15 make up a lens position controller.

When the focus lens 4 is driven toward the imaging device 5 so that the photosensor 8 is interrupted by the photo-interruption member 7, thus changing a signal level of the photosensor to exceed a threshold value under a predetermined condition (or fall below a threshold value in some circuit configurations), the system control unit 13 performs a process for resetting the absolute position counter 153.

The system control unit 13 further includes an AD converter that analog-to-digital converts a signal output from the photosensor 8, and the system control unit 13 handles the signal level of the photosensor 8 as a digital value. For instance, an 8-bit AD converter with an input D range of 3 V may be used. In this case, when an output level of the photosensor changes from 0 V to 3 V, this output level can be represented with digital values ranging from 0 to 255.

The absolute position counter 153 operates in synchronization with a counter value of the exciting position counter 151. The exciting position counter 151 comes full circle to correspond to one cycle (360 degrees) of a driving electrical angle of the motor 9, whereas the absolute position counter 153 shows the absolute position with reference to a value reset under a predetermined condition. Numeral 14 denotes a nonvolatile memory, by which writing and reading operations with respect to the exciting position counter 151 can be conducted. As described later, the nonvolatile memory 14 serves as reference position storage.

Figure 3:
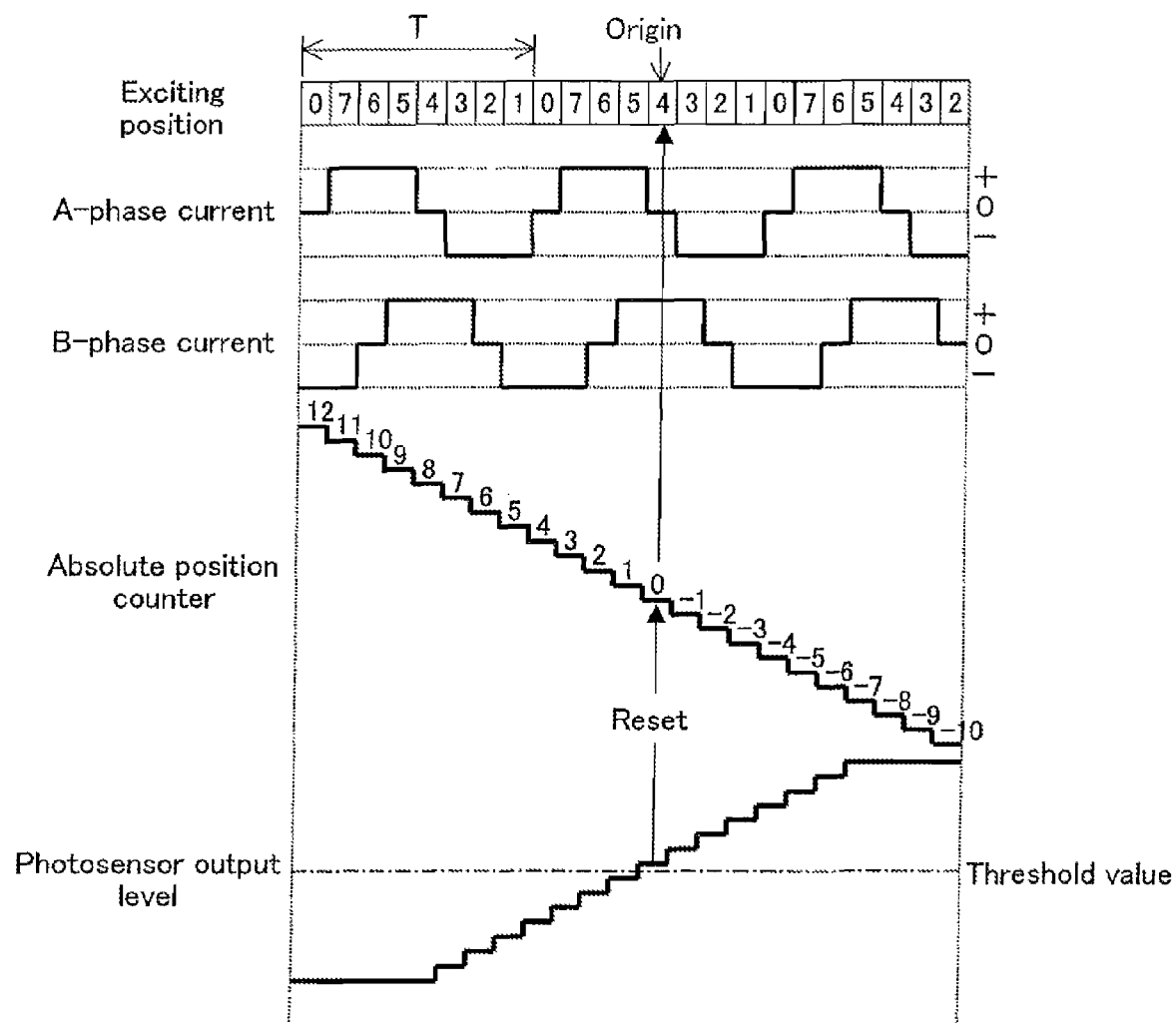
FIG. 3 is a drawing for explaining an origin detection operation during the process adjustment according to Embodiment 1 of the present invention.

The operation of the thus configured lens driving apparatus is described below, with reference to FIG. 3. FIG. 3 is a drawing for explaining an origin detection operation during the process adjustment according to Embodiment 1. The "exciting position" shown in FIG. 3 corresponds to a phase of the driving signal, which represents a 3-bit counter value of the exciting position counter 151 obtained by dividing one cycle of 360 degrees of a driving signal for the motor coil of the motor 9 output from the focus motor driving unit 11 into 8 sections. This drawing shows a state where the exciting position is decreased one by one along with the movement of the focus lens 4 to the imaging device 5 side.

The "A-phase current" and the "B-phase current" show current waveforms of the motor coil that the focus motor driving unit 11 outputs to the motor 9, and in this example the motor 9 has a two-phase coil with the A-phase and the B-phase. The A-phase current and the B-phase current have electrical angles different from each other by the phase of 90° (in the case where one cycle of the current waveform is 360 degrees), and the motor 9 is rotated by applying a current to the motor coil with the A-phase and the B-phase. In this drawing, the focus lens 4 moves to the imaging device 5 side while the A-phase current is 90° leading relative to the B-phase current.

The "absolute position counter" represents a counter value of the absolute position counter 153, and operates in synchronization with the exciting position. In the case where the exciting position is decreased one by one, the absolute position counter also is decreased one by one. Herein, the absolute position counter sets a bit width so that the same value is not assigned to different positions in the movement range of the focus lens 4.

The "photosensor output level" shows the state where the output level changes as the focus lens 4 moves toward the imaging device 5 so that the photosensor 8 is interrupted by the photo-interruption member 7.

Figure 4:
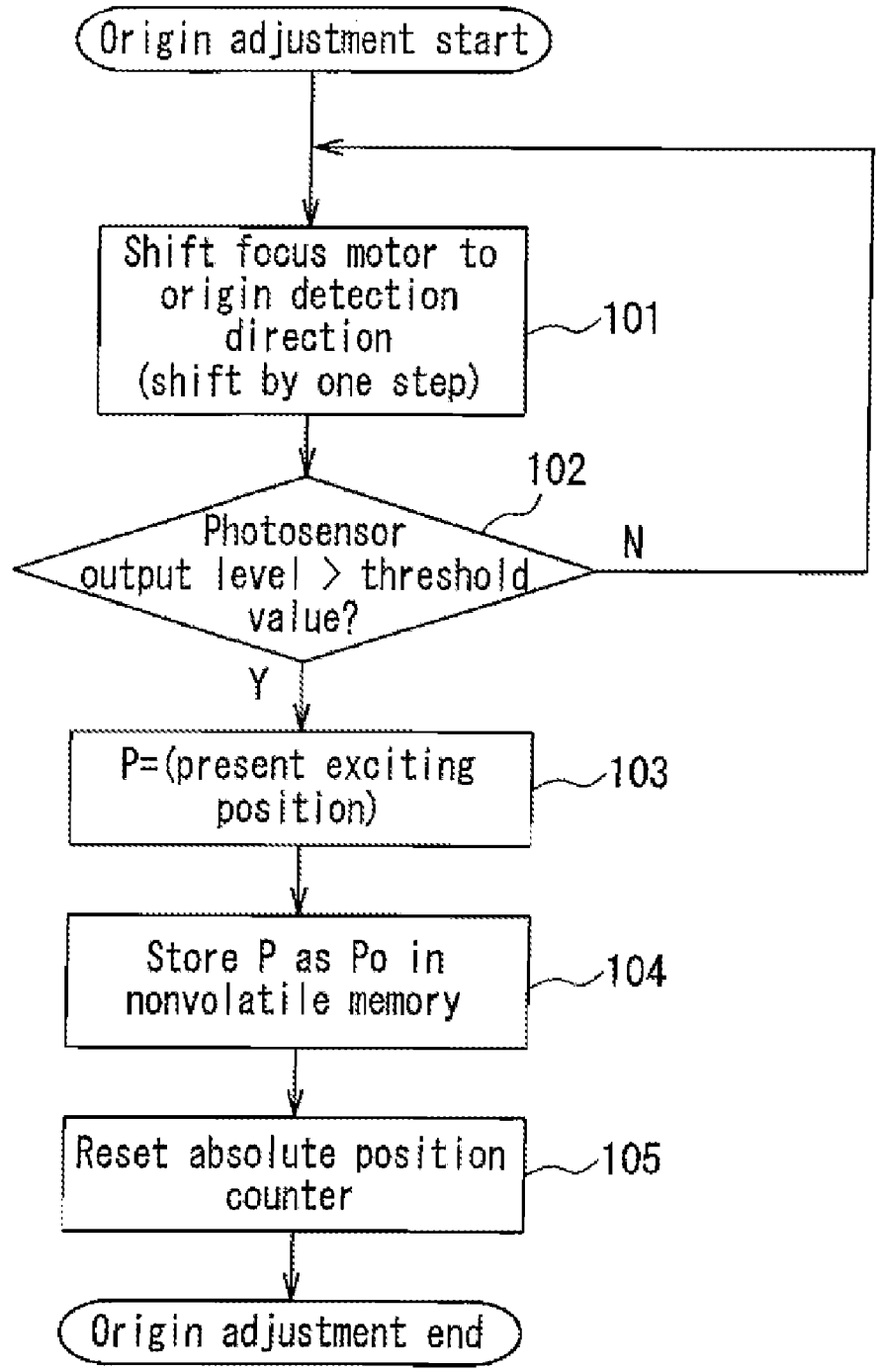
FIG. 4 is a flowchart of the origin detection operation during the process adjustment according to Embodiment 1 of the present invention.

Referring now to FIGS. 3 and 4, the origin detection operation of the focus lens 4 during the process adjustment is described more specifically. FIG. 4 is a flowchart of the origin detection operation according to Embodiment 1 of the present invention, which shows an operation flow described as a program in the system control unit 13. When the power is turned on, the process starts with "origin detection adjustment start".

In Step 101 the motor 9 as a focus motor is shifted to the origin detection direction (the direction of the imaging device 5) by one step at a time. In this case, the exciting position counter 151 is decreased one by one. More specifically, in response to an instruction from the system control unit 13, the exciting position counter 151 is down-counted via the tracking position control unit 152. In accordance with this down-counting, the focus motor driving unit 11 rotates the motor 9 so as to shift the focus lens 4 toward the imaging device 5.

In Step 102, a judgment is made as to whether the photosensor output level exceeds a threshold value or not. In the case of not exceeding, the process returns to Step 101 to make the motor 9 conduct the next one step operation. In the case of exceeding, the process goes to Step 103, where the exciting position at the time of exceeding is substituted as P. In this case, the exciting position "4" is substituted as P. In Step 104, P is stored as Po in the nonvolatile memory 14. In Step 105, the absolute position counter is reset. In FIG. 3, the position indicated with "0" shows the reset position.

Figure 5:
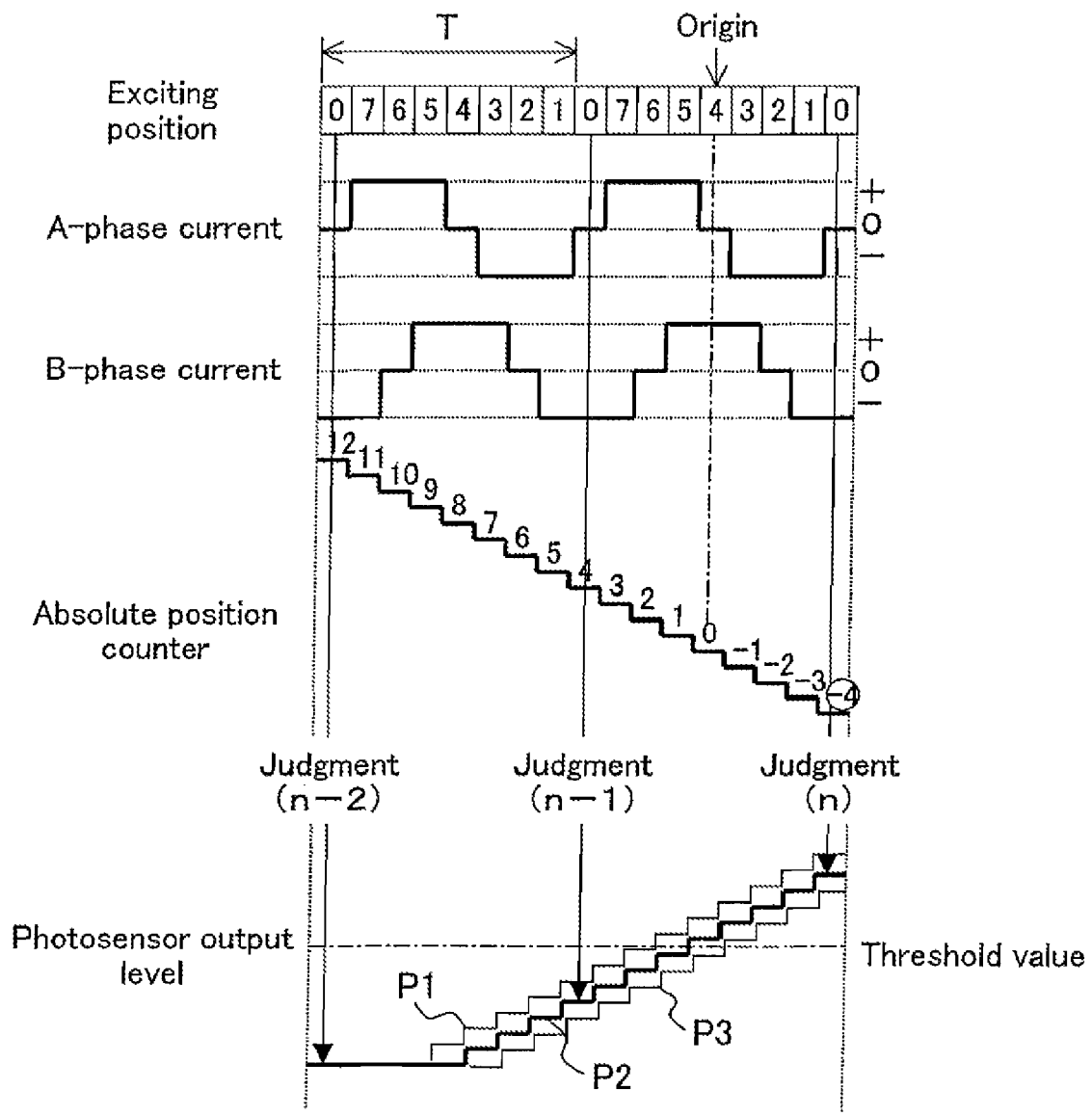
FIG. 5 is a drawing for explaining an origin detection operation during the normal operation according to Embodiment 1 of the present invention.
Figure 6:
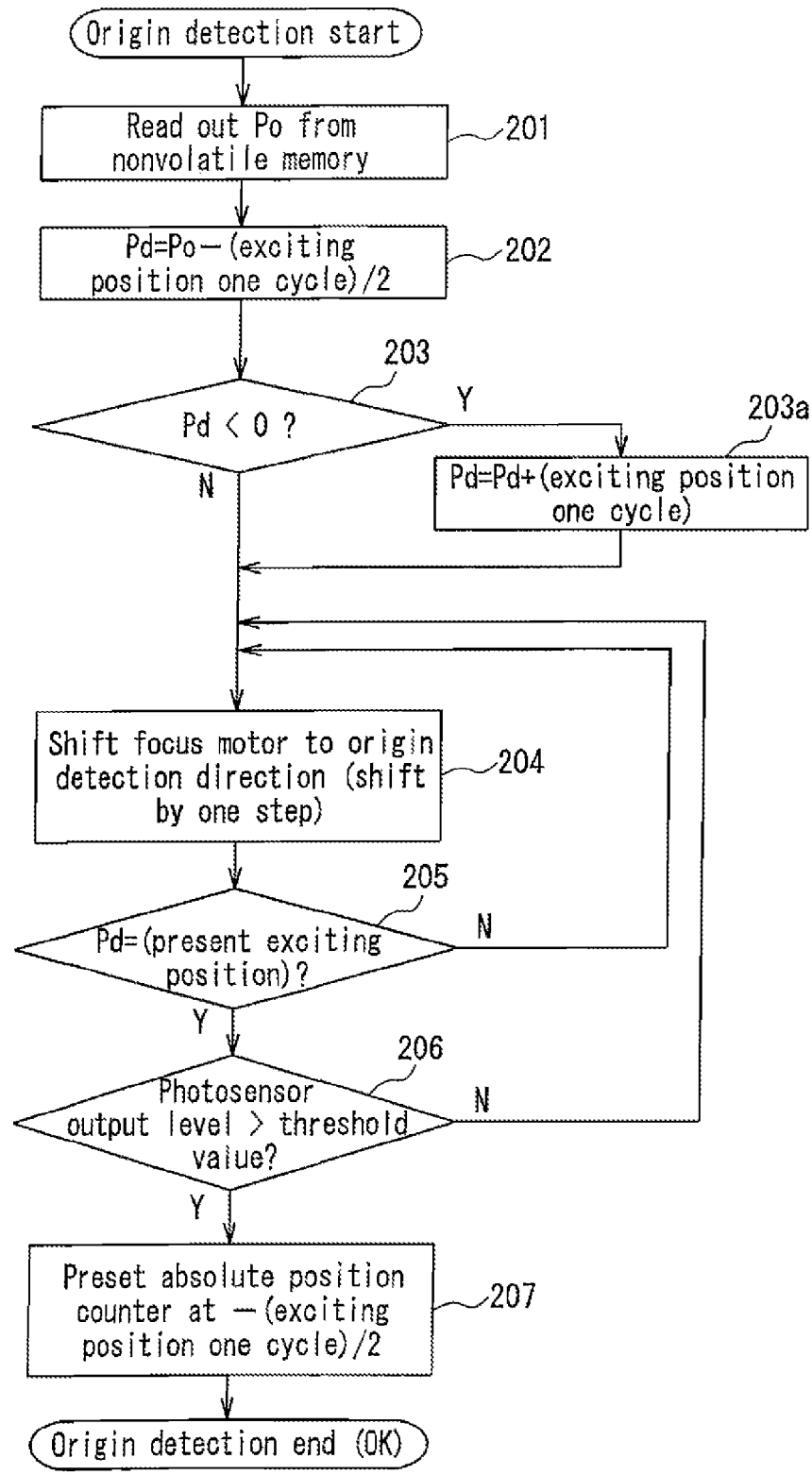
FIG. 6 is a flowchart of the origin detection operation during the normal operation according to Embodiment 1 of the present invention.

Next, the origin detection operation of the focus lens 4 during the normal operation is described, with reference to FIGS. 5 and 6. FIG. 5 is a drawing for explaining the origin detection operation during the normal operation according to Embodiment 1. FIG. 6 is a flowchart of the origin detection operation during the normal operation according to Embodiment 1, which shows an operation flow described as a program in the system control unit 13. Since the exciting position, the A-phase current, the B-phase current, the absolute position counter and the photosensor output level shown in FIG. 5 are the same as those described in FIG. 3, the explanations for the duplication are omitted.

In FIG. 6, when the power is turned on, the process starts with "origin detection start". In Step 201, Po is read out from the nonvolatile memory 14. In Step 202, Pd is calculated from the following formula (1):

$$Pd=Po-(exciting\ position\ one\ cycle)/2 \quad (formula\ 1),$$

where (exciting position one cycle) is "8". During the above-described origin detection operation for the focus lens 4 during the process adjustment, the value stored in the nonvolatile memory 14 is "4". Therefore, in this example, Pd=4=8/2=0.

In Step 203, a judgment is made as to whether Pd is negative or not. In the case where Pd is 0 or positive, the process goes to the next Step 204. In the case where Pd is negative, Pd=Pd+(exciting position one cycle) is calculated in Step 203*a*, and then the process goes to the next Step 204. When Pd is negative, there is no corresponding numerical value for the exciting position. However, the calculation in Step 203*a* allows the exciting position Pd that differs by half cycle from Po to be determined.

In Step 204, the motor 9 is shifted by one step at one time to the origin detection direction (the direction of the imaging device 5) (decrease the exciting position counter one by one). More specifically in response to an instruction from the system control unit 13, the exciting position counter 151 is down-counted via the tracking position control unit 152. In accordance with this down-counting, the focus motor driving unit 11 rotates the motor 9 so as to shift the focus lens 4 toward the imaging device 5.

In Step 205, a judgment is made as to whether the present exciting position equals Pd (in this example, Pd=0) or not. In the case of not being equal, the process returns to Step 204 to make the motor 9 conduct the next one step operation. In the case of being equal, the process goes to the next Step 206. In the example of FIG. 5, the positions indicated by the judgment (n−2), the judgment (n−1) and the judgment (n) equal Pd (Pd=0) in the exciting position. In Step 206, a judgment is made as to whether the photosensor output level exceeds a threshold value or not at each of these positions.

Firstly, at the position of the judgment (n−2), a judgment is made as to whether the photosensor output level exceeds the threshold value or not. In the example of FIG. 5, it does not exceed the threshold value, and therefore the process returns to Step 204 to make the motor 9 conduct the next one step operation. After the repetition of one step operation, at the position of the judgment (n−1), a judgment is made again as to whether the photosensor output level exceeds the threshold value or not. In the example of FIG. 5, it does not exceed the threshold value, and therefore the process returns to Step 204 to make the focus motor conduct the next one step operation. After the repetition of one step operation, at the position of the judgment (n), a judgment is made again as to whether the photosensor output level exceeds the threshold value or not. In the example of FIG. 5, it exceeds the threshold value. In this case, the process goes to Step 207, where the absolute position counter 153 is preset at −(exciting position one cycle)/2. Since (exciting position one cycle) in this example=8, the absolute position counter 153 is preset at "−4" (as shown in FIG. 5, the value of the absolute position counter surrounded with the circle ◯).

Herein, the photosensor output level indicated by P2 in FIG. 5 shows a level variation under the conditions of the mechanism and electrical properties at the same operational environmental temperature and humidity as those during the process adjustment. However, during the normal operation in which the power may be turned on repeatedly, the photosensor output level generates a variation different from P2 in the respective exciting positions as indicated by P1 and P3. This results from errors in looseness in the lens unit driving direction and variations in mechanism and electrical properties due to a temperature and humidity change in the operation environment.

In the present embodiment, in the origin detection operation during the normal operation, a judgment is made as to whether the photosensor output level exceeds a threshold value or not at the judgment (n−2), the judgment (n−1) and the judgment, (n) shown in FIG. 5, as described above. From this, even when a variation occurs within the range from P1 to P3, the absolute counter 153 always is preset at "−4", and when the absolute position counter is "0", the exciting position of the motor 9 always becomes "4", thus allowing the origin during the process adjustment to be reproduced.

More specifically, the exciting position for each judgment is at the position of Pd (Pd=0) as described above. Since Pd is a value calculated from the above formula (1), this is located at a position different from the origin Po (the position with the exciting position of "4") by a half cycle. Thus, between the position of Pd and the next Pd, i.e., between the judgment position and the next judgment position, the exciting position varies by one cycle, which always passes through the position with the exciting position of "4".

Although the position with the exciting position of "4" is located between one judgment position and the next judgment, position, this exciting position "4" is not the origin if none of the photosensor output levels exceed a threshold value. On the other hand, if the photosensor output level at one judgment position does not exceed a threshold value but the photosensor output level at the next judgment position exceeds the threshold value, the exciting position "4" between these judgment positions is the origin.

As described above, the exciting position at the judgment position is located at a position different from the origin by half cycle. Therefore, if the absolute position counter 153 at the judgment position where the photosensor output level exceeds a threshold value is preset at "−4", the position with the absolute position counter of "0" can be the origin obtained during the process adjustment.

If there is a variation in photosensor output level as indicated by P1 and P3 of FIG. 5, the photosensor output level will exceed a threshold value at a position other than the origin. Therefore, even if the position with the photosensor output level exceeding a threshold value is judged as the origin, that position is not the origin. According to the present embodiment, there is no need to detect the origin directly, but if it can be detected that the photosensor output level at one judgment position does not exceed a threshold value but the photosensor output level at the next judgment position exceeds the threshold value, the origin can be detected accurately.

Note here that a range of errors in looseness of the lens unit in the driving direction and variations in mechanism and electrical properties due to a temperature and humidity change in the operation environment should be within the exciting position one cycle.

In the example of the above-stated Step 202, (exciting position one cycle)/2 is subtracted from Po as in the above-stated formula (1). However, (exciting position one cycle)/2 may be added as in the following formula (2)

$$Pd=Po+(\text{exciting position one cycle})/2. \quad \text{(formula 2)}$$

In this case, if Pd≧(exciting position one cycle) in Step 203, Pd is calculated from the following formula 3 in Step 203a. From this, the exciting position Pd can be determined so as to differ from Po by a half cycle.

$$Pd=Pd-(\text{exciting position one cycle}). \quad \text{(formula 3)}$$

For instance, in the present embodiment, Po=4 and the exciting position one cycle is 8. Therefore, the value of the above-stated formula (2) becomes 4+4=8, and this value can satisfy the relationship of Pd≧exciting position one cycle. Thus, when Pd is determined from the formula (3), 8−8=0, which is the same result as that using the formula (1). In this way, the formula (2) can be used instead of the formula (1), which holds true for the respective embodiments that will be described later.

Figure 7:
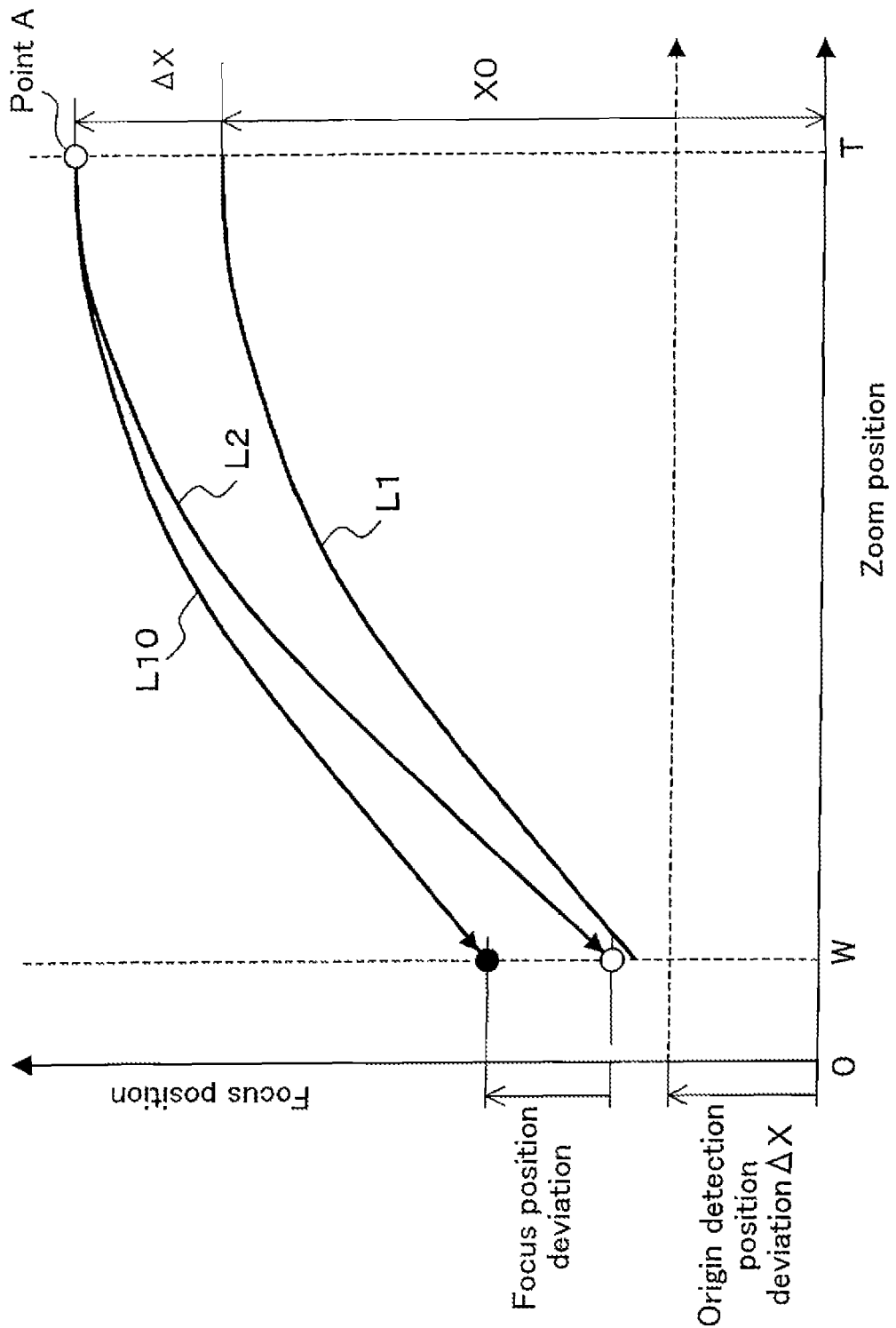
FIG. 7 is a graph showing the relationship between the zoom position and the focus position according to Embodiment 1 of the present invention.

FIG. 7 is a graph showing the relationship between the zoom position and the focus position, L1 represents the relationship between the zoom position and the focus position enabling the zoom operation while keeping the focus condition, when the distance from the front face of the fixed lens to the subject is set at 2 m, for example. L2 represents the relationship between the zoom position and the focus position enabling the zoom operation while keeping the focus condition, when the distance from the front face of the fixed lens to the subject is set at 1 m, for example.

T of the zoom position on the horizontal as shows a telephoto side, and W shows a wide-angle side. Assuming that the distance from the front face of the fixed lens to the subject is 1 m under the ideal condition without deviation in origin detection of the focus, in the case where the focus position is determined on the T side (point A of the drawing), the zooming operation can be conducted while keeping the focus condition along the graph of L2 when the zoom position is shifted to the W side.

However, in the case where the focus position is determined on the T side with the distance from the front face of the fixed lens to the subject set at 2 m, this may agree with the point (point A of the drawing) on the T side under the ideal condition when the distance from the front face of the fixed lens to the subject is 1 m, due to an influence of the deviation ΔX in origin detection. In such a case, when the zoom position is shifted to the W side, the zooming operation will be conducted based on the graph L10 in which the focus position is deviated from L1 by ΔX. Therefore, the focus position will be deviated on the W side. According to the present invention, this does not occur, and the origin detection operation free from influences of errors in looseness of the focus lens unit in the driving direction and variations in mechanism and electrical properties due to a temperature and humidity change in the operation environment can be realized. Therefore, the accuracy in absolute position of the focus lens unit can be enhanced remarkably, and especially the present invention is effective for a system performing a zooming operation while maintaining a focus condition.

Embodiment 2

The following describes Embodiment 2 of the present invention. Embodiment 2 is the same as in Embodiment 1 in the configuration shown in FIG. 1 and FIG. 2 and the origin detection operation during the process adjustment described referring to FIG. 3 and FIG. 4.

Figure 8:
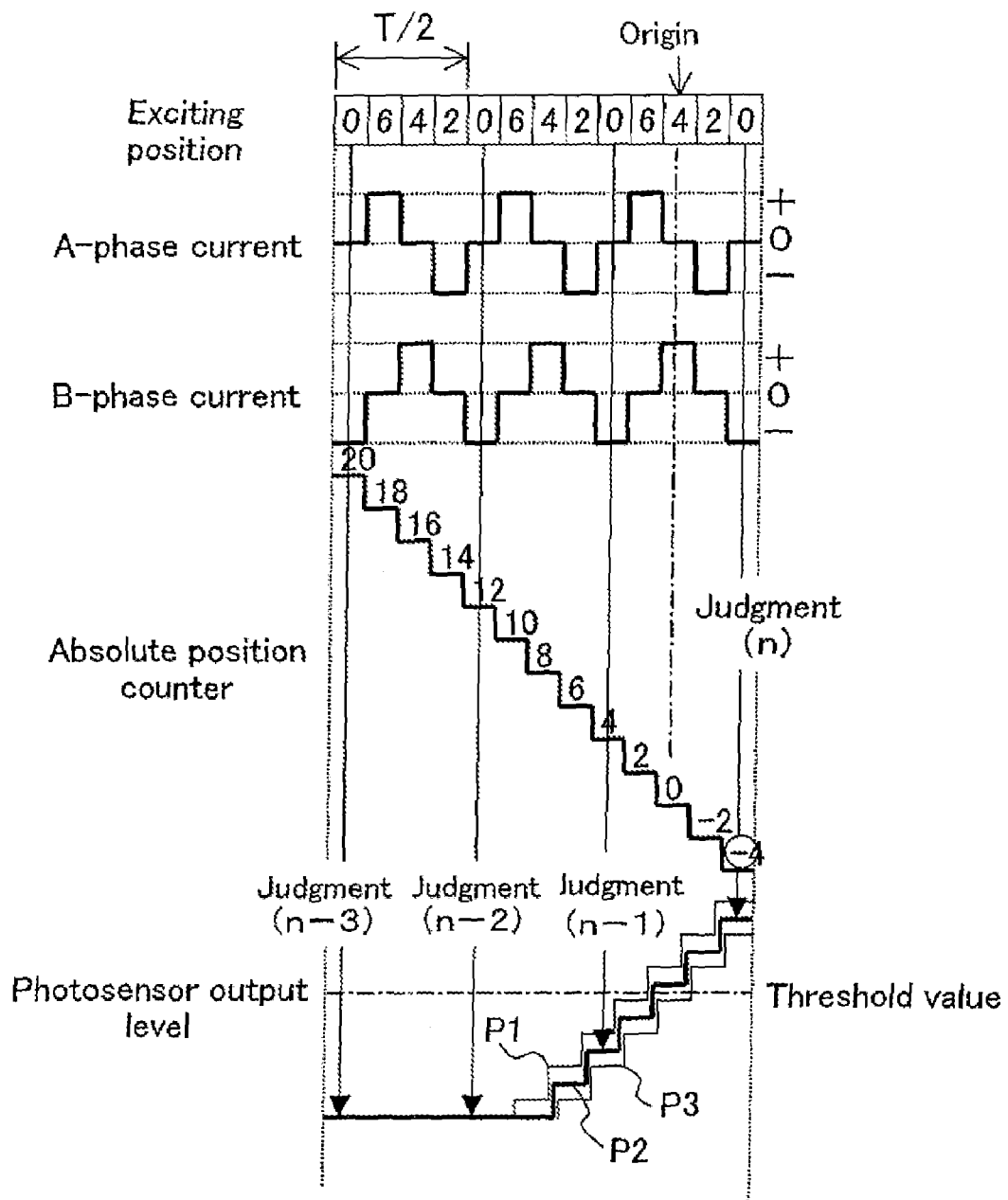
FIG. 8 is a drawing for explaining an origin detection operation during the normal operation according to Embodiment 2 of the present invention.
Figure 9:
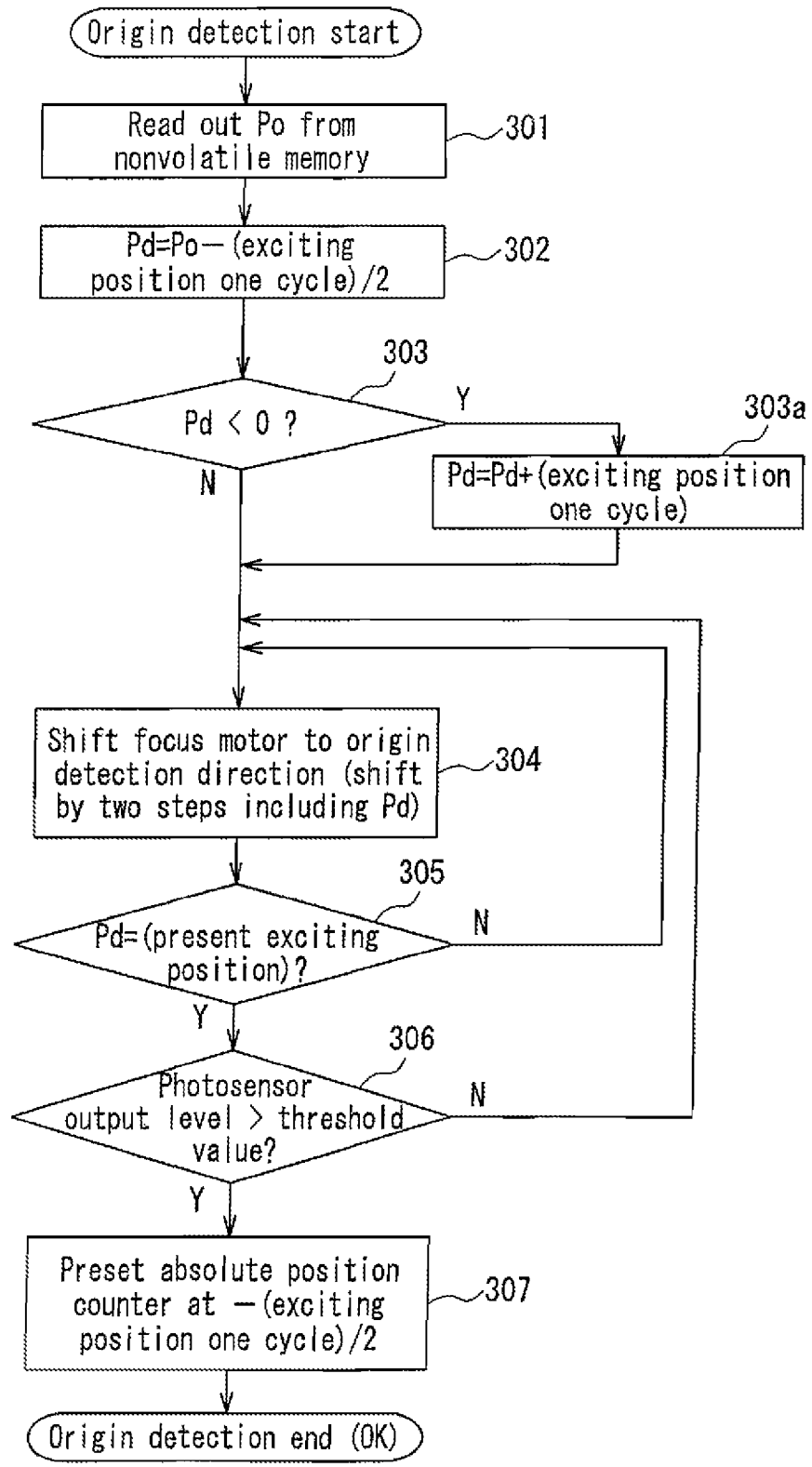
FIG. 9 is a flowchart, of the origin detection operation during the normal operation according to Embodiment 2 of the present invention.

Referring now to FIGS. 8 and 9, the origin detection operation of a focus lens 4 during the normal operation in Embodiment 2 is described below. FIG. 8 is a drawing for explaining the origin detection operation during the normal operation according to Embodiment 2. Since the exciting position, the A-phase current, the B-phase current, the absolute position counter and the photosensor output level shown in FIG. 8 are the same as those described in FIG. 3, the duplicate explanations are omitted.

Embodiment 2 is different from Embodiment 1 in that the exciting position is decreased by two at one time when the focus lens 4 is shifted to the imaging device 5 side. Therefore, an absolute position counter 153, which operates in synchronization with the exciting position, also is decreased by two at one time. Herein, the absolute position counter sets a bit width so that the same value is not assigned to different positions in the movement range of the focus lens 4.

In Embodiment 1, the time for one cycle of the driving signal is the time T for both of the process adjustment and the normal operation as shown in FIGS. 3 and 5. However, in Embodiment 2, the time for one cycle of the driving signal during the normal operation is T/2 as shown in FIG. 8. Thereby, Embodiment 2 enables the origin detection operation during the normal operation at twice the speed of Embodiment 1.

FIG. 9 is a flowchart of the origin detection operation during the normal operation according to Embodiment 2, which shows an operation flow described as a program in the system control unit 13. When the power is turned on, the process starts with "origin detection start". In Step 301, $P_o$ is read out from the nonvolatile memory 14. In Step 302, in accordance with the above-stated formula (1), Pd=$P_o$−(exciting position one cycle)/2 is calculated, where (exciting position one cycle) is 8. Also in Embodiment 2, the example is explained where the value stored in the nonvolatile memory 14 is "4" similarly to Embodiment 1.

Therefore, in this embodiment also, Pd=4−8/2=0. In Step 303, a judgment is made as to whether Pd is negative or not. In the case where Pd is 0 or positive, the process goes to the next Step 304. In the case where Pd is negative, Pd=Pd+ (exciting position one cycle) is calculated in Step 303a, and then the process goes to the next. Step 304. The reason for undergoing Step 303a in the case of Pd being negative is the same as the reason for undergoing Step 203a of FIG. 6 in Embodiment 1.

In Step 304, the motor 9 is shifted by two steps at one time to the origin detection direction (the direction of the imaging device 5) (decrease the exciting position counter by two at one time with the rotation pitch S=2). Herein, the exciting position is set so as to include the above-obtained Pd (in this case, Pd=0).

More specifically in response to an instruction from the system control unit 13, the exciting position counter 151 is down-counted via the tracking position control unit 152. In accordance with this down-counting, the focus motor driving unit 11 rotates the motor 9 so as to shift the focus lens 4 toward the imaging device 5.

In Step 305, a judgment is made as to whether the present exciting position equals Pd (in this example, Pd=0) or not. In the case of not being equal, the process returns to Step 304 to make the motor 9 conduct the next two-step operation. In the case of being equal, the process goes to a judgment at the next Step 306.

The judgment positions are the positions indicated by the judgment (n−3), the judgment (n−2), the judgment (n−1) and the judgment (n) of FIG. 8. In Step 306, a judgment is made as to whether the photosensor output level exceeds a threshold value or not. In the case of not exceeding, the process returns to Step 304 to make the focus motor conduct the next two-step operation. In the case of exceeding, the process goes to Step 307. At the time of exceeding, the absolute position counter 153 is preset at −(exciting position one cycle)/2. Herein, this is preset at "−4" because (exciting position one cycle)=8 (as shown in FIG. 8, the value of the absolute position counter surrounded with the circle ○).

Similarly to Embodiment 1, even when there is a variation in photosensor output level within the range from P1 to P3, the origin during the process adjustment can be reproduced securely. In addition to this, Embodiment 2 enables the origin detection operation during the normal operation at twice the speed of Embodiment 1.

Incidentally, similarly to Embodiment 1, a range of errors in looseness of the lens unit in the driving direction and variations in mechanism and electrical properties due to a temperature and humidity change in the operation environment should be within the exciting position one cycle.

Embodiment 3

The following describes Embodiment 3 of the present invention. In the following description, duplication of the configurations shown in FIG. 1 and FIG. 2 described in Embodiment 1 is omitted. Embodiment 3 explains the example where the focus motor driving unit 11 of FIG. 1 drives the motor 9 to rotate by substantially sine wave driving (called also microstep driving). Further, the exciting position counter 151 of FIG. 2 is a 5-bit counter that comes full circle with the counter value of 32 representing one cycle (360 degrees) of the driving electrical angle of the motor 9. The absolute position counter 153 operates in synchronization with the counter value of the exciting position counter 151, and is preset or reset under a predetermined condition described later.

Figure 10:
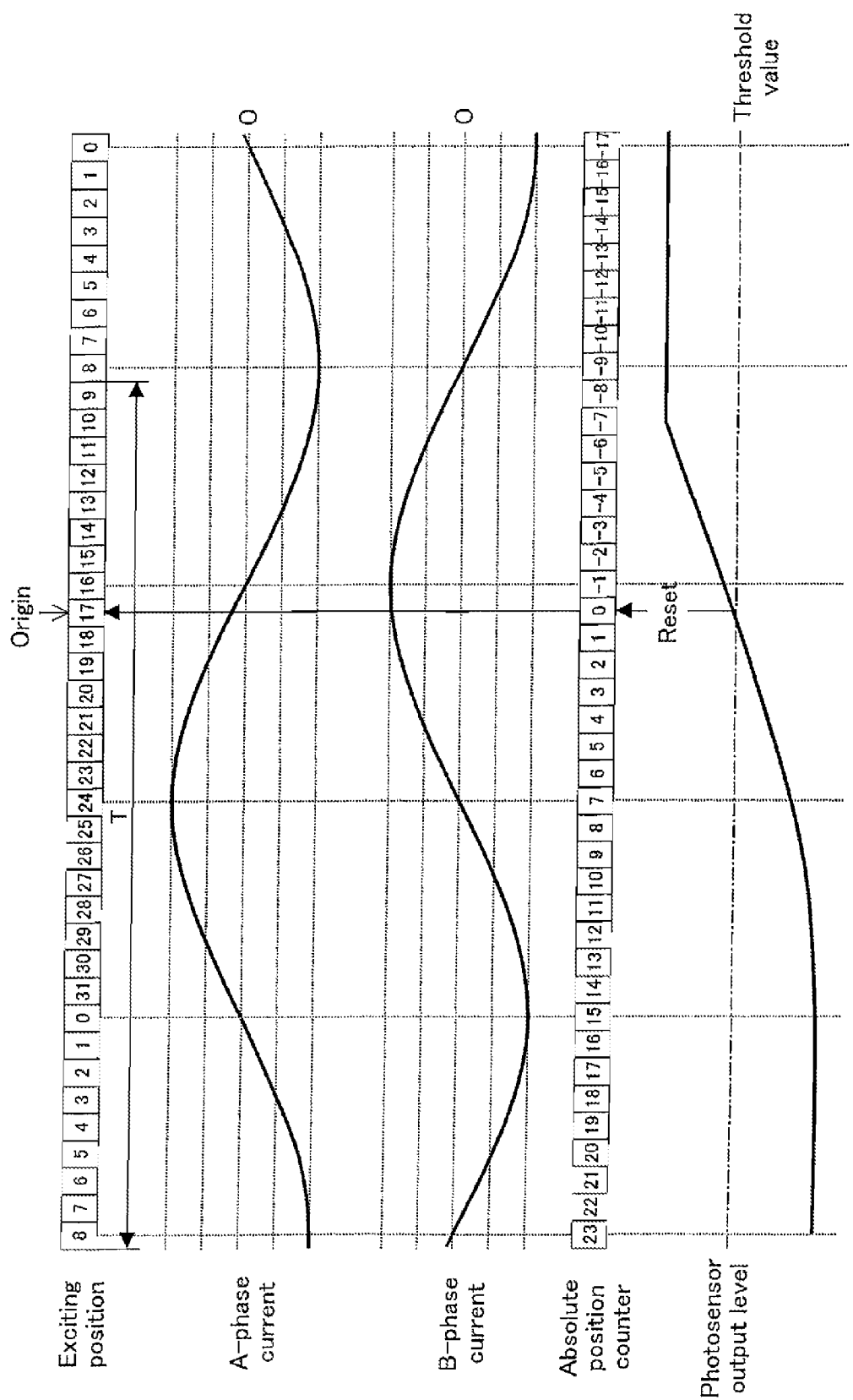
FIG. 10 is a drawing for explaining an origin detection operation during the process adjustment according to Embodiment 3 of the present invention.

The operation is described below, with reference to FIG. 10. FIG. 10 is a drawing for explaining an origin detection operation during the process adjustment according to Embodiment 3. The "exciting position" shown in FIG. 10 corresponds to a phase of the driving signal, which represents a 5-bit counter value for the exciting position counter 151 obtained by dividing one cycle of 360 degrees of a driving signal for the motor coil of the motor 9 output from the focus motor driving unit 11 into 32 sections.

This drawing shows a state where the exciting position is decreased one by one along with the movement of the focus lens 4 to the imaging device 55 side. The "A-phase current" and the "B-phase current" show current waveforms in a substantially sine wave form of the motor coil that the focus motor driving unit 11 outputs to the motor 9, and in this example the motor 9 has a two-phase coil with the A-phase and the B-phase. The A-phase current and the B-phase current have electrical angles different from each other by the phase of 90° (in the case where one cycle of the current waveform is 360 degrees), and the motor 9 is rotated by applying a current to the motor coil with the A-phase and the B-phase. In this drawing, the focus lens 4 moves to the imaging device 5 side while the A-phase current is 90° leading relative to the B-phase current.

Herein, the focus motor driving unit 11 is configured so as to output a substantially sine wave formed current waveform by using a ROM table in which the relationship between the counter value of the exciting position counter 151 and the driving current value is set beforehand, for example. The "absolute position counter" represents a counter value of the absolute position counter 153, and operates in synchronization with the exciting position. In the case where the exciting position is decreased one by one, the absolute position counter also is decreased one by one. Herein, the absolute position counter sets a hit width so that the same value is not assigned to different positions in the movement range of the focus lens 4.

The "photosensor output level" shows the state where the output level changes as the focus lens 4 moves toward the imaging device 5 so that the photosensor 8 is interrupted by the photo-interruption member 7.

Referring now to FIGS. 4 and 10, the origin detection operation of the focus lens 4 during the process adjustment is described more specifically. Although FIG. 4 is a flowchart of the origin detection operation according to Embodiment 1, this flowchart is common to Embodiment 3. However, since there are some different, parts in setting the conditions in each step, the following focuses on such different parts from Embodiment 1.

When the power is turned on, the process starts with "origin detection adjustment start". In Step 101 the motor 9 as a focus motor is shifted to the origin detection direction (the direction of the imaging device 5) by one step at one time. In Step 102, a judgment is made as to whether the photosensor output level exceeds a threshold value or not. In the case of not exceeding, the process returns to Step 101 to make the motor 9 conduct the next one step operation. In the case of exceeding, the process goes to Step 103, where the exciting position at the time of exceeding is substituted as P. In this case, the exciting position "17" is substituted as P. In Step 104, P is stored as Po in the nonvolatile memory 14. In Step 105, the absolute position counter is reset. In FIG. 10, the position indicated with "0" shows the reset, position.

Figure 11:
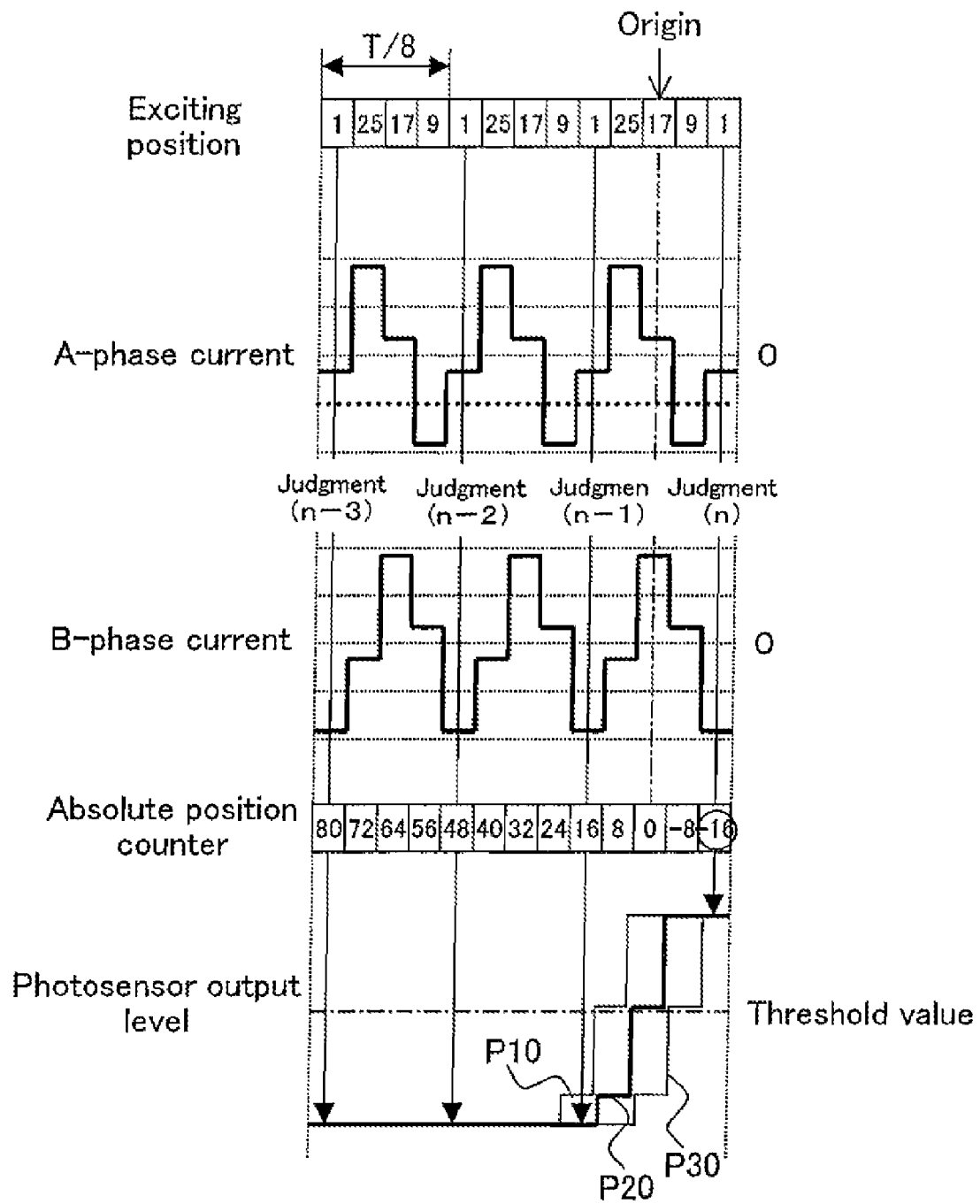
FIG. 11 is a drawing for explaining an origin detection operation during the normal operation according to Embodiment 3 of the present invention.

Next, the origin detection operation of the focus lens 4 during the normal operation is described, with reference to FIGS. 9 and 11. FIG. 11 is a drawing for explaining the origin detection operation during the normal operation according to Embodiment 3, Although FIG. 9 is a flowchart of the origin detection operation according to Embodiment 2, this flowchart is common to Embodiment 3. However, since there are some different, parts in setting the conditions in each step, the following focuses on such different parts from Embodiments 1 and 2.

In FIG. 9, when the power is turned on, the process starts with "origin detection start". In Step 301, Po is read out from the nonvolatile memory 14. In Step 302, Pd is calculated from the following formula (1): Pd=Po–(exciting position one cycle)/2. In this formula, (exciting position one cycle) is "32". During the above-described origin detection operation of the focus lens 4 during the process adjustment, the value stored in the nonvolatile memory 14 is "17". Therefore, in this example, Pd=17−32/2=1.

In Step 303, a judgment is made as to whether Pd is negative or not. In the case where Pd is 0 or positive, the process goes to the next Step 304. In the case where Pd is negative, Pd=Pd+(exciting position one cycle) is calculated in Step 303*a*, and then the process goes to the next Step 304. When Pd is negative, there is no corresponding numerical value for the exciting position. However, the calculation in Step 303*a* allows the exciting position Pd that differs by a half cycle from Po to be determined.

In Step 304, the motor 9 is shifted by eight steps at one time to the origin detection direction (the direction of the imaging device 5) (decrease the exciting position counter by eight at one time with the rotation pitch S=8). As a result, the speed of the origin detection operation during the normal operation is eight times the speed during the process adjustment, and the driving cycle during the normal operation becomes T/8, where T is the driving cycle during the process adjustment. Herein, the exciting position is set so as to include the above-obtained Pd (in this case, Pd=1) similarly to the above-described Embodiment 2.

In Step 305, a judgment is made as to whether the present exciting position equals Pd (in this example, Pd=1) or not in the case of not being equal, the process returns to Step 304 to make the motor 9 conduct the next 16-step operation. In the case of being equal, the process goes to the next Step 306. In the example of FIG. 11, the positions indicated by the judgment (n−3), the judgment (n−2), the judgment (n−1) and the judgment (n) equal Pd (Pd=1) in the exciting position. In Step 306, a judgment is made as to whether the photosensor output level exceeds a threshold value or not at each of these positions. Firstly, at the position of the judgment (n−3), a judgment is made as to whether the photosensor output level exceeds a threshold value or not. In the example of FIG. 11, it does not exceed the threshold value, and therefore the process returns to Step 304 to make the motor 9 conduct the next 16-step operation. After the repetition of 16-step operation, at the position of the judgment (n−2), a judgment is made again as to whether the photosensor output level exceeds the threshold value or not. In the example of FIG. 11, it does not exceed the threshold value, and therefore the process returns to Step 304 to make the focus motor conduct the next 16 step operation. After the repetition of 16-step operation, at the position of the judgment (n), a judgment is made again as to whether the photosensor output level exceeds the threshold value or not.

In the example of FIG. 11, it exceeds the threshold value. In this case, the process goes to Step 307, where the absolute position counter 153 is preset at −(exciting position one cycle)/2. In this example, since (exciting position one cycle) =32, the absolute position counter 153 is preset at "−16" (as shown in FIG. 11, the value of the absolute position counter surrounded with the circle ○).

Herein, the photosensor output level indicated by P20 in FIG. 11 shows a level variation under the conditions of the mechanism and electrical properties at the same operational environmental temperature and humidity as those during the process adjustment. However, during the normal operation in which the power may be turned on repeatedly, the photosensor output level generates a variation different from P20 in the respective exciting positions of the motor 9 as indicated by P10 and P30. This results from errors in looseness in the lens unit driving direction and variations in mechanism and electrical properties due to a temperature and humidity change in the operation environment.

In the present embodiment, in the origin detection operation during the normal operation, a judgment is made as to whether the photosensor output level exceeds a threshold value or not at the judgment (n−3), the judgment (n−2), the judgment (n−1) and the judgment (n) shown in FIG. 11, as described above. From this, even when a variation occurs within the range from P10 to P30, the absolute counter 153 always is preset at "−16", and when the absolute position counter is "0", the exciting position of the motor 9 always becomes "17", thus allowing the origin during the process adjustment to be reproduced.

Similarly to Embodiment 1, even when there is a variation in photosensor output level within the range from P10 to P30, the origin during the process adjustment can be reproduced securely In addition to this, since the motor is driven to rotate by substantially sine wave driving in Embodiment 3, this embodiment allows the division number of one cycle of 360 degrees to be increased when the counter value is set, thus increasing the bit number of the counter.

Thus, the origin of the focus lens during the process adjustment can be detected with higher precision than in Embodiment 1, and even when the origin detection operation during the normal operation is conducted at a higher speed similarly to Embodiment 2, the origin during the process adjustment, detected with high precision, can be reproduced securely. Further, since the center value with respect to a variation occurring during the normal operation can be determined precisely during the process adjustment, the design margin for the variation can be secured.

Incidental similarly to Embodiments 1 and 2, a range of errors in looseness of the lens unit in the driving direction and variations in mechanism and electrical properties due to a temperature and humidity change in the operation environment should be within the exciting position one cycle.

Herein, assuming that the cycle of a driving signal for driving the motor when the reference position is determined during the process adjustment is T, the cycle T' of a driving signal for the motor when the reference position is determined again during the normal operation can be represented with the following formula (4):

$$T' = (M/N) \cdot T \quad \text{(formula 4)},$$

where N=2n (n is an integer of 2 or more), M is an integer satisfying 2n>M>2).

In Embodiment 3, the cycle of the motor driving waveform for the origin detection operation during the normal operation is described as ⅛ of the cycle of the motor driving waveform for the origin detection operation during the process adjustment (i.e., M=1, N=8). However, the cycle of the motor driving waveform for the origin detection operation during the normal operation may be 3/32 (i.e., M=3, N=32). More specifically, in FIG. 20, instead of advancing the exciting position of 1→25→17→9→1, this may be advanced as in 1→22→11→1.

Further, in Embodiment 3, the motor driving is described as substantially sine wave driving. However, this embodiment is applicable to the driving method of substantially sine wave driving by PWM.

Embodiment 4

The following describes Embodiment 4 of the present invention. Embodiment 4 is the same as in Embodiment 1 in the configuration shown in FIG. 1 and FIG. 2 and the origin detection operation during the process adjustment described referring to FIG. 3 and FIG. 4.

Figure 12:
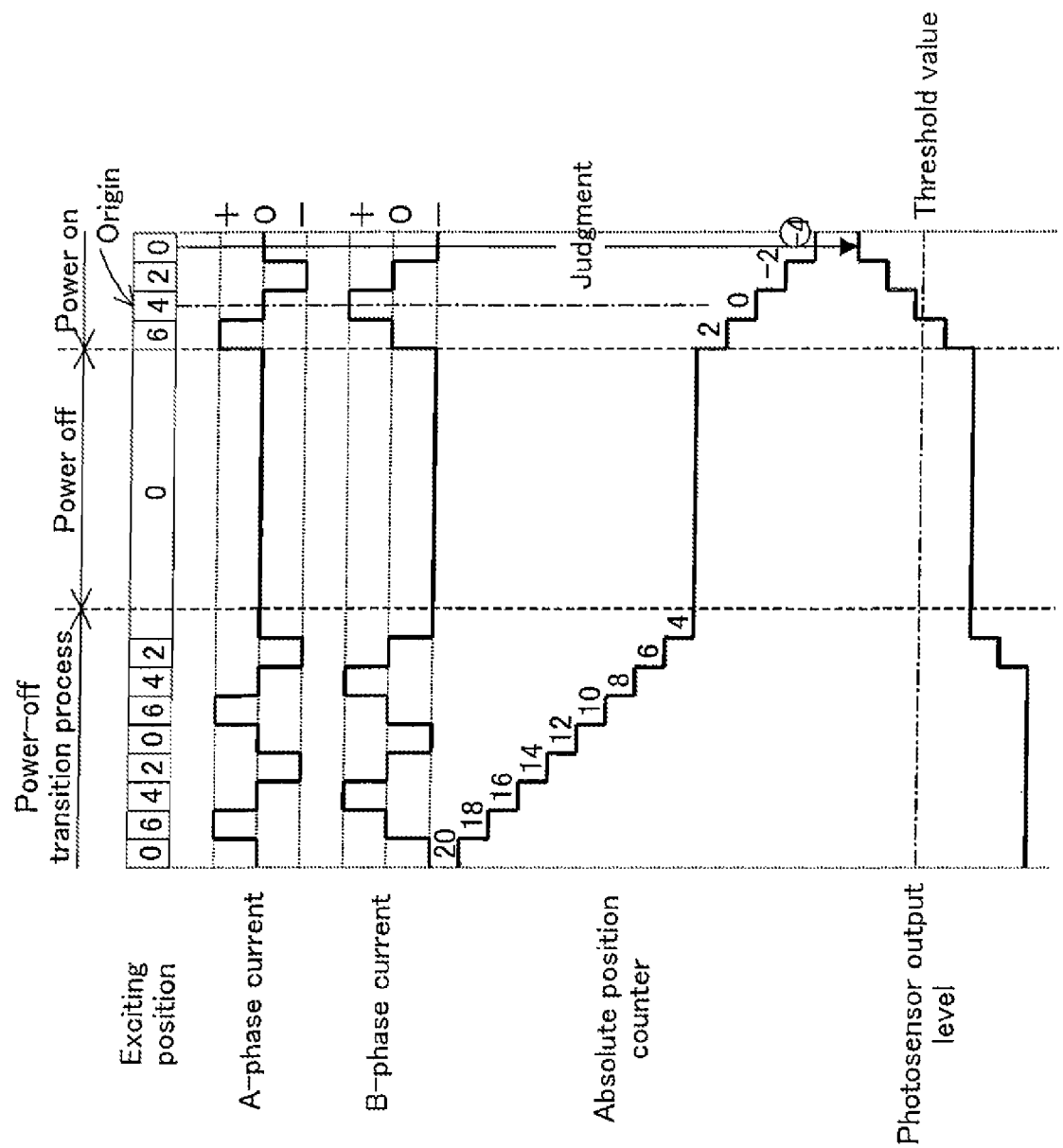
FIG. 12 is a drawing for explaining an origin detection operation during the normal operation according to Embodiment 4 of the present invention.
Figure 13:
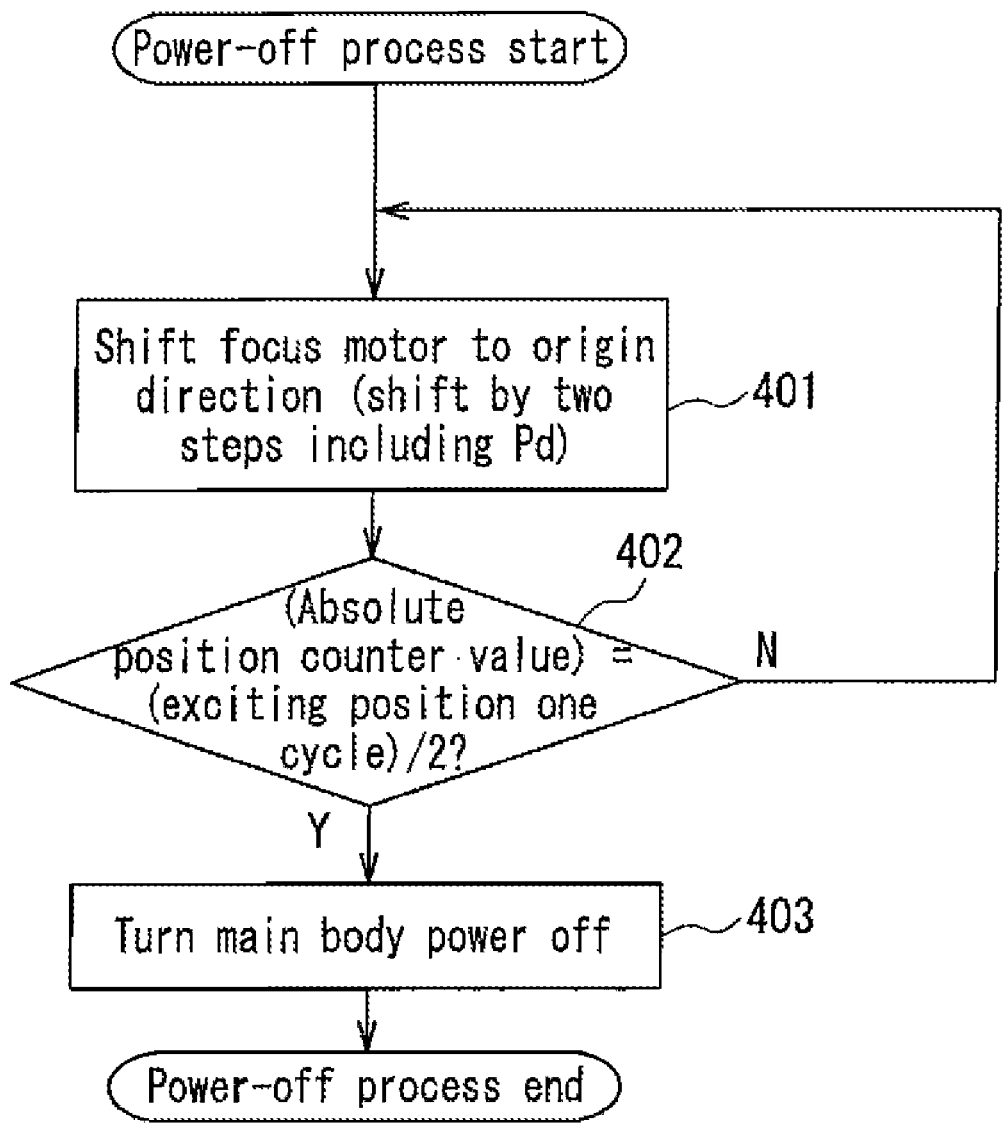
FIG. 13 is a flowchart of a power-off process according to Embodiment 4 of the present invention.

Referring now to FIGS. 12 and 13, the origin detection operation of a focus lens 4 during the normal operation in Embodiment 4 is described below. FIG. 12 is a drawing for explaining the origin detection operation during the normal operation according to Embodiment 4. Since the exciting position, the A-phase current, the B-phase current, the absolute position counter and the photosensor output level shown in FIG. 12 are the same as those described in FIG. 3, the duplicate explanations are omitted.

FIG. 13 is a flowchart of a power-off process according to Embodiment 4, which shows an operation flow described as a program in the system control unit 13. This drawing shows an example where when a power of a main body of an imaging device such as a still camera or a video movie is turned off by a main body switch (not illustrated), a transition process to the power off is performed.

When the power is turned off, the system control unit 13 starts the process with "power-off process start". In Step 401, the motor 9 is shifted to the origin detection direction (the direction of the imaging device 5) by two steps at one time (decreases the exciting position counter by two at one time). Herein, the exciting position is set so as to include Pd (in this case, Pd=0) described in Embodiment 2, More specifically, in response to an instruction from the system control unit 13, the exciting position counter 151 is down-counted via the tracking position control unit 152. In accordance with this down-counting, the focus motor driving unit 11 rotates the motor 9 so as to shift the focus lens 4 toward the imaging device 5.

In Step 402, if the counter value of the absolute position counter 153 does not agree with the exciting position one cycle/2, the process returns to Step 401 to make the focus motor conduct the next 2-step operation. In the case where they agree, the process goes to Step 403, where the power of the main body is turned off. In this case, since the (exciting position one cycle)=8, the power of the main body is turned off when "absolute position counter value"=4 (see FIG. 12), Next, when the power is turned on by the main body switch, the operation is as follows: as described in Embodiment 2 with reference to FIG. 9, the process is conducted in accordance with the flowchart that starts with "origin detection start" when the power is turned on. Although the description of the midstream of the process is omitted because of duplication, in Step 306 of FIG. 9, a judgment is made as to whether the photosensor output level exceeds a threshold value or not, and the counter value of the absolute position counter 153 is preset at "−4" (as shown in FIG. 12, the value of the absolute position counter surrounded with the circle ○).

As shown in FIG. 12, in the power-off transition process, the focus motor is stopped immediately before the origin (immediately before the photosensor output level exceeds the threshold value). Therefore, in Embodiment 4, the first once judgment concerning the photosensor output level is all that is required to detect the origin when the power is tuned on. More specifically, since the position where the counter value of the absolute position counter becomes "0" is the origin, the stopping position where the counter value agrees with the exciting position one cycle/2 is the judgment position on the preceding side between the judgment positions sandwiching the origin. That is, the feature of the present embodiment resides in that the stopping position of the focus motor during the power-off transition process is a judgment position immediately preceding the position for the final judgment of the photosensor output level when the power is turned on next.

Thus the power off transition process enables secure origin detection simply by the first once judgment of the photosensor output level even when errors in looseness of the lens unit in the driving direction and variations in mechanism and electrical properties due to a temperature and humidity change in the operation environment occur before the power is turned on next.

Incidentally, similarly to Embodiments 1, 2 and 3, a range of errors in looseness of the lens unit in the driving direction and variations in mechanism and electrical properties due to a temperature and humidity change in the operation environment should be within the exciting position one cycle.

Embodiment 5

Figure 14:
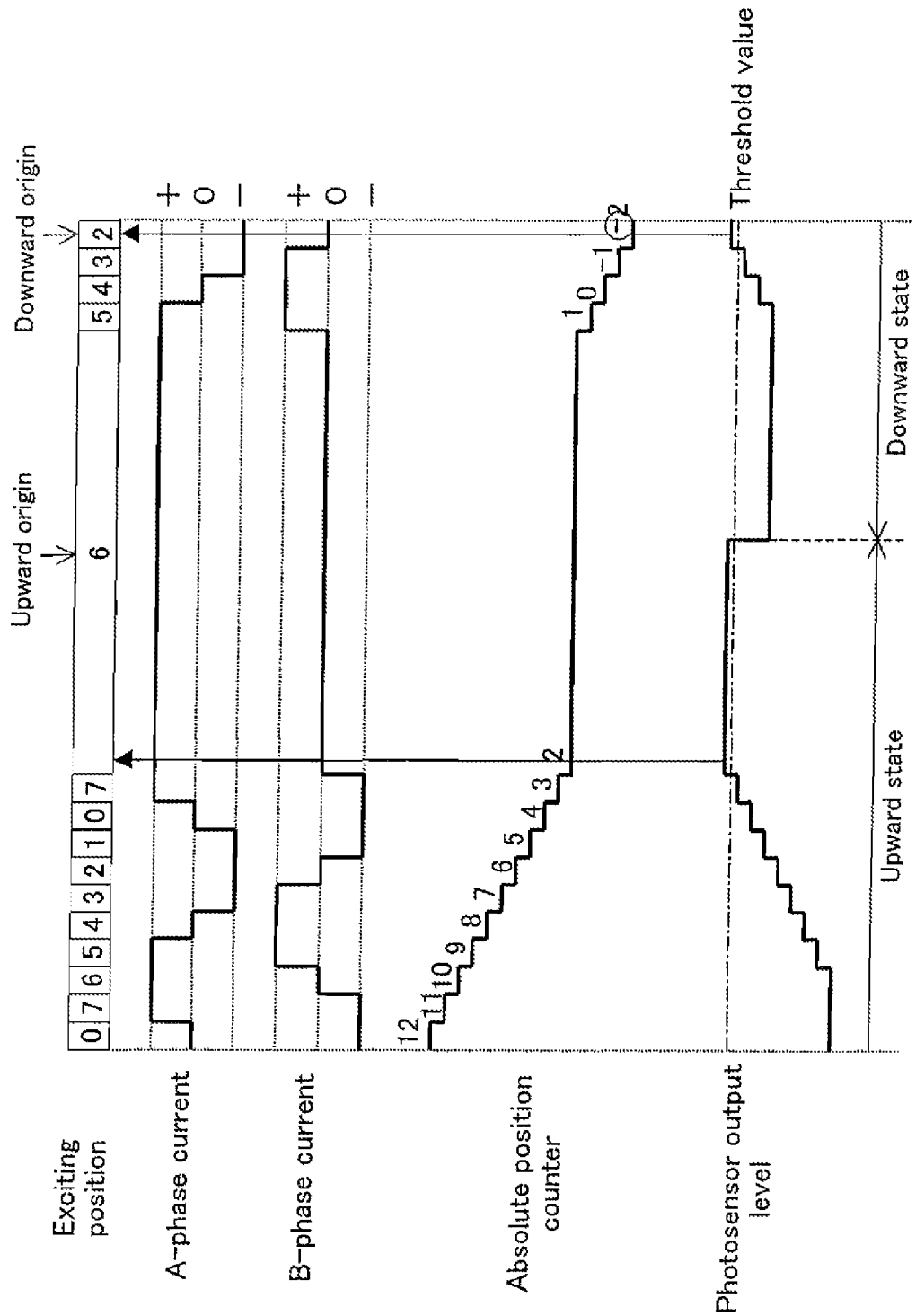
FIG. 14 is a drawing for explaining an origin detection operation during the process adjustment according to Embodiment 5 of the present invention.
Figure 15:
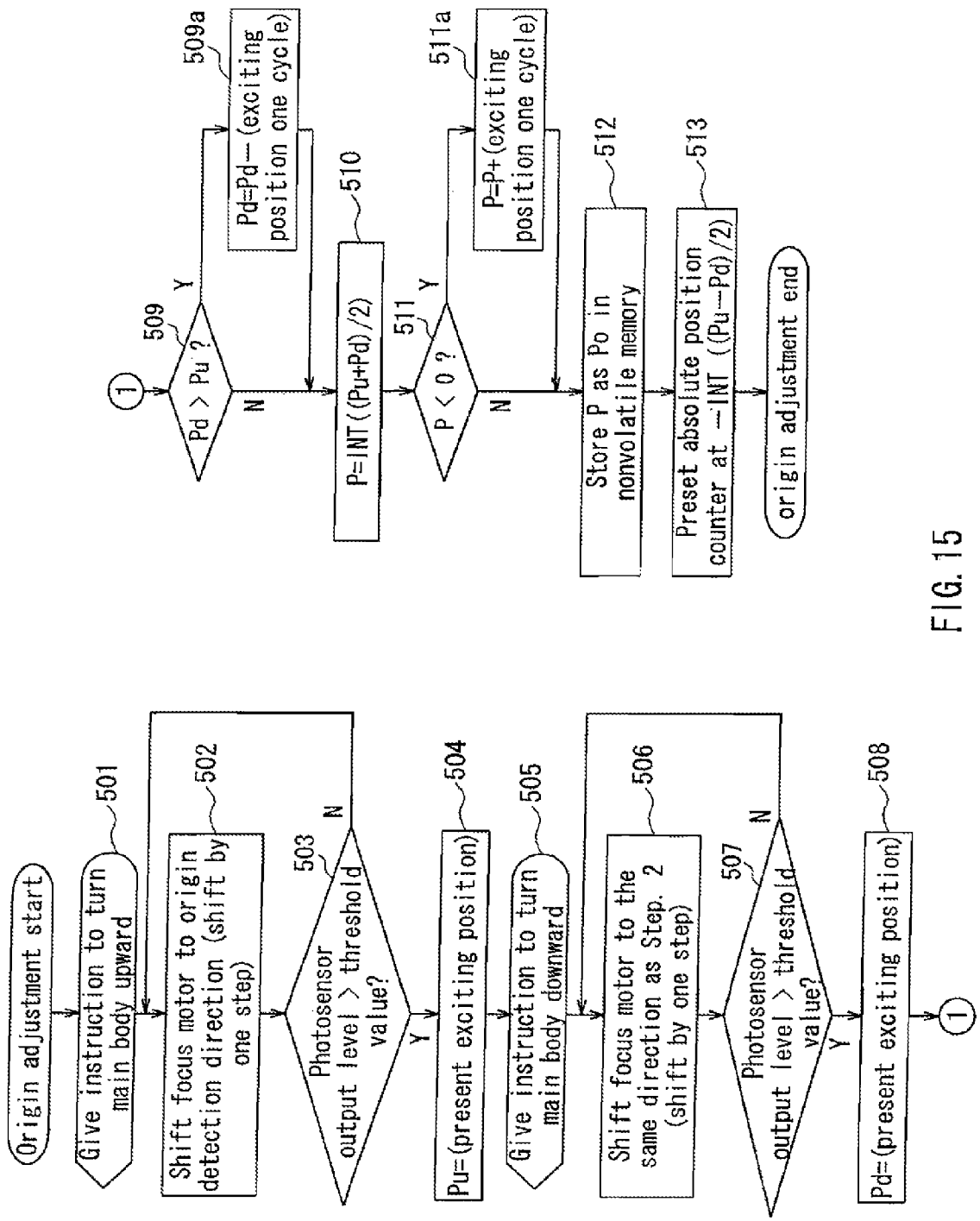
FIG. 15 is a flowchart of the origin detection operation during the process adjustment according to Embodiment 5 of the present invention.

The following describes Embodiment 5 of the present invention. Embodiment 5 is the same as in Embodiment 1 in the configuration shown in FIG. 1 and FIG. 2. Referring now to FIGS. 14 and 15, the origin detection operation of a focus lens 4 during the process adjustment in Embodiment 5 is described below.

FIG. 14 is a drawing for explaining the origin detection operation during the process adjustment according to Embodiment 5. Since the exciting position, the A-phase current, the B-phase current, the absolute position counter and the photosensor output level shown in FIG. 14 are the same as those described in FIG. 3 of Embodiment 1, the duplicate explanations are omitted. Further, this embodiment is the same as Embodiment 1 in that the exciting position is decreased one by one along with the movement of the focus lens 4 to the imaging device 5 side.

FIG. 15 is a flowchart of an origin detection operation during the process adjustment according to Embodiment 5, which shows an operation flow described as a program in the system control unit 13. This process starts with "origin detection adjustment start" when the power is turned on. In Step 501, on a liquid crystal display (not illustrated) showing a process adjustment menu, for example, "main body upward" is displayed. A lens 2 of the imaging apparatus is turned upward, and the process goes to the next Step 502.

In Step 502, the motor 9 is shifted to the origin detection direction (the direction of the imaging device 5) by one step at one time (decreases the exciting position counter one by one). More specifically, in response to an instruction from the system control unit 13, the exciting position counter 151 is down-counted via the tracking position control unit 152. In accordance with this down-counting, the focus motor driving unit 11 rotates the motor 9 so as to shift the focus lens 4 toward the imaging device 5.

In Step 503, a judgment is made as to whether the photosensor output level exceeds a threshold value or not. In the case of not exceeding, the process returns to Step 502 to make the motor 9 conduct, the next one step operation. In the case of exceeding, the process goes to Step 504, where the exciting position at the time of exceeding is substituted as Pu. In this case, the exciting position "6" is substituted as Pu.

Next, in Step 505, on the liquid crystal display (not illustrated) showing a process adjustment menu, for example, "main body downward" is displayed. The lens 2 of the imaging apparatus is turned downward, and the process goes to the next Step 506. In Step 506, the motor 9 is shifted to the origin detection direction (the direction of the imaging device 5) by one step at one time (decreases the exciting position counter one by one).

In Step 507, a judgment is made as to whether the photosensor output level exceeds a threshold value or not. In the case of not exceeding, the process returns to Step 506 to make the motor 9 conduct the next one step operation. In the case of exceeding, the process goes to Step 508, where the exciting position at the time of exceeding is substituted as Pd.

In this case, the exciting position "2" is substituted as Pd. In Step 509, the magnitude of Pd and Pu is judged. In this case, since Pu=6 and Pd=2, the process goes to the next Step 510. In Step 510, P=INT((Pu+Pd)/2) is calculated, so that P=4 is determined. Incidentally, INT means to round up the figures after the decimal fractions. In Step 511, a judgment is made as to whether P is smaller than 0 or not. In this example, since P=4, the process goes to the next Step 512 and P=4 is stored as Po in the nonvolatile memory.

In Step 513, the counter value of the absolute position counter 153 is preset at −INT ((Pu−Pd)/2). The value of −INT ((Pu−Pd)/2) becomes −INT ((6−2)/2)=−2. With this calculation, it can be calculated how far apart in exciting position the origin at the time of downward and the origin of the intermediate between at the time of upward and downward are. As shown in FIG. 14, assuming that the numerical value of the absolute position counter at the origin at the time of downward is −2 as the calculated value (the value surrounded with the circle ○), the counter value of the absolute position counter 153 at the origin (exciting position "4") of the intermediate between at the time of upward and downward becomes "0".

Note here that the reason for generating a step in the photosensor output level when the attitude is changed from "upward state" to "downward state" in FIG. 14 is that the focus lens 4 is shifted to the direction moving away from the imaging device 5 because of its own weight and looseness (e.g., looseness of the rack for transferring the focus lens 4 with the lead screw of the motor 9).

In the afore-mentioned example, the example where the origin detection position in the upward state is Pu=6 and the origin detection position in the downward state is Pd=2, i.e., Pd<Pu is described. In this case, the intermediate position P can be determined from the formula of Step 510 as described above. However, in the case of Pd>Pu, the intermediate position P cannot be determined from the formula of Step 510. For instance, in the case of Pu=0 and Pd=4, the intermediate position P will be 6 as is understood from the illustration of the exciting position in FIG. 14. However, according to the calculation using the formula of Step 510, P=INT((0+4)/2) =2, which is different from P=6.

In such a case, the process may undergo Steps 509a and 511a, whereby the correct intermediate position P can be determined. In the above-stated example of Pu=0 and Pd=4, the process goes to Step 509a because Pd>Pu, where Pd=Pd−(exciting position one cycle) is calculated, from which Pd=−4 can be determined using "exciting position one cycle"=8. When P is determined by the formula of Step 510 using this value of Pd, P=INT((0−4)/2)=−2. In this case, since P<0 in Step 511, the process goes to Step 511a, where P=P+(exciting position one cycle) is calculated, through which P=6 can be obtained. The reason for undergoing Step 511a in the case where P is negative is the same as the reason for undergoing Step 203a of FIG. 6 in Embodiment 1.

In this example, in Step 512, P=6 is stored as Po in the nonvolatile memory 14. Next, in Step 513, using Pu=0, Pd=−4 calculated in Step 509a, −INT((Pu−Pd)/2)=−2 is obtained, so that "−2" is preset as the counter value at the portion corresponding to the downward origin (Pd=4) of the absolute position counter 153.

In this way, according to Embodiment 5, the origin stored in the nonvolatile memory 14 is the intermediate position of the origins detected in the upward state and the downward state. Therefore as compared with the case where the origin is adjusted without consideration given to the difference due to attitude as described in Embodiment 1, which might cause an upward attitude difference during the adjustment and cause a downward attitude difference during the normal operation, for example, Embodiment 5 allows an error in lens position due to attitude difference to be improved to ½.

Further, in Embodiment 5, the example where the origin is detected in the upward state firstly, and then the origin is detected in the downward state is described. However, if, considering looseness, the position in the upward state is farther away from the origin than in the downward state, the origin may be detected in the downward state firstly, followed by the origin detection in the upward state.

Further, in an imaging device in which a variation in origin detection position due to attitude difference is specified as a specification, the origin may be detected in either the upward state or the downward state, and the position deviated from the detected position by half of the specification may be set as the origin, whereby the same effects can be obtained.

The present embodiment is on the precondition that there is a variation in origin detection position due to the attitude difference of a lens barrel. However, if the accuracy of a lens barrel can be secured so that a variation in origin detection position due to the attitude difference of a lens barrel can be ignored, the configuration of the above-stated Embodiments 1 to 4 may be adopted.

Embodiment 6

Figure 16:
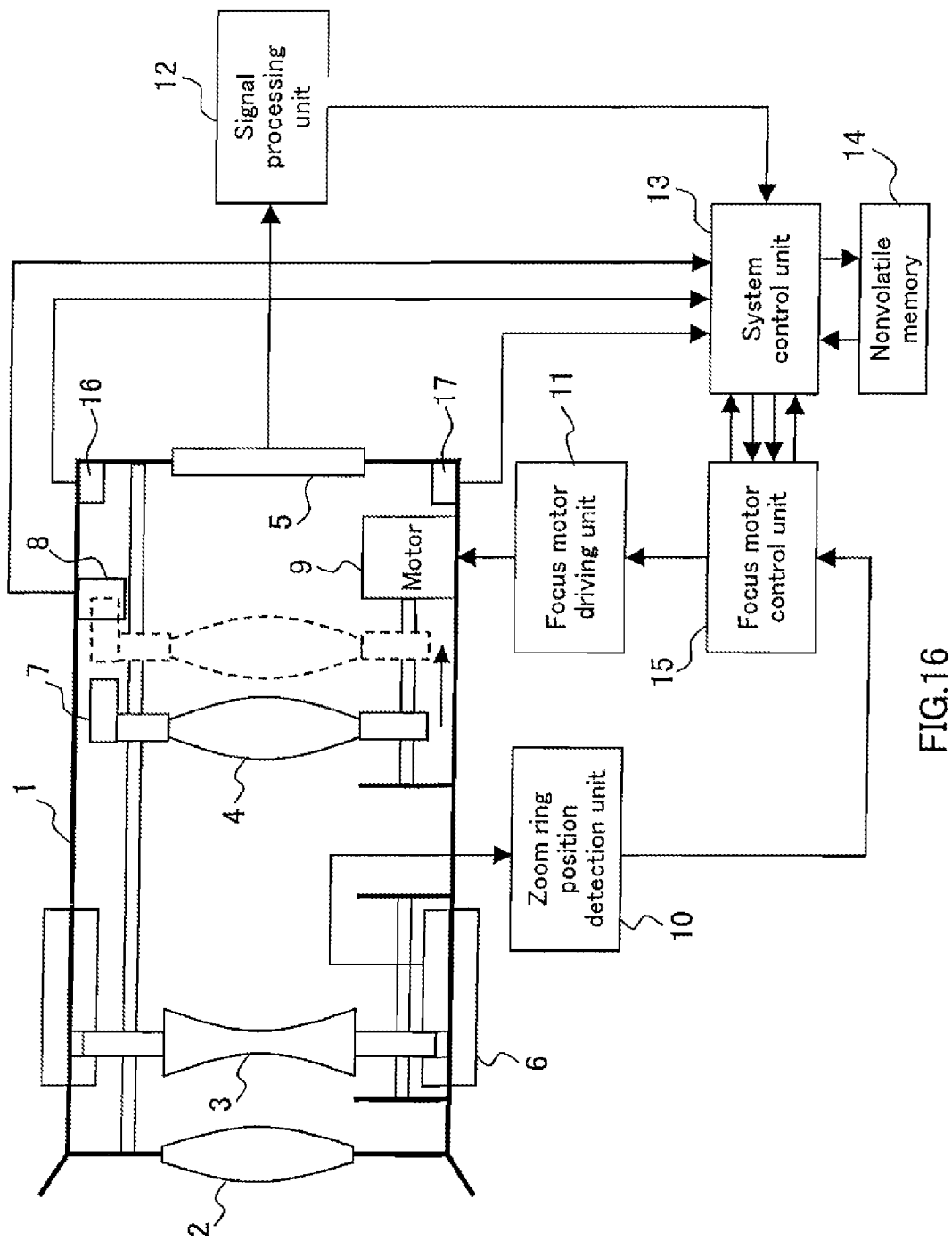
FIG. 16 is a block diagram of a lens driving apparatus according to Embodiment 6 of the present invention.

The following describes Embodiment 6 of the present invention. FIG. 16 includes a schematic diagram and a block diagram of a lens driving apparatus according to Embodiment 6. In FIG. 16, the same numerals are assigned to the same configurations as in FIG. 1 so as to omit their detailed explanations. The lens driving apparatus shown in FIG. 16 includes a temperature sensor 16 and an angular sensor 17 in addition to the lens driving apparatus of FIG. 1.

The temperature sensor 16 is provided in the lens barrel 1 or in the imaging apparatus main body (not illustrated), which is a sensor for detecting a temperature, and a thermistor or the like is used therefor. The angular sensor 17 is provided in the lens barrel 1 or in the imaging apparatus main body (not illustrated), which is a sensor for detecting the inclination of the lens barrel or the imaging apparatus main body.

Figure 17:
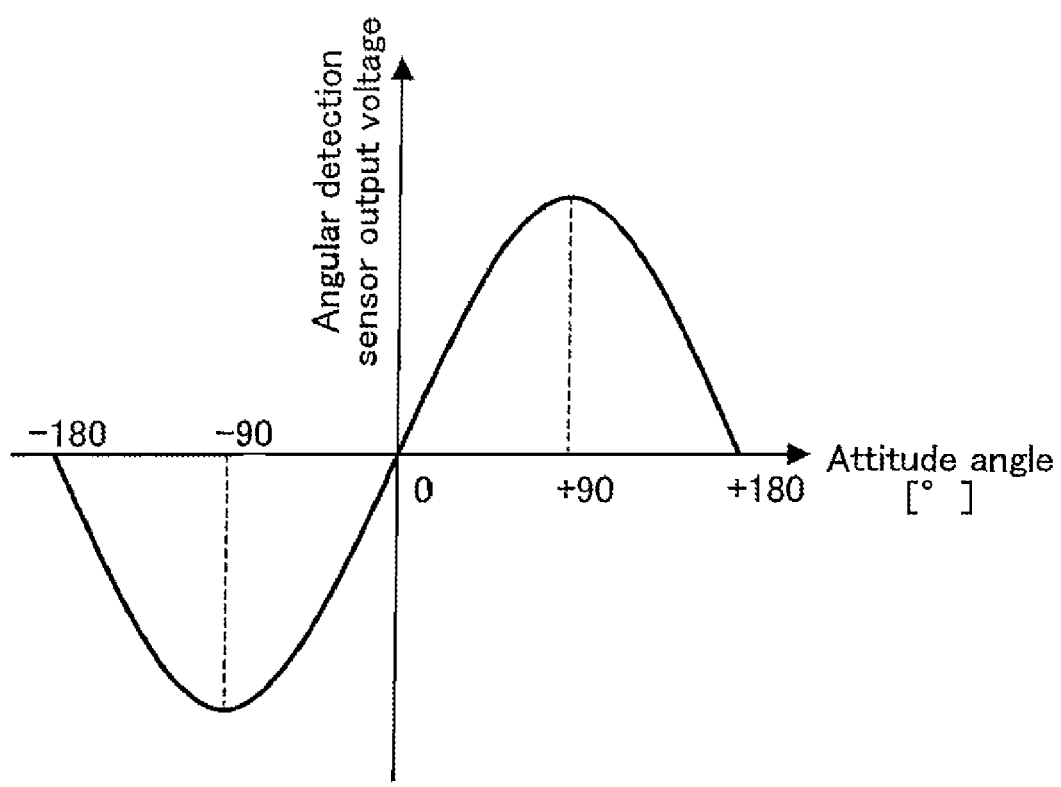
FIG. 17 is a drawing for explaining an operation of an angle detection sensor according to Embodiment 6 of the present invention.

FIG. 17 shows one example of angular detection by the angular sensor 17. The example of FIG. 17 shows that a voltage output from the angular sensor 17 is set at 0 when the lens barrel 1 or the imaging apparatus is in a horizontal position, and the output voltage varies in accordance with the attitude angle.

Incidentally, the angular sensor 17 may be an inclination sensor that detects three positions of the lens barrel 1 or the imaging apparatus main body including upward, downward and horizontal. In the present embodiment, the focus motor control unit 15 has the same configuration as that of Embodiment 1 shown in FIG. 2.

Figure 18A:
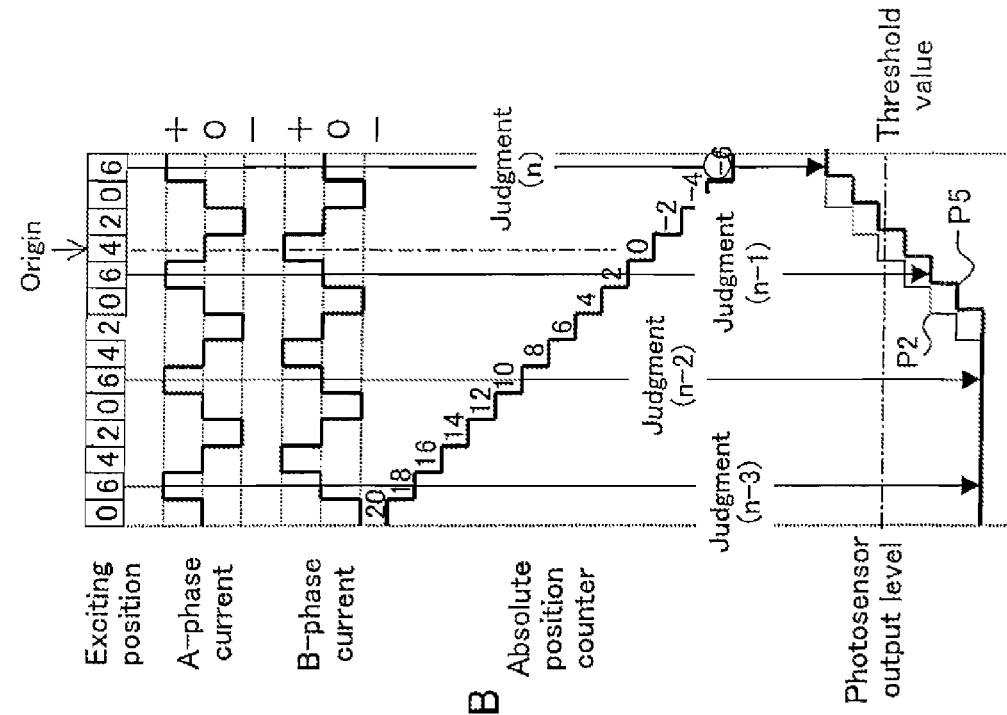
FIG. 18 is a drawing for explaining an origin detection operation during the normal operation according to Embodiment 6 of the present invention.
Figure 18B:
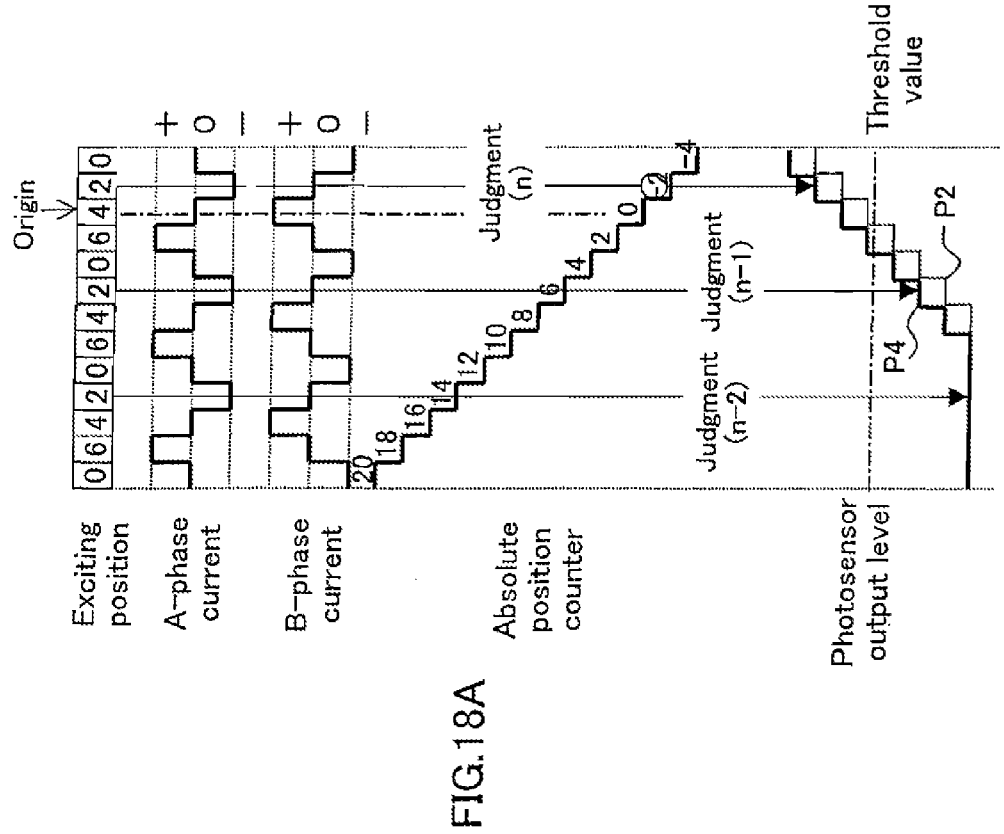
Figure 19:
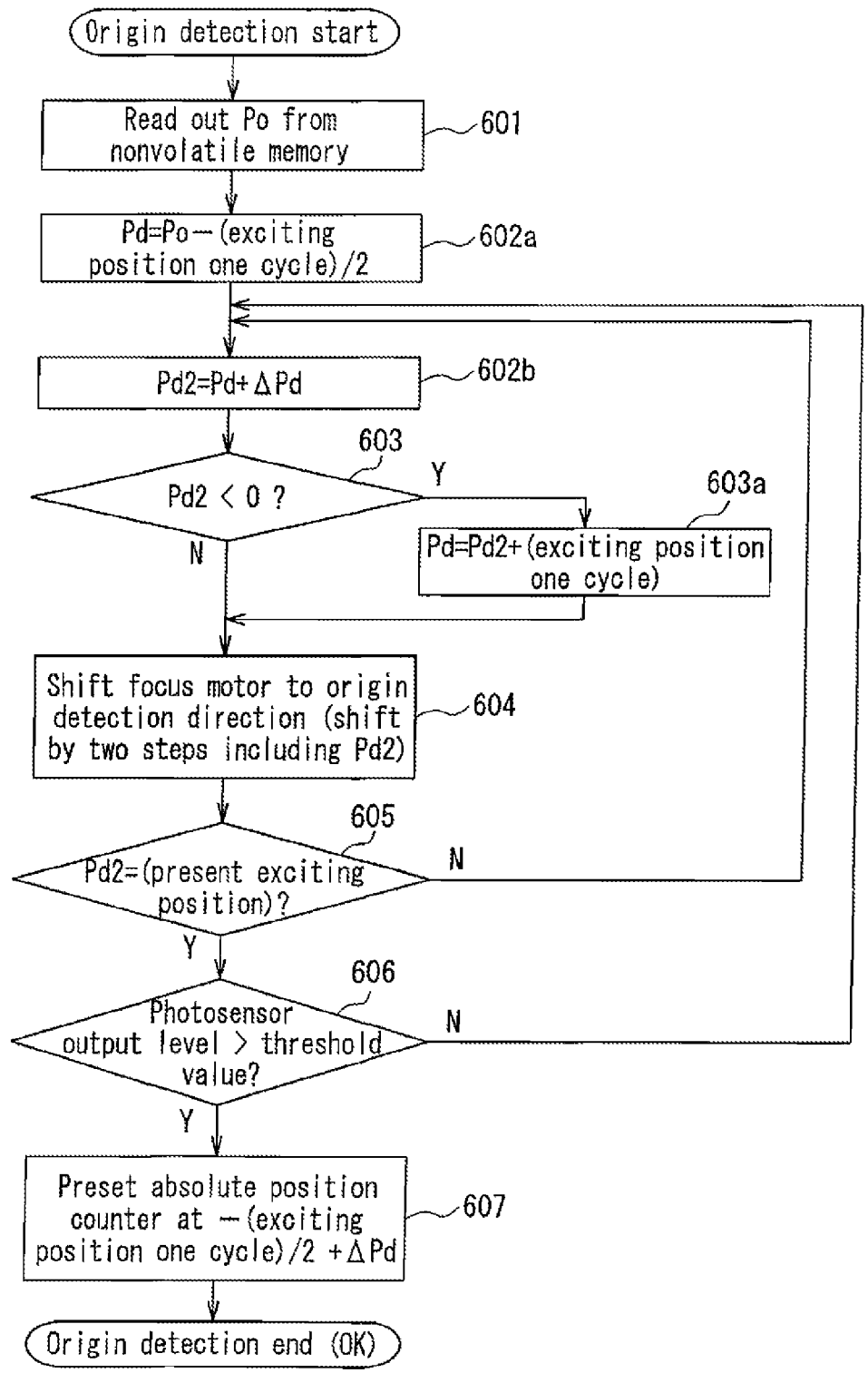
FIG. 19 is a flowchart of the origin detection operation during the normal operation according to Embodiment 6 of the present invention.

Referring now to FIGS. 18 and 19, an origin detection operation by the focus lens 4 during the normal operation in Embodiment 6 will be described below. FIG. 18 is a drawing for explaining an origin detection operation during the normal operation according to Embodiment 6. FIG. 18(*a*) is intended to show the state where the temperature is higher than a room temperature and the lens 2 of the lens barrel 1 faces upward, and FIG. 18(*b*) is intended to show the state where the temperature is lower than a room temperature and the lens 2 of the lens barrel 1 faces downward.

Since the exciting position, the A-phase current, the B-phase current, the absolute position counter and the photosensor output level shown in FIG. 18 are the same as those described in FIG. 3 of Embodiment 1, the explanations for the duplication are omitted. Further, the exciting position is decreased by two at one time along with the movement of the focus lens 4 to the imaging device 5 side, which is similar to the example of FIG. 8 of Embodiment 2.

FIG. 19 is a flowchart of the origin detection operation during the normal operation according to Embodiment 6, which shows an operation flow described as a program in the system control unit 13. When the power is turned on, the process starts with "origin detection start", In Step 601, Po is read out from the nonvolatile memory 14. In Step 602*a*, Pd=Po−(exciting position one cycle)/2 is calculated. Herein, (exciting position one cycle) equals 8. During the origin detection operation of the focus lens 4 during the process adjustment, the value stored in the nonvolatile memory 14 is "4", which is similar to Embodiment 1. Therefore, the result is Pd=4−8/2=0.

In Step 602*b*, in accordance with the information output from the temperature sensor 16 and the angular sensor 17, a correction value ΔPd is added to Pd. In the case where the lens 2 of the lens barrel 1 faces upward, the focus lens 4 moves closer to the imaging device 5 as compared with the horizontal position due to its own weight and looseness (e.g., looseness of the rack for transferring the focus lens 4 with the lead screw of the motor 9). Moreover, in the case where the temperature is higher than a room temperature and the photo-interruption member 7 has a thermal expansion coefficient larger than those of the lens barrel 1 and the motor 9, the photo-interruption member 7 moves closer to the photosensor 8.

For those reasons, as shown by P4 of the photosensor output level of FIG. 18(*a*), the timing when the photosensor output level changes at the time of the origin detection becomes earlier than the photosensor output level P2 that shows the case where the lens is in a horizontal position at a room temperature. In this case, an example where an error occurring due to the temperature increase from a room temperature corresponds to one step of the exciting position of the motor 9 and an error occurring when the imaging apparatus in a horizontal position is made to face upward corresponds to one step of the exciting position of the motor 9, whereby an error corresponding to two steps in total occurs, is shown.

Therefore, since ΔPd=2, Pd2=2 is calculated in Step 602*b*. In Step 603, a judgment is made as to whether Pd2 is negative or not. In the case where Pd2 is 0 or positive, the process goes to the next Step 604. In the case where Pd is negative, Pd=Pd+ (exciting position one cycle) is calculated in Step 603*a*, and then the process goes to the next Step 604. The reason for undergoing Step 603*a* in the case of Pd being negative is the same as the reason for undergoing Step 203*a* of FIG. 6 in Embodiment 1.

In Step 604, the motor 9 is shifted by two steps at one time to the origin detection direction (the direction of the imaging device 5) (decreases the exciting position counter by two at one time). Herein, the exciting position is set so as to include the above-obtained Pd2 (in this case, Pd2=2). More specifically, in response to an instruction from the system control unit 13, the exciting position counter 151 is down-counted via the tracking position control unit 152. In accordance with this down-counting, the focus motor driving unit 11 rotates the motor 9 so as to shift the focus lens 4 toward the imaging device 5.

In Step 605, a judgment is made as to whether the present exciting position equals Pd2 (in this example, Pd2=2) or not. In the case of not being equal, the process returns to Step 602*b* to make the motor 9 conduct the next two-step operation. In the case of being equal, the process goes to the next Step 606.

The positions with Pd2=2 are positions indicated with the judgment (n−2), the judgment (n−1) and the judgment (n) shown in FIG. 18(*a*). Since the exciting position is 2 at these judgment positions, this is the position advancing by two steps from the exciting position 0 that shows a position before adding the correction value (i.e., a position moving away from the imaging device 5). Therefore, the judgment at these judgment positions can be substantially equal to the case where the photosensor output level P2 for the lens in a horizontal position at a room temperature is detected at a position where the exciting position is 0.

In Step 606, a judgment is made as to whether the photosensor output level exceeds a threshold value or not at the above-stated judgment positions. In the case of not exceeding, the process returns to Step 602*b* to make the focus motor conduct the next two-step operation. In the case of exceeding, the process goes to Step 607. At the time of exceeding, the absolute position counter 153 is preset at −(exciting position one cycle)/2+ΔPd. Herein, this is preset at "−2" because (exciting position one cycle)=8 and ΔPd=2 (as shown in FIG. 18(*a*), the value of the absolute position counter surrounded with the circle ○).

Note here that the explanations for FIG. 9 of Embodiment 2 show the example where, if the conditions are not satisfied in Step 305 or Step 306, the process returns to Step 304. On the contrary, Embodiment 6 shows the example where the process returns to Step 602*b*. This is because according to Embodiment 6 in the case where a temperature changes or the attitude difference changes during the origin detection operation, a position for judging whether the photosensor output level exceeds a threshold value or not is changed successively.

The following describes the case where the lens 2 of the lens barrel 1 faces downward and the temperature is lower than a room temperature, with reference to FIG. 18(*b*) and FIG. 19. In the case where the lens 2 of the lens barrel 1 faces downward, the focus lens 4 moves away from the imaging device 5 as compared with the horizontal position due to its own weight and looseness (e.g., looseness of the rack for transferring the focus lens 4 with the lead screw of the motor 9). Moreover, in the case where the temperature is lower than a room temperature and the photo-interruption member 7 has a thermal expansion coefficient larger than those of the lens barrel 1 and the motor 9, the photo-interruption member 7 moves away from the photosensor 8.

For those reasons, as shown by P5 of the photosensor output level of FIG. 18(*b*), the timing when the photosensor output level changes at the time of the origin detection becomes later than the photosensor output level P2 that shows the case where the lens is in a horizontal position at a room temperature. In this case, an example where an error occurring due to the temperature decrease from a room temperature corresponds to one step of the exciting position of the motor 9 and an error occurring when the imaging device in a horizontal position is made to face downward corresponds to one step of the exciting position of the motor 9, whereby an error corresponding to two steps in total occurs, is shown.

Therefore, since ΔPd=−2, Pd2=−2 is calculated in Step 602b. In Step 603, a judgment is made as to whether Pd2 is negative or not. In the case where Pd2 is negative, Pd2=Pd2+ (exciting position one cycle) is calculated in Step 603a, and then the process goes to the next step. In the case where Pd2 is 0 or positive, the process goes to the next step. In this case, the resultant Pd2 is 6, because −2+8=6.

In Step 604, the motor 9 is shifted by two steps at one time to the origin detection direction (the direction of the imaging device 5) (decreases the exciting position counter by two at one time). Herein, the exciting position is set so as to include the above-obtained Pd2 (in this case, Pd2=6). More specifically, in response to an instruction from the system control unit 13, the exciting position counter 151 is down-counted via the tracking position control unit 152. In accordance with this down-counting, the focus motor driving unit 11 rotates the motor 9 so as to shift the focus lens 4 toward the imaging device 5.

In Step 605, a judgment is made as to whether the present exciting position equals Pd2 (in this example, Pd2=6) or not. In the case of not being equal, the process returns to Step 602b to make the motor 9 conduct the next two-step operation. In the case of being equal, the process goes to the next Step 606. The positions with Pd2=6 are positions indicated with the judgment (n−3), the judgment (n−2) and the judgment (n−1) shown in FIG. 18(b). Since the exciting position is 6 at these judgment positions, this is the position behind by two steps from the exciting position 0 that shows a position before adding the correction value (i.e., a position moving closer to the imaging device 5). Therefore, the judgment at these judgment positions can be substantially equal to the case where the photosensor output level P2 for the lens in a horizontal position at a room temperature is detected at a position where the exciting position is 0.

In Step 606, a judgment is made as to whether the photosensor output level exceeds a threshold value or not at the above-stated judgment positions. In the case of not exceeding, the process returns to Step 602b to make the focus motor conduct the next two-step operation. In the case of exceeding, the process goes to Step 607. At the time of exceeding, the absolute position counter 153 is preset at −(exciting position one cycle)/2+ΔPd.

Herein, this is preset at "−6" because (exciting position one cycle)=8 and ΔPd=−2 (as shown in FIG. 18(b), the value of the absolute position counter surrounded with the circle ○). Note here that the explanations for FIG. 9 of Embodiment 2 show the example where if the conditions are not satisfied in Step 305 or Step 306, the process returns to Step 304. On the contrary, Embodiment 6 shows the example where the process returns to Step 602b. This is because in the case where a temperature changes or the attitude difference changes during the origin detection operation, a position for judging whether the photosensor output level exceeds a threshold value or not is changed successively.

The photosensor output level indicated by "P2" in FIG. 18 shows a level variation under the conditions of the mechanism and electrical properties at the same operational environmental temperature and humidity as those during the process adjustment. However, during the normal operation in which the power may be turned on repeatedly a variation occurs in the position of a level change in accordance with the exciting positions of the motor 9, as indicated by "P4" and "P5". This results from errors in looseness in the lens unit driving direction and variations in mechanism and electrical properties due to a temperature change in the operation environment.

In Embodiment 6, however, in the origin detection operation during the normal operation, a judgment is made as to whether the photosensor output level exceeds a threshold value or not at the respective judgment positions shown in FIG. 18. Therefore, even when a variation occurs within the range from "P4" to "P5", the exciting position of the motor 9 always becomes "4" when the counter value of the absolute counter 153 is "0", thus allowing the origin during the process adjustment to be reproduced as described in Embodiment 1.

The above-description shows the example using the temperature sensor and the angular sensor. However, the use of a humidity sensor also enables the improvement of accuracy by improving an error occurring due to a difference in hygroscopic coefficient of the lens barrel and the lens. Further, Embodiment 6 allows the origin detection operation during the normal operation conducted at twice the speed of Embodiment 1.

Figure 20:
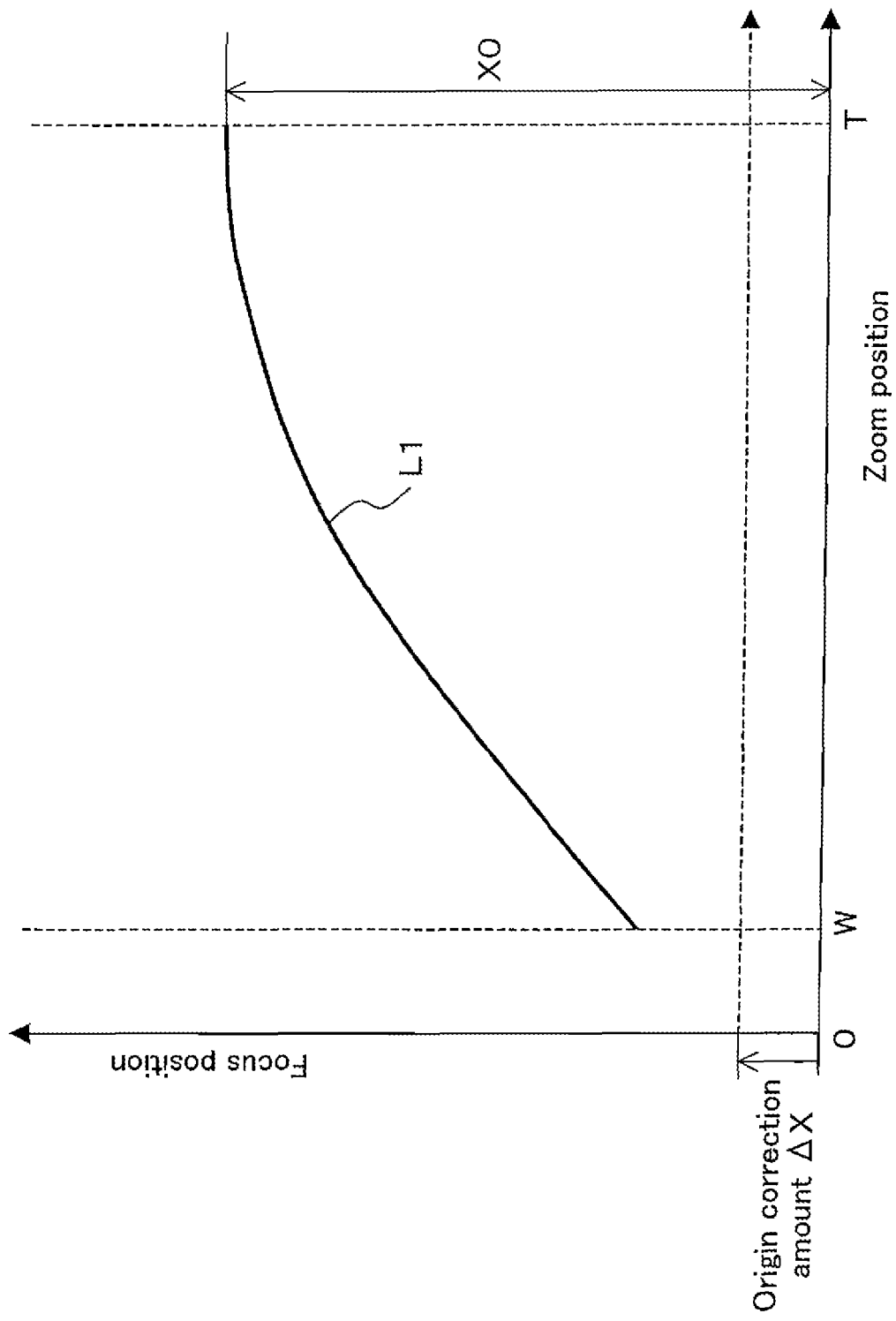
FIG. 20 is a graph showing the relationship between the zoom position and the focus position according to Embodiment 6 of the present invention.

FIG. 20 is a graph showing a relationship between the zoom position and the focus position according to Embodiment 6. L1 represents the relationship between the zoom position and the focus position enabling the zoom operation while keeping the focus condition, when the distance from the front face of the fixed lens to the subject is set at 2 m, for example.

"T" of the zoom position on the horizontal axis shows a telephoto side, and "W" shows a wide-angle side. Assuming that the distance from the front face of the fixed lens to the subject is 2 m under the ideal condition without deviation in origin detection of the focus, in the case where the focus position is determined on the "T" side, the zooming operation can be conducted while keeping the focus condition along the graph of L1 when the zoom position is shifted to the "W" side.

Since the temperature sensor 16 and the angular sensor 17 of FIG. 16 can be used to detect errors in looseness in the lens unit driving direction and variations in mechanism and electrical properties due to a temperature change in operation environment, the focus position may be corrected with consideration given to the origin correction amount ΔX shown in FIG. 20 after the detection of the origin.

This graph shows the example where the correction in the state at a high temperature and facing downward is conducted, while the focus position on the "T" side is located at the position of X0 in the state at a room temperature and in a horizontal position. At a high temperature, distances between lenses increase relative to the design values because of thermal expansion of the lens barrel 1, and accordingly the focus lens 4 has to be shifted to the imaging device 5 side. Further, in the state of facing downward, the focus lens 4 moves away from the imaging device 5 as compared with in the horizontal position due to its own weight and looseness.

Therefore, assuming that the total position correction amount of the focus lens 4 in the state at a high temperature and facing downward is ΔX, X0-ΔX is determined so as to correct the position of the focus lens 4 from the origin, whereby a zooming operation can be conducted while maintaining the focusing condition from the "T" side to the "W" side.

Herein, Embodiment 6 explains the example with consideration given to the case where angles and temperatures of the lens barrel differ between the process adjustment and the normal operation. However, these configurations are not always the optimum one. For instance, in the case where a variation in photosensor output level due to changes in angle and temperature is suppressed by the configuration of the lens barrel or the like, the configurations of Embodiments 1 to 4 are suitable.

Although Embodiment 6 explains the example of having both of the angular sensor and the temperature sensor, the configuration having one of these sensors also is possible. For instance, in the case where a variation in a changing position of the photosensor output level due to a temperature change does not pose a problem especially, the correction can be conducted using an angular sensor only.

Further, although Embodiment 6 shows the example where ΔPd is added in Step 602b of FIG. 19, ΔPd may be subtracted.

In the above-stated Embodiments 2, 4 and 6, the example where at the time of the origin detection operation during the normal operation the lens unit is driven at twice the speed of the process adjustment is shown. However, these examples are non-limiting, and the operation at four times or more the speed also is possible. That is, in the case where a time of the driving signal one cycle is T during the process adjustment, a time of the driving signal one cycle during the normal operation may be T' in the above-stated formula (4), and a driving signal with MIN cycle may be output.

Further, in Embodiments 4 and 6, the driving signal one cycle may be the same for the process adjustment and the normal operation.

Further, although the exciting positions obtained by dividing the cycle of the driving signal of the motor into 8 and 32 sections are described above, these embodiments are not limited by the division number. For example, division into 4 and 16 sections may be set depending on the required accuracy.

Further, the above-described embodiments explain the example using a stepping motor as the driver. However, this may be other motors as long as an exciting signal of the motor has periodicity, and a linear motor for example may be used.

Embodiment 7

Figure 21:
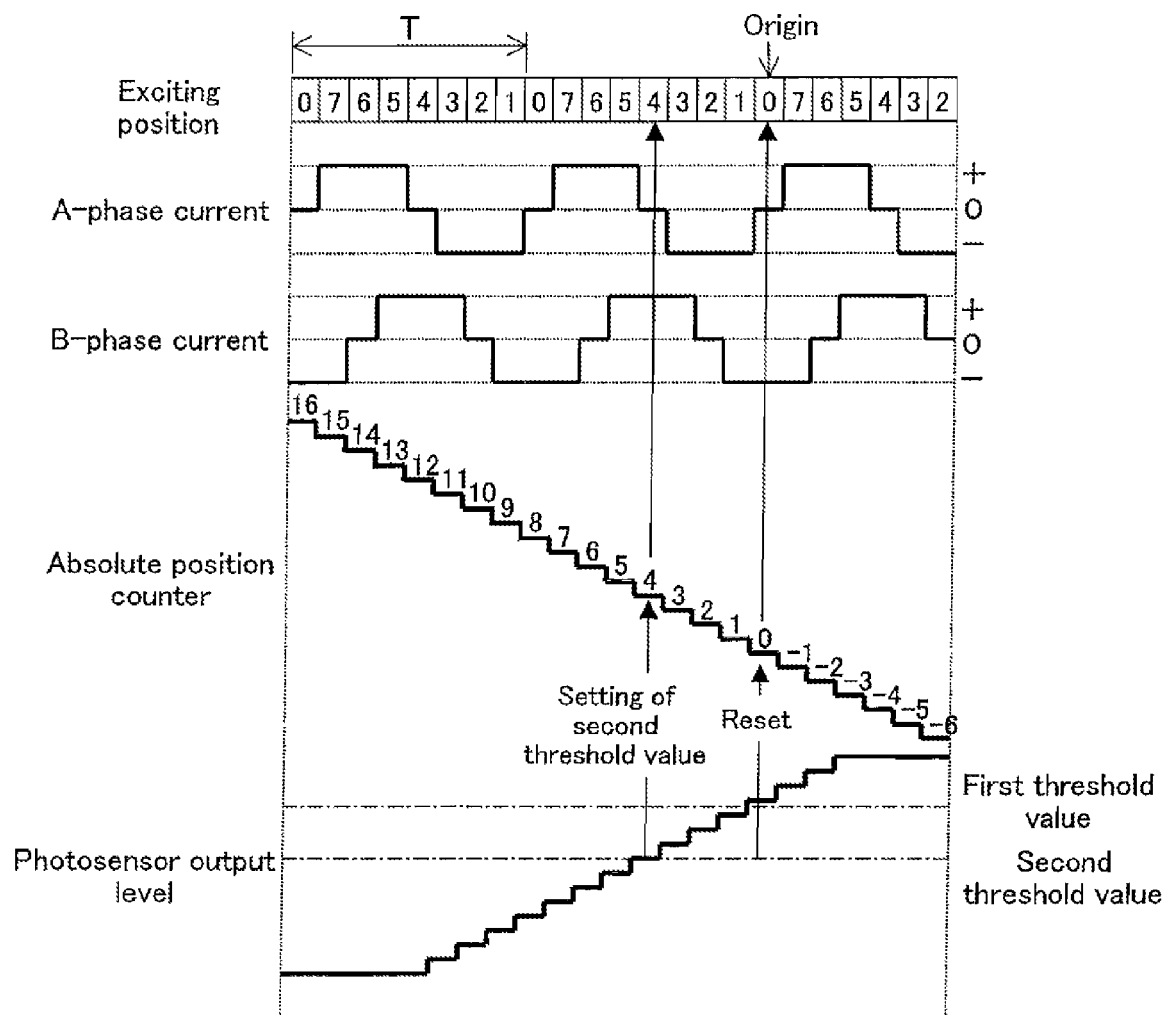
FIG. 21 is a drawing for explaining an origin detection operation during the process adjustment according to Embodiment 7 of the present invention.

The following describes Embodiment 7 of the present invention. A driving apparatus according to Embodiment 7 also has the configuration shown in FIGS. 1 and 2. An operation thereof will be described below, with reference to FIG. 21. FIG. 21 is a drawing for explaining an origin detection operation during the process adjustment according to Embodiment 7. The "exciting position" shown in FIG. 21 corresponds to a phase of the driving signal, which represents a 3-bit counter value for the exciting position counter 151 obtained by dividing one cycle of 360 degrees of a driving signal for the motor coil of the motor 9 output from the focus motor driving unit 11 into 8 sections. This drawing shows a state where the exciting position is decreased one by one along with the movement of the focus lens 4 to the imaging device 5 side.

The "A-phase current" and the "B-phase current" show current waveforms of the motor coil that the focus motor driving unit 11 outputs to the motor 9, and in this example the motor 9 has a two-phase coil with the A-phase and the B-phase. The A-phase current and the B-phase current have electrical angles different from each other by the phase of 90° (in the case where one cycle of the current waveform is 360 degrees), and the motor 9 is rotated by applying a current to the motor coil with the A-phase and the B-phase. In this drawing, the focus lens 4 moves to the imaging device 5 side while the A-phase current is 90° leading relative to the B-phase current.

The "absolute position counter" represents a counter value of the absolute position counter 153, and operates in synchronization with the exciting position. In the case where the exciting position is decreased one by one, the absolute position counter also is decreased one by one. Herein, the absolute position counter sets a bit width so that the same value is not assigned to different positions in the movement range of the focus lens 4.

The "photosensor output level" shows the state where the output level changes as the focus lens 4 moves to the imaging device 5 side so that the photosensor 8 is interrupted by the photo-interruption member 7. Every time the exciting position of the motor 9 changes by one step, the photosensor output level changes by 0.2 V, for example. In this case, in the system control unit 13, it is recognized that the digital value changes by 17 using a built-in AD converter.

As described later, the system control unit 13 makes a judgment as to whether the photosensor output level exceeds a threshold value or not. For instance, a first threshold value can be 195 (about 2.3 V at the AD conversion input unit), which is a digital value after AD conversion, and a second threshold value can be 127 (about 1.5 V at the AD conversion input unit) as a digital value. The second threshold value is set at a value obtained by changing the exciting position of the motor 9 by 4 steps with reference to the first threshold value, i.e., at a value of the photosensor output level obtained by rotating the motor 9 by the half cycle (electrical angle of 180 degrees) of the exciting cycle (electrical angle of 360 degrees).

Figure 22:
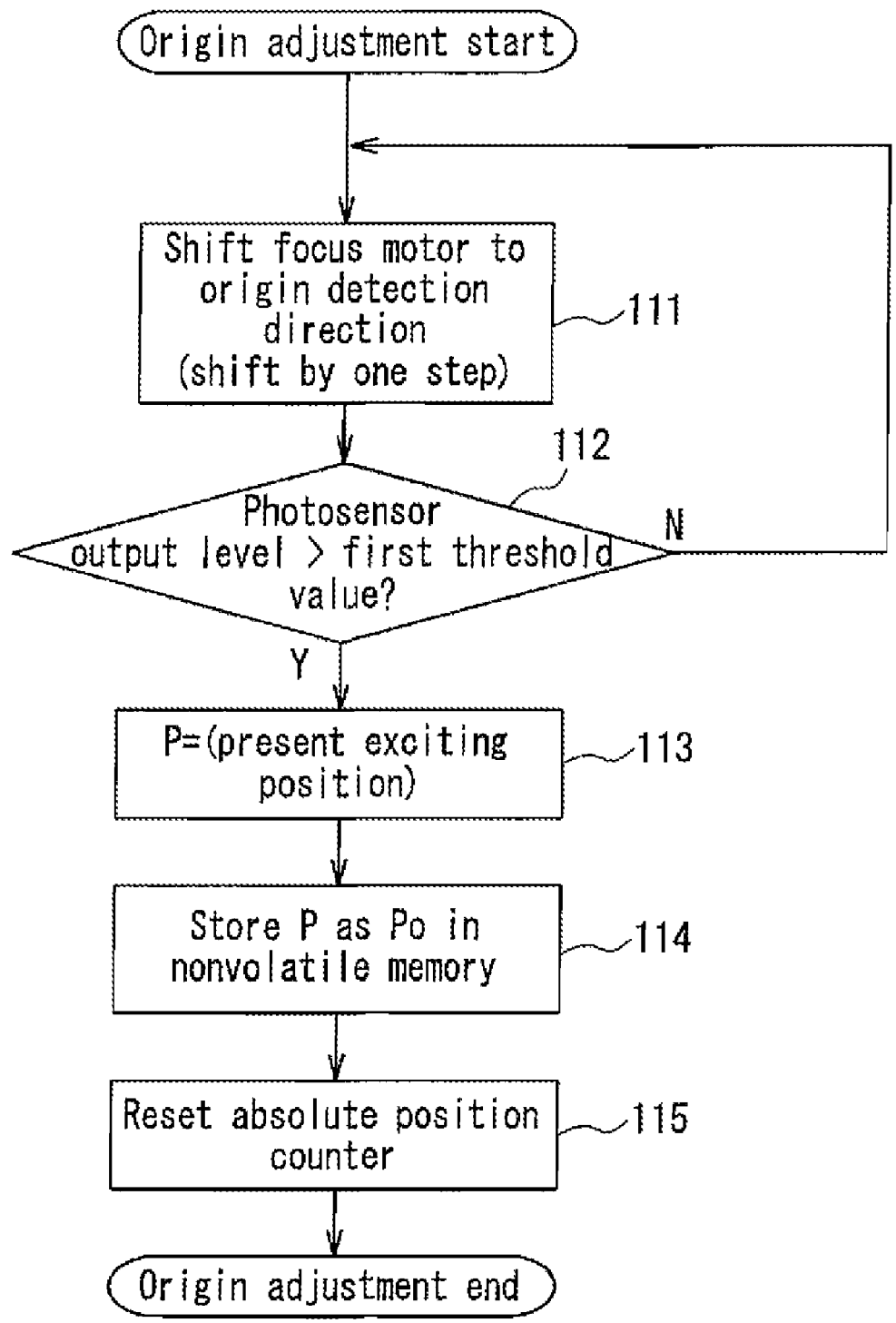
FIG. 22 is a flowchart of the origin detection operation during the process adjustment according to Embodiment 7 of the present invention.

Referring now to FIGS. 21 and 22, the origin detection operation of the focus lens 4 during the process adjustment is described more specifically. FIG. 22 is a flowchart of the origin detection operation according to Embodiment 7 of the present invention, which shows an operation flow described as a program in the system control unit 13. When the power is turned on, the process starts with "origin detection adjustment start".

In Step 111 the motor 9 as a focus motor is shifted to the origin detection direction (the direction of the imaging device 5) by one step at one time. In this case, the exciting position counter 151 is decreased one by one. More specifically, in response to an instruction from the system control unit 13, the exciting position counter 151 is down-counted via the tracking position control unit 152. In accordance with this down-counting, the focus motor driving unit 11 rotates the motor 9 so as to shift the focus lens 4 toward the imaging device 5.

In Step 112, a judgment is made as to whether the photosensor output level exceeds a first threshold value or not. In the case of not exceeding, the process returns to Step 111 to make the motor 9 conduct the next one step operation. In the case of exceeding, the process goes to Step 113, where the exciting position at the time of exceeding is substituted as P. In FIG. 21, since the photosensor output level exceeds the first threshold value at the exciting position of "0", the exciting position of "0" is substituted as P.

In Step 114, P is stored as $P_o$ in the nonvolatile memory 14. In Step 115, the absolute position counter is reset. In FIG. 21, the position indicated with "0" shows the reset position.

Figure 23:
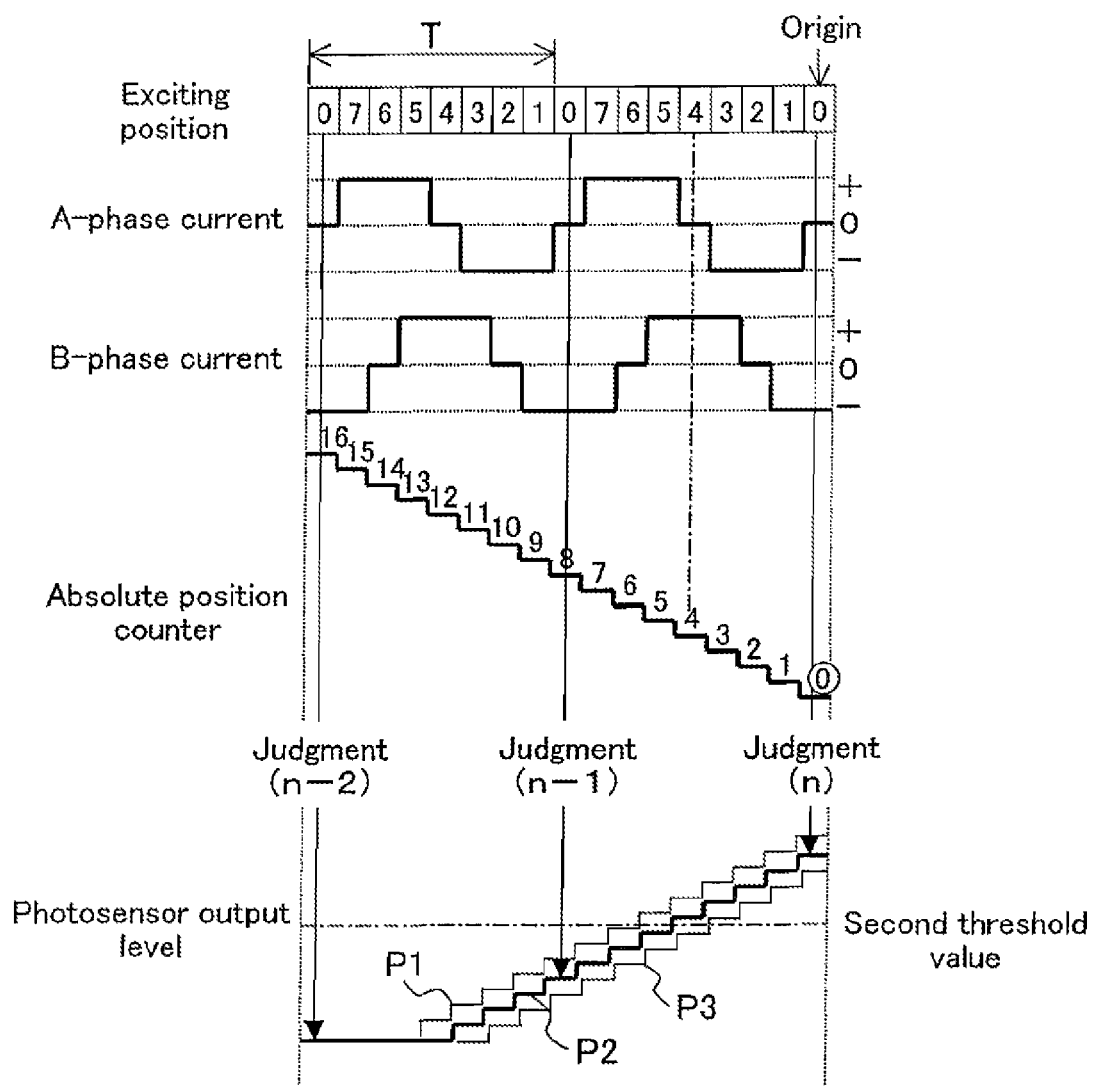
FIG. 23 is a drawing for explaining an origin detection operation during the normal operation according to Embodiment 7 of the present invention.
Figure 24:
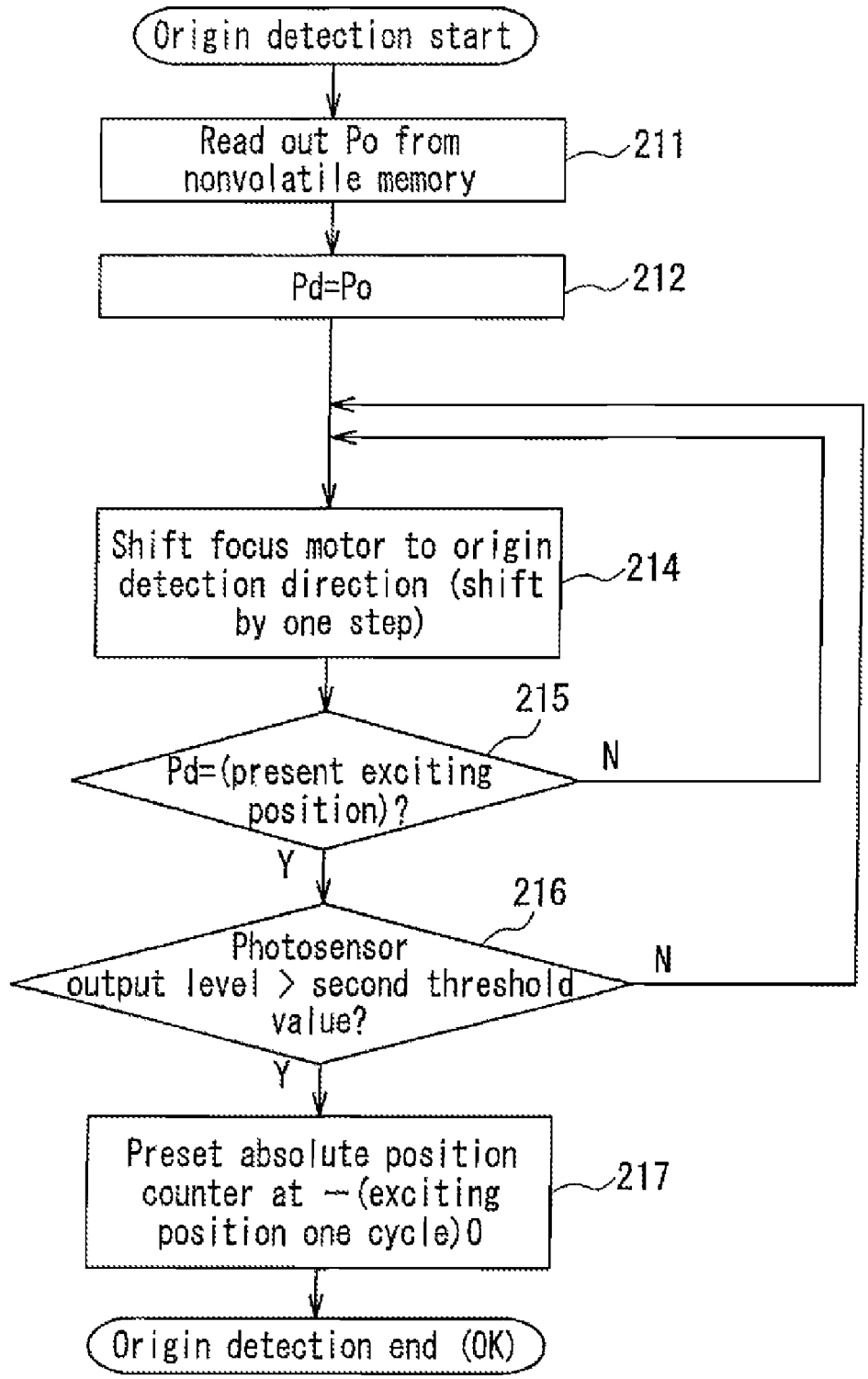
FIG. 24 is a flowchart of the origin detection operation during the normal operation according to Embodiment 7 of the present invention.

Next, the origin detection operation of the focus lens 4 during the normal operation is described, with reference to FIGS. 23 and 24. FIG. 23 is a drawing for explaining the origin detection operation during the normal operation according to Embodiment. 7. FIG. 24 is a flowchart of the origin detection operation during the normal operation according to Embodiment 7, which shows an operation flow described as a program in the system control unit 13. Since the exciting position, the A-phase current, the B-phase current, the absolute position counter and the photosensor output level shown in FIG. 23 are the same as those described in FIG. 21, the explanations for the duplication are omitted.

In FIG. 24, when the power is turned on, the process starts with "origin detection start". In Step 211, Po is read out from the nonvolatile memory 14. In Step 212, Po is substituted for Pd. The value stored in the nonvolatile memory 14 at the origin detection operation of the focus lens 4 during the process adjustment is "0". Therefore, in this example, Pd=0.

In Step 214, the motor 9 is shifted by one step at one time to the origin detection direction (the direction of the imaging device 5) (decreases the exciting position counter one by one). More specifically, in response to an instruction from the system control unit 13, the exciting position counter 151 is down-counted via the tracking position control unit 152. In accordance with this down-counting, the focus motor driving unit 11 rotates the motor 9 so as to shift the focus lens 4 toward the imaging device 5.

In Step 215, a judgment is made as to whether the present exciting position equals Pd (in this example, Pd=0) or not. In the case of not being equal, the process returns to Step 214 to make the motor 9 conduct the next one step operation. In the case of being equal, the process goes to the next Step 216. In the example of FIG. 23, the positions indicated by the judgment (n−2), the judgment (n−1) and the judgment (n) equal Pd(Pd=0) in the exciting position. In Step 216, a judgment is made as to whether the photosensor output level exceeds the second threshold value or not at each of these positions.

Firstly, at the position of the judgment (n−2), a judgment is made as to whether the photosensor output level exceeds the second threshold value or not. In the example of FIG. 23, it does not exceed the second threshold value, and therefore the process returns to Step 214 to make the motor 9 conduct the next one step operation. After the repetition of one step operation, at the position of the judgment (n−1), a judgment is made again as to whether the photosensor output level exceeds the second threshold value or not. In the example of FIG. 23, it does not exceed the second threshold value, and therefore the process returns to Step 214 to make the focus motor conduct the next one step operation. After the repetition of one step operation, at the position of the judgment (n−1), a judgment is made again as to whether the photosensor output level exceeds the second threshold value or not. In the example of FIG. 23, it exceeds the second threshold value. In this case, the process goes to Step 207, where the absolute position counter 153 is preset at 0 (as shown in FIG. 23, the value of the absolute position counter surrounded with the circle ○).

Herein, the photosensor output level indicated by P2 in FIG. 23 shows a level variation under the conditions of the mechanism and electrical properties at the same operational environmental temperature and humidity as those during the process adjustment. However, during the normal operation in which the power may be turned on repeatedly, the photosensor output level generates a variation different from P2 in the respective exciting positions of the motor 9 as indicated by P1 and P3. This results from errors in looseness in the lens unit driving direction and variations in mechanism and electrical properties due to a temperature and humidity change in the operation environment.

In the present embodiment, in the origin detection operation during the normal operation, a judgment is made as to whether the photosensor output level exceeds a second threshold value or not at the judgment; (n−2), the judgment (n−1) and the judgment (n) shown in FIG. 23, as described above. The threshold value used in this case is not the first threshold value during the process adjustment but the second threshold value.

Assuming that the threshold value is the first threshold value, if the photosensor output level has the same level variation as in the process adjustment (P2 of FIG. 23), the origin can be reproduced accurately. However, when there is a variation in the level variation (P1, P3 of FIG. 23) as described above, the origin detected also becomes varied.

According to the present embodiment, as described above, the second threshold value is a value of the photosensor output level where the exciting position of the motor 9 is at a half cycle of the excitation (electrical angle 180 degrees) earlier than the first threshold value during the process adjustment. Therefore, even if the photosensor output level varies as in P1 and P3 as shown in FIG. 23, it is always judged to exceed the second threshold value at the judgment position of n. Similarly, it is always judged not to exceed the second threshold value at the judgment positions of n−1 and n−2.

From this, even in the case where there is a variation within the range from P1 to P3, the exciting position of the motor 9 always becomes "0" when the preset absolute position counter shows "0", thus allowing the accurate reproduction of the origin during process adjustment. That is, if it can be judged that the photosensor output level at a certain judgment position does not exceed the second threshold value but the photosensor output level at the next judgment position exceeds the second threshold value, the origin can be detected accurately.

Note here that a range of errors in looseness in the lens unit driving direction and variations in mechanism and electrical properties due to a temperature and humidity change in operation environment should be within the exciting position one cycle.

Also in the present embodiment, the focus position deviation due to the origin detection position deviation can be prevented as described in Embodiment 1 with reference to FIG. 7. That is, according to the present invention, the origin detection operation free from influences of errors in looseness of the focus lens unit in the driving direction and variations in mechanism and electrical properties due to a temperature and humidity change in the operation environment can be realized. Therefore, the accuracy in absolute position of the focus lens unit can be enhanced remarkably, and the present invention is especially effective for a system performing a zooming operation while maintaining a focus condition.

Incidentally, in the present embodiment the difference between the first threshold value and the second threshold value is a difference corresponding to a half cycle of the motor excitation cycle. However, the difference is not limited to this, and may be set within a range free from the influence of a variation in the photosensor output level.

For instance, the second threshold value may be set at a value within a range of the photosensor output, level that is between the exciting position corresponding to the origin and the exciting position that is one-cycle of the motor excitation cycle away from the exciting position corresponding to the origin.

Although the second threshold value may be set in advance prior to the process adjustment, this value may be set during the process adjustment. For instance, at the origin detection operation during the process adjustment, the system control unit 13 may store the photosensor output level for each step of the motor 9, and the nonvolatile memory 14 may store so that when the photosensor output level reaches the first threshold value, the photosensor output level of 4 steps earlier is set as the second threshold value. Thereby, a variation in the properties of the photosensor can be corrected, and an accurate threshold value can be determined.

Embodiment 8

The following describes Embodiment 8 of the present invention. Embodiment 8 is the same as in the configuration shown in FIG. 1 and FIG. 2 and the origin detection operation during the process adjustment described referring to FIG. 21 and FIG. 22.

Figure 25:
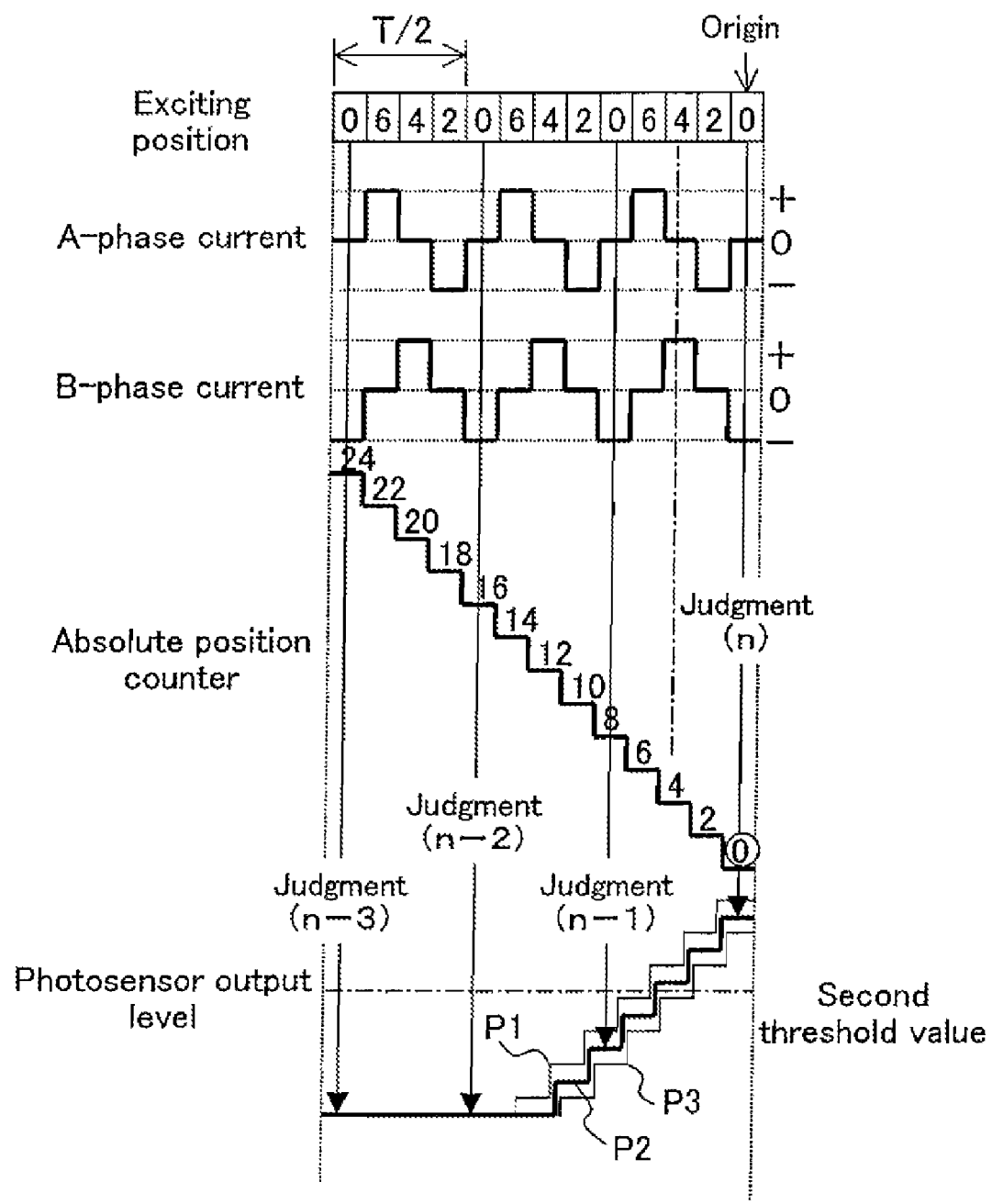
FIG. 25 is a drawing for explaining an origin detection operation during the normal operation according to Embodiment 8 of the present invention.
Figure 26:
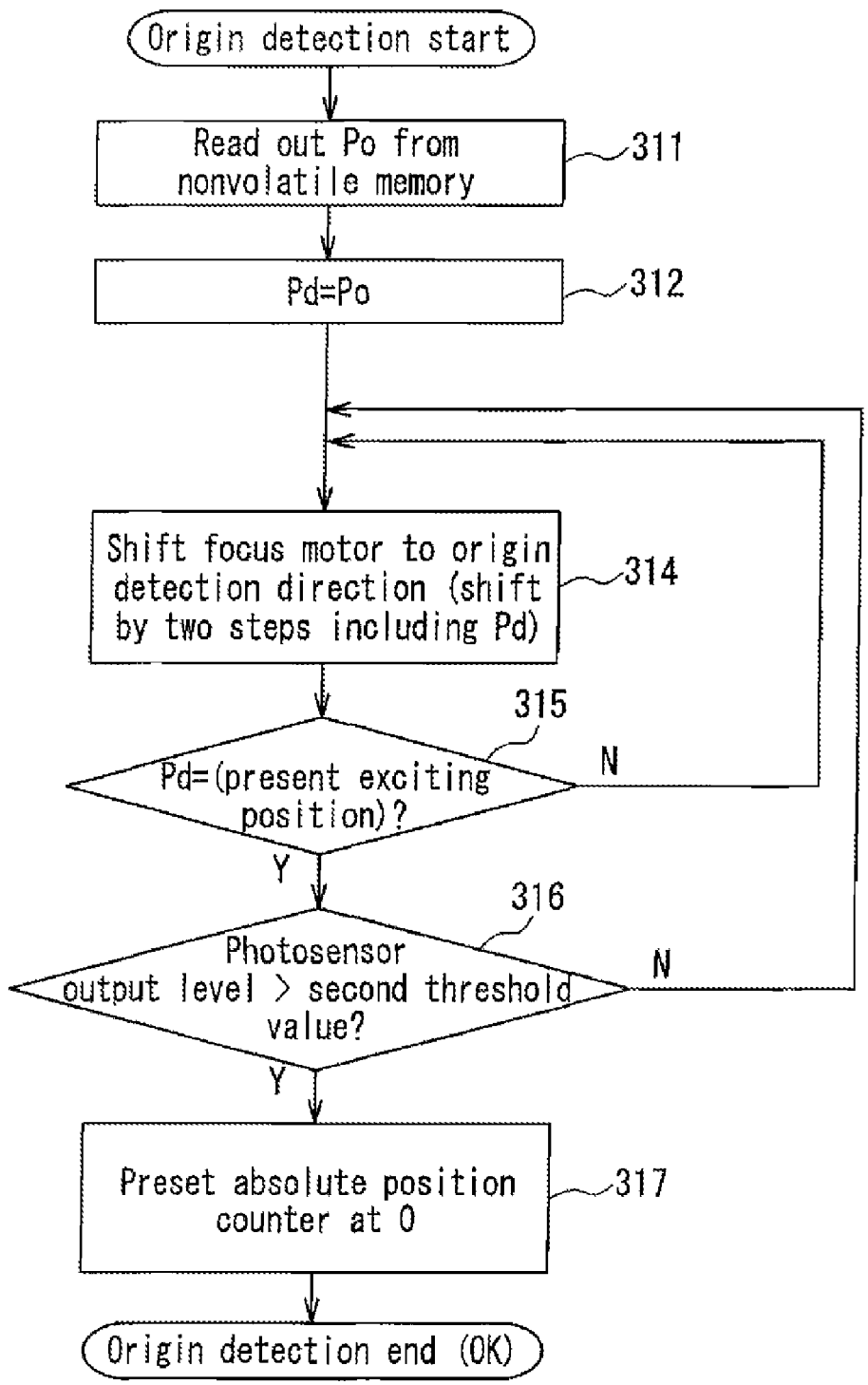
FIG. 26 is a flowchart, of the origin detection operation during the normal operation according to Embodiment 8 of the present invention.

Referring now to FIGS. 25 and 26, the origin detection operation of a focus lens 4 during the normal operation in Embodiment 8 is described below. FIG. 25 is a drawing for explaining the origin detection operation during the normal operation according to Embodiment 8. Since the exciting position, the A-phase current, the B-phase current, the absolute position counter and the photosensor output level shown in FIG. 25 are the same as those described in FIG. 3, the duplicate explanations are omitted.

Embodiment 8 is different from Embodiment 7 in that the exciting position is decreased by two at one time when the focus lens 4 is shifted to the imaging device 5 side. Therefore, the counter value of an absolute position counter 153, which operates in synchronization with the exciting position, also is decreased by two at one time. Herein, the absolute position counter sets a bit width so that the same value is not assigned to different positions in the movement range of the focus lens 4.

In Embodiment 7, the time for one cycle of the driving signal is the time T for both of the process adjustment and the normal operation as shown in FIGS. 21 and 23. However, in Embodiment 8, the time for one cycle of the driving signal during the normal operation is T/2 as shown in FIG. 25. Thereby, Embodiment 8 enables the origin detection operation during the normal operation at twice the speed of Embodiment 7.

FIG. 26 is a flowchart of the origin detection operation during the normal operation according to Embodiment 8, which shows an operation flow described as a program in the system control unit 13. When the power is turned on, the process starts with "origin detection start". In Step 311, Po is read out from the nonvolatile memory 14. In Step 312, Po is substituted for Pd. Also in Embodiment 8, the example where the value stored in the nonvolatile memory 14 is "0" is described like Embodiment 1. Therefore, also in this example, Pd=0.

In Step 314, the motor 9 is shifted by two steps at one time in the origin detection direction (the direction of the imaging device 5) (decreases the exciting position counter by two at one time). Herein, the exciting position is set so as to include the above-obtained Pd (in this case, Pd=0).

More specifically, in response to an instruction from the system control unit 13, the exciting position counter 151 is down-counted via the tracking position control unit 152. In accordance with this down-counting, the focus motor driving unit 11 rotates the motor 9 so as to shift the focus lens 4 toward the imaging device 5.

In Step 315, a judgment is made as to whether the present exciting position equals Pd (in this example, Pd=0) or not. In the case of not being equal, the process returns to Step 314 to make the motor 9 conduct the next two-step operation. In the case of being equal, the process goes to the next Step 316.

The judgment positions are the positions indicated by the judgment (n−3), the judgment (n−2), the judgment (n−1) and the judgment (n) of FIG. 25. In Step 316, a judgment is made as to whether the photosensor output level exceeds a second threshold value or not. In the case of not exceeding, the process returns to Step 314 to make the motor 9 conduct the next two-step operation. In the case of exceeding, the process goes to Step 317. At the time of exceeding, the absolute position counter 153 is preset at 0 (as shown in FIG. 25, the value of the absolute position counter surrounded with the circle ○).

The operation during these Steps 314 to 317 is the same as the operation during Steps 214 to 217 described in the above Embodiment 7 with reference to FIG. 24. Further, even in the case where there is a variation of the photosensor output level within the range from P1 to P3, the origin during the process adjustment can be reproduced with reliability, which is similar to Embodiment 7. In addition, Embodiment 8 enables the origin detection operation during the normal operation at twice the speed of Embodiment 7.

Incidentally, similarly to Embodiment 7, a range of errors in looseness of the lens unit in the driving direction and variations in mechanism and electrical properties due to a temperature and humidity change in the operation environment should be within the exciting position one cycle.

Embodiment 9

The following describes Embodiment 9 of the present invention. Embodiment 9 is the same as in the configuration shown in FIG. 1 and FIG. 2 and the origin detection operation during the process adjustment described referring to FIG. 21 and FIG. 22.

Figure 27:
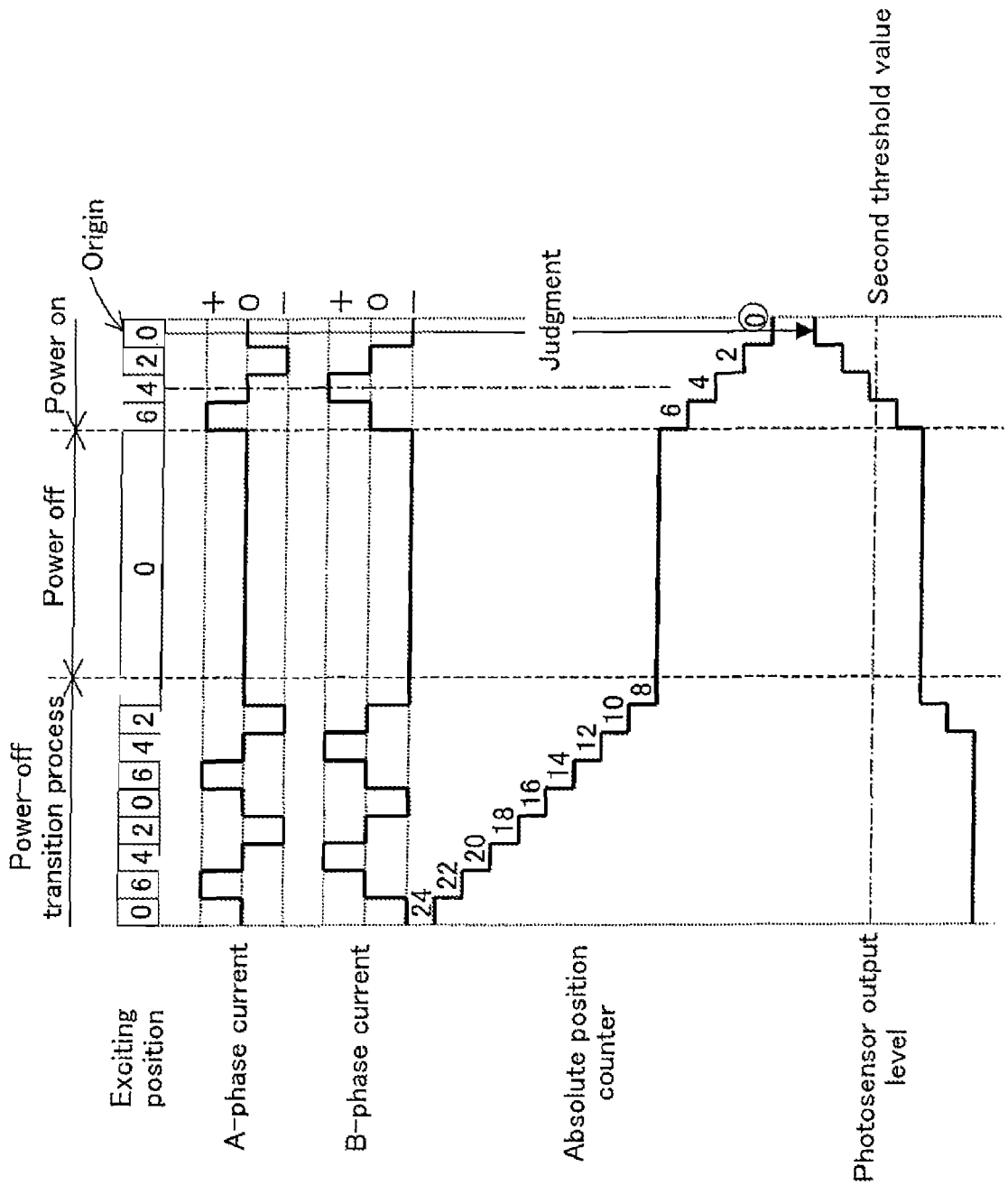
FIG. 27 is a drawing for explaining an origin detection operation during the normal operation according to Embodiment 9 of the present invention.
Figure 28:
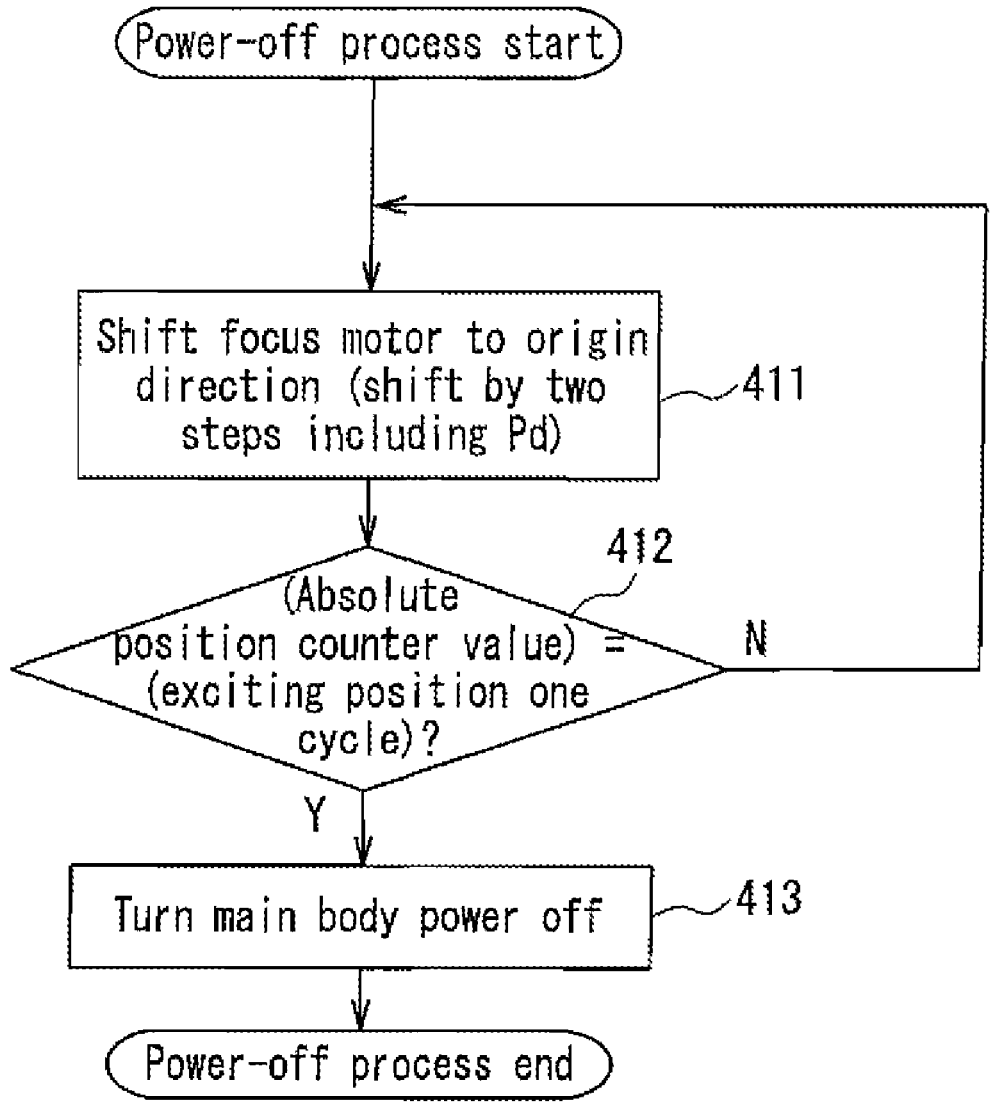
FIG. 28 is a flowchart of a power-off process according to Embodiment 9 of the present invention.

Referring now to FIGS. 27 and 28, the origin detection operation of a focus lens 4 during the normal operation in Embodiment 9 is described below. FIG. 27 is a drawing for explaining the origin detection operation during the normal operation according to Embodiment 9. Since the exciting position, the A-phase current, the B-phase current, the absolute position counter and the photosensor output level shown in FIG. 27 are the same as those described in FIG. 21, the explanations for the duplication are omitted.

FIG. 28 is a flowchart of a power-off process according to Embodiment 9, which shows an operation flow described as a program in the system control unit 13. This drawing shows an example where when a power of a main body of an imaging device such as a still camera or a video movie is turned off by a main body switch (not illustrated), a transition process to the power-off is performed.

When the power is turned off, the system control unit 13 starts the process with "power-off process start". In Step 411, the motor 9 is shifted to the origin detection direction (the direction of the imaging device 5) by two steps at one time (decreases the exciting position counter by two at one time). Herein, the exciting position is set so as to include Pd (in this case, Pd=0) described in Embodiment 8. More specifically, in response to an instruction from the system control unit 13, the exciting position counter 151 is down-counted via the tracking position control unit 152. In accordance with this down-counting, the focus motor driving unit 11 rotates the motor 9 so as to shift the focus lens 4 toward the imaging device In Step 412, if the counter value of the absolute position counter 153 does not agree with the exciting position one cycle, the process returns to Step 411 to make the focus motor conduct the next 2-step operation. In the case where they agree, the process goes to Step 413, where the power of the main body is turned off. In this case, since the (exciting position one cycle)=8, the power of the main body is turned off when (absolute position counter value)=8 (see FIG. 27).

Next, when the power is turned on by the main body switch, the operation is as follows: as described in Embodiment 8 with reference to FIG. 26, the process is conducted in accordance with the flowchart that starts with "origin detection start" when the power is turned on. Although the description of the midstream of the process is omitted to avoid duplication, in Step 316 of FIG. 26, a judgment is made as to whether the photosensor output level exceeds a second threshold value or not, and the counter value of the absolute position counter 153 is preset at "0" (as shown in FIG. 27, the value of the absolute position counter surrounded with the circle ○).

As shown in FIG. 27, in the power-off transition process, the focus motor is stopped immediately before the origin (immediately before the photosensor output level exceeds a threshold value). Therefore, in Embodiment 9, the first once judgment concerning the photosensor output level is all that required to detect the origin when the power is tuned on. More specifically, since the position where the counter value of the absolute position counter becomes "0" is the origin, the stopping position where the counter value agrees with the exciting position one cycle is the judgment position on the preceding side by one relative to the final judgment position (origin). That is, the feature of the present embodiment resides in that the stopping position of the motor 9 during the power-off transition process is a judgment position immediately preceding the position for the final judgment of the photosensor output level when the power is turned on next.

The thus performed power-off transition process enables secure origin detection simply by the first once judgment of the photosensor output level even when errors in looseness of the lens unit in the driving direction and variations in mechanism and electrical properties due to a temperature and humidity change in operation environment occur before the power is turned on next.

Incidentally similarly to Embodiments 7 and 8, a range of errors in looseness of the lens unit in the driving direction and variations in mechanism and electrical properties due to a temperature and humidity change in operation environment should be within the exciting position one cycle.

Embodiment 10

Figure 29:
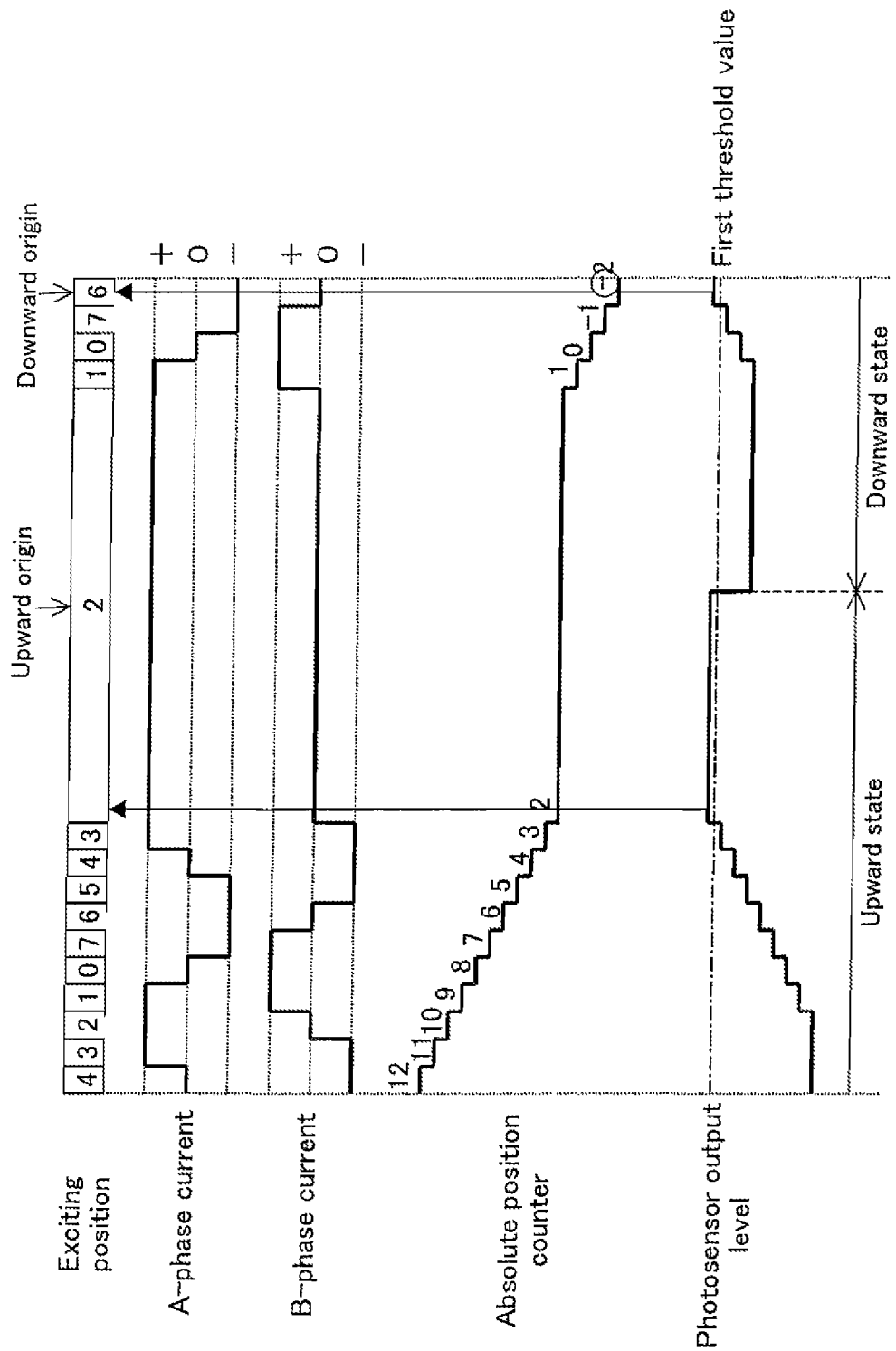
FIG. 29 is a drawing for explaining an origin detection operation during the process adjustment according to Embodiment 10 of the present invention.
Figure 30:
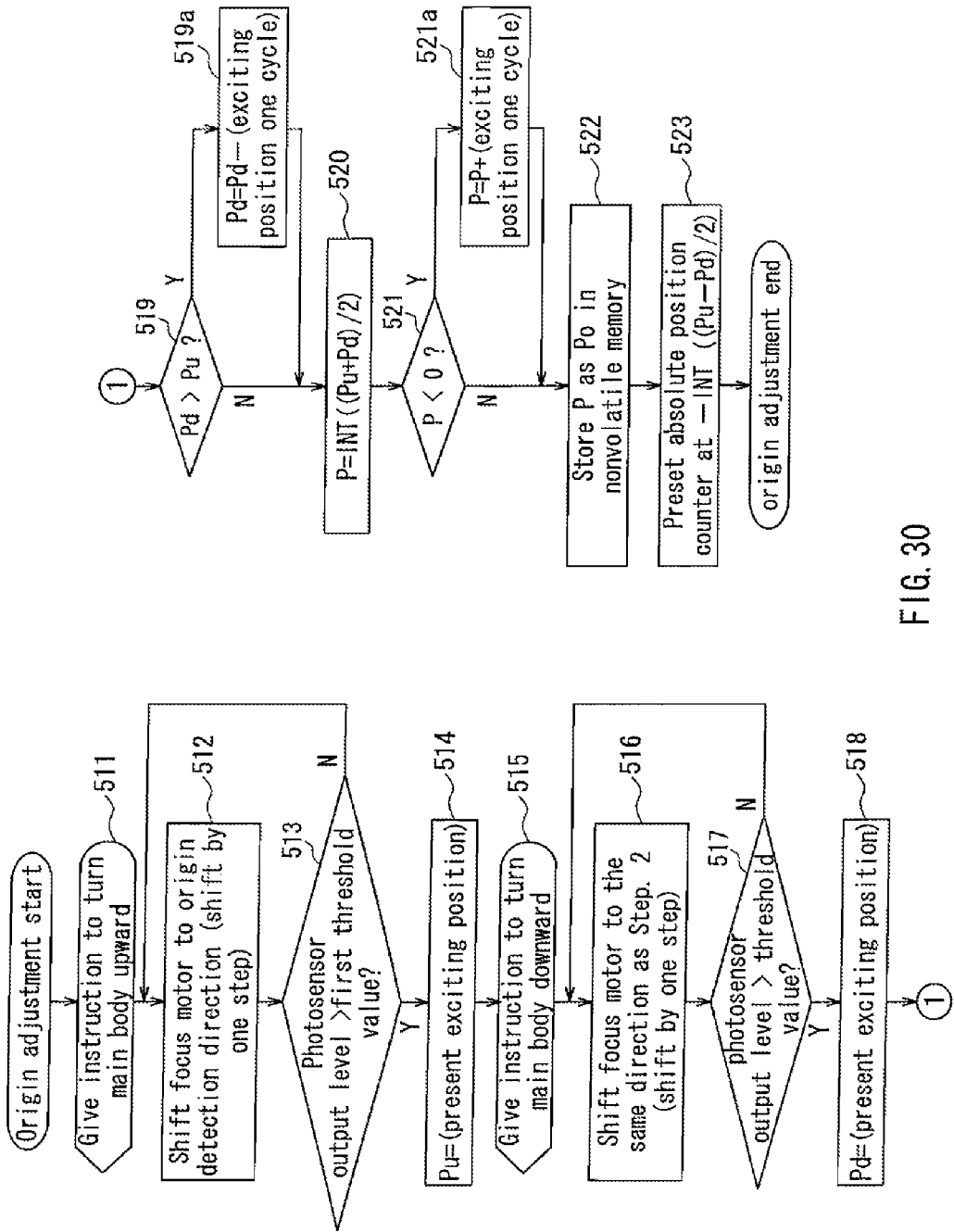
FIG. 30 is a flowchart, of the origin detection operation during the process adjustment according to Embodiment 1.0 of the present invention.

The following describes Embodiment 10 of the present invention. Embodiment 10 is the same as in the configuration shown in FIG. 1 and FIG. 2. Referring now to FIGS. 29 and 30, the origin detection operation of a focus lens 4 during the normal operation in Embodiment 10 is described below FIG. 29 is a drawing for explaining the origin detection operation during the process adjustment according to Embodiment 10. Since the exciting position, the A-phase current, the B-phase current, the absolute position counter and the photosensor output level shown in FIG. 29 are the same as those described in FIG. 21 of Embodiment 7, the duplicate explanations are omitted. Further, this embodiment is the same as Embodiment 7 in that the exciting position is decreased one by one along with the movement of the focus lens 4 to the imaging device 5 side.

FIG. 30 is a flowchart of an origin detection operation during the process adjustment according to Embodiment 10, which shows an operation flow described as a program in the system control unit 13. This process starts with "origin adjustment start" when the power is turned on. In Step 511, on a liquid crystal display (not illustrated) showing a process adjustment menu, for example, "main body upward" is displayed. A lens 2 of the imaging apparatus is turned upward, and the process goes to the next Step 512.

In Step 512, the motor 9 is shifted to the origin detection direction (the direction of the imaging device 5) by one step at one time (decreases the exciting position counter one by one). More specifically, in response to an instruction from the system control unit 13, the exciting position counter 151 is down-counted via the tracking position control unit 152. In accordance with this down-counting, the focus motor driving unit 11 rotates the motor 9 so as to shift the focus lens 4 toward the imaging device 5.

In Step 513, a judgment is made as to whether the photosensor output level exceeds a first threshold value or not. In the case of not exceeding, the process returns to Step 512 to make the motor 9 conduct the next one step operation. In the case of exceeding, the process goes to Step 514, where the exciting position at the time of exceeding is substituted as Pu. In this case, the exciting position "2" is substituted for Pu.

Next, in Step 515, on the liquid crystal display (not illustrated) showing a process adjustment menu, for example, "main body downward" is displayed. The lens 2 of the imaging apparatus is turned downward, and the process goes to the next Step 516. In Step 516, the motor 9 is shifted to the origin detection direction (the direction of the imaging device 5) by one step at one time (decreases the exciting position counter one by one).

Note here that the reason for generating a step in the photosensor output level when the attitude is changed from "upward state" to "downward state" in FIG. 29 is that the focus lens 4 is shifted to the direction moving away from the imaging device 5 because of its own weight and looseness (e.g., looseness of the rack for transferring the focus lens 4 with the lead screw of the motor 9).

In Step 517, a judgment is made as to whether the photosensor output level exceeds the first threshold value or not. In the case of not exceeding, the process returns to Step 516 to make the motor 9 conduct the next one step operation. In the case of exceeding, the process goes to Step 518, where the exciting position at the time of exceeding is substituted as Pd.

In this case, the exciting position "6" is substituted as Pd. In Step 519, the magnitude of Pd and Pu is judged. In this case, since Pu=2 and Pd=6, the process goes to the next Step 519a. In Step 519a, Pd=Pd−(exciting position one cycle) is calculated, and since (exciting position one cycle)=8, Pd=−2 is determined. When, using this value of Pd, P is determined by the formula of Step 520, P=INT((2−2)/2)=0 is obtained. Incidentally, INT means to round down the figures from the decimal fractions. In this example, since it is not the case of P<0 in Step 521, the process goes to the next Step 522 and P=0 is stored as Po in the nonvolatile memory.

In Step 523, the counter value of the absolute position counter153 is preset at −INT ((Pu−Pd)/2). The value of −INT ((Pu−Pd)/2) becomes −INT ((2+2)/2)=−2. With this calculation, it can be calculated how far apart in exciting position the origin at the time of downward and the origin of the intermediate are between the times of upward and downward. As shown in FIG. 29, assuming that the numerical value of the absolute position counter at the origin at the time of downward is −2 as the calculated value (the value surrounded with the circle ○), the counter value of the absolute position counter 153 at the origin (exciting position "0") of the intermediate between at the time of upward and downward becomes "0".

In the case of P<0 in Step 521, there is no corresponding numerical value for the exciting position. However, the calculation in Step 521a allows the exciting position corresponding to P in Step 520 to be determined.

In the afore-mentioned example, the example of Pd>Pu is described in Step 519. On the contrary, in the case of Pd≦Pu, the process may go to Step 520 directly. In the case of Pd≦Pu, the intermediate position between Pu and Pd can be determined from the calculation of Step 520 without the need of correction of the value of Pd in Step 519a.

In this way, according to Embodiment 10, the origin stored in the nonvolatile memory 14 is the intermediate position of the origins detected in the upward state and the downward state. Therefore as compared with the case where the origin is adjusted without consideration given to the difference due to attitude as described in Embodiment 1, which might cause an upward attitude difference during the adjustment and cause a downward attitude difference during the normal operation, for example, Embodiment 10 allows an error in lens position due to attitude difference to be improved to ½.

Further, in Embodiment 10, the example where the origin is detected in the upward state firstly and then the origin is detected in the downward state is described. However, if, considering looseness, the position in the upward state is farther away from the origin than in the downward state, the origin may be detected in the downward state firstly, followed by the origin detection in the upward state.

Further, in an imaging apparatus in which a variation in origin detection position due to attitude difference is specified as a specification, the origin may be detected in either the upward state or the downward state, and the position deviated from the detected position by half of the specification may be set as the origin, whereby the same effects can be obtained.

The present embodiment is on the precondition that there is a variation in origin detection position due to attitude difference of a lens barrel. However, if the accuracy of a lens barrel can be secured so that a variation in origin detection position due to attitude difference of a lens barrel can be ignored, the configuration of the above-stated Embodiments 7 to 9 may be adopted.

Embodiment 11

The following describes Embodiment 11 of the present invention. A driving apparatus according to Embodiment 11 includes a temperature sensor and an angular, sensor, which have the configuration shown in FIGS. 16 and 17.

Figure 31B:
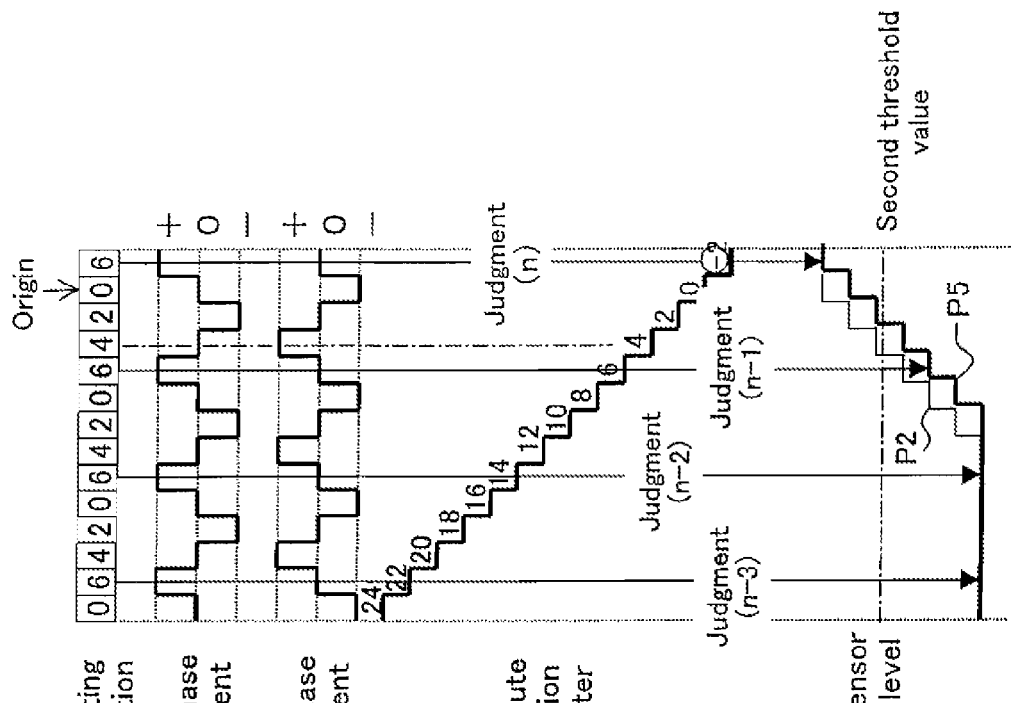
FIG. 31 is a drawing for explaining an origin detection operation during the normal operation according to Embodiment 11 of the present invention.
Figure 31A:
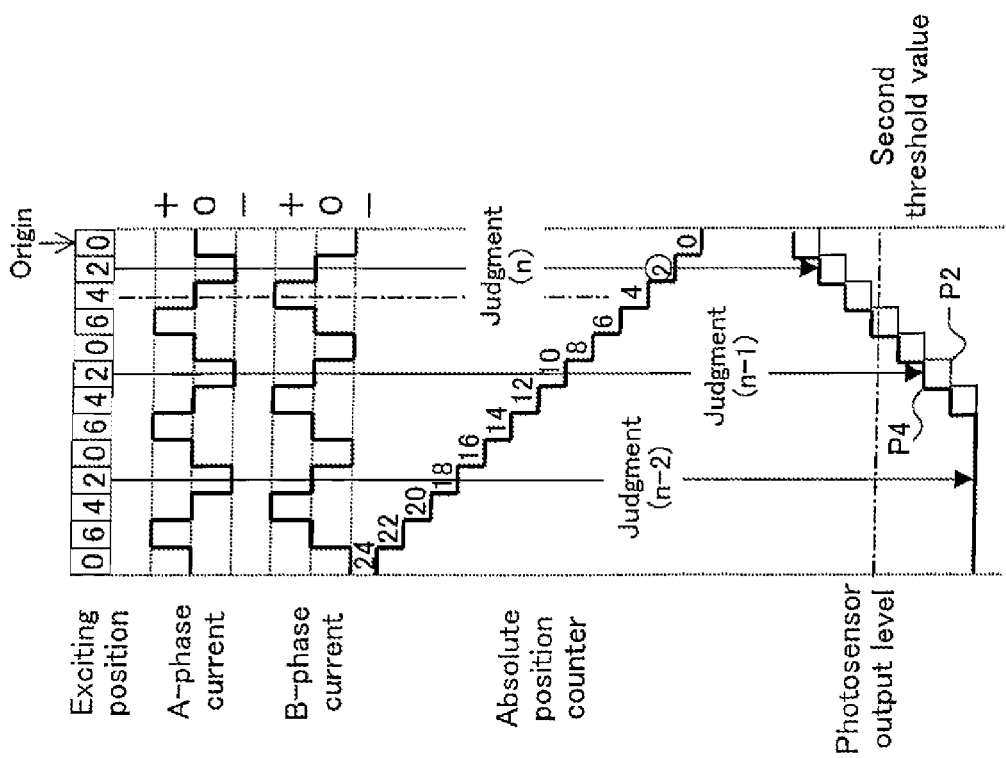
Figure 32:
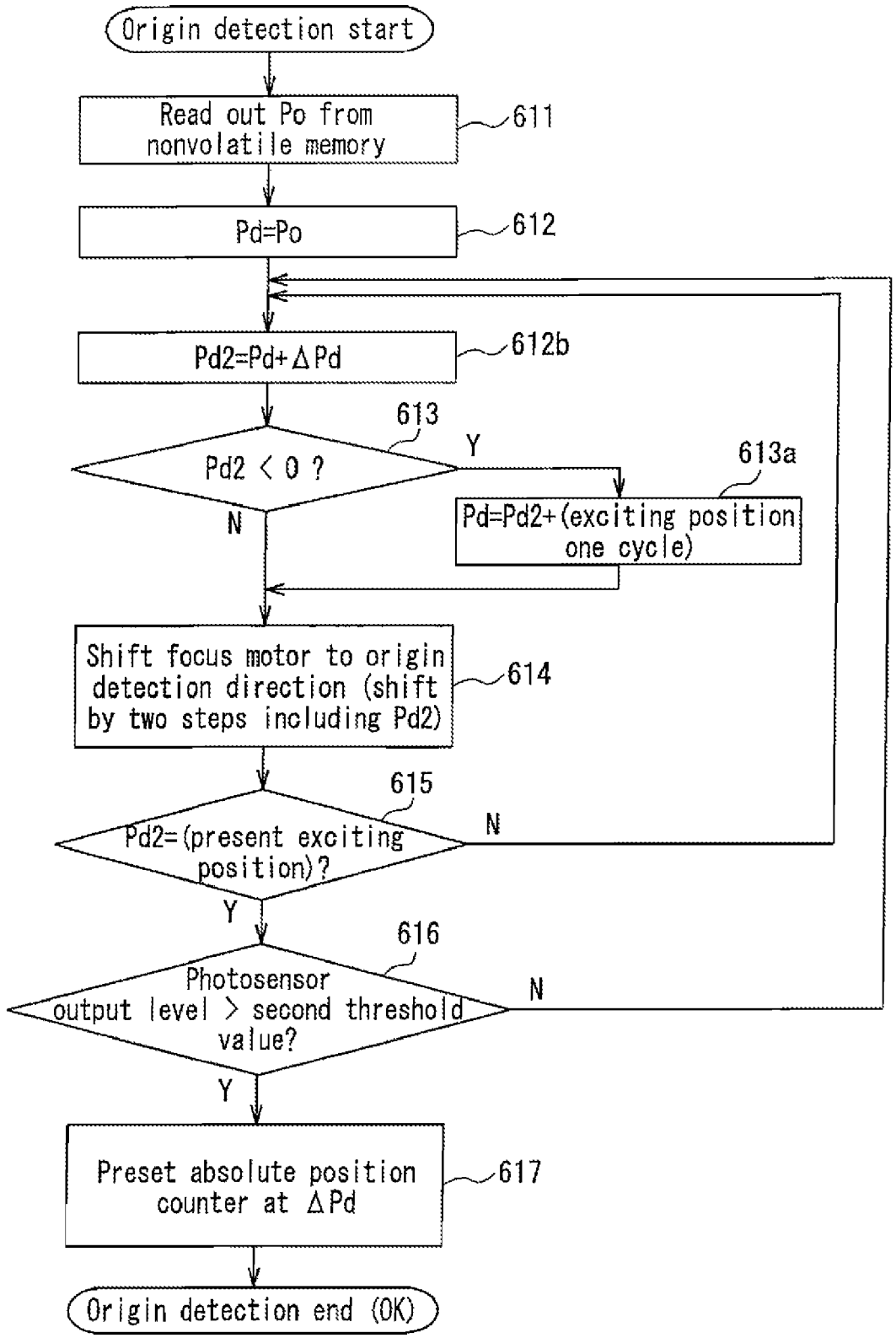
FIG. 32 is a flowchart of the origin detection operation during the normal operation according to Embodiment 11 of the present invention.

Referring now to FIGS. 31 and 32, an origin detection operation of the focus lens 4 during the normal operation in Embodiment 11 will be described below. FIG. 31 is a drawing for explaining an origin detection operation during the normal operation according to Embodiment 11. FIG. 31(*a*) is intended to show the state where the temperature is higher than a room temperature and the lens 2 of the lens barrel 1 faces upward, and FIG. 31(*b*) is intended to show the state where the temperature is lower than a room temperature and the lens 2 of the lens barrel 1 faces downward.

Since the exciting position, the A-phase current, the B-phase current, the absolute position counter and the photosensor output level shown in FIG. 31 are the same as those described in FIG. 21 of Embodiment 7, the duplicate explanation are omitted. Further, the exciting position is decreased by two at one time along with the movement of the focus lens 4 to the imaging device 5 side, which is similar to the example of FIG. 25 of Embodiment. 8.

FIG. 32 is a flowchart of the origin detection operation during the normal operation according to Embodiment 11, which shows an operation flow described as a program in the system control unit 13. When the power is turned on, the process starts with "origin detection start", In Step 611, Po is read out from the nonvolatile memory 14. In Step 612*a*, Po=Po. The value stored in the nonvolatile memory 14 at the origin detection operation of the focus lens 4 during the process adjustment is "0", which is similar to Embodiment 7. Therefore, in this example, Pd=0.

In Step 612*b*, in accordance with information output from the temperature sensor 16 and the angular sensor 17, a correction value ΔPd is added to Pd. In the case where the lens 2 of the lens barrel 1 faces upward, the focus lens 4 moves closer to the imaging device 5 as compared with the horizontal position due to its own weight and looseness (e.g., looseness of the rack for transferring the focus lens 4 with the lead screw of the motor 9). Moreover, in the case where the temperature is higher than a room temperature and the photo-interruption member 7 has a thermal expansion coefficient larger than those of the lens barrel 1 and the motor 9, the photo-interruption member 7 moves closer to the photosensor 8.

For those reasons, as shown with P4 of the photosensor output level of FIG. 31(*a*), the timing when the photosensor output level changes at the time of the origin detection becomes earlier than the photosensor output level P2 that shows the case where the lens is in a horizontal position at a room temperature. In this case, an example where an error occurring due to the temperature increase from a room temperature corresponds to one step of the exciting position of the motor 9 and an error occurring when the imaging apparatus in a horizontal position is made to face upward corresponds to one step of the exciting position of the motor 9, whereby an error corresponding to two steps in total occurs, is shown.

Therefore, since ΔPd=2, Pd2=2 is calculated in Step 602*b*. In Step 613, a judgment is made as to whether Pd2 is negative or not. In the case where Pd2 is 0 or positive, the process goes to the next Step 614. In the case where Pd2 is negative, Pd2=Pd2+(exciting position one cycle) is calculated in Step 613*a*, and then the process goes to the next Step 614. The reason for undergoing Step 613*a* in the case of Pd2 being negative is the same as the reason for undergoing Step 521*a* of FIG. 30 in Embodiment 10.

In Step 614, the motor 9 is shifted by two steps at one time to the origin detection direction (the direction of the imaging device 5) (decreases the exciting position counter by two at one time). Herein., the exciting position is set so as to include the above-obtained Pd2 (in this case, Pd2=2). More specifically, in response to an instruction from the system control unit 13, the exciting position counter 151 is down-counted via the tracking position control unit 152, In accordance with this down-counting, the focus motor driving unit 11 rotates the motor 9 so as to shift the focus lens 4 toward the imaging device 5.

In Step 615, a judgment is made as to whether the present exciting position equals Pd2 (in this example, Pd2=2) or not. In the case of not being equal, the process returns to Step 612*b* to make the motor 9 conduct the next two-step operation. In the case of being equal, the process goes to the next step 616.

The positions with Pd2=2 are positions indicated with the judgment (n−2), the judgment (n−1) and the judgment (n) shown in FIG. 31(*a*). Since the exciting position is 2 at these judgment positions, this is the position advancing by two steps from the exciting position 0 that shows a position before adding the correction value (i.e., a position moving away from the imaging device 5). Therefore, the judgment at these judgment positions can be substantially equal to the case where the photosensor output level P2 for the lens in a horizontal position at a room temperature is detected at a position where the exciting position is 0.

In Step 616, a judgment is made as to whether the photosensor output level exceeds a second threshold value or not at the above-stated judgment positions. In the case of not exceeding, the process returns to Step 612*b* to make the focus motor conduct the next two-step operation. In the case of exceeding, the process goes to Step 617. At the time of exceeding, the absolute position counter 153 is preset at ΔPd. Herein, this is preset at "2" because ΔPd=2 (as shown in FIG. 31(*a*), the value of the absolute position counter surrounded with the circle ○).

Note here that the explanations for FIG. 26 of Embodiment 8 show the example where if the conditions are not satisfied in Step 315 or Step 316, the process returns to Step 314. On the contrary, Embodiment 11 shows the example where the process returns to Step 612b. This is because according to Embodiment 11 in the case where a temperature changes or the attitude difference changes during the origin detection operation, a position for judging whether the photosensor output level exceeds a threshold value or not is changed successively.

The following describes the case where the lens 2 of the lens barrel 1 faces downward and the temperature is lower than a room temperature, with reference to FIG. 31(b) and FIG. 32. In the case where the lens 2 of the lens barrel 1 faces downward, the focus lens 4 moves away from the imaging device 5 as compared with the horizontal position due to its own weight and looseness (e.g., looseness of the rack for transferring the focus lens 4 with the lead screw of the motor 9). Moreover, in the case where the temperature is lower than a room temperature and the photo-interruption member 7 has a thermal expansion coefficient larger than those of the lens barrel 1 and the motor 9, the photo-interruption member 7 moves away from the photosensor 8.

For those reasons, as shown with P5 of the photosensor output level of FIG. 31(b), the timing when the photosensor output level changes at the time of the origin detection becomes later than the photosensor output level P2 that shows the case where the lens is in a horizontal position at a room temperature. In this case, an example where an error occurring due to the temperature decrease from a room temperature corresponds to one step of the exciting position of the motor 9 and an error occurring when the imaging apparatus in a horizontal position is made to face downward corresponds to one step of the exciting position of the motor 9, whereby an error corresponding to two steps in total occurs, is shown.

Therefore, since ΔPd=−2, Pd2=−2 is calculated in Step 612b. In Step 613, a judgment is made as to whether Pd2 is negative or not. In the case where Pd2 is negative, Pd2=Pd2+ (exciting position one cycle) is calculated in Step 613a, and then the process goes to the next step. In the case where Pd2 is 0 or positive, the process goes to the next step. In this case, the resultant Pd2 is 6, because −2+8=6.

In Step 614, the motor 9 is shifted by two steps at one time to the origin detection direction (the direction of the imaging device 5) (decreases the exciting position counter by two at one time). Herein, the exciting position is set so as to include the above-obtained Pd2 (in this case, Pd2=6). More specifically, in response to an instruction from the system control unit 13, the exciting position counter 151 is down-counted via the tracking position control unit 152. In accordance with this down-counting, the focus motor driving unit 11 rotates the motor 9 so as to shift the focus lens 4 toward the imaging device 5.

In Step 615, a judgment is made as to whether the present exciting position equals Pd2 (in this example, Pd2=6) or not. In the case of not being equal, the process returns to Step 612b to make the motor 9 conduct the next two-stop operation. In the case of being equal, the process goes to the next Step 616. The positions with Pd2=6 are positions indicated with the judgment (n−3), the judgment (n−2) and the judgment. (n−1) shown in FIG. 31(b). Since the exciting position is 6 at these judgment positions, this is the position behind by two steps from the exciting position 0 that shows a position before adding the correction value (i.e., a position moving closer to the imaging device 5). Therefore, the judgment at these judgment positions can be substantially equal to the case where the photosensor output level P2 for the lens in a horizontal position at a room temperature is detected at a position where the exciting position is 0.

In Step 616, a judgment is made as to whether the photosensor output level exceeds a threshold value or not at the above-stated judgment positions. In the case of not, exceeding, the process returns to Step 612b to make the focus motor conduct the next two-step operation. In the case of exceeding, the process goes to Step 617. At the time of exceeding, the absolute position counter 153 is preset at ΔPd.

Herein, this is preset at "−2" because ΔPd=−2 (as shown in FIG. 31(b), the value of the absolute position counter surrounded with the circle ○). Note here that the explanations for FIG. 26 of Embodiment 8 show the example where if the conditions are not satisfied in Step 315 or Step 316, the process returns to Step 314. On the contrary, Embodiment 11 shows the example where the process returns to Step 612b. This is because in the case where a temperature changes or the attitude difference changes during the origin detection operation, a position for judging whether the photosensor output level exceeds a threshold value or not is changed successively.

The photosensor output level indicated by "P2" in FIG. 31 shows a level variation under the conditions of the mechanism and electrical properties at the same operational environmental temperature and humidity as those during the process adjustment. However, during the normal operation in which the power may be turned on repeatedly, a variation occurs in the position of a level change in accordance with the exciting positions of the motor 9, as indicated by "P4" and "P5". This results from errors in looseness in the lens unit driving direction and variations in mechanism and electrical properties due to a temperature change in the operation environment.

In Embodiment 11, however, in the origin detection operation during the normal operation, a judgment is made as to whether the photosensor output level exceeds a threshold value or not at the respective judgment positions shown in FIG. 31. Therefore, even when a variation occurs within the range from "P4" to "T5", the exciting position of the motor 9 always becomes "0" when the counter value of the absolute counter 153 is "0", thus allowing the origin during the process adjustment to be reproduced as described in Embodiment 7.

The above-description shows the example using the temperature sensor and the angular sensor, However, the use of a humidity sensor also enables the improvement of accuracy by improving an error occurring due to a difference in hygroscopic coefficient of the lens barrel and the lens. Further, Embodiment 11 allows the origin detection operation dining the normal operation conducted at twice the speed of Embodiment 7.

Further, if errors in looseness in the lens unit driving direction and variations in mechanism and electrical properties due to a temperature and humidity change in the operation environment can be detected using a temperature sensor and an angular sensor, the correction is possible even when these errors exceed the range of the exciting position one cycle.

Note here that the explanations of the zooming operation in the above Embodiment 6 referring to FIG. 20 are true for the present embodiment.

Embodiment 11 explains the example with consideration given to the case where angles and temperatures of the lens barrel differ between the process adjustment and the normal operation. However, these configurations are not always the optimum one. For instance, in the case where a variation in photosensor output level due to changes in angle and temperature is suppressed by the configuration of the lens barrel or the like, the configurations of Embodiments 7 to 9 are suitable.

Although Embodiment 11 explains the example of having both of the an angular sensor and the temperature sensor, the configuration having one of these sensors also is possible, For instance, in the case where a variation in a changing position of the photosensor output level due to a temperature change does not pose a problem especially, the correction can be conducted using an angular sensor only.

Further, although Embodiment 11 shows the example where the ΔPd is added in Step 612*b* of FIG. 32, ΔPd may be subtracted.

In the above-stated Embodiments 8, 9 and 11, the example where at the time of the origin detection operation during the normal operation the lens unit is driven at twice the speed of the process adjustment is shown. However, these examples are non-limiting, and the operation at four times or more the speed also is possible. That is, in the case where a time of the driving signal one cycle is T during the process adjustment, a time of the driving signal one cycle during the normal operation may be T/N (N denotes an integer of 2 or more), and a driving signal with 1/N cycle may be output.

Further, in Embodiments 9 and 11, the driving signal one cycle may be the same for the process adjustment and the normal operation.

Further, although the exciting positions obtained by dividing the cycle of the driving signal of the motor into 8 sections are described above, these embodiments are not limited in the division number. For example, division into 4 and 16 sections may be set depending on the required accuracy.

Further, the above-described embodiments explain the example using a stepping motor as the driver. However, this may be other motors as long as an exciting signal of the motor has periodicity, and a linear motor for example may be used.

Embodiment 12

Figure 33:
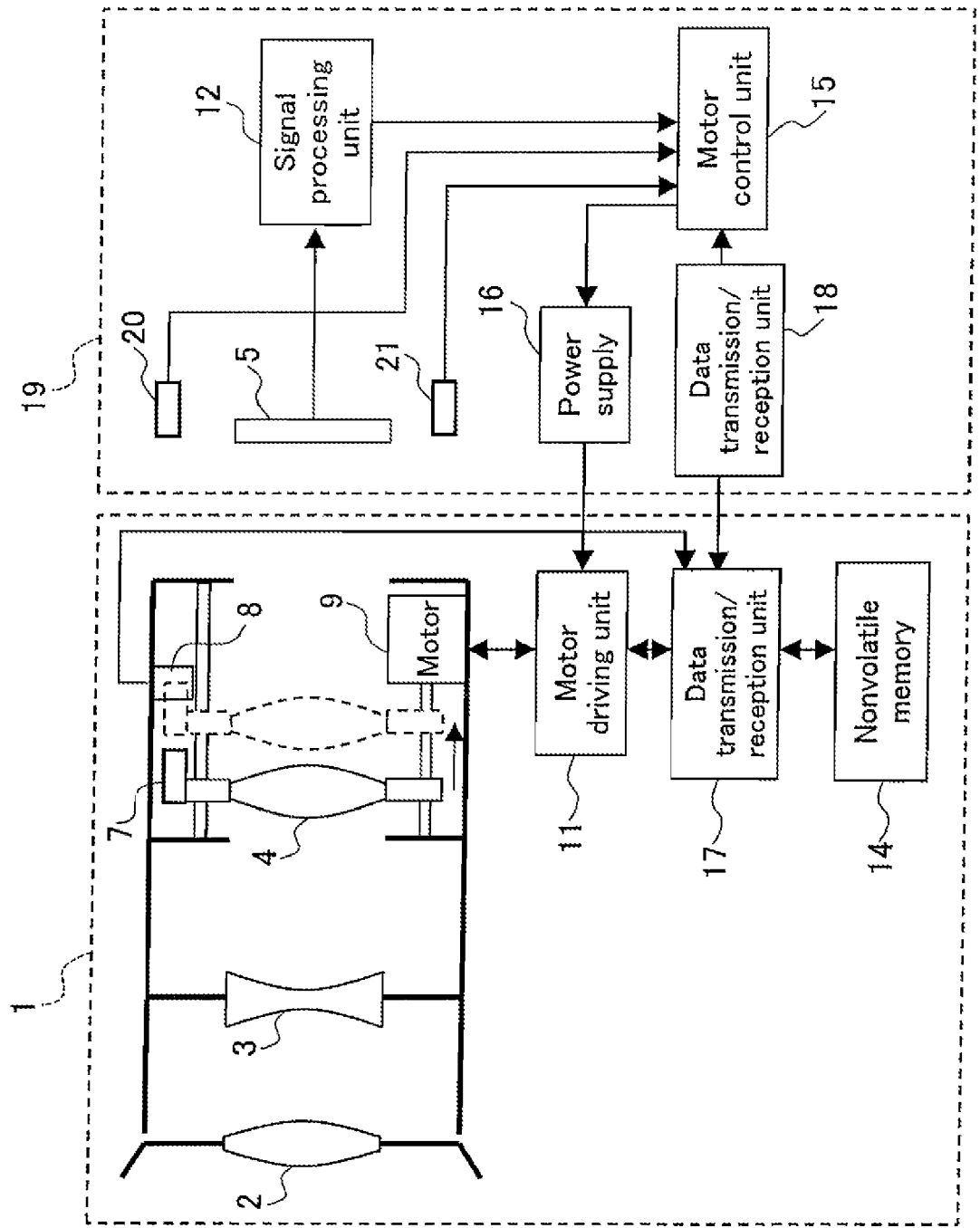
FIG. 33 includes a schematic diagram and a block diagram of an imaging apparatus according to Embodiment 12 of the present invention.

The following describes Embodiment 12 of the present invention, with reference to the drawings. FIG. 33 includes a schematic diagram and a block diagram of an imaging apparatus according to Embodiment 12. In FIG. 33, numeral 1 denotes a lens barrel and 19 denotes a camera main body. The lens barrel 1 includes imaging lens groups, in which a fixed lens group 2 as a first lens group, a fixed lens group 3 as a second lens group and a focus lens 4 as a third lens group are arranged in this order from the side of a subject. The fixed lens groups 2 and 3 are fixed to the lens barrel 1. A motor 9 as a focus motor and a motor driving unit 11 make up a motor driver. Along with the rotation of the motor 9, the focus lens 4 moves in the optical axis direction along a lead screw with threads cut therein so as to enable the adjustment of focus.

In the example of FIG. 33, the motor 9 is a stepping motor that rotates in accordance with a phase of a driving signal (exciting signal) for a motor coil output from a focus motor driving unit 11. Numeral 5 denotes an imaging device that converts an image of a subject captured through the fixed lens groups 2 and 3 and the focus lens 4 into an electric signal. Numeral 7 denotes a photo-interruption member that is fixed to a frame of the focus lens 4.

As illustrated by the dotted lines of FIG. 33, the focus lens 4 is shifted in the direction of the imaging device 5 so as to interrupt a photosensor 8 as a position detection sensor by the photo-interruption member 7, whereby the origin of the focus lens 4 is detected.

Numeral 12 denotes a signal processing unit that generates image data and contrast information for performing focus adjustment based on an electric signal output from the imaging device 5. Numeral 17 denotes a data transmission/reception unit provided in the lens barrel 1, and 18 denotes a data transmission/reception unit provided in the camera main body 19. Numeral 15 denotes a motor control unit as a motor controller for the motor 9. A user is allowed to perform focus adjustment based on the image processed by the signal processing unit 12. Further, automatic focus adjustment (autofocus function) can be performed as well based on the contrast information of the signal processing unit 12 so that the contrast is maximized. In either case, the motor control unit 15 outputs an instruction to the motor control unit 11 via the data transmission/reception units 17 and 18 so as to drive the focus lens 4.

Numeral 14 denotes a nonvolatile memory as a storage, and 16 denotes a power supply. A voltage to be applied to the motor driving unit 11 is set in accordance with the information concerning a motor application voltage stored in the nonvolatile memory 14. This will be described later in detail. Numeral 20 denotes a temperature sensor and 21 denotes an angular sensor whose output varies with the attitude angle of the camera main body 19. Outputs from these sensors are input to the motor control unit 15, which are used to correct the position of the focus lens 4.

Figure 34:
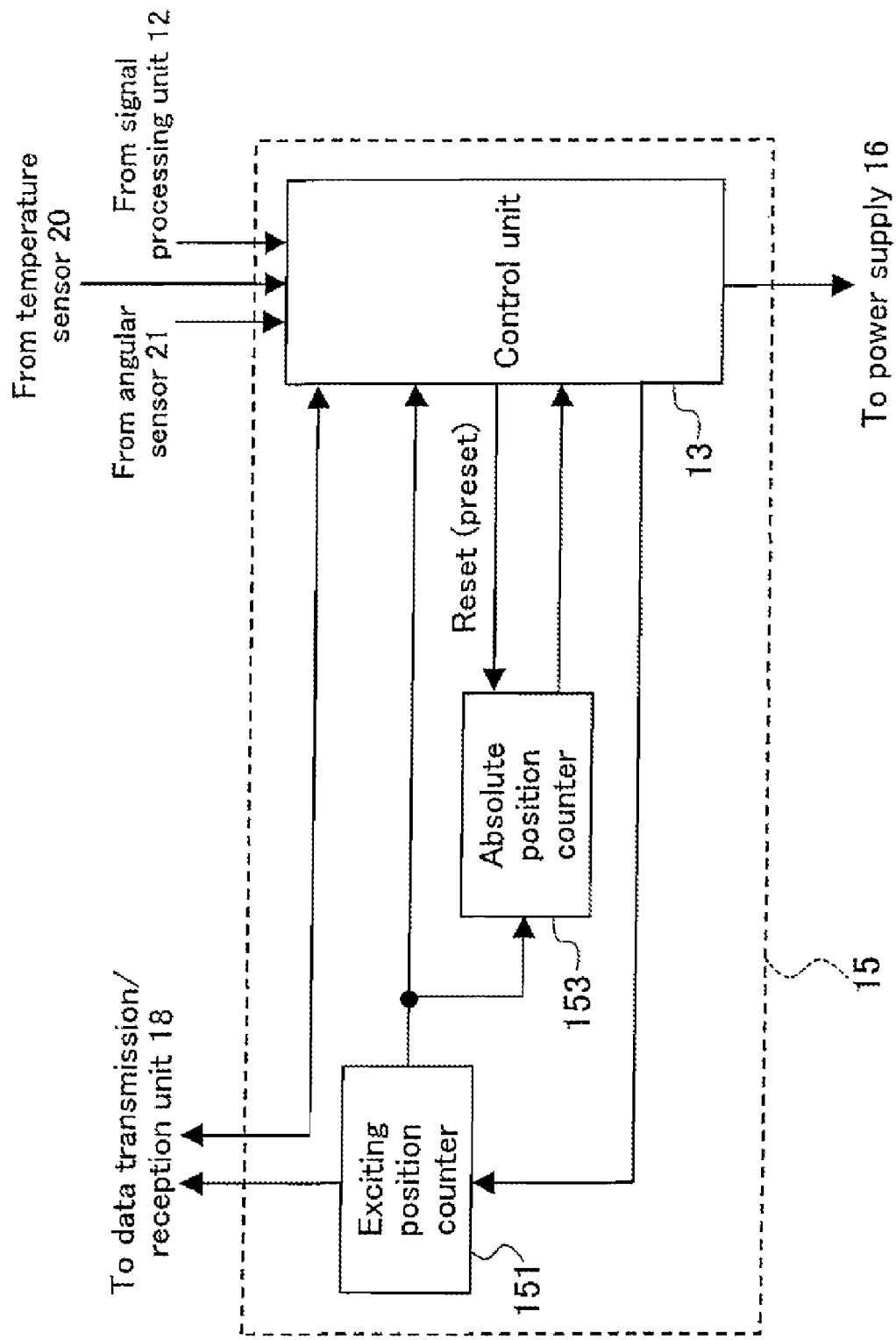
FIG. 34 is a block diagram of a motor control unit according to Embodiment 12 of the present invention.

FIG. 34 is a detailed block diagram of the focus motor control unit 15 shown in FIG. 33. In FIG. 34, the focus motor control unit 15 includes a control unit 13, an exciting position counter 151 and an absolute position counter 153. The exciting position counter 151, based on a focus moving direction and moving step information output from the control unit 13, counts up or counts down the exciting position counter for controlling a phase of a driving signal for the motor 9 and for controlling the position of the focus lens 4.

In the above configuration of FIG. 33, the position of the focus lens 4 is controlled by the rotation of the motor 9. The rotation of the motor 9 is controlled by a periodic driving signal from the motor driving unit 11 that receives a signal from the motor control unit 15 via the data transmission/reception units 18 and 17.

Immediately after the power is turned on, the control unit 13 reads out information concerning lens control that is stored in the nonvolatile memory 14 provided in the lens barrel 1 and then performs a focus origin detection process, which will be described later in detail. In the focus origin detection process, firstly, the focus lens 4 is driven toward the imaging device 5. As the focus lens 4 is driven in this way, the photosensor 8 is interrupted by the photo-interruption member 7. In accordance with this interruption amount, a signal level of the photosensor 8 varies, and when the signal level exceeds a threshold level (or falls below a threshold value in some circuit configurations) under predetermined conditions, the absolute position counter 153 is reset or preset.

After the completion of this process, the motor control unit 15 transmits control information for the motor 9 to the motor driving unit 11 via the data transmission/reception units 18 and 17. When receiving this control information, the motor driving unit 11 outputs a driving signal having periodicity based on the received signal so as to control the position of the focus lens 4. As shown in FIG. 34, the information transmitted from the motor control unit 15 includes information transmitted via the exciting position counter 151 and information directly transmitted from the control unit 13 to the data transmission/reception unit 18.

The information transmitted via the exciting position counter 151 relates to the position of the focus lens 4. In accordance with the contrast information from the signal processing unit 12, the rotational position information of the motor 9 output from the exciting position counter 151 and the positional information of the focus lens 4 output from the absolute position counter 153, the control unit 13 outputs the moving direction and the moving step information of the motor 9 to the exciting position counter 151 so as to control the position of the focus lens 4. The information directly transmitted from the control unit 13 to the data transmission/reception unit 18 includes information relating to an application voltage and the maximum driving rate of the motor 9, for example.

Herein, the absolute position counter 153 operates in synchronization with a counter value of the exciting position counter 151. The exciting position counter 151 comes full circle to correspond to one cycle (360 degrees) of a driving electrical angle of the motor 9, whereas the absolute position counter 153 shows the absolute position with reference to a value reset under a predetermined condition.

The transmission/reception of information between the lens barrel 1 and the camera main body 19 is conducted between the data transmission/reception units 17 and 18. When detaching the lens barrel 1 from the camera main body 19, the detaching can be conducted at a junction part (not illustrated) of the data transmission/reception units 17 and 18 and a junction part (not illustrated) of the motor driving unit 11 and the power supply 16.

In the present embodiment, the motor control unit 15 for controlling the focus lens 4 is not disposed in the lens barrel 1 or to be shared between the lens barrel 1 and the camera main body 19, but is disposed in the camera main body 19. Therefore, the processing of the information stored in the nonvolatile memory 14 is carried out not in the lens barrel 1 but by the motor control unit 15 in the camera main body 19. That is, the information in the nonvolatile memory 14 is transmitted to the motor control unit 15 via the data transmission/reception units 17 and 18, is processed in the camera main body 19 and is transmitted again to the lens barrel 1. With this configuration, there is no need to provide a large scale microcomputer for controlling in the lens barrel 1, thus making the lens barrel 1 compact and reducing a cost. Although the lens barrel 1 is provided with the data transmission/reception unit 17, this is intended mainly to exchange data between the lens barrel 1 and the camera main body 19, so that a simple configuration can suffice for this purpose.

Figure 35:
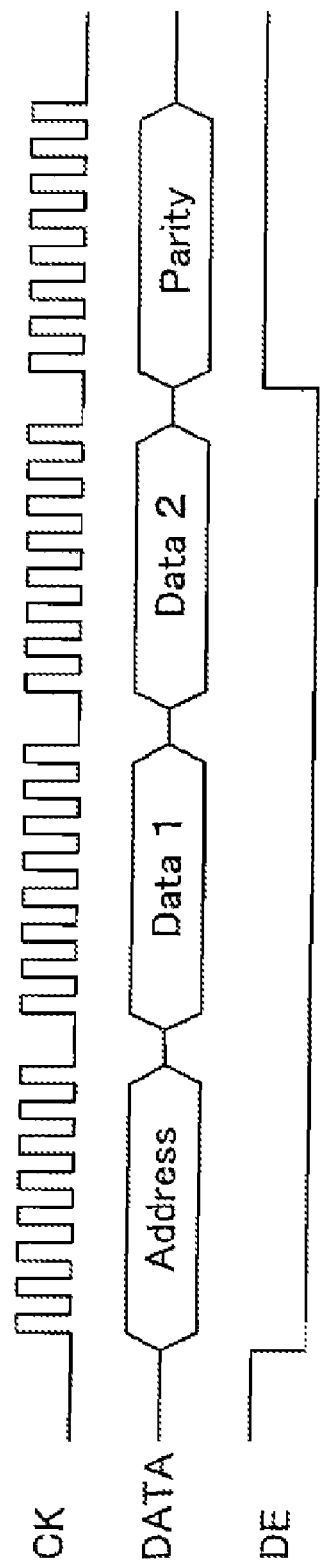
FIG. 35 is a drawing for explaining the operation of a data transmission/reception unit according to Embodiment 12 of the present invention.

FIG. 35 is a drawing for explaining the operation of the data transmission/reception units 17 and 18. "CK" represents a clock for detecting "DATA" (in this case, address, data 1, data 2 and parity). This "CK" is transmitted from the data transmission/reception unit 18 of the camera main body 19 to the data transmission/reception unit 17 of the lens barrel 1. The data transmission/reception unit 17 reads out data corresponding to the respective addresses from the nonvolatile memory 14.

"DE" also is output from the data transmission/reception unit 18 of the camera main body 19 to the data transmission/reception unit 17 on the lens barrel 1 side. The data transmission/reception unit 17 recognizes an address 8-bit data immediately after "DE" changes from "H" level to "L" level. Next, the data transmission/reception unit 17 recognizes 8-bit data after the address during the "L" level period as data in this case, as data 1 and data 2).

Herein, 16-bit data is transmitted/received so that data 1 is a high-order 8 bit and data 2 is a low-order 8 bit. 24-bit data is transmitted/received so that data 1 is a high-order 8 bit, data 2 is a middle-order 8 bit and data 3 is a low-order 8 bit.

Next, 8-bit, data immediately after the change from "L" level to "H" level is made parity. The parity is a value obtained by the calculation of (address)XOR(data1)XOR(data2), and this calculation is performed by the data transmission/reception unit 17 and the calculated value is transmitted to the data transmission/reception unit 18. The motor control unit 15 receives data from the data transmission/reception unit 18, and calculates (address)XOR(data1)XOR(data2) like the data transmission/reception unit 17. If the calculated value does not agree with the received parity, the motor control unit 15 transmits or receives data again.

The following Table 1 shows information thereinafter called "memory READ information") that is read out only during the normal operation of the imaging apparatus, which is included in information stored in the nonvolatile memory 14. The memory READ information is written in the nonvolatile memory 14 during the manufacturing process.

TABLE 1

| Memory READ information | Address | Data |
|---|---|---|
| excitation method | 0x00 | 0x02 |
| maximum response frequency | 0x01 | 0x0DAC |
| maximum self-start frequency | 0x03 | 0x02D0 |
| motor current | 0x05 | 0x46 |
| motor voltage | 0x06 | 0x32 |
| focus lens unit shift amount | 0x07 | 0x0F |
| magnetic pole number | 0x08 | 0x0A |
| rotation resolution | 0x09 | 0x08 |
| focal distance | 0x0A | 0x0023 |
| maximum operation cycle | 0x0C | 0x0186A0 |
| reference exciting position | 0x0F | 0x04 |
| subject distance ∞ - focus position | 0x10 | 0x0198 |
| subject distance 2 m - focus position | 0x12 | 0x01BA |
| subject distance 1 m - focus position | 0x14 | 0x01D9 |
| subject distance 0.5 m - focus position | 0x16 | 0x0213 |
| focus position correction amount by temperature | 0x18 | 0x06 |
| focus position correction amount by attitude angle | 0x19 | 0x1F |
| . | . | . |
| . | . | . |

As shown in Table 1, the information stored in the nonvolatile memory 14 forms an information table in which data corresponds to a plurality of addresses. The same goes for the following Tables 2 and 3.

In Table 1, the data of "excitation method" at address 0x00 includes one-phase excitation (0x00), two-phase excitation (0x01), one-two phase excitation (0x02) and the like in the case of a stepping motor, and Table 1 shows the case of one-two phase excitation (0x02).

The "maximum response frequency" at address 0x01 relates to the maximum driving rate of the motor. Table 1 exemplifies the case of one-two phase excitation, which shows 3500 [pps] obtained by converting data 0x0DAC into a decimal number. The "maximum self-start frequency" at 0x03 also relates to the maximum driving rate of the motor. Table 1 exemplifies the case of one-two phase excitation, which shows 720 [pps], obtained by converting data 0x2D0 into a decimal number.

The "motor current" at address 0x05 shows 70 [mA] obtained by converting data 0x46 into a decimal number. The "motor voltage" at address 0x06 shows 50 [×$10^{-1}$V], obtained by converting data 0x32 into a decimal number. Based on this information of the motor voltage, the control unit 13 makes the power supply 16 set an application voltage of the motor driving unit 11.

The focus lens unit shift amount at address 0x07 shows 15 [μm], obtained by converting data 0x0F into a decimal number in the case of one-two phase excitation. The magnetic pole number at address 0x08 shows 10 [poles], obtained by converting data 0x0A into a decimal number, and one cycle of the driving signal of the motor 9 corresponds to 72 [degrees] when it is converted into the rotational angle. As described below, the rotation resolution per cycle of the driving signal of the motor 9 is 8 [sections], and therefore when the above-stated focus lens unit shift amount 15 [μm] is converted into the rotational angle of the motor 9, it can be found that this corresponds to 72/8=9 [degrees].

The rotation resolution at address 0x09 shows 8 [sections], obtained by converting data 0x08 into a decimal number, which is the rotation resolution per cycle of the driving signal of the motor 9, and when it is converted into the rotational angle of the motor 9, this corresponds to 72/8=9 [degrees] as stated above.

The focal distance at address 0x0A shows 35 [mm], obtained by converting data 0x0023 into a decimal number. The maximum operation cycle at address 0x0C shows 100,000 [cycles], obtained by converting data 0x0186A0 into a decimal number, which shows the maximum operation cycle assuming the rotation of the motor 9 corresponding to the reciprocating distance within a movable range of the focus lens 4 as one [cycle], for example. Although the reference exciting position at address 0x0F will be described later in detail, this shows the reference exciting position of the motor 9 that is performed during the process adjustment.

The subject distance ∞—focus position at address 0x10 shows the position of the focus lens 4 with a value of the absolute position counter 153 when the distance from the imaging device 5 to a subject is ∞. Similarly to the case of the distance ∞ to the subject, the data at address 0x12, address 0x14 and address 0x16 show the counter values of the absolute position counter 153 in the case of the distance between the imaging device 5 to the subject of 2 m, 1 m and 0.5 m, respectively The respective data show the values of the absolute position counter 153 where the origin is 0. The value of the subject distance ∞—focus position at address 0x10 is 408, obtained by converting 0x0198 into a decimal number. The value of the subject distance 2 m—focus position at address 0x12 is 442, obtained by converting 0x01BA into a decimal number. The value of the subject distance 1 m—focus position at address 0x14 is 473, obtained by converting 0x01D9 into a decimal number. The value of the subject distance 0.5 m—focus position at address 0x16 is 531, obtained by converting 0x0213 into a decimal number.

In this way the lens barrel 1 according to the present embodiment is provided with data therein by which the relationship between the rotational angle of the motor 9 and the subject distance is clarified. In the case where a plurality of types of lens barrels 1 are prepared for interchangeable lenses, data corresponding to the above-stated data may be stored in the non-volatile memory 14 of each lens barrel 1, whereby the focus lens position can be controlled precisely irrespective of the types of the lens barrels 1.

The focus position correction amount by temperature at address 0x18 shows a correction amount for a change of 10° C., represented with the value of the absolute position counter 153, and this is 6 by converting data 0x06 into a decimal number. The focus position correction amount by attitude angle at address 0x19 shows a correction amount for a change of 90°, represented with the value of the absolute position counter 153, and this is 31 by converting data 0x1F into a decimal number. These corrections by temperature and attitude angle will be described later in detail.

The following Table 2 shows information (hereinafter called "memory WRITE/READ information") that is for performing reading out and writing operations during the normal operation of the imaging apparatus, which is included in information stored in the nonvolatile memory 14. The data of the above Table 1 corresponding to the addresses are written during the manufacturing process and are read out during the normal operation, whereas data of Table 2 corresponding to addresses are both read out and written during the normal operation.

In the following, it is assumed that data is written in the nonvolatile memory 14 in the case where the highest bit of a 8-bit address is "1", and data is read out from the nonvolatile memory 14 in the case where the highest bit of a 8-bit address is "0", which will be described as writing address/reading-out address, respectively.

TABLE 2

| MemosWRITE/READ information | Address | Data |
|---|---|---|
| operation cycle | 0x90/0x10 | 0x000010 |
| . | . | . |
| . | . | . |
| . | . | . |

In Table 2, the operation cycle at address 0x90/0x10 shows the operation cycle, assuming the rotation of the motor 9 corresponding to the reciprocating distance within a movable range of the focus lens 4 as one [cycle], for example.

Assuming that, the reference of this one cycle is the subject distance of 0.5 m where the focus position is the farthest from the origin, the focus position in this case has the reciprocating distance of 531×2=1062, because the counter value is 531, i.e., the focus position is at a position 531 away from the origin. Therefore, in the case where the count reaches 1062, +1 cycle may be added to the read out operation cycle, thus enabling the management of the operation cycle of the motor 9.

In this case, the control unit 13 may manage the operation cycle so that the operation cycle is written in the nonvolatile memory 14 via the data transmission/reception units 18 and 17 immediately before turning off the power, whereby the operation cycle can be updated into the latest one.

The following Table 3 shows control information transmitted/received between the data transmission/reception units 17 and 18.

TABLE 3

| Control information | Address | Data |
|---|---|---|
| photosensor output level | 0x20 | 0x00 |
| motor exciting position | 0xA0 | 0x04 |
| . | . | . |
| . | . | . |
| . | . | . |

In Table 3, the photosensor output level at address 0x20 is an output level that changes as the focus lens 4 is driven toward the imaging device 5 so that the photosensor 8 is interrupted by the photo-interruption member 7. When the signal level of the photosensor 8 changes and exceeds a threshold value under predetermined conditions (or falls below a threshold value in some circuit configurations), the data stored in the nonvolatile memory 14 changes from 0x00 to 0x01, for example.

The motor exciting position at address 0xA0 shows the exciting position of the motor 9, which can be represented with 8 values of 0x00, 0x01, . . . 0x07 when one cycle of the driving signal of the motor 9 is divided into 8 sections as one-two phase excitation. In this case, the exciting position of 0x04 shown, which is an output value of the exciting position counter 151.

Figure 36:
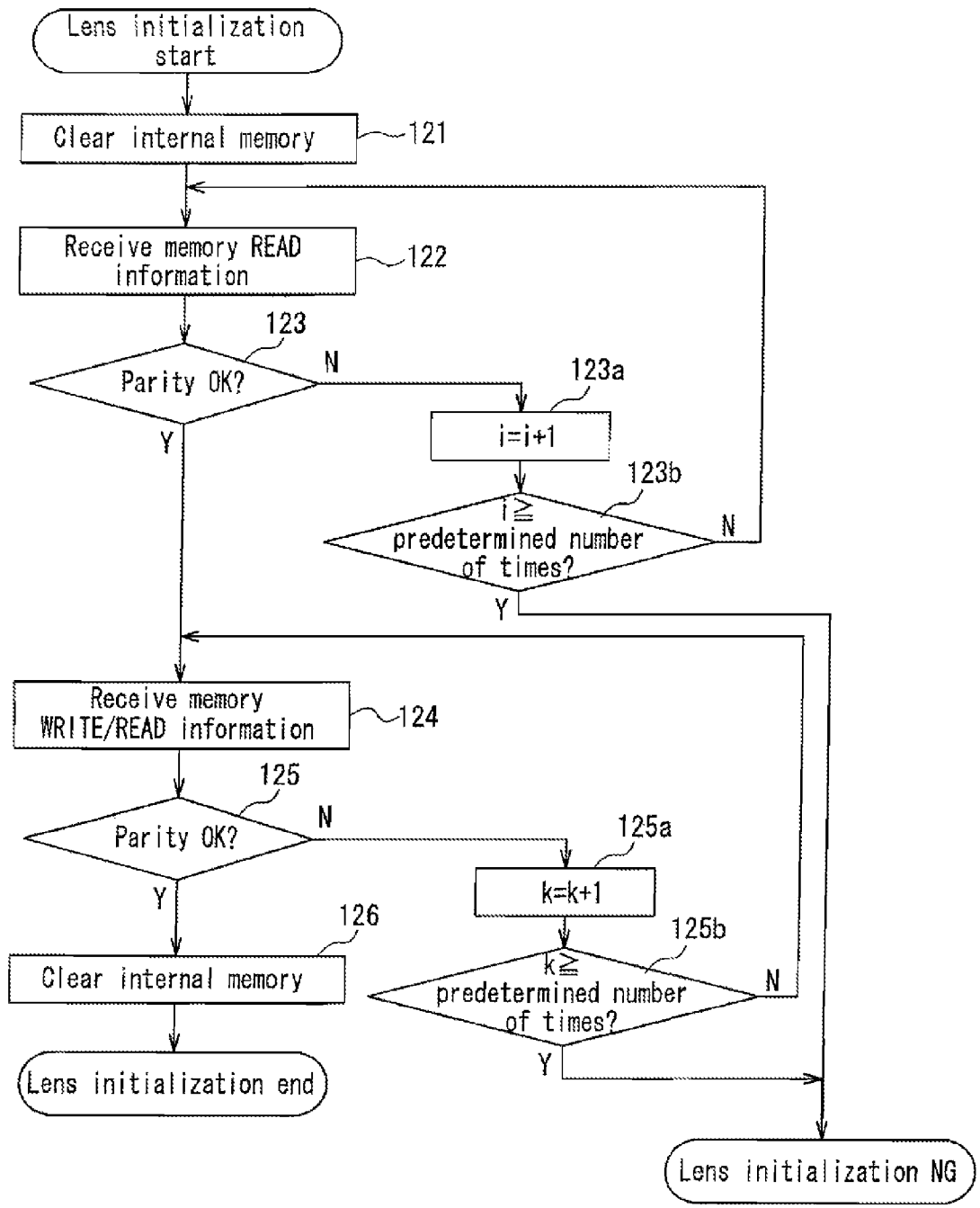
FIG. 36 is a flowchart of a lens initialization operation according to Embodiment 12 of the present invention.

The following describes a lens initialization operation when the power is turned on in the normal operation mode. FIG. 36 is a flowchart of the lens initialization operation. This flowchart shows the operation by a processing program in the control unit 13. In Step 121, internal memory of the control unit 13 is cleared. In Step 122, memory READ information stored in the nonvolatile memory 14 provided in the lens barrel 1 is received.

In Step 123, confirmation is conducted to compare the parity received as described above with the parity calculated by the control unit 13, whereby a judgment is made as to whether these parities agree or not. If they agree, the process goes to the next Step 124, and if they do not agree, the process goes to Step 123a. In Step 123a, 1 is added to a variable i (initial value is 0), and the process goes to Step 123b, and in Step 123b, a judgment is made as to whether the variable i is a predetermined number of times or more (e.g., 3) or not. In the case where the variable i is smaller than the predetermined number of times, the process returns to Step 122, and the similar operation is performed. In the case where the variable i reaches the predetermined number of times, the lens initialization is regarded as NG so as to complete the lens initialization operation.

In Step 124, memory WRITE/READ information stored in the nonvolatile memory 14 is received. In Step 125, confirmation is conducted to compare the parity received as described-above with the parity calculated by the control unit 13, whereby a judgment is made as to whether these parities agree or not. If they agree, the process goes to the next Step 126, and if they do not agree, the process goes to Step 125a.

In Step 125a, 1 is added to a variable k (initial value is 0), and the process goes to Step 125b, and in Step 125b, a judgment is made as to whether the variable k is a predetermined number of times or more (e.g., 3) or not. In the case where the variable is smaller than the predetermined number of times, the process returns to Step 124, and the similar operation is performed. In the case where the variable k reaches the predetermined number of times, the lens initialization is regarded as NG so as to complete the lens initialization operation. In Step 126, a focus origin detection process is performed, and the lens initialization operation is completed.

After completion of the lens initialization operation, normal operation is conducted based on the memory READ information received from the nonvolatile memory 14, and after completion of the normal operation, memory WRITE/READ information is updated to new information.

Further, when the lens barrel 1 is replaced with a new lens barrel 1, the control unit 13 will receive information corresponding to the new lens barrel 1 by undergoing the above-described steps of FIG. 36.

Therefore, even when the lens barrel 1 is replaced with another one, the position of the focus lens 4 can be controlled by the focus control unit 15 of the camera main body 19 in accordance with the operation conditions of the motor 9 and the focus lens 4 provided in the replaced lens barrel 1. Although the information stored in the nonvolatile memory 14 is as described referring to the above Tables 1 to 3, the following supplementary explanation is given referring to Tables 1 to 3.

By using the information of the magnetic pole number of the motor, the relationship of the rotational angle of the motor with one cycle of the driving signal is known, thus allowing the rotation of the motor to be controlled variously. Further, in the case of a lens barrel provided with a high rotation resolution (traveling distance resolution), by using the information on the rotation resolution, a driving pitch of the focus lens can be controlled in accordance with the motor with high precision. Therefore, although Table 1 shows the example of the division into 8 [sections], a microstep motor with 64 [sections] also can be controlled, for example.

Further, by using the information on the application voltage of the motor, the application voltage can be set corresponding to various motors and driving circuits, Moreover, by using the information on the maximum driving rate such as the motor maximum response frequency and the maximum self-start frequency, various motors can be controlled at the maximum rate concerning their focusing.

Further, as shown in Table 2, the information of the operation cycle is provided as the memory WRITE/READ information. This information can be utilized as information relating to the maintenance of the lens barrel 1 such as a timing for replacing the motor 9. For instance, the timing for replacing the motor 9 can be determined by comparing with the information of the maximum operation cycle shown in Table 1, and at the timing for replacing, this may be displayed. As for maintenance, not only the information on the operation cycle but information on operation time may be utilized.

Figure 37:
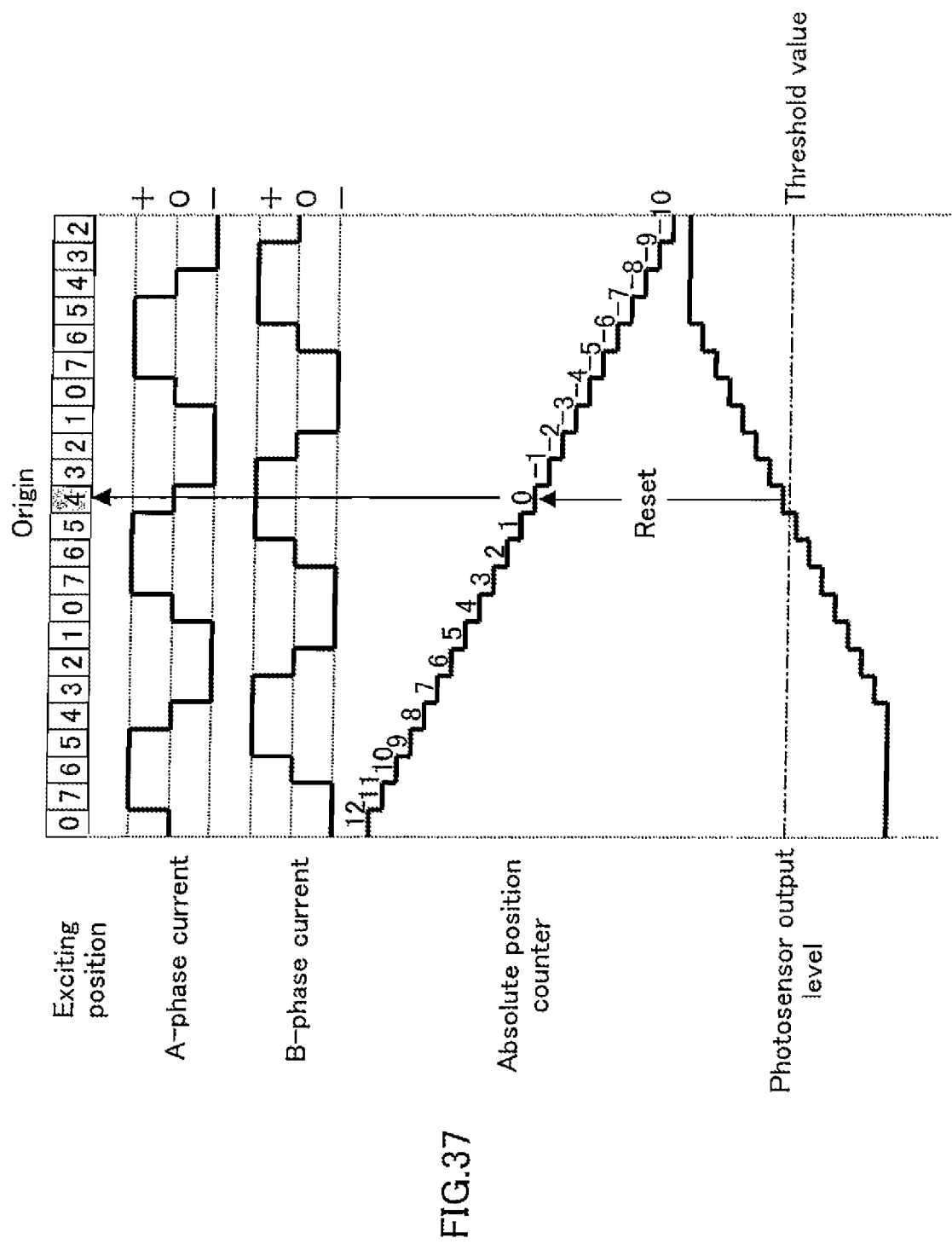
FIG. 37 is a drawing for explaining an origin detection operation during the process adjustment according to Embodiment 12 of the present invention.

The following describes the reference exciting position at address 0x0F of FIG. 1 during the process adjustment, with reference to FIG. 37. FIG. 37 is a drawing for explaining an origin detection operation during the process adjustment according to one embodiment of the present invention. The "exciting position" shown in FIG. 37 corresponds to a phase of the driving signal, which represents a 3-bit counter value for the exciting position counter 151 obtained by dividing one cycle of 360 degrees of a driving signal for the motor coil of the motor 9 output from the focus motor driving unit 11 into 8 sections.

The counter value of the exciting position counter 151 is transmitted to the motor driving unit 11 via the data transmission/reception units 18 and 17. This drawing shows a state where the exciting position is decreased one by one along with the movement of the focus lens 4 to the imaging device 5 side. By transferring the motor exciting position as address 0xA0 (Table 3), the rotation of the motor 9 is controlled.

The "A-phase current" and the "B-phase current" show current waveforms of the motor coil that the focus motor driving unit 11 outputs to the motor 9, and in this example the motor 9 has a two-phase coil with the A-phase and the B-phase. The A-phase current and the B-phase current have electrical angles different from each other by the phase of 90° (in the case where one cycle of the current waveform is 360 degrees), and the motor 9 is rotated by applying a current to the motor coil with the A-phase and the B-phase. In this drawing, the focus lens 4 moves to the imaging device 5 side while the A-phase current is 90° leading relative to the B-phase current.

The "absolute position counter" represents a counter value of the absolute position counter 153, and operates in synchronization with the exciting position. In the case where the exciting position is decreased one by one, the absolute position counter also is decreased one by one. Herein, the absolute position counter sets a bit width so that the same value is not assigned to different positions in the movement range of the focus lens 4.

The "photosensor output level" shows the state where the output level changes as the focus lens 4 moves to the imaging device 5 side so that the photosensor 8 is interrupted by the photo-interruption member 7. The "photosensor output level" is identified by the control unit 13 as "1" in the case of a threshold value or more and "0" in the case of less than the threshold value, where data at address 0x20 (Table 3) is identified via the data transmission/reception units 17 and 18.

Figure 38:
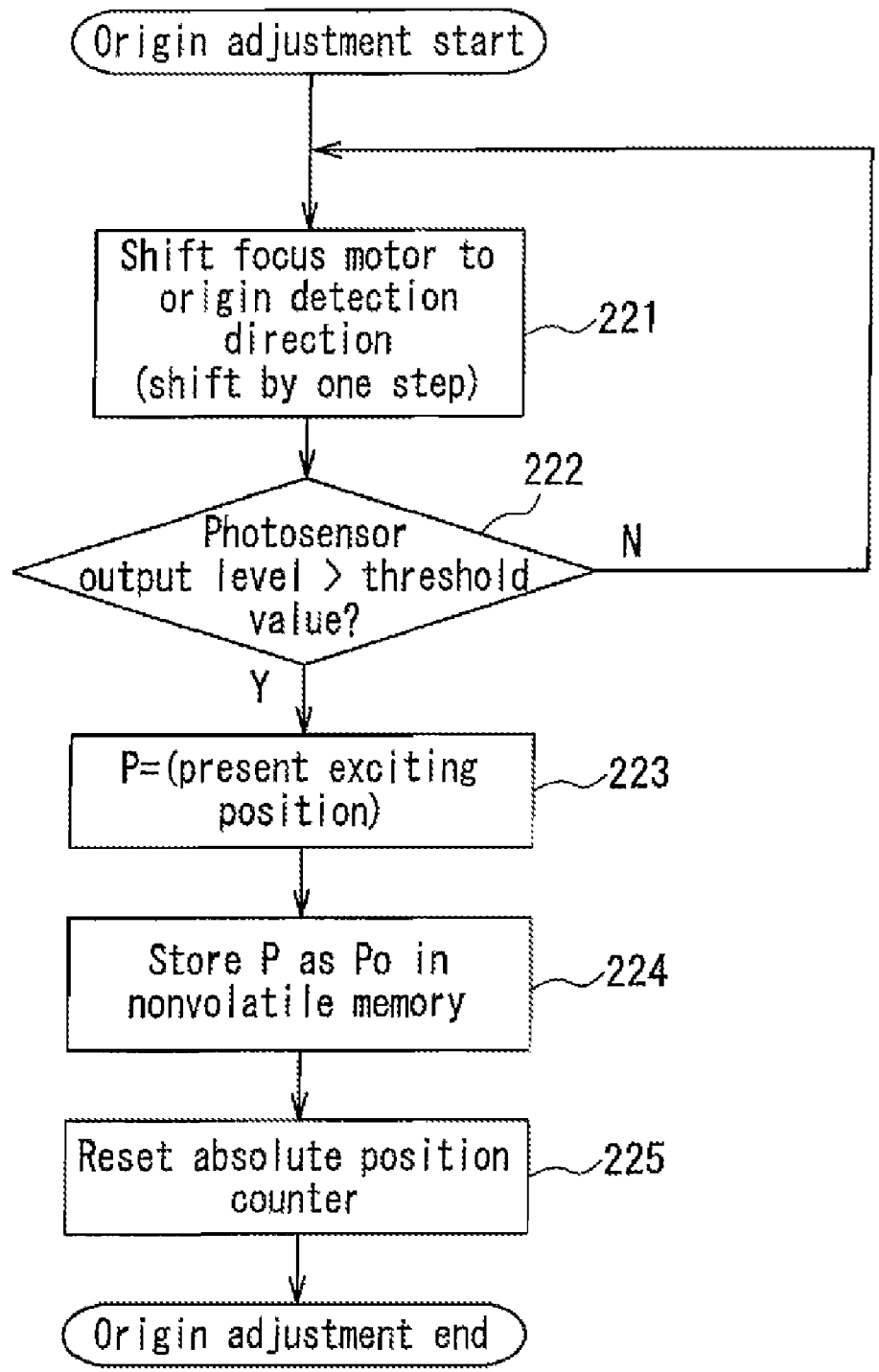
FIG. 38 is a flowchart of the origin detection operation during the process adjustment according to Embodiment 12 of the present invention.

Referring now to FIGS. 37 and 38, the origin detection operation of the focus lens 4 during the process adjustment is described more specifically. FIG. 38 is a flowchart of the origin detection operation according to one embodiment of the present invention, which shows an operation flow described as a program in the system control unit 13. When the power is turned on in the process adjustment mode, the process starts with "origin detection adjustment start".

In Step 221 the motor 9 is shifted to the origin detection direction (the direction of the imaging device 5) by one step at one time. In this case, the exciting position counter 151 is decreased one by one. More specifically in response to an instruction from the system control unit 13, the exciting position counter 151 is down-counted. In accordance with this down-counting, the focus motor driving unit 11 outputs a driving signal having periodicity to rotate the motor 9 so as to shift the focus lens 4 toward the imaging device 5.

In Step 222, a judgment is made as to whether the photosensor output level exceeds a threshold value or not. In the case of not exceeding, the process returns to Step 221 to make the motor 9 conduct the next one step operation. In the case of exceeding, the process goes to Step 203, where the exciting position at the time of exceeding is substituted for P. In this case, the exciting position "4" is substituted for P.

In Step 224, P is stored as Po in the nonvolatile memory 14. The value Po stored in this step is the reference exciting position of the motor 9, which is stored as address 0x0F and data 0x04 in the nonvolatile memory 14 via the data transmission/reception unit 18 and the data transmission/reception unit 17. In Step 225, the absolute position counter is reset. In FIG. 5, the position indicated with "0" shows the reset position.

Since this position "0" of the absolute position counter is erased when the power is turned off, the origin has to be detected again when the power supply is turned on in the normal operation mode. For the detections of this origin, the information stored in the nonvolatile memory 4, i.e., the reference exciting position "4" is used. Since the exciting position "4" is not an absolute value but is at a position appearing periodically, the origin can be detected by detecting the exciting position "4" corresponding to the origin.

More specifically, in the normal operation mode, the motor 9 is rotated to the origin detection direction by a signal from the motor control unit 15. In this case, a judgment is made as to whether the photosensor output level exceeds a threshold value or not at the exciting position "0" that is the electrical angle of 180 degrees (½ cycle) of the motor 9 away from the reference exciting position "4" that already has been received from the nonvolatile memory 14. If it is judged that the photosensor output level at a certain judgment position "0" does not exceed the threshold value but the photosensor output level at the next judgment position "0" after one cycle exceeds the threshold value, the origin during the process adjustment can be reproduced accurately. That is, the exciting position "4" between these two judgment positions "0" is the origin.

According to this origin detection process, there is no need to detect the origin directly. Instead, this can be performed simply by judging that the photosensor output level at a certain judgment position does not exceed the threshold value but the photosensor output level at the next judgment position after one cycle exceeds the threshold value, as described above. Thus, even if errors occur due to looseness in the lens unit driving direction and variations in mechanism and electrical properties due to a temperature and humidity change in the operation environment, the origin during the process adjustment can be reproduced accurately.

Note here that a range of errors in looseness in the lens unit driving direction and variations in mechanism and electrical properties due to a temperature and humidity change in the operation environment should be within the exciting position one cycle.

Figure 39:
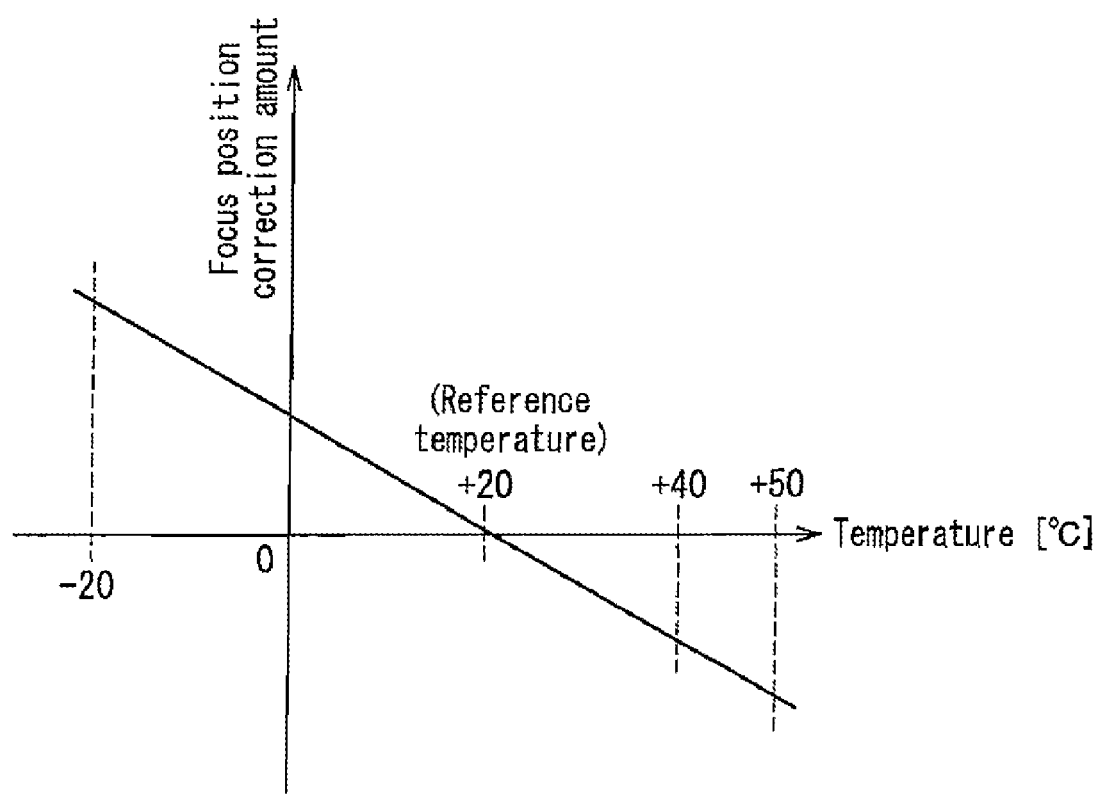
FIG. 39 is a drawing showing the relationship between temperatures and the focus position correction amount according to Embodiment 12 of the present invention.

The following describes a method for controlling the focus lens 4 using the focus position correction amount by temperature that is stored in the nonvolatile memory 14. FIG. 39 is a graph showing the relationship between temperatures and the focus position correction amount. Data at address 0x18 of Table 1 is 0x06, and the counter value of the absolute position counter 153 changes by six when the temperature changes by 10° C. In this example, correction is made so that the position of the focus lens 4 is shifted closer to (far side) the imaging device 5 along with the temperature rise, which can be represented with a graph of a straight line having a gradient of −0.6 [counter/° C.] with reference to 20° C.

As shown in FIG. 34, the control unit 13 receives information from the temperature sensor 20. Based on the temperature change detected by a temperature sensor 20 and data 0x06 at address 0x18, the control unit 13 corrects the position of the focus lens 4 in accordance with the above-stated graph, whereby a focus condition can be kept even when a temperature changes.

For instance, in the case where the operation temperature is at 20° C. as the reference temperature, the focus position of the focus lens 4 is not corrected. On the other hand, when the temperature is at 30° C., which is higher than the reference temperature by 10° C., the focus position is corrected at a position closer to the imaging device 5 by the amount corresponding to the counter value of 6.

The following describes a method for controlling the focus lens 4 using the focus position correction amount by attitude angle that is stored in the nonvolatile memory 14. The relationship between the attitude angle and the output voltage of the angular sensor is as shown in FIG. 17. Data at address 0x19 of Table 1 is 0x1F, and the counter value of the absolute position counter 153 changes by 31 when the attitude angle changes by 90°.

In this case, it is assumed that the output voltage of the angular sensor is + when the fixed lens 2 faces upward and the output voltage of the angular sensor is − when the fixed lens 2 faces downward. For instance, it is assumed that facing upward at 90 degrees results in the change of focus lens 4 in the direction of closer to the imaging device 5 by 31 that is the counter value of the absolute position counter 153 due to the looseness of the mechanism, and facing downward at 90 degrees results in the change of focus lens 4 in the direction of away from the imaging device 5 by 31 that is the counter value of the absolute position counter 153 due to the looseness of the mechanism.

As shown in FIG. 34, the control unit 13 receives information from an angular sensor 21. Herein, in the case of facing upward at 90 degrees, for example, based on the angular change detected by the angular sensor 21 and data 0x1F at address 0x19, the control unit 13 corrects the position of the focus lens 4 in the direction away from the imaging device 5 by the amount corresponding to the counter value of 31. On the other hand, in the case of facing downward at 90 degrees, the control unit 13 corrects the position of the focus lens 4 in the direction closer to the imaging device 5 by the amount corresponding to the counter value of 31. Thereby, a focus condition can be kept even when an attitude angle changes significantly.

Incidentally, in the case where the looseness in the focus lens position 4 is varied between upward and downward relative to the horizontal state, information therefor may be stored as memory READ information in different areas.

The above-description shows the example using the temperature sensor and the angular sensor. However, a humidity sensor further may be used. With this configuration, an error occurring due to a difference in hygroscopic coefficient of the lens barrel and the lens can be improved, thus further enhancing the accuracy.

Further, the above-described embodiments explain the example using a stepping motor as the driver. However, this may be other motors as long as an driving signal of the motor has periodicity, and a linear motor for example may be used.

Moreover, a circuit for detecting the shifting amount of the motor may be provided, whereby the exciting position counter of the present embodiment can be counted up or counted down in accordance with the position. Then, pseudo periodicity can be formed in the driving signal, whereby the present invention is applicable to various motors such as an ultrasound motor, a motor made up with a smooth impact driving mechanism, an electrostatic motor and a piezoelectric motor.

In the present embodiment, the motor for driving the focus lens is described mainly. However, the present invention is applicable to an imaging apparatus and a lens barrel having a motor for driving a zoom lens as well.

Embodiment 13

Figure 40:
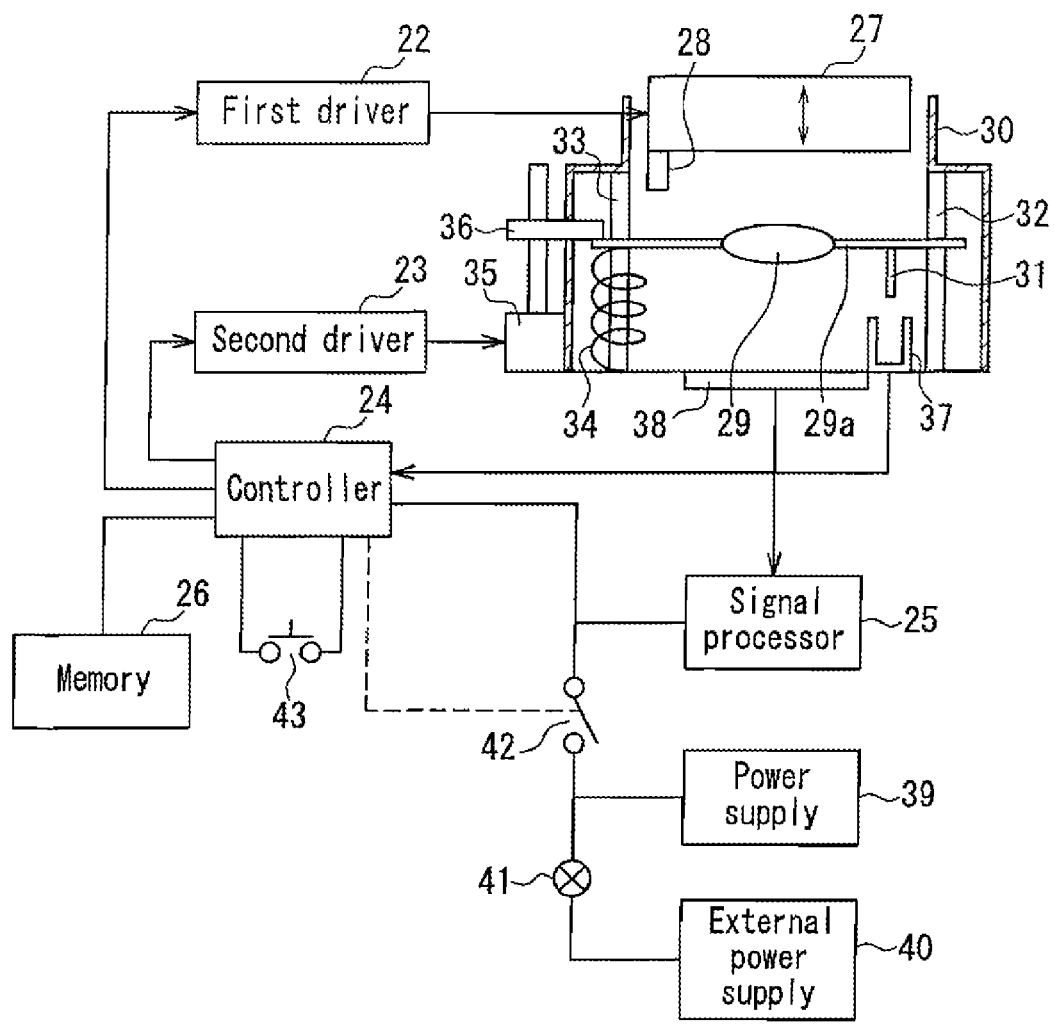
FIG. 40 is a schematic block diagram of an imaging apparatus according to Embodiment 13 of the present invention.

FIG. 40 is a block diagram of an imaging apparatus according to Embodiment 13. In FIG. 40, numeral 30 denotes a lens barrel, 38 denotes an imaging device and 27 denotes a zoom lens unit as a first lens unit that is provided to be movable in the lens barrel 30. Numeral 29 denotes a focus lens unit as a second lens unit that is provided to be movable by means of guide poles in the lens barrel 30, which will be described later.

Numeral 22 denotes a first driver that drives the zoom lens unit 27 in the optical axis direction via a movement conveying unit 28, which includes a stepping motor, for example. Numeral 23 denotes a second driver that drives a stepping motor 35 so as to allow the focus lens unit 29 to be driven in the optical axis direction. Numeral 36 denotes a restriction member (movement restriction unit) with threads cut therein to mate with a lead screw of the stepping motor 35, which moves in the optical axis direction along with the rotation of the stepping motor 35.

Numeral 34 denotes a spring that baises the focus lens unit 29 toward the zoom lens unit 27 side, i.e., a subject side. During the normal operation of the imaging apparatus, the position of the focus lens unit 29 is restricted and kept because a lens frame 29a thereof is biased by the spring 34 so as to contact with the restriction member 36.

Numerals 32 and 33 denote guide poles that guide the focus lens unit 29 so as to move along the optical axis direction. Numeral 28 denotes a movement conveying unit that is provided for the zoom lens unit 27 and that contacts the lens frame 29a of the focus lens unit 29 when the zoom lens unit 27 is shifted in the imaging plane direction.

Numeral 31 denotes a photo-interruption member that is provided for the focus lens unit 29. As the focus lens unit 29 moves in the imaging plane direction, the photo-interruption member 31 interrupts light of a light-transmission type photosensor 37 (hereinafter called photosensor) attached to the lens barrel 30, whereby the position of the focus lens unit 29 can be detected.

Numeral 24 denotes a controller that outputs a control signal to the first driver 22 and the second driver 23 in accordance with an output signal of the photosensor 37 and a mode of the imaging apparatus main body. Numeral 26 denotes a memory that stores mode information of the controller 24, and 25 denotes a signal processor that processes an image information signal output from the imaging device 38. Herein, memory 26 as a storage includes a nonvolatile memory or a volatile memory that is driven by a secondary power supply (not illustrated).

Numeral 39 denotes an internal power supply, for example, provided in the imaging apparatus, and 40 denotes an external power supply connected with a connecting terminal 41. These power supplies allow electric power to be supplied to the controller 24, the signal processor 25 and the like when a power supply switch 42 is turned on at the time of the start of an imaging operation. Note here that electric power is supplied from the external power supply 40 as an alternative to the internal power supply 39 when the internal power supply 39 becomes exhausted.

Numeral 43 denotes a termination switch that is connected with the controller 24 and that shuts off electric power at the time of the completion of the imaging operation. When this termination switch 43 is operated in the ON state of the power supply switch 42, after the controller 24 conducts a predetermined process and operations set for the time of shutting off the power supply, the controller 24 makes the power supply switch 42 open to create a power-off state.

Herein, the photosensor 37 making up the above-stated position detector is attached to the lens barrel 30 and has a U-letter shaped main body. A photo-reception element and a photo-transmission element, opposed to the photo-reception element are attached to one strip portion of this main body and the other strip portion on the respective inner sides. When the focus lens unit 29 moves to the imaging device side, the photo-interruption member 31 enters into a space between the photo-transmission element and the photo-reception element, so that the light from the light-transmission element to the light-reception element, intersecting at right angles with the optical axis of the lens units, is interrupted.

FIG. 41 is a drawing for explaining mode transition of the above-stated lens units. Positions of the zoom lens unit 27 and the focus lens unit 29 in FIG. 40 for the respective operation modes are separately shown in four drawings of FIGS. 41(a) to (d).

Herein, the controller 24 includes a microcomputer and the like, which is configured so as to control not only the above-stated operations but also all operations in this embodiment described herein.

Figure 42:
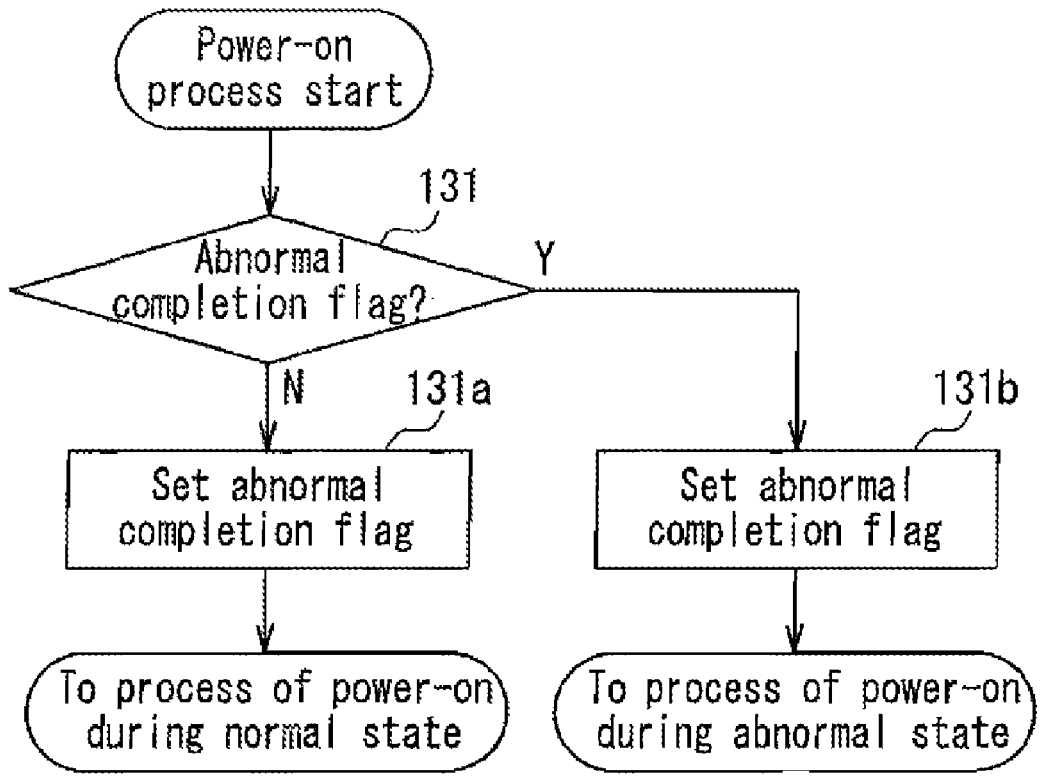
FIG. 42 is an operation flowchart of a power supply process according to Embodiment 13 of the present invention.

FIG. 42 is an operation flowchart of a process by the controller 24 when the power supply switch 42 lets electric power be supplied (ON). This shows operation flows in the case where the process is completed normally and abnormally when the operation of the imaging apparatus is completed the last time. The abnormal completion refers to the case where when electric power is supplied to the imaging apparatus, for example, when electric power is supplied from the external power supply 40, the connecting terminal 41 is detached accidentally and the power supply is shut off abruptly.

The memory 26 of FIG. 40 is configured so that, when electric power of the imaging apparatus is supplied, an abnormal completion flag is set by the controller 24 as described later. When the power supply of the imaging apparatus is shut off normally, both of the lens units 27 and 29 move, the light of the photosensor 37 is interrupted by the photo-interruption member 31 and the controller 24 detects that both of the lens units 27 and 29 are shifted to their storage positions, then the abnormal completion flag is cleared in accordance with an instruction from the controller 24.

If the operation of the imaging apparatus is not completed normally, for example, in the case where the power being supplied is shut off abruptly the light of the photosensor 37 will not be interrupted and both of the lens units 27 and 29 will not be stored at their storage positions. In this case, the abnormal completion flag stored in the memory 26 is not cleared.

Therefore, this abnormal completion flag is managed as a flag that shows the state where the lens units are not stored in the final storage positions in the lens barrel.

As shown in FIG. 42, when electric power is supplied to the imaging apparatus, the controller 24 starts the operation by reading out the presence or absence of the abnormal completion flag in the memory 26. A judgment is made as to whether the process for supplying electric power during the normal state or the process for supplying electric power during the abnormal state (supplying electric power after abnormal completion) is to be conducted, and the process for supplying electric power is carried out by making a distinction between processes. Thereby, even when the operation of the imaging apparatus is completed abnormally the last time, the imaging apparatus can be returned to the normal state by performing the origin detection process of the lens units when the electric power is supplied to the imaging apparatus next.

Figure 43:
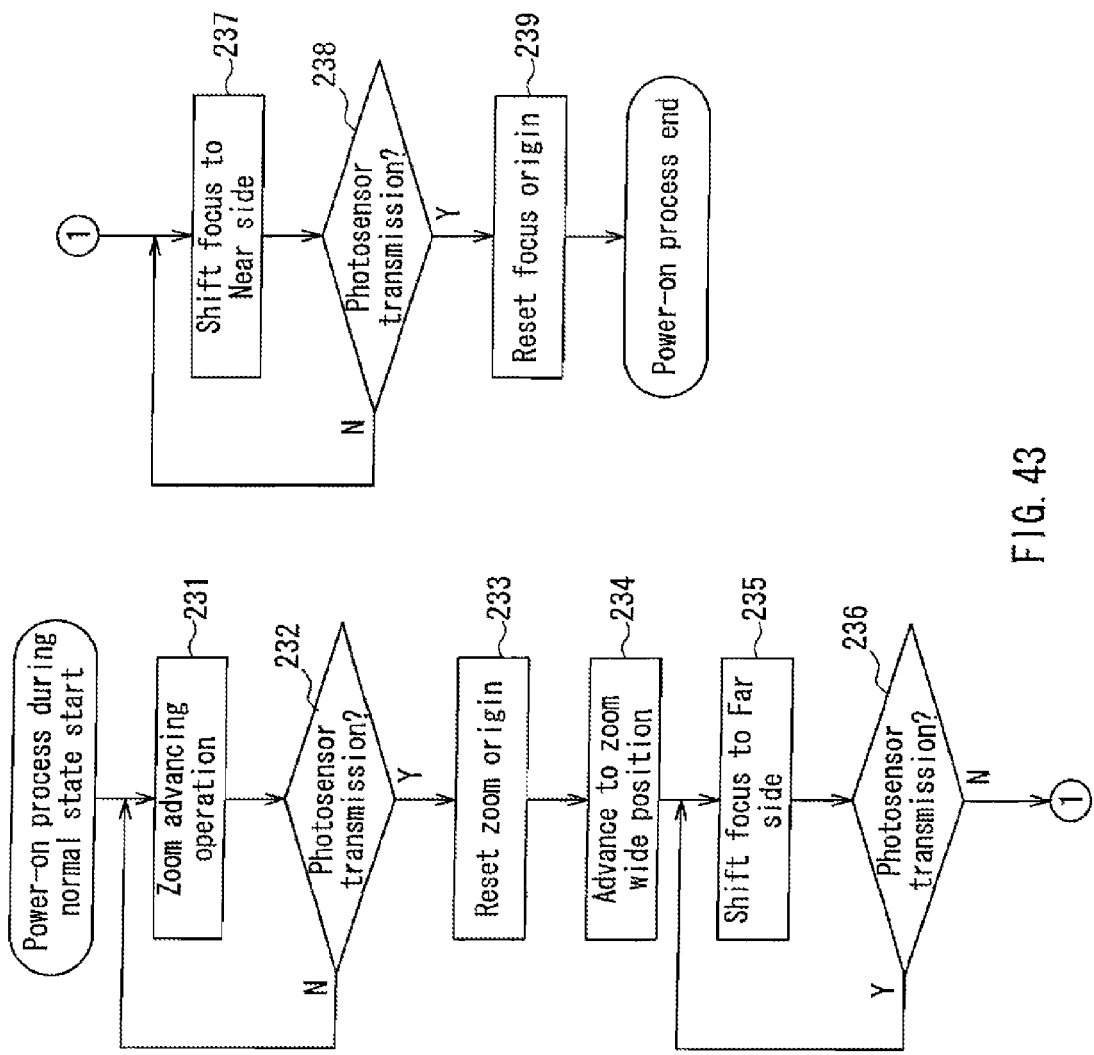
FIG. 43 is an operation flowchart of a power supply process during normal state awarding to Embodiment 13 of the present invention.
Figure 44:
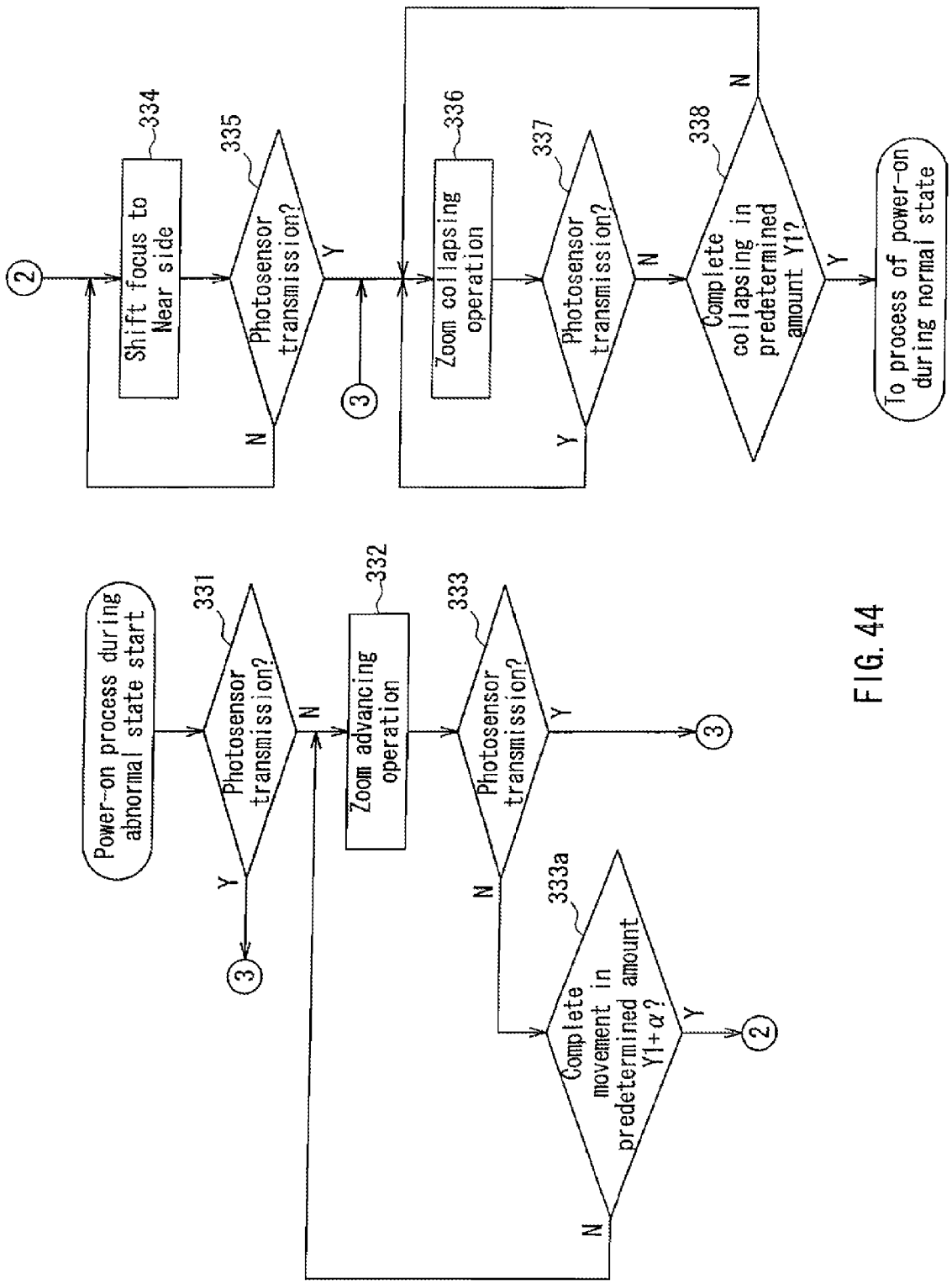
FIG. 44 is an operation flowchart of a power supply process during abnormal state according to Embodiment 13 of the present invention.

FIG. 43 is an operation flowchart of the process for supplying electric power during the normal state in accordance with an instruction from the controller 24, and FIG. 44 is an operation flowchart of the process for supplying electric power during the abnormal state in accordance with an instruction from the controller 24. After the operations shown by the flowchart of FIG. 42, the process proceed in accordance with either one of these operations. Herein, in the flowcharts of FIGS. 43 and 44, the zoom lens unit is abbreviated as "zoom" and the focus lens unit is abbreviated as "focus". These abbreviations are used in the later drawings as well.

Figure 41A:
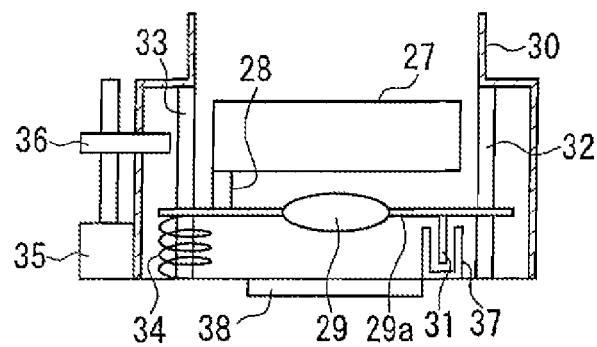
FIG. 41 is a drawing for explaining the mode transition of lens units according to Embodiment 13 of the present invention.

Firstly, the case where the imaging apparatus is completed normally the last time and then the imaging apparatus will be operated this time is described below. Before supplying electric power, the zoom lens unit 27 and the focus lens unit 29 are stored on the imaging plane side (normal completion) as shown in FIG. 41(a) because the operation is completed normally the last time.

In this state, when the power supply switch 42 is turned on and electric power is supplied to the controller 24 and the like, the operation starts with the start of the process for supplying electric power of FIG. 42. In Step 131, the controller 24 reads out the presence or absence of the abnormal completion flag in the memory 26. Since the abnormal completion flag in the memory 26 is cleared (N) because the operation is completed normally the last time, the process goes to Step 131a.

In this Step 131a, the controller 24 sets an abnormal completion flag in the memory 26, and starts the operation of the process for supplying electric power during the normal state. That is, since then, the abnormal completion flag is kept to be set, and in the case of normal completion, the abnormal completion flag is cleared, or in the case of abnormal completion, the abnormal completion flag is kept to be set.

On the other hand, in the case where an abnormal completion flag is set (Y) in the memory 26 when electric power is supplied, the process goes to Step 131b. In this Step 131b, after an abnormal completion flag is set again, the operation of the process for supplying electric power during the abnormal state is started.

Referring to FIG. 43, in the case where the operation of the imaging apparatus is completed normally the last time, the process for supplying electric power during the normal state after Step 131 will be described below. In Step 231 of FIG. 43, in accordance with an instruction from the controller 24, the first driver 22 drives the zoom lens unit 27 to advance to the subject, side.

Figure 41B:
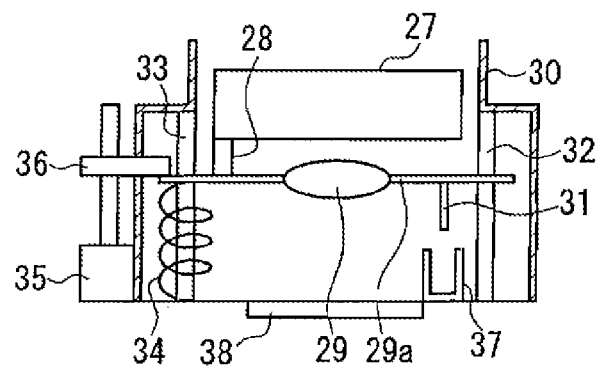

As the zoom lens unit 27 moves to advance, the photosensor 37 judges whether the light from its light-transmission element to the light-reception element, is transmitted or not in Step 232. In the case where the light is not transmitted, the process goes to Step 231 again. Then, as shown in FIG. 41(b), following the advancing movement of the zoom lens unit 27, the focus lens unit 29 moves by the biasing force of the spring 34. Along with this, the photo-interruption member 31 moves, so that the photo-interruption state of the photosensor 37 changes into the photo-transmission state (to the origin position), and the process goes to next Step 233. In this Step 233, a zoom origin reset, process is performed.

Herein, this origin reset process of the zoom lens unit 27 is performed after the controller 24 detects that the driving by the first driver 22 causes the change of the photo-interruption state of the photosensor 37 into the photo-transmission state.

The above-stated origin position detection process is described on the assumption that the first driver 22 is composed including a one-two phase excitation driving stepping motor (not illustrated) as a power source. In this case, an A-phase current and a B-phase current are supplied generally for driving the stepping motor, whereby the stepping motor shifts the zoom lens unit 27 to the advancing direction every 45° electrical angle as shown in the exciting positions of FIG. 46.

The controller 24 monitors the transmission of the light of the photosensor 37 that changes with the photo-interruption member 31 moving following this movement of the zoom lens unit 27 by means of the output level of the photosensor 37. When the output level exceeds a predetermined threshold value, the absolute position counter is reset and the origin position of the zoom lens unit 27 is detected.

After the zoom origin reset process in the above Step 233, the first driver 22 makes the zoom lens unit 27 advance to a wide position, for example, in Step 234. Along with the advancing movement of the zoom lens unit 27, the focus lens unit 29 also is shifted in the same direction by the spring 34.

Figure 41C:
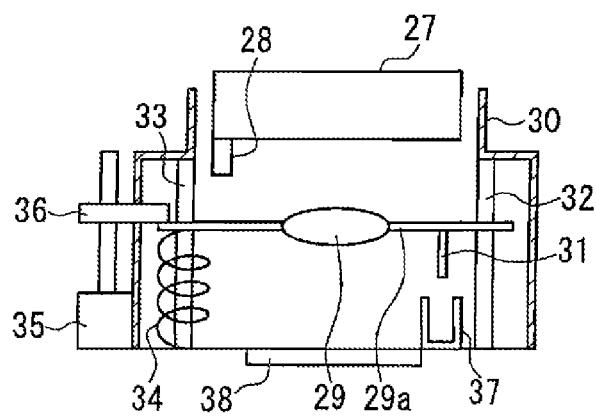

Then, both of the lens units 27 and 29 are shifted from the position of FIG. 41(a) to the position of FIG. 41(b), so that the lens frame 29a of the focus lens unit 29 contacts with the restriction member 36 at the position of FIG. 41(b). After this, the zoom lens unit 27 and the focus lens unit 29 are detached, and the zoom lens unit 27 is made to advance to the wide position as shown in FIG. 41(c).

Next, as shown in Step 235, the second driver 23 drives the stepping motor 35 so that the restriction member 36 is shifted to the imaging plane side (Far side), whereby the focus lens unit 29 is shifted to the Far side. As a result of the movement of the focus lens unit 29 to the imaging plane side, in Step 236, the controller 24 detects the change of the light of the photosensor 37 from the transmission state to the interruption state due to the photo-interruption member 31.

Figure 41D:
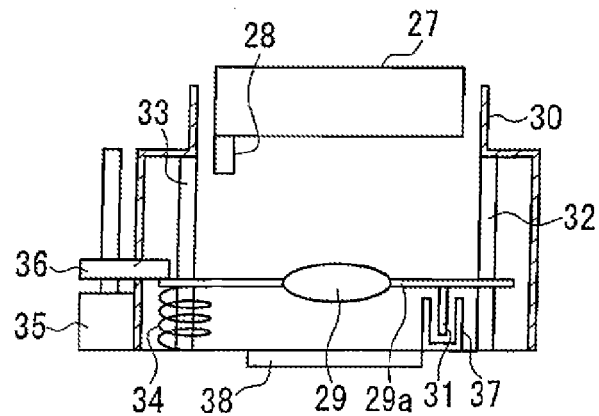

When the state becomes as shown in FIG. 41(d), the process goes to next Step 237. Until the focus lens unit 29 moves to the imaging plane side so as to interrupt the light of the photosensor 37, the process of Step 235 and Step 236 will be repeated. When the process goes to Step 237, the controller 24 makes the second driver 23 shift the focus lens unit 29 to the subject side (Near side), and then the process goes to Step 238.

In Step 238, a judgment is made as to whether the movement of the focus lens unit 29 to the subject side results in the change of the light of the photosensor 37 from the interruption state to the transmission state or not. If the light becomes transmitted, the process goes to next Step 239, where the focus origin is detected and focus origin reset is performed.

This origin reset for the focus lens unit 29 is performed after the controller 24 detects that the driving by the second driver 23 causes the change of the photo-interruption state of the photosensor 37 into the photo-transmission state, which is distinguished from the case of the zoom lens unit 27 where the interruption state of the light of the photosensor 37 is changed into the transmission state by the driving of the first driver 22. Until the focus lens unit 29 moves to the imaging plane side so as to interrupt the light of the photosensor 37, the process of Step 237 and Step 238 will be repeated.

Figure 46:
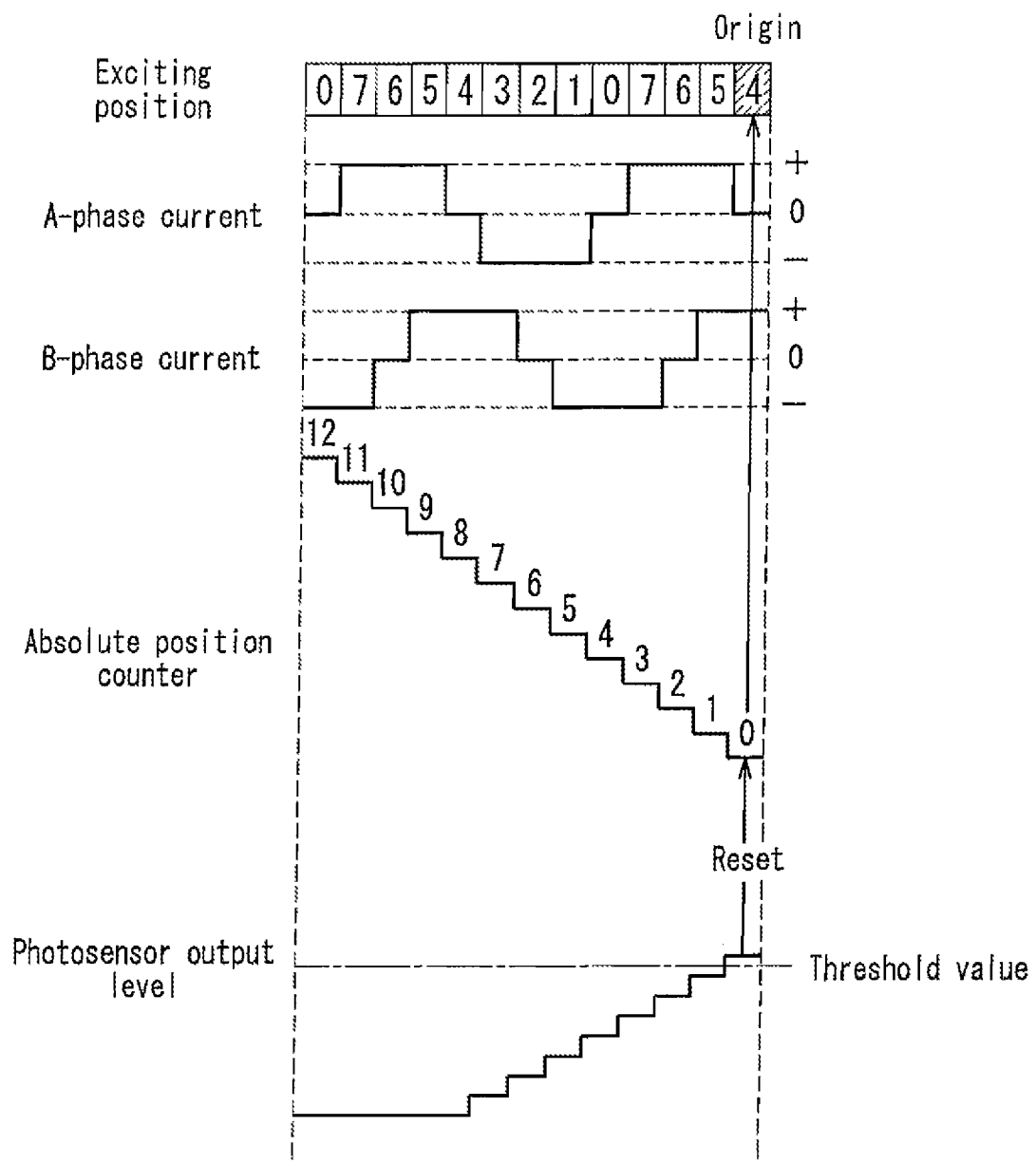
FIG. 46 is a drawing for explaining the operation of an origin detection of a lens unit according to Embodiment 13 of the present invention.

The following describes the origin detection process of the focus lens unit 29. FIG. 46 is a drawing for explaining the operation for the origin detection of the lens unit. This drawing shows the example where a A-phase current and a B-phase current are supplied from the driver 23 to the one-two phase excitation driving stepping motor 35, and driving by electrical angle of 45 degrees is carried out for each step as shown in the exciting positions of 0 to 7 so that the focus lens unit 29 is driven toward the subject side.

The output level of the photosensor 37 is monitored by the controller 24. When the output level exceeds a predetermined threshold value, the absolute position counter is reset, whereby the origin of the focus lens unit 29 is detected, so that the process for supplying electric power is completed.

After the completion of the above process for supplying electric power, in accordance with an operation by the operator of the imaging apparatus, the controller 24 is controlled so as to drive the both lens units 27 and 29 to perform the imaging operation.

The following describes the operation for the abnormal completion, for example, while electric power is supplied to the imaging apparatus during the last time operation, the electric power is shut off accidentally. As the state of the lens units when the operation is completed abnormally the last time, any state of FIGS. 41(a) to (d) is possible.

FIG. 41(a) shows the abnormal completion state in the case where although the lens units 27 and 29 are stored normally, the power supply is shut off forcibly before the completion of all storage operation, and the abnormal completion flag in the memory 26 is not cleared but still remains set. FIG. 41(d) shows the case where the power supply is shut off during the normal operation of the imaging apparatus (e.g., during image capturing).

In both of the states of FIG. 41(a) and FIG. 41(d), the light of the photosensor 37 is interrupted by the photo-interruption member. Therefore, when electric power is supplied, a judgment cannot be made only from the state of the photosensor 37 as to at, which one of the states in the last time operation the abnormal completion is made.

FIG. 41(b) shows the state where the power supply is shut off during the advancing or collapsing operation of the zoom lens unit 27 (the state where the movement conveying unit 28 contacts with the lens frame 29a of the focus lens unit 29). FIG. 41(c) shows the state the power supply is shut of during the normal operation of the imaging apparatus (e.g., during image capturing). In both of the states of FIG. 41(b) and FIG. 41(c), the light of the photosensor 37 is transmitted. Therefore, when electric power is supplied, a judgment, cannot be made in both of the states as to identifying which one of the states in the last time operation the abnormal completion is made.

Therefore, according to this embodiment, when electric power is supplied, an abnormal completion flag in the memory 26 is read out. If the abnormal completion flag is set in the memory 26, "the process for supplying electric power during the abnormal state" firstly is carried out and then "the process for supplying electric power during the normal state" is carried out. On the other hand, if the abnormal completion flag is cleared, "the process for supplying electric power during the normal state" is carried out as stated above.

From this, in the case of the normal state, the imaging apparatus can be made ready for imaging quickly without undergoing the process for the abnormal state. In the case of the abnormal state, by inserting the process for abnormal state before the process for normal state, the abnormal state can be recovered to the stable state.

Referring to FIG. 44, the process when electric power is supplied ON state) by the power supply switch 42 and the like after the abnormal completion state will be described below. In Step 331, the controller 24 judges whether light is transmitted from the light-transmission element to the light-reception element of the photosensor 37 or not, In the case of FIGS. 41(b) and (c) where the photosensor 37 is in the light-transmission state, the process goes to Step 336. In Step 336, the first driver 22 shifts the zoom lens unit 27 to the imaging plane side (Far side) to perform the collapsing operation.

In the case of FIGS. 41(a) and (d) where the light of the photosensor 37 is interrupted by the photo-interruption member 31, the process goes to Step 332, where the first driver 22 makes the zoom lens unit 27 advance. When the zoom lens unit 27 advances, the controller 24 in Step 333 detects whether the photosensor 37 is in the light-transmission state from the light-transmission element to the light-reception element or not. In the case where the light of the photosensor 37 is not transmitted as a result of the advancing operation of the zoom lens unit 27, the process goes to Step 333a, where a judgment is made as to whether the zoom lens unit 27 finishes the movement of a distance in a predetermined amount of (Y1+α) or not.

Herein, the relationship between the storage position of the zoom lens unit 27 in the collapsing state and the origin (the position of the transition from the interruption state to the transmission state of the light of the photosensor 37) will be described below. Along with the storage operation of the zoom lens unit 27 by collapsing, the focus lens unit 29 also moves in the same direction. Along with the movement of the focus lens unit 29, the photo-interruption member 31 also moves so that the light of the photosensor 37 changes from the transmission state to the interruption state at the origin.

The storage position of the zoom lens unit 27 is set at a further collapsing position. The position shifted by the distance corresponding to the pulse number of the stepping motor of 2 pulses in the collapsing direction is the storage position. Therefore, when the zoom lens unit 27 advances from the storage position by three pulses, then it reaches the origin where the light of the photosensor 37 changes from the light-interruption state to the transmission state.

Since the zoom lens unit 27 is configured so as to have the above-state relationship of the storage position and the origin, the above-stated Y1 becomes (origin)—(storage position) and α is set at a distance corresponding to the pulse number of the stepping motor of 1 pulse, for example. Thereby, in Step 333a, the controller 24 judges whether the zoom lens unit 27 finishes the movement corresponding to 1 pulse of the pulse number of the stepping motor after the passage of the origin. This judgment equals to the judgment of the movement of (Y1+α) from the starting position of the advancing operation of the zoom lens unit 27. In Step 333a, when the controller 24a detects the completion of the movement of (Y1+α), then the process goes to Step 334.

The process changes from Step 333a to Step 334 in the case where although the zoom lens unit 27 moves by (Y1+α), the photosensor 31 still remains in the interruption state. Such a state occurs when the movement of the focus lens unit 29 is restricted by the restriction member 36 as shown in FIG. 41(d).

In Step 334, the second driver 23 shifts the focus lens unit 29 to the subject side (Near side). Thereby, the photo-interruption member 31 also moves, and when it is detected in Step 335 that the photosensor 37 is in the light-transmission state, the movement of the focus lens unit 29 is stopped, and the process goes to Step 336. In this Step 336, the first driver 22 is operated so as to start the collapsing operation of the zooming lens unit 27.

In the collapsing operation of the zooming lens unit 27 to the imaging plane side in Step 336, during the time when the light of the photosensor 37 is judged as the transmission state in Step 337, the collapsing operation will be continued. When the light of the photosensor 37 is interrupted by the photo-interruption member 31 and the origin is detected, the process goes to Step 338.

In Step 338, when the completion of the movement of the distance in the above-stated predetermined amount of Y1 is detected, the process for supplying electric power during the abnormal state is completed. In this state, the zoom lens unit 27 reaches the storage position shown in FIG. 41(a). After this, the process changes to the process for supplying electric power during the normal state as shown in FIG. 43, where the setting for making the apparatus ready for imaging is carried out. Herein, in this transition to the process for supplying electric power during the normal state, the abnormal completion flag reset in the memory 26 is left as it is. After this, the abnormal completion flag is kept to be set, and in the case of normal completion, the abnormal completion flag is cleared, whereas in the case of abnormal completion, the abnormal completion flag will be kept to be set.

As stated above, according to the present embodiment even in the case where the imaging apparatus is completed abnormally the last time, the abnormal completed state can be recovered to change to the normal and usual process for supplying electric power during the normal state.

Figure 45:
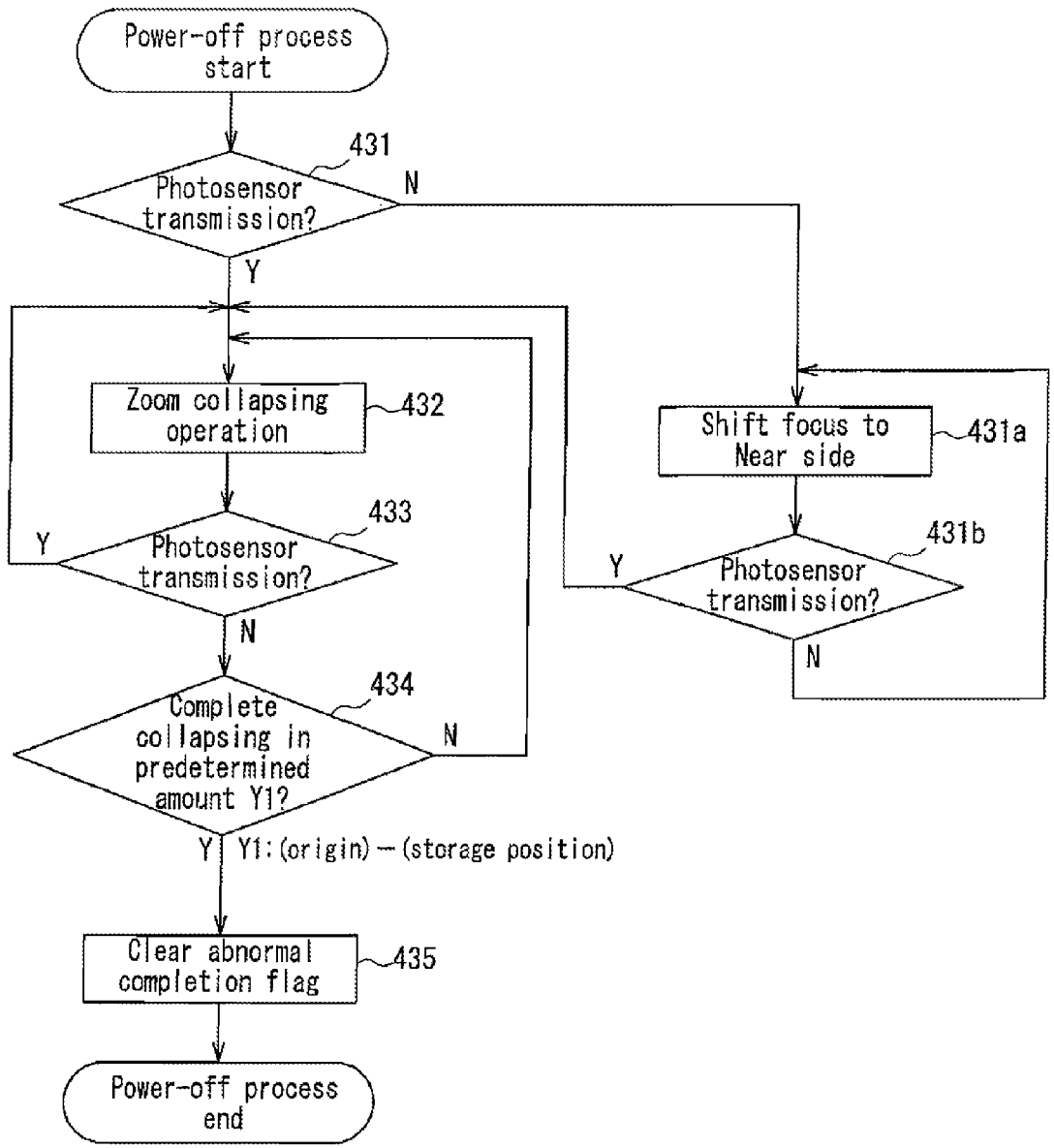
FIG. 45 is an operation flowchart of a power shut-off process according to Embodiment 13 of the present invention.

Referring to FIG. 45, the process for the normal shut-off of the power supply by an operator after the normal imaging operation will be described below. After the completion operation by shutting off the electric power by the termination switch 43, firstly in Step 431, the controller 24 judges whether the light of the photosensor 37 is transmitted from the light-transmission element to the light-reception element or not.

In the case where the photo-interruption member 31 prevents the light from being transmitted through the photosensor 37, the process goes to Step 431a. In Step 431a, the second driver 23 shifts the focus lens unit 29 toward the subject, and the process goes to Step 431b. In Step 431b, the controller 24 judges whether, as a result of the movement of the focus lens unit 29, the light of the photosensor 37 is transmitted or not. If the transmission of the light is detected as a result of the movement of the photo-interruption member 31, the movement of the focus lens unit 29 is stopped, and the process goes to next Step 432.

In Step 432, the first driver 22 drives and shifts the zoom lens unit 27 to the imaging plane side so as to perform a collapsing operation. As the zoom lens unit 27 moves to the imaging plane side in this way, the focus lens unit 29 also moves to the imaging plane side. Then, in Step 433, a judgment is made as to whether the light of the photosensor 37 is transmitted or not. In the case where the light is transmitted, the process returns to Step 432 to continue the collapsing operation, and if it is detected that the transmission of the light is interrupted, the process goes to Step 434.

The position where the light of the photosensor 37 is interrupted is the origin, and the focus lens unit 29 is shifted by the zoom lens unit 27 to a storage position that is shifted by the above-stated predetermined amount of Y1 from this origin. In Step 434, a judgment is made as to whether the collapsing operation is completed to arrive at this storage position. In Step 434, if the collapsing operation is not completed, the process returns to Step 432 to continue the collapsing operation, so as to shift the zoom lens unit 27 securely to the storage position shown in FIG. 41(a).

In Step 434, it is detected that the zoom lens unit 27 arrives at the position shifted by the predetermined amount of Y1 from the origin, i.e., at the storage position, so that the collapsing operation is completed, the abnormal completion flag in the memory 26 is cleared in Step 435, and the controller 24 turns the power supply switch 34 off, which means the completion of the process for shutting off the power supply.

Note here that the completion of the collapsing operation, i.e., the movement of the zoom lens unit 27 to the storage position, can be detected by the application of two pulses to the stepping motor making up the first driver 22 after the detection of the origin of the zoom lens unit 27 and the completion of the application of one further pulse to the stepping motor after the movement by the predetermined amount of Y1.

That is the explanation of the present embodiment. The features of the present embodiment can be summarized as follows: in the operation for supplying electric power during the normal state, the controller 24 firstly reads out an abnormal completion flag from the memory 26 and confirms that the flag is cleared. At the time of this confirmation, the lens units are positioned as in the state of FIG. 41(a), and it is judged as the storage completion state.

Next, from the state of FIG. 41(a), the first driver 22 makes the zoom lens unit 27 perform an advancing operation, so that the focus lens unit 29 stored by this zoom lens unit 27 is advanced together with this zoom lens unit 27 by the returning force of the spring 34. Along with this, the photo-interruption member 31 also moves, so that the photosensor 37 changes from the light-interruption state to the light-transmission state. By detecting the changing point from the light-interruption state to the transmission state, the origin of the zoom lens unit 27 is reset.

Next, the zoom lens unit 27 further is shifted so as to advance to a predetermined position, and as shown in FIG. 41(c), in the state where the movement conveying unit 28 is detached from the lens frame 29a of the focus lens unit 29, the focus lens unit 29 is shifted toward the imaging device 38 by driving the stepping motor 35.

Thereafter, after the photosensor 37 is interrupted by the photo-interruption member 31 once, the stepping motor 35 is reverse-driven to shift the focus lens unit 29 toward the subject by the biasing force of the spring 34. As a result, the position where the photosensor 37 changes from the light-interruption state to the light-transmission state due to the photo-interruption member 31 is detected, whereby the origin of the focus lens unit 29 is reset. When electric power is supplied during the normal time, the above-stated operation enables the origin detection of the respective lens units using one photosensor 37.

The following describes the operation in the case where electric power is supplied after the abnormal completed state, for example, while electric power is supplied to the imaging apparatus during the last time operation, the power supply is shut off accidentally. Firstly the controller 24 reads out an abnormal completion flag from the memory 26, and if this abnormal completion flag is set, it is judged that the shut-off of the power supply is not performed normally and the lens units have not been stored completely (abnormal completion state).

At the time when this abnormal completion flag is confirmed, it is unknown at which state of (a), (b), (c) and (d) of FIG. 41 the respective lens units are located. Further, in the case where the lens units have not been stored completely; if the light of the photosensor 37 is interrupted, it is unknown whether the photosensor 37 is interrupted by the photo-interruption member 31 resulting from the driving of the zoom lens unit 27 by the first driver 22 or is interrupted by the photo-interruption member 31 by the focus lens unit 29.

Therefore, in order to allow the transition from the abnormal completion state to the process for supplying electric power during the normal state, a judgment is made firstly as to whether the light of the photosensor 37 is transmitted or not, which is for locating the respective lens units. In the case where the light is transmitted, the zoom lens unit 27 is made to collapse so that the light of the photosensor 37 is interrupted by the photo-interruption member 31. Thereby, it can be found that the movement of the zoom lens unit 27 by the first driver 22 causes the interruption of the light of the photosensor 37, thus enabling the transition to the process for supplying electric power during the normal state.

On the other hand, in the case where the light of the photosensor 37 is not transmitted, the zoom lens unit 27 is made to advance by a predetermined amount by the first driver 22. If this operation allows the light of the photosensor 37 to be transmitted, it can be found that the light of the photosensor 37 is interrupted due to the movement of the zoom lens unit 27 by the first driver 22 at the time of the abnormal completion. Therefore, in this case, after making the zoom lens unit 27 advance, then the zoom lens unit 27 is made to collapse so that the light of the photosensor 37 is interrupted, thus enabling the transition to the process for supplying electric power during the normal state.

If the light of the photosensor 37 is not transmitted even when the zoom lens unit 27 is made to advance by the predetermined amount, it is estimated that since the focus lens unit 29 cannot move by the returning force of the spring 34, the light of the photosensor 37 is interrupted by the photo-interruption member 31. Therefore, the focus lens unit 29 is shifted toward the subject, by the second driver 23, and after the transmission of the light of the photosensor 37 is confirmed, then the zoom lens unit 27 is made to collapse by the first driver 22, thus enabling the transition to the process for supplying electric power during the normal state.

Next, the operation for shutting off the power supply is as follows. For example, when the collapsing operation of the zoom lens unit 27 is performed by the driving by the first driver 22 from the state where the light of the photosensor 37 is not transmitted by the photo-interruption member 31 of the focus lens unit 29 as shown in FIG. 41(c), the movement conveying unit 28 of the zoom lens unit 27 contacts with the lens frame 29a of the focus lens unit 29. Thereby, the focus lens unit 29 integrally moves to the imaging plane side against the spring 34, so that the photosensor 37 changes from the light-transmission state to the light-interruption state by the photo-interruption member 31. In response to the detection of this change of states, the collapsing operation is completed and the lens units are stored.

Herein, in the case where the power-supply shut-off operation is performed in the state where the light of the photosensor 37 is interrupted by the photo-interruption member 31 of the focus lens unit 29 as shown in FIG. 41(d), the stepping motor 35 is driven firstly so that the focus lens unit 29 is shifted to the subject side by the biasing force of the spying 34.

With this operation, the photosensor 37 is made in the light-transmission state once, and based on the detection of the change of the states of the photosensor 37, the collapsing operation of the zoom lens unit 27 is performed by driving of the first driver 22 from the state of the light-transmission state of the photosensor 37, whereby the lens units are stored at their storage positions.

Then, when these lens units are shifted to their storage positions and the collapsing operation is completed, the power supply is shut off. In this way, the above-stated operation is performed for shutting of the power supply, thus enabling the origin detection of the lens units when electric power is supplied next.

As stated above, according to the present embodiment, the origins of the first lens unit (zoom lens unit) and the second lens unit (focus lens unit) can be detected using a common position detector using one photosensor. That is, the position detector allows not only the origin detection of the second lens unit but also the origin detection of the first lens unit by shifting resulting from the contact of the first lens unit with the second lens unit. Thereby, the number of components can be decreased, and the lens barrel can be miniaturized in the optical axis direction and in the outer rim direction.

Further, even in the case of the abnormal stopping where electric power is supplied by externally connecting a connecting terminal with the imaging apparatus and such power supply is shut off abruptly by the connecting terminal falling off, for example, the origin detection process can be performed normally and the apparatus can be returned to the normal state when electric power is supplied the next time.

The above-described embodiment is just one example, and a method including a storage that stores information varied depending on the normal completion state in which a first lens unit and a second lens unit are shifted to their storage positions from the power-supply state in accordance with predetermined processes and operations when electric power supplied is shut off and the abnormal completion state that is completed in a state different from the normal completion state in the power-supply state, the method being for returning the first lens unit and the second lens unit to the normal completion state in accordance with the information stored in the storage when electric power is to be supplied after the abnormal completion state, can be embodied with other configurations similarly.

Further, as another configuration, when power is turned on in the abnormal completion state, the process may be completed simply by returning to the normal completion state, and the apparatus may be stopped in this state. In this case, when electric power is supplied again, the process for supplying electric power during the normal state can be performed.

Further, in the case where a secondary power supply is used as a power supply for the storage and in the case where the storage includes a volatile memory, a reduction in the secondary power supply may cause a loss of the abnormal completion information. In such a case, however, the abnormal completion can be judged by detecting the reduction in the power supply, so that the apparatus can be returned to the normal state without malfunction.

Further, the movement conveying unit and the movement restriction unit (in this embodiment, the movement conveying unit 28 and the restriction member 36) for controlling the movement of the second lens unit may be brought into contact with each other at a position where they are closer to the lens frame of the second lens unit. Thereby, the portion of the lens frame that should be reinforced in strength because of the contact can be reduced in area, and the portion of the contacting face whose profile irregularity should be secured also can be made smaller. Therefore, the stable operation is enabled, and there is substantially no torsion in the second lens unit even when a contacting force is applied thereto because the portion contacting with the lens frame is brought closer to the supporting members (in this embodiment, guide poles 32 and 33) supporting the second lens unit movably, whereby the second lens unit can move smoothly. Herein, the number of the supporting members is not limited to two and more supporting members may be provided.

Further, the present embodiment describes the example using the stepping motor as the driver for driving the first lens unit (the zoom lens unit) and the second lens unit (the focus lens unit). However, a DC motor, an ultrasound motor and the like may be used for the driver, and they are not limited specifically. They may be a motor with an encoder or a motor without an encoder.

The predetermined amount Y1 that is the amount of shifting the lens unit to the storage position by way of the origin may be a distance based on the time in accordance with timer setting, for example, or a predetermined amount based on other settings.

Further, in the present embodiment, after shifting the lens unit to the storage position, one pulse is applied to the stepping motor. However, still more pulses may be applied, or no pulse may be applied after the shifting to the storage position.

Further, the present embodiment describes the example using a transmission type photosensor and a photo-interruption member (member to be detected) as the position detector for detecting the origin. However, a reflective type photosensor and a reflection member may be used. Alternatively, a hall device and a magnet may be used.

Moreover, the method for detecting the origin of the first lens unit is not limited to the present embodiment, including the movement conveying unit that is directly attached to or integrally molded with the first lens unit, i.e., the movement conveying unit that moves integrally with the first lens is brought into contact with the second lens unit. More specifically, other movement conveying units, provided so as to move to be linked with the first lens unit, e.g., a movement conveying unit that is shifted by the first driver and is provided in the shifting means that shifts the first lens unit, also is possible.

Further, the movement conveying unit that makes the first lens unit, and the second lens unit move to be linked with each other may include one provided on the second lens unit side.

Although the movement conveying unit described in the present embodiment contacts at one point, it may contact at two or more points or contact with a large plane.

Embodiment 14

Figure 47:
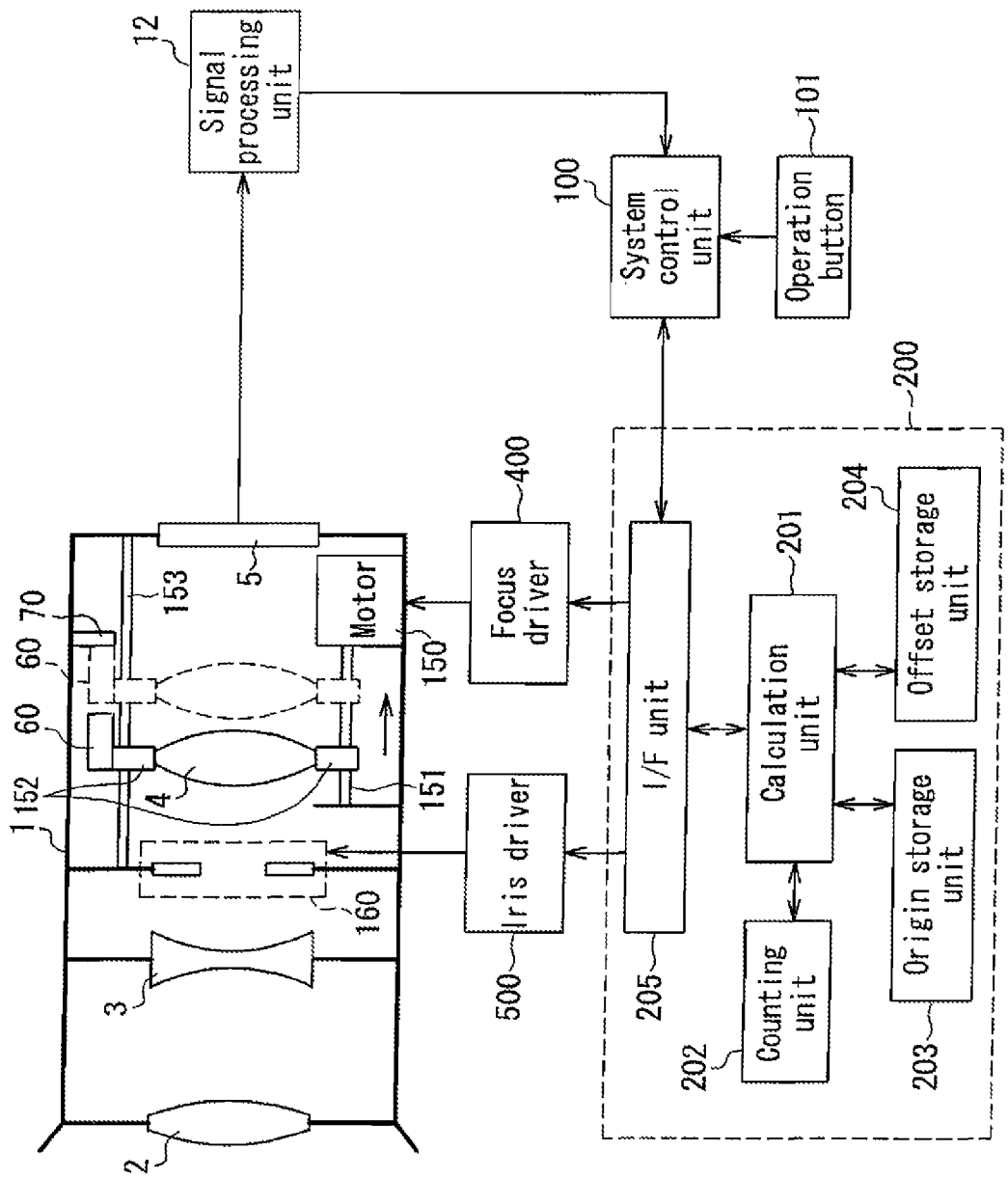
FIG. 47 includes a schematic diagram and a block diagram of an imaging apparatus according to Embodiment 14 of the present invention.

FIG. 47 includes a schematic diagram and a block diagram of an imaging apparatus according to Embodiment 14. In FIG. 47, a first lens group 2, a second lens group 3 and a third lens group 4 (hereinafter the third lens group is called "focus lens") are disposed in a barrel 1. A stop 160 adjusts a light amount of light of a subject passing through the first lens group 2 and the second lens group 3. An imaging device 5 captures an image of the light of the subject passing through the respective lens groups.

A contacting member 60 is fixed to a frame 152 of the focus lens 4, and the position of the contacting member 60 is restricted by a restriction member 70. Along with the rotation of a focus motor 150, a lead screw 151 with threads cut therein rotates so that the frame 152 moves toward the imaging device 5 until the contacting member 60 contacts with the restriction member 70, thus restricting the movement of the focus lens 4 toward the imaging device 5.

An image of the subject received by the imaging device 5 is processed by a signal processing unit 12. In a system control unit 100, in accordance with an operation signal of operation buttons 101 such as a shutter button and a power supply button of a camera main body and menu buttons (not illustrated) and an image signal output from the signal processing unit 12, control information for the focus lens 4 and the stop 160 is transmitted/received to/from a control circuit 200.

Herein, the focus motor 150 is a stepping motor. The stop 160 is provided with a stepping motor (hereinafter called "iris motor") that drives blades for adjusting the light amount, which will be described later.

A focus driver 400 and an iris driver 500 are pulse generation circuits that generate pulses of a driving current (hereinafter called "driving pulses)" for driving the stepping motors. The control circuit 200 is provided with an I/F unit 205 that transmits control information transmitted from the system control unit 100 to the focus driver 400 and the iris driver 500. Further, a calculation unit 201 that calculates control information for controlling the focus lens 4 and the stop 160, a counting unit 202, an origin storage unit 203 and an offset storage unit 204 are provided.

Figure 48:
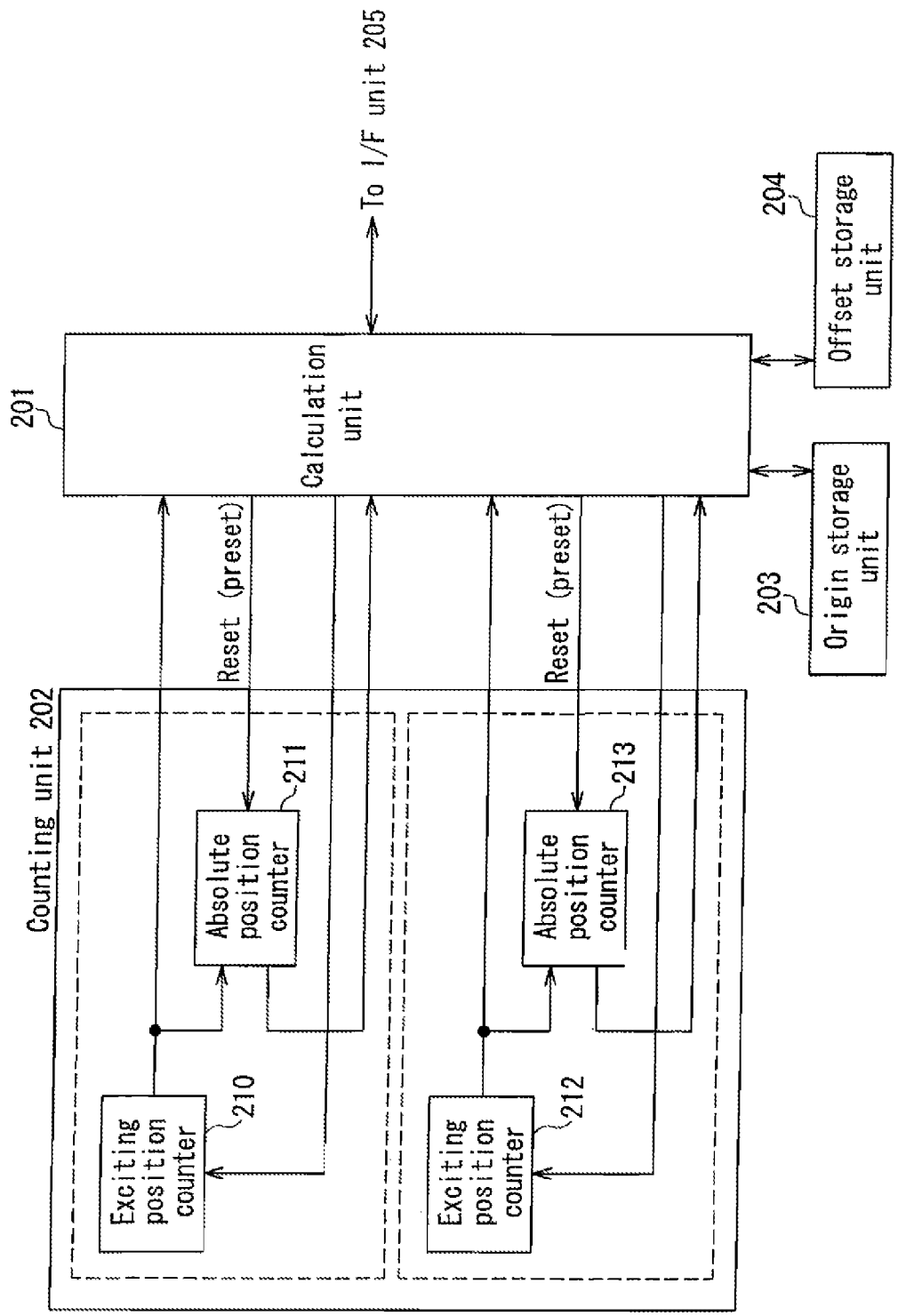
FIG. 48 is a detailed block diagram of a control circuit in the imaging apparatus according to Embodiment 14 of the present invention.

FIG. 48 is a detailed block diagram of the control circuit 200 in the imaging apparatus according to the present embodiment. In FIG. 48, the counting unit 202 includes an exciting position counter 210 that counts exciting positions of the focus motor 150 and an absolute position counter 211 that is reset or present by an origin reset process described later and counts an absolute position of the focus motor 150. Further, an exciting position counter 212 that counts exciting positions of an iris motor 160a (described later) and an absolute position counter 213 that is reset or present by an origin reset process described later and counts an absolute position of the iris motor 160a are provided.

In accordance with an instruction for driving the focus motor and an instruction for driving the iris motor that are sent from the I/F unit 205, the calculation unit 201 counts up and counts down the exciting position counters 210 and 212 based on the information of the counting unit 202, the origin storage unit 203 and the offset storage unit 204, and reads out counter values of the respective exciting position counters. Further, the calculation unit 201 resets or presets the absolute position counters 211 and 213 and reads out counter values of the respective absolute position counters.

Figure 49:
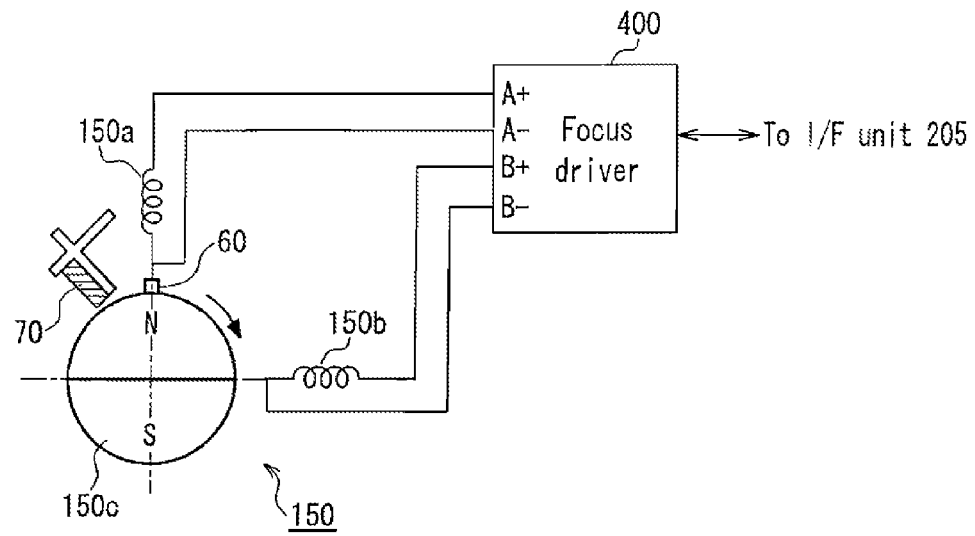
FIG. 49 is a block diagram of a motor unit and a focus driver of the imaging apparatus according to Embodiment 14 of the present invention.

FIG. 49 is a block diagram of a motor unit and a focus driver of the imaging apparatus according to the present embodiment. In FIG. 49, numeral 400 denotes the focus driver, 150a denotes an A-phase coil, 150b denotes a B-phase coil, 150c denotes a rotor magnetized to have two poles, 60 denotes a contacting member and 70 denotes a restriction member.

In FIG. 47, the example is described where the contacting member 60 is secured to the focus lens 4 and the restriction member 70 is restricted by the barrel 1. This holds true, but in FIG. 49 for the sake of clarity, the example where the contacting member 60 is attached to the rotor 150c and the restriction member 70 is disposed closer to the rotor 150c is described below.

In the example of FIG. 47, the contacting member 60 shown with the sold line is located at a position displaced from the position of the restriction member 70 toward the stop 160. As described above, as the focus lens 4 moves toward the imaging device 5 along with the rotation of the focus motor 150, the contacting member 60 will contact with the restriction member 70 as shown with the broken line. The position of the contacting member 60 in FIG. 49 corresponds to the position of the contacting member 60 shown with the solid line in FIG. 47. As the rotor 150c rotates to the right, the contacting member 60 contacts with the restriction member 70. This position corresponds to the position of the contacting member 60 shown with the broken line in FIG. 47.

Figure 50:
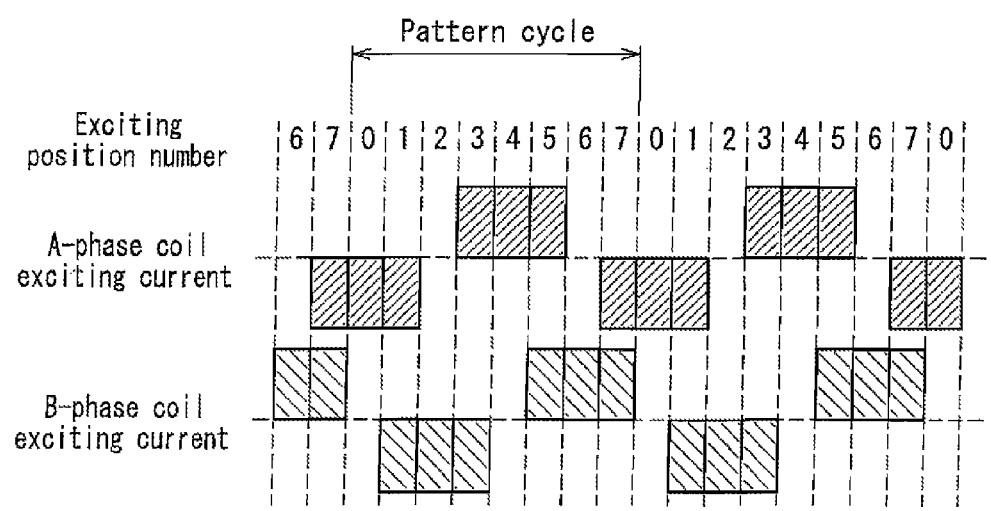
FIG. 50 is a timing chart showing a current pattern of the exciting currents applied to an A-phase coil and a B-phase coil of the motor unit of the imaging apparatus according to Embodiment 14 of the present invention.

The following describes the driving control of the stepping motor based on the example of FIG. 49 FIG. 50 is a timing chart showing a current pattern of the exciting currents applied to the A-phase coil and the B-phase coil of the motor unit of the imaging apparatus according to the present embodiment. The motor unit is a stepping motor driven by a so-called one-two phase excitation method.

The one-two phase excitation method type stepping motor is driven by the combination of the application of a control current with two polarities of positive and negative to the A-phase coil 150a and the application of a control current with two polarities of positive and negative to the B-phase coil 150b. Herein, three patterns of the application of the current to the A-phase coil 150a can be considered including the application of a positive current (A+), the application of a negative current (A−) and the case of none of them applied (0).

Also, three patterns of the application of the current to the B-phase coil 150b can be considered as well, including the application of a positive current (B+), the application of a negative current (B−) and the case of none of them applied (0). Therefore, the possible application patterns of the currents are 9 patterns=3 patterns×3 patterns, but the pattern in which currents are not applied to the A-phase or the B-phase should be excluded, so that they are 8 patterns in total.

The timing chart of FIG. 50 shows 8 current patterns with the exciting position numbers from 0 to 7, The respective exciting position numbers correspond to the following current patterns. The current pattern corresponding to the following exciting position numbers from 0 to 7 is applied to the stepping motor successively so that the stepping motor is driven to rotate.

(a) exciting position number 0: (A-phase, B-phase)=(A−, 0)
(b) exciting position number 1: (A-phase, B-phase)=(A−, B−)
(c) exciting position number 2: (A-phase, B-phase)=(0, B−)
(d) exciting position number 3: (A-phase, B-phase)=(A+, B−)
(e) exciting position number 4: (A-phase, B-phase)=(A+, 0)
(f) exciting position number 5: (A-phase, B-phase)=(A+, B+)
(g) exciting position number 6: (A-phase, B-phase)=(0, B+)
(h) exciting position number 7: (A-phase, B-phase)=(A−, B+)

FIG. 51 is a schematic diagram showing the relationship between the exciting positions of the motor unit and the driving positions when the contracting member 60 is brought closer to the restriction position from a position away from the restriction position by advancing the exciting position number one by one in the imaging apparatus according to the present embodiment. FIGS. 51(a) to (h) correspond to the above-stated exciting position numbers from 0 to 7. These drawings are viewed from the rotation axis direction of the rotor 150c of the stepping motor, and the A-phase coil 150a and the B-phase coil 150b are disposed at positions displaced by 90 degrees from each other in the rotation direction of the rotor 150c.

In the case of corresponding to the exciting position number 0, current is not applied to the B-phase coil 150b and current is applied to the A-phase coil from the A− terminal to the A+ terminal. Therefore, the A-phase coil 150a is excited as the S-pole attracting the N-pole of the rotor 150c, so that the rotor 150c is kept at the position of FIG. 51(a).

In the case of corresponding to the exciting position number 1, current is applied to the A-phase coil 150a from the A-terminal to the A+ terminal, and current is applied to the B-phase coil 150b from the B− terminal to the B+ terminal. Therefore, the N-pole of the rotor 150c is attracted by the both coils excited as the S-pole, so that the rotor 150c is kept at the position of FIG. 51(b) where the respective attractive forces are balanced.

In the case of corresponding to the exciting position number 2, current is not applied to the A-phase coil 150a and current is applied to the B-phase coil 150b from the B− terminal to the B+ terminal. Therefore, the B-phase coil 150b is excited as the S-pole attracting the N-pole of the rotor 150c, so that the rotor 150c is kept at the position of FIG. 51(c).

In the case of corresponding to the exciting position number 3, current is applied to the A-phase coil 150a from the A+ terminal to the A− terminal, and current is applied to the B-phase coil from the B− terminal to the B+ terminal. Therefore, the A-phase coil 150a excited as the N-pole attracts the S-pole of the rotor 150c and the B-phase coil 150b excited as the S-pole attracts the N-pole of the rotor 150c, so that the rotor 150c is kept at the position of FIG. 51(d) where the respective attractive forces are balanced.

In the case of corresponding to the exciting position number 4, current is not applied to the B-phase coil 150b and current is applied to the A-phase coil 150a from the A+ terminal to the A− terminal. Therefore, the A-phase coil 150a is excited as the N-pole attracting the S-pole of the rotor 150c, so that the rotor 150c is kept at the position of FIG. 51(e).

In the case of corresponding to the exciting position number 5, current is applied to the A-phase coil 150a from the A+ terminal to the A− terminal, and current is applied to the B-phase coil from the B+ terminal to the B− terminal, Therefore, the S-pole of the rotor 150c is attracted by the both coils excited as the N-pole, so that the rotor 150c is kept at the position of FIG. 51(f) where the respective attractive forces are balanced.

In the case of corresponding to the exciting position number 6, current is not applied to the A-phase coil 150a and current is applied to the B-phase coil 150b from the B+ terminal to the B− terminal. Therefore, the B-phase coil 150b is excited as the N-pole attracting the S-pole of the rotor 150c, so that the rotor 150c is kept at the position of FIG. 51(g).

In the case of corresponding to the exciting position number 7, current is applied to the A-phase coil 150a from the A− terminal to the A+ terminal, and current is applied to the B-phase 150b from the B+ terminal to the B− terminal. Therefore, the A-phase coil 150a excited as the S-pole attracts the N-pole of the rotor 150c and the B-phase coil 150b excited as the N-pole attracts the S-pole of the rotor 150c, so that the rotor 150c is kept at the position of FIG. 51(h) where the respective attractive forces are balanced.

When the state of the exciting position number 0 changes into the state of the exciting position number 1, the rotor 150c receives a thrust rotating to the right from the position of the exciting position number 0 and assumes the state of the exciting number position 1. When the state of the exciting position number 1 changes into the state of the exciting position number 2, the rotor 150c receives a thrust rotating to the right from the position of the exciting position number 1 and assumes the state of the exciting number position 2. After that, as the exciting position number is advanced one by one, the rotor 150c will rotate to the right. Herein, the exciting position number 0 follows the exciting position number 7.

In this way, the stepping motor is driven to rotate. Since the A-phase coil 150a and the B-phase 150b are disposed at positions displaced by 90 degrees from each other in the rotation direction of the rotor 150c, this stepping motor has a resolution of a half of 90 degrees that is the displacement pitch of the coil, i.e., a 45-degree resolution.

FIG. 52 is a schematic diagram showing the relationship between the exciting positions of the motor unit and the driving positions when the exciting position number is advanced further one by one from the state of FIG. 51(h). As stated above, as the rotor 150c rotates to the right from the exiting position number 0 to the exiting position number 7 in this order in FIG. 51, the contacting member 60 is restricted by the restriction member 70 at the position of FIG. 51(h). Therefore, in this state, the rotor 150c no longer rotates even if the thrust for rotating to the right is applied to the rotor 150c.

Therefore, when the exciting position number is advanced from 7 to 0, the rotor 150c does not rotate, and as shown in FIG. 52(a), the rotor 150c keeps the position of FIG. 51(h). If the contacting member 60 was not restricted by the restriction member 70, the rotor 150c would rotate to the position of FIG. 51(a).

In the state of FIG. 52(a), the thrust that makes the rotor 150c rotate to the right acts on the rotor 150c. That is, the contacting member 60 pushes the restriction member 70 in the direction shown by the arrow of the drawing.

Even when the exciting position number is advanced to 1, as shown in FIG. 52(b), the rotor 150c does not rotate and keeps the former position. If the contacting member 60 was not restricted by the restriction member 70, the rotor 150c would rotate to the position of FIG. 51(b). Also in the state of FIG. 52(b), the thrust that makes the rotor 150c rotate to the right acts on the rotor 150c. That is, the contacting member 60 pushes the restriction member 70 in the direction shown by the arrow of the drawing.

Even when the exciting position number is advanced to 2, as shown in FIG. 52(c), the rotor 150c does not rotate and keeps the former position. If the contacting member 60 was not restricted by the restriction member 70, the rotor 1500 would rotate to the position of FIG. 51(c). Also in the state of FIG. 52(c), the thrust that makes the rotor 150c rotate to the right acts on the rotor 150c. That is, the contacting member 60 pushes the restriction member 70 in the direction shown by the arrow of the drawing.

When the exciting position number is advanced to 3, the following two patterns can be considered: the former state is kept as shown in FIG. 52(d), and the rotor 150c rotates to the position shown in FIG. 51(d). The reason for this is as follows. When the exciting position numbers are 0 to 2, the A-phase coil 150a or the B-phase coil 150b is excited to have the pole such that the thrust making the rotor 150c rotate to the right acts.

On the other hand, when the exciting number position is 3, the A-phase coil 150a is excited as the N-pole and the B-phase coil 150b is excited as the S-pole, and in the state of FIG. 52(d), the rotor 150c receives repulsion forces from both coils uniformly, so that the rotor 150c is in an instable state.

Therefore, if the magnetic force of the B-phase coil 150b is even slightly stronger than the magnetic force of the A-phase coil 150a, or conversely if the magnetic force of the A-phase coil 150a is even slightly stronger than the magnetic force of the B-phase coil 150b, or if vibration is applied externally, the rotor 150c may rotate to the left to be kept in the state shown in FIG. 51(d). That is, in this state, the rotor 150c may be located at either one of the two positions of FIG. 52(d) and FIG. 51(d), thus showing an instable state.

FIG. 52(e) shows the state where the rotor 150c changes from the restricted state (upper one) to the state of the exciting position number of 4 (lower one). When the exciting position number is 4, the A-phase coil 150a is excited as the N-pole and the B-phase coil 150b is not excited. Therefore, the rotor 150c rotates from the position shown in the upper one to the left and is kept at the position shown in the lower one.

FIG. 52(f) shows the state where the rotor 150c changes from the restricted state (upper one) to the state of the exciting position number of 5 (lower one). When the exciting position number is 5, the A-phase coil 150a and the B-phase coil 150b are excited as the N-pole. Therefore, the rotor 150c rotates from the position shown in the upper one to the left and is kept at the position shown in the lower one.

FIG. 52(g) shows the state where the rotor 150c changes from the restricted state (upper one) to the state of the exciting position number of 6 (lower one). When the exciting position number is 6, the A-phase coil 150a is not excited and the B-phase coil 150b is excited as the N-pole. Therefore, the rotor 150c rotates from the position shown in the upper one to the left and is kept at the position shown in the lower one.

In the state with the exciting position number of 7 shown in FIG. 52(h), the rotor 150c is kept at the position where the contacting member 60 contacts with the restriction member 70. That is, the state of FIG. 52(h) is an ideal state, where the force keeping the rotor 150c at that position acts on the rotor 150c, and at the position where the rotor 150c is kept, the contacting member 60 just contacts with the restriction member 70. In this state, there is no force acting so that the contacting member 60 pushes the restriction member 70. However, if the restriction member 70 is displaced to the left even slightly, the contacting member 60 will be pushed toward the restriction member 70. In this case, the thrust will act on the rotor 150c so as to make the rotor 150c rotate to the right.

Figure 53:
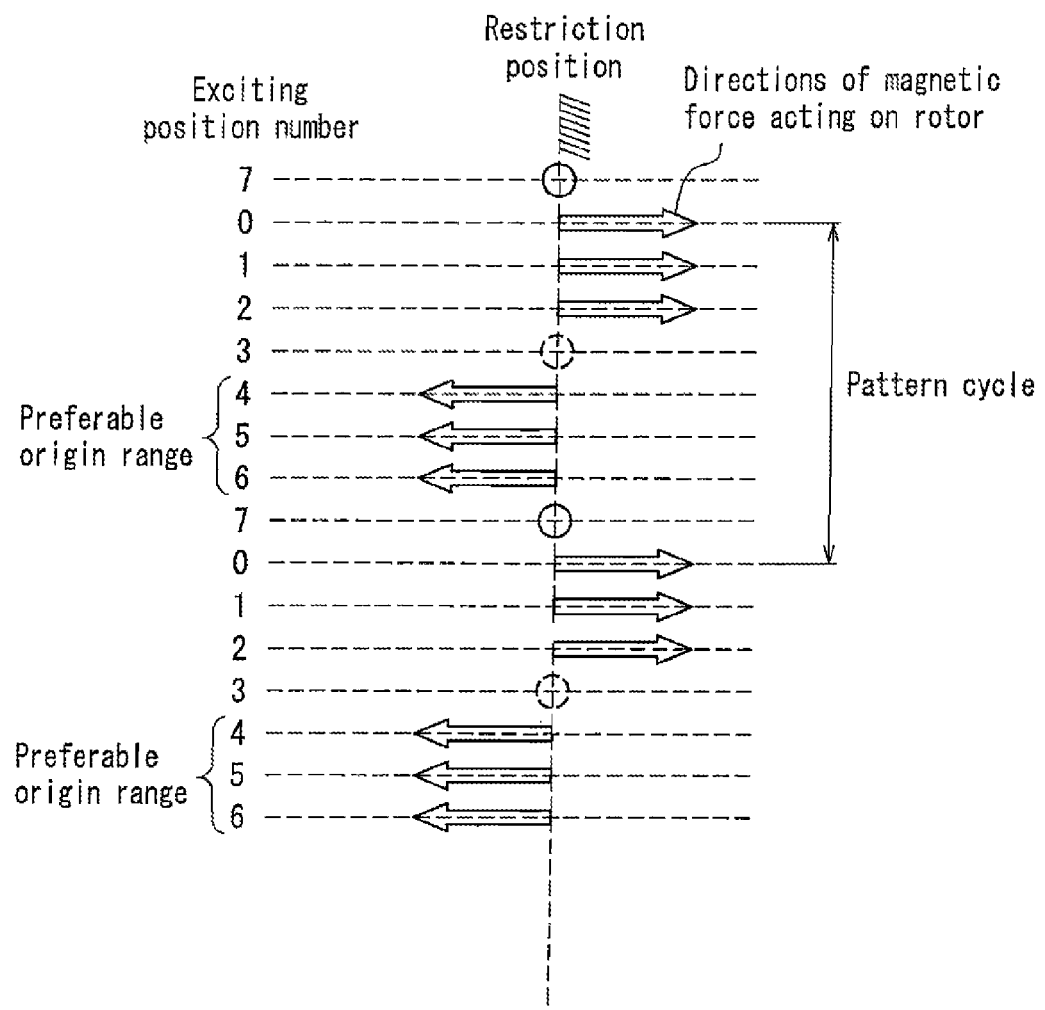

In this way, in the case where the rotor 150c contacts with the restriction position, the direction of the magnetic force acting on the rotor magnet varies in accordance with the exciting position number. FIG. 53 schematically shows the relationship between the directions of the forces that the rotor magnet of the imaging apparatus according to the present embodiment receives and the exciting position numbers. In the case where the rotor 150c contacts with the restriction position, in the state with the exciting position numbers of 7 and 3, the magnetic rotation thrust does not acts on the rotor magnet as described above.

When the exciting position numbers are 0 to 2, the magnetic force acts on the rotor magnet so as to push it in the direction of the restriction position. Conversely, when the exciting position numbers are 4 to 6, the magnetic force acts on the rotor magnet so as to shift it away from the restriction position. As a result, as shown in FIG. 53, the magnetic force that the rotor magnet receives varies in accordance with the periodic pattern of the exciting position numbers.

Figure 54:
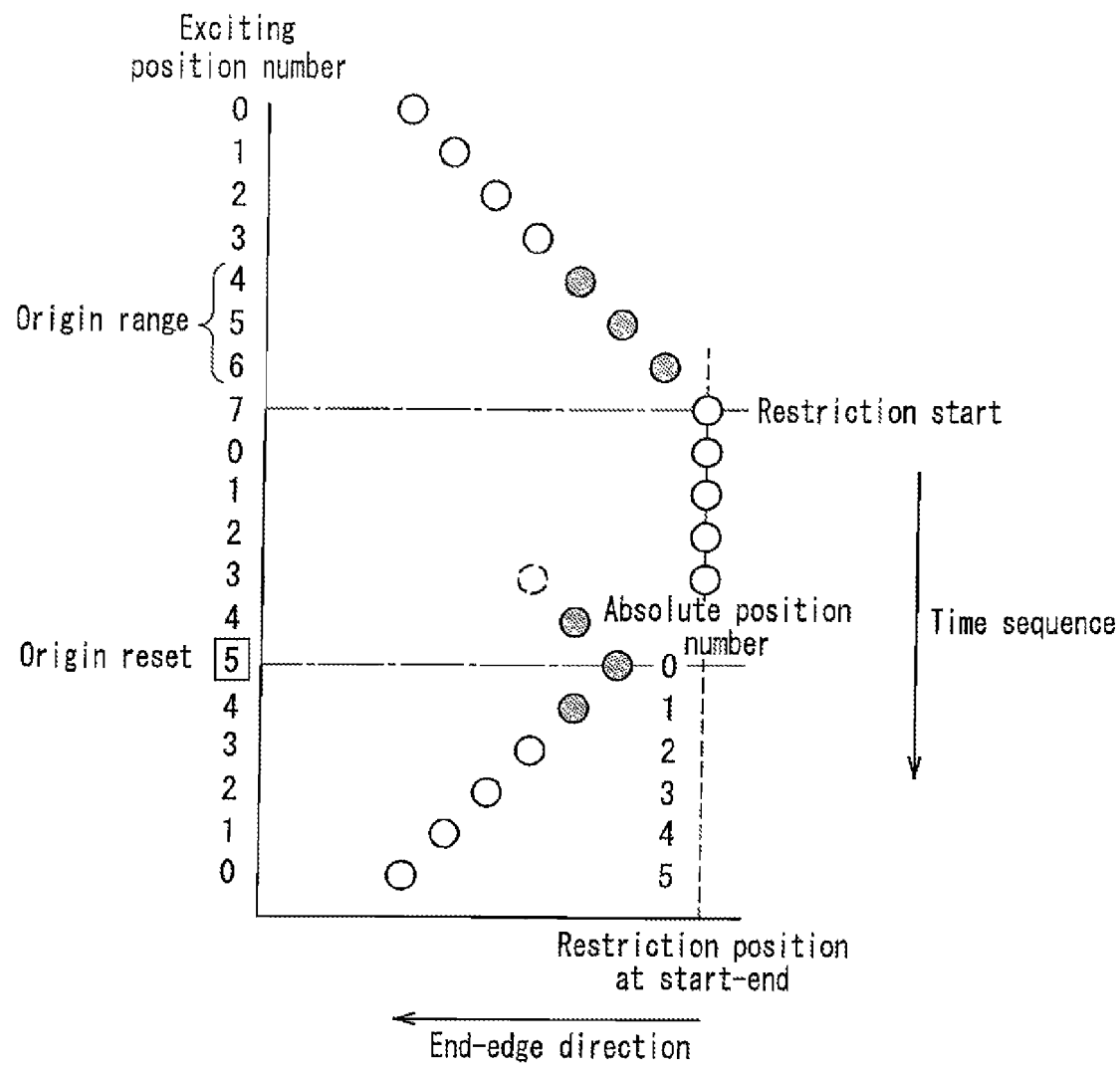
FIG. 54 is a drawing for explaining the movement of a rotor of the imaging apparatus according to Embodiment 14 of the present invention.

FIG. 54 is a drawing for explaining the movement of the rotor 150c of the imaging apparatus according to the present embodiment. In FIG. 54, the vertical axis shows a time sequence, which is described corresponding to the exciting position numbers. The horizontal axis in FIG. 54 shows the position closer to the restriction end. Regarding the vertical axis, the exciting position numbers show the state of driving toward the restriction end.

Figure 55:
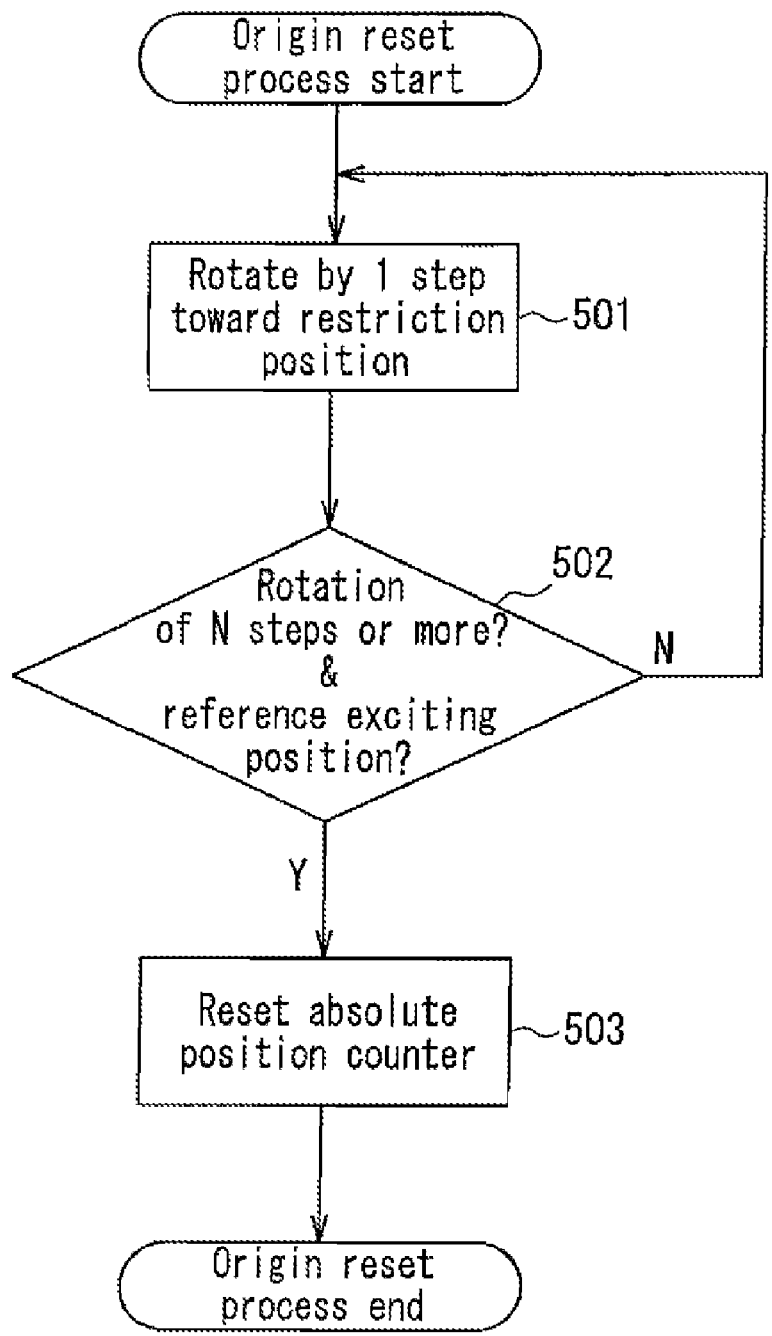
FIG. 55 is an operation flowchart of an origin reset process of the imaging apparatus according to Embodiment 14 of the present invention.

FIG. 55 is an operation flowchart of the origin reset process of the imaging apparatus according to the present embodiment. This shows the flow that is described as a program in the system control unit 100 of FIG. 47. When a power supply button is pushed and an instruction of turning the power on is issued from the operation button 101 to the system control unit 100, the process starts with the origin reset process start.

The following describes the origin reset process in detail. In accordance with an instruction from the calculation unit 201, the I/F unit 205 in the control circuit 200 of FIG. 47 is connected so as to allow a signal to be transmitted to the focus driver 400 and the iris driver 500, and is connected so as to allow a focusing instruction signal and an iris adjustment instruction signal to be received from the outside.

Herein, the focusing instruction signal is an image signal, for example, that is output from an imaging sensor 5 and undergoes a predetermined imaging process, which contains information for specifying a change in the focused object distance of an imaging optical system.

The iris adjustment instruction signal is a signal, for example, that detects an exposure state based on brightness information output from the imaging sensor 5. This signal gives an instruction of narrowing the stop 160 in the case of bright, and gives an instruction of opening the stop 160 in the case of dark.

The counting unit 202 counts driving pulses in accordance with an instruction from the calculation unit 201. The driving pulses are generated by the focus driver 400 and the iris driver 500 in accordance with the instruction by the calculation unit 201, which are for driving the focus motor 150 and the iris motor 160*a*. In the case where a driving pulse is generated so that the rotation driving is in the direction away from the restriction end with reference to the origin, the counting unit 202 decreases the counter, whereas in the case where a driving pulse is generated so that the rotation driving is in the direction closer to the restriction end, the counting unit 202 increases the counter.

The origin storage unit 203 stores the exciting position number corresponding to the origin that is detected beforehand, for example, at the time of shipment. The offset storage unit 204 stores the exciting position numbers corresponding to the predetermined waiting states of the imaging apparatus, such as a wide-angle end focal distance state and a finite object distance focusing state.

In the above-stated configuration, the specific operation of the control block will be described below, where the driving of the focus motor 150 is exemplified. Firstly, at the time of shipment of the imaging apparatuses, each imaging apparatus is detected concerning the exciting position number corresponding to the restriction end contacting with the restriction unit, and exciting position numbers at which the rotor magnet receives a magnetic force so as to let it move away from the restriction end with reference to the restriction end are stored in the origin storage unit 203. More specifically, in the case where the exciting position corresponding to the restriction end is the exciting position number of 7, any one of the exciting position numbers 4 to 6, which are in the direction away from the restriction end, is stored therein.

In this state, when electric power is supplied to the imaging apparatus, the process starts with the origin reset process start of the flowchart in FIG. 55. The focus motor 150 is shifted by one step in the direction of the restriction position as shown in Step 501, and the exciting position number is shifted from 0 to 1 as shown in FIG. 54. More specifically, the system control unit 100 gives an instruction to the calculation unit 201 via the I/F unit 205 so that the focus motor 150 is rotated by one step in the direction of the restriction end. The calculation unit 201 counts up the exciting position counter 201 from 0 to 1, and reads out the counter value.

The calculation unit 201 sends an instruction to the focus driver 400 via the I/F unit so that the current pattern of the exciting position number indicated by this counter value is output to the A-phase coil and the B-phase coil of the focus motor 150 and the focus motor 150 is driven by one step in the direction of the restriction end.

Next, in Step 502 of FIG. 55, a judgment is made as to whether movement is N steps or more and it reaches a reference exciting position or not. Herein, N steps show the range of the rotation of the focus motor 150, which is represented with the step number. For instance, this is represented with the step number from the start-edge to the end-edge (restriction end).

The reference exciting position is an exciting position that is read out from the origin storage unit 203. In the case where the exciting position corresponding to the restriction end is the exciting position number of 7, any one of the exciting position numbers 4 to 6, which are in the direction away from the restriction end, is stored therein. It is assumed herein that the exciting position number of 5 is stored as the reference exciting position.

Assuming that the focus motor 150 starts to rotate from the start-edge when electric power is supplied, unless it reaches the restriction end, the movement is not N steps or more. Therefore, the process returns to Step 501. After that, Step 501 and Step 502 are repeated, so that the focus motor 150 reaches the restriction end when the exciting position number is 7 (restriction start).

When the exciting position number is 7 in this way, the condition in Step 502 of the movement being N steps or more is satisfied. However, since the reference exciting position is the exciting position number 5, the process further returns to Step 501, where the focus motor 150 is rotated in the direction of the restriction end so as to advance the exciting position number as in 0, 1, 2, 3 and 4. Between the exciting position number 7, where the focus motor 150 reaches the restriction end, and the exciting position numbers of 0 to 2, the focus motor 150 is pushed against the restriction end. When the exciting position number is 3, the focus motor 150 is kept at the restriction end or is rotated to the position kept by the excitation. When the exciting position number is 4, the focus motor 150 is rotated to the position kept by the excitation as shown in FIG. 54.

Next, in Step 501, when the focus motor 150 is shifted by one step in the direction of the restriction position and when the exciting position number is 5, the conditions of the movement being N steps or more and the arrival at the reference exciting position (in this case, the exciting position number 5) are satisfied in Step 502, then the process goes to Step 503. In Step 503, the absolute position counter 211 is reset. At this time, the absolute position number becomes 0, and the absolute position of the focus motor 150 is determined, so as to complete the origin reset process. With the above-stated process, the origin of the focus motor 150 is determined.

Following this, the calculating unit 201 reads out the pulse number corresponding to the offset movement amount stored in the offset storage unit 204. Herein, the offset movement amount means a movement amount to a specific position that is a predetermined distance away from the origin.

The specific position that is a predetermined distance away from the origin may be, in the case of the focus motor 150 for example, a rotation position of the focus motor 150 corresponding to the focus ∞ end of the imaging apparatus and a pan-focus region, typically. In this case, the offset movement amount specifically is a movement amount specified with reference to the origin using M pieces of exciting patterns (M is a positive integer of 1 or more).

In addition, the offset movement amount can be configured variably by setting the specific position that is a predetermined distance away from the origin appropriately using a middle focal position, a position corresponding to the telephoto end, focus, iris, zoom positions when the power is turned off, and the like. In this way, by setting the offset movement amount, the time required to make the imaging apparatus ready for the operation after turning the power on can be shortened.

In this way according to the present embodiment, simply by adding the contacting member and the restriction member that restrict the movement of the focus lens, the origin can be detected without using a sensor in the configuration. In the absence of a sensor, by storing the exciting position number corresponding to the restriction end beforehand, the origin may be detected when the pulse is at a position corresponding to the exciting position number.

However, in the case where the exciting position number corresponding to the origin is an arbitrary number, the origin cannot be detected accurately depending on the selected exciting position number. More specifically, in the example of the present embodiment, in the case where the position corresponding to the restriction end is at a position corresponding to the exciting position numbers of 3 and 7, the position of the rotor is instable as stated above, and therefore this position is not suitable for the origin.

Further, at the positions corresponding to the exciting position numbers of 0 to 2, the rotor magnet receives a magnetic force so as to push the restriction position. Thus, since an error may occur when counting the movement amount from the origin, these positions are not suitable for the origin. For instance, in the case where the origin is set at a position corresponding to the exciting position number of 2, when the contacting member 60 contacts with the restriction member 70 as shown in FIG. 52(c), the contacting member 60 pushes the restriction member 70 as described above.

This pushing state does not change even at the position with the exciting position number of 1 in FIG. 52(b). In this case, since the exciting position number changes from 2 to 1, it is judged that the focus lens is shifted by the amount corresponding to one exciting position number. However, the focus lens actually is kept at the same position, and therefore the movement amount from the origin cannot be understood accurately Thus, according to the present embodiment, the origin is set at a position corresponding to the exciting position numbers of 4 to 6. As shown in FIG. 54, when the exciting position number is advanced from the upper side to the lower side of the vertical axis, after reaching the restriction position, all of the positions corresponding to the exciting position numbers of 4 to 6 are away from the restriction end.

This is because, as described referring to FIGS. 52(e), (f) and (g), at the positions corresponding to the exciting position numbers of 4 to 6 the magnetic force acts on so that the rotor magnet moves away from the restriction position. Therefore, as the exciting position number is decreased one by one from this position, the focus lens securely moves corresponding to the exciting position number as illustrated in the lower portion from the origin reset position in FIG. 54.

Thus, according to the present invention, the origin is set at a position corresponding to the exciting position numbers of 4 to 6, and the movement from the origin is detected using a step corresponding to the exciting position number, whereby the rotor can be controlled for alignment accurately without using a sensor or the like.

Incidentally, the above-stated embodiment describes the example where the one-two phase excitation type stepping motor is driven in 8 excitation patterns with the exciting position numbers of 0 to 7. However, this is not a limiting example, and excitation patterns within a range of 4 to 16 patterns are possible using a different excitation type stepping motor.

Further, although the example with the exciting position numbers of 0 to 7 is described above, the exciting position numbers simply are set for the sake of convenience, and they may be set differently. For instance, the exciting position numbers may be set at 1 to 8, and in this case, the origin should not be selected from the exciting position numbers of 4 to 6 as in the above example, but should be selected from the exciting position numbers of 5 to 7.

Therefore, many patterns of the representation for the origin can be considered. However, this may be represented as follows. In the case of a stepping motor having n+1 pieces of exciting position patterns from 0 to n (herein, n+1 is an even number of 4 or more), assuming that the exciting position number starts from the state where the contacting member 60 is separated from the restriction member 70 and the exciting position number is n in the state where the contacting member 60 contacts with the restriction member 70 for the first time, then the selection range of the origin will be from (n+1)/2 to n−1.

Embodiment 15

Figure 56:
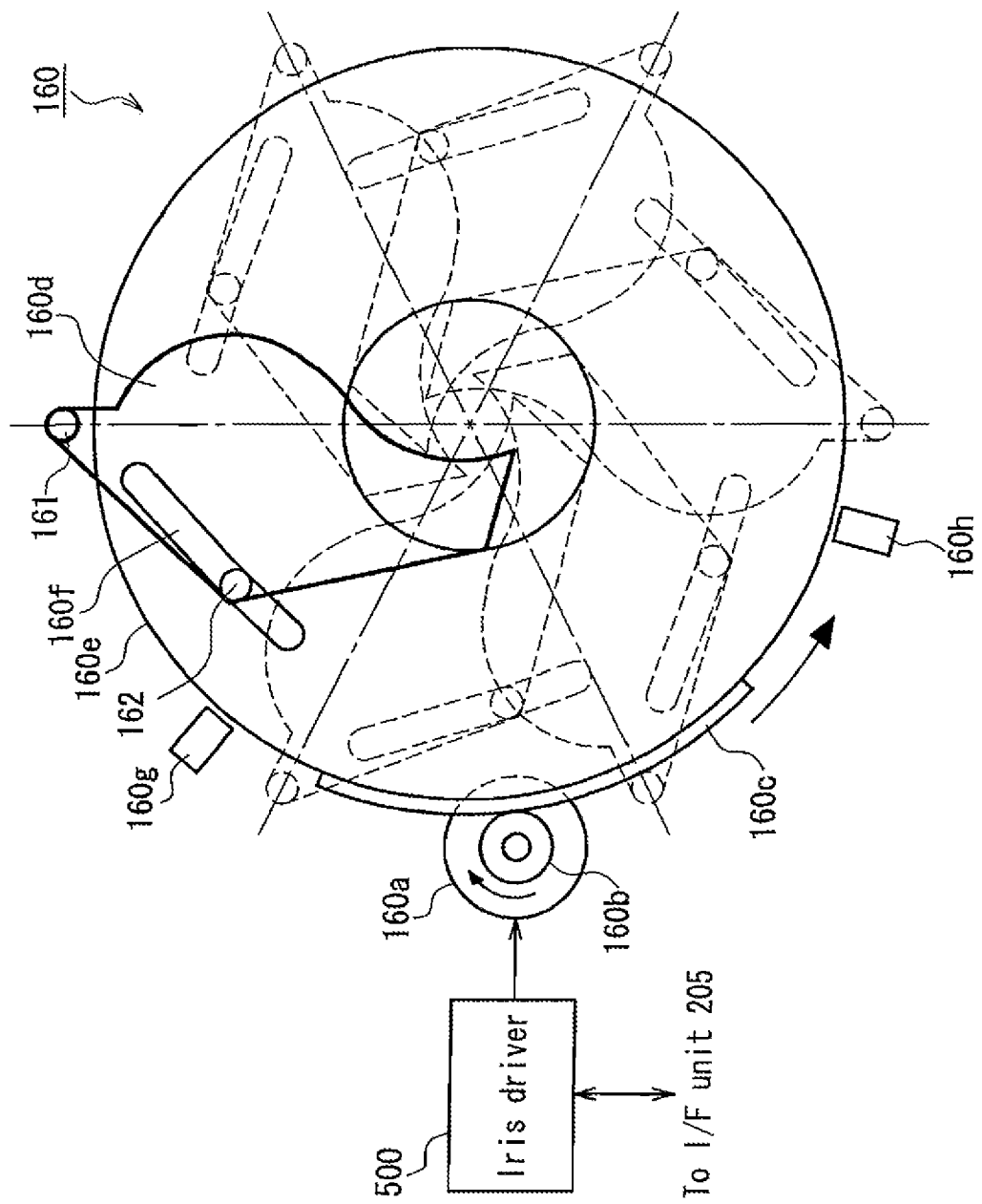
FIG. 56 includes a block diagram of a motor unit and an iris driver of an imaging apparatus according to Embodiment 15 of the present invention and a schematic diagram of a stop.
Figure 57:
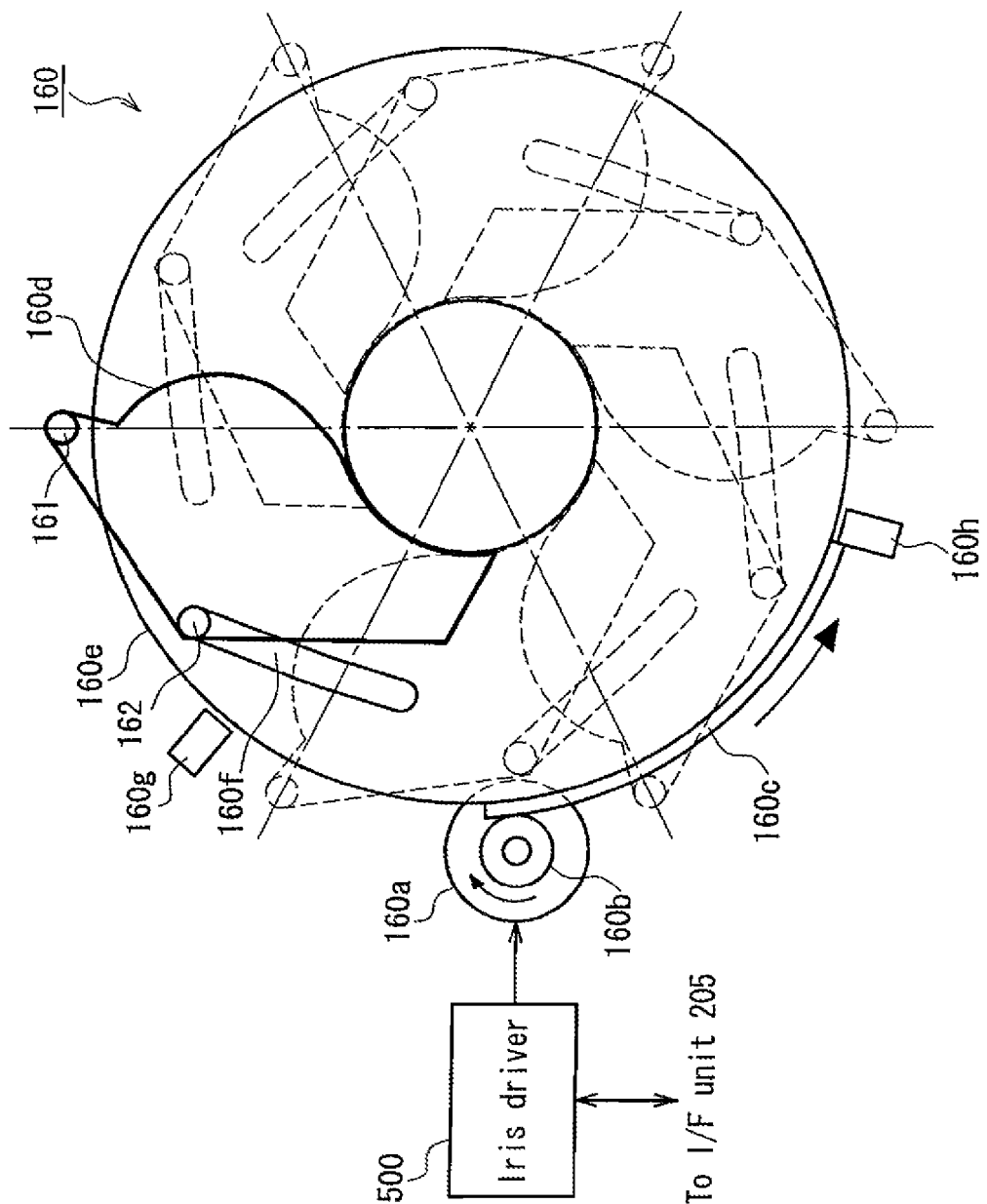
FIG. 57 schematically shows the stop in the imaging apparatus according to Embodiment 15 of the present invention closer to the restriction end.
Figure 58:
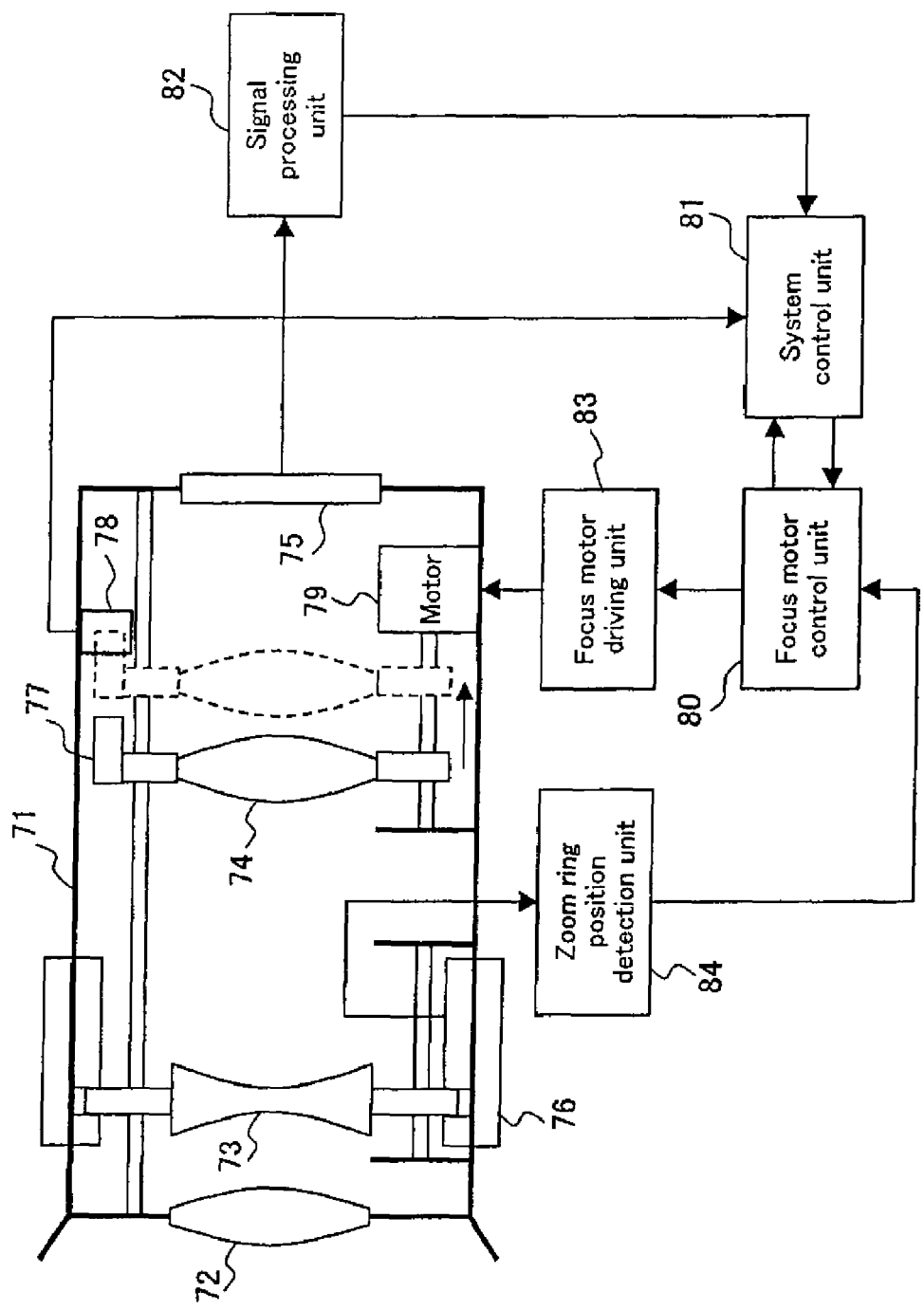
FIG. 58 includes a schematic diagram and a block diagram of an exemplary conventional lens driving apparatus.
Figure 59:
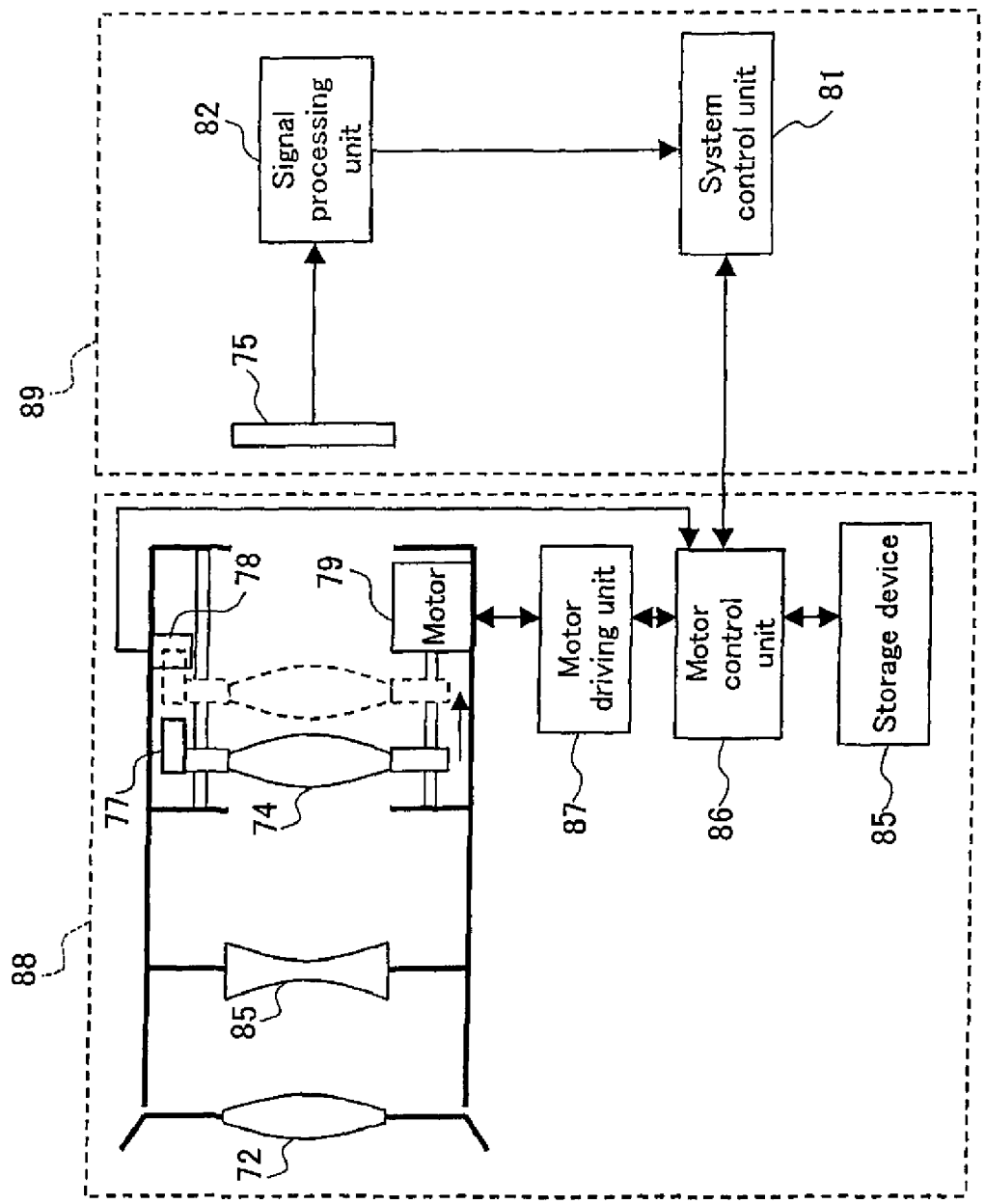
FIG. 59 includes a schematic diagram and a block diagram of an exemplary conventional imaging apparatus.
Figure 60:
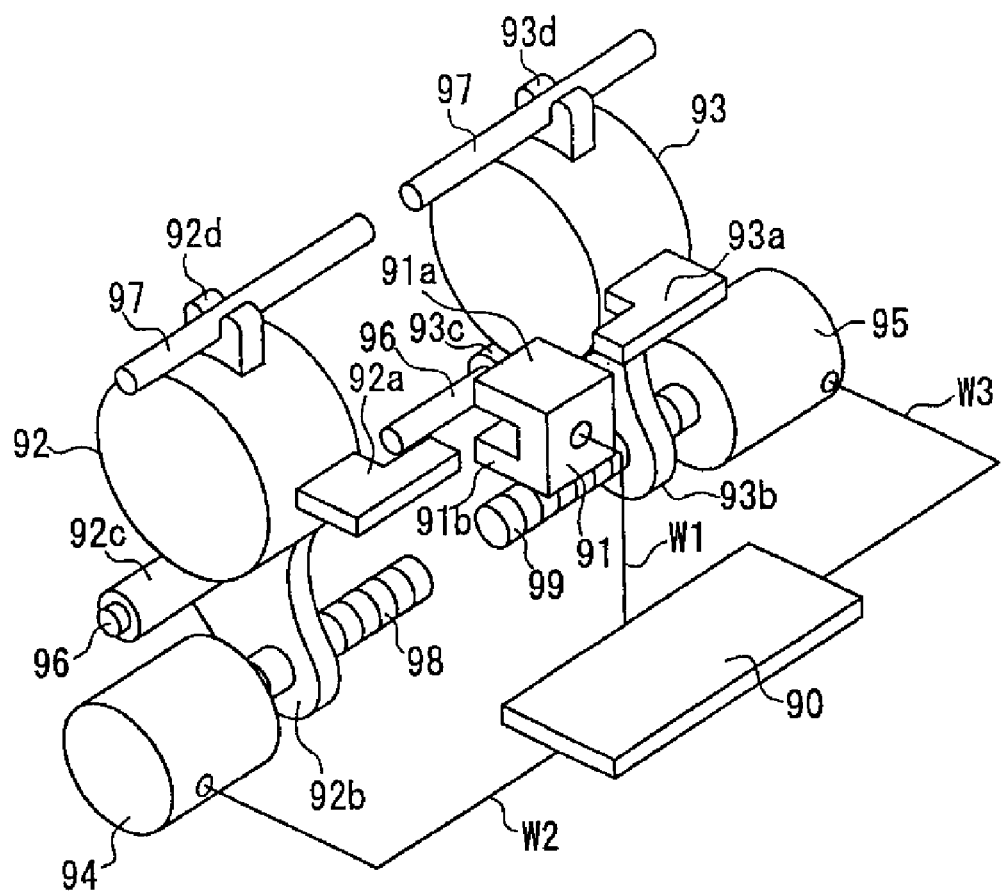
FIG. 60 is a schematic perspective view of a main portion of another exemplary conventional imaging apparatus.

FIG. 56 includes a block diagram of a motor unit and an iris driver of an imaging apparatus according to Embodiment 15 and a schematic diagram of a stop. FIG. 57 schematically shows the stop in the configuration of FIG. 56 closer to the restriction end. FIGS. 56 and 57 correspond to the iris driver 500 and the stop 160 of FIG. 47, which show the stop 160 in detail.

The imaging apparatus according to the present embodiment uses the operation principal of the origin reset of the above-stated focus lens. While the member to be driven in the above-stated embodiment is the frame integral with the focus lens, the member to be driven in the present embodiment is a rotation member 160e.

An iris motor 160a is a stepping motor like the above-stated focus motor 150, and therefore the detailed explanations of the iris motor 160a is omitted. As shown in FIGS. 56 and 57, the stop 160 is provided with a plurality of light-amount adjustment blades 160d. The respective light-amount adjustment blades 160d have similar configurations and similar functions. Thus, for convenience in explaining, one of the light-amount adjustment blades 160d is shown with a solid line, and the operation of the light-amount adjustment blades 106d will be described using this.

In accordance with a current pattern output from the iris driver 500, the iris motor 160a rotates to the right as shown in the drawing. Along with this, a rotation gear 160b rotates to the right, and the rotation force is transmitted to an arc-shaped gear 160c, which makes the rotation member 160e rotate to the left. During this movement, the point of application 162 of the light-amount adjustment blades 160d moves along a guide groove 160f provided in the rotation member 160e with a support point 161 as center, so that as shown in FIG. 57, the light-amount adjustment blades 160d are driven in the direction of opening the stop.

Herein, 160g denotes a restriction member that restricts the stop at its narrowest position, and 160h denotes a restriction member that restricts the stop at an open position. The restriction member 160h corresponds to the restriction member 70 of FIG. 47 and the arc-shaped gear 160c corresponds to the contacting member 60 of FIG. 1. Although the origin of the above-stated focus lens is reset by bringing the restricting member 70 into contact with the contacting member 60, the origin of the stop in the present embodiment is reset by bringing the arc-shaped gear 160c into contact with the restriction member 160h. According to the present embodiment, although an object to be controlled is different from the above-stated embodiment, the basic operation of the origin reset is similar to the above-stated embodiment.

As stated above, according to the imaging apparatuses of Embodiments 14 and 15, since the exciting position where the rotor receives a magnetic force so as to let it move away from the restriction end of performing the physical restriction is set as the origin, the origin can be determined accurately without the need of alignment using a photosensor or the like.

Herein, in the imaging apparatuses according to Embodiments 14 and 15, at the time of shipment of imaging apparatuses, each imaging apparatus is detected beforehand concerning the exciting position number corresponding to the restriction end contacting with the restriction unit, and an exciting position number set based on this exciting position number is stored as the origin in the origin storage unit. Instead, an exciting position number corresponding to the origin can be estimated from a range specified from the accuracy of components and assembly accuracy.

More specifically, in the above imaging apparatuses described in Embodiments 14 and 15, the exciting position number corresponding to the restriction end may be designed within a range of the exciting position numbers of 4±1 based on the accuracy of components and alignment accuracy, and the position corresponding to the actual origin may be set at a position always returning by the amount corresponding to 3 patterns from the exciting position number of the restriction end. With this setting, the exciting position number corresponding to the origin always can be within the range of the exciting position numbers of 4 to 6, thus omitting an inspection concerning the origin at the time of shipment.

Further, Embodiments 14 and 15 are not limiting examples, and various modifications are possible. Although Embodiments 14 and 15 show the example where the barrel is provided with two stepping motors of the focus motor and the iris motor, they are not limiting examples. Even in the case where the imaging apparatus is provided with a zoom motor having a zooming function, the present invention is applicable in a similar manner Further, in the case of so-called pan-focus in which focusing is set at a fixed finite image-capturing distance, the motor may be a zoom motor only. In the case where the imaging apparatus includes a unifocal lens system that does not have a zooming function and focusing only is performed, the motor may be a focus motor only.

As a motor to which the present invention is applicable, an image fluctuation correction motor that shifts a lens group in the direction perpendicular to the optical axis is available as well. Further, in the case of a stop motor, a half-stop diameter, which is used frequently, can be considered as the predetermined position for setting an offset movement amount. In the case of the image fluctuation correction motor, a position where the optical axis of a lens groups that is in the normal operation state and the optical axis of the overall system agree with each other can be considered as such a position.

Further, depending on the movement mode of the imaging optical system during zooming, the zoom motor may drive one lens group or three lens groups. Similarly, depending on the movement mode of the lens during focusing, the focus motor may drive one lens group or three lens groups.

Further, a conversion mechanism and a movement mechanism of a barrel to which the present invention is applicable may include the configuration including a rotating cam cylinder and a rotating lens frame coupled with a cam, the configuration including a rotating cylinder and a rotating lens frame connected with a rotating frame via screws and the like.

Further, although in the stepping motors of Embodiments 14 and 15, a stator includes a stator coil and a rotor includes a rotor magnet, they are not limiting examples. As the stepping motor, a stator may include a stator magnet and a rotor may include a rotor coil, and current may be supplied on the rotor side.

With such a configuration of the stepping motor, the moment of inertia of the rotor can be made smaller and the property of controlling rotation during alignment or the like can be improved. However, as compared with the configurations of Embodiments 14 and 15, the configuration for connecting a driving current to the rotor coil becomes more complicated. Therefore, the configuration of the stepping motor may be selected from these depending on desired properties.

Further, at the time of turning power off, following the movement of the motor to the origin, the power may be turned off. Thereby, when power is turned on the next time, an origin reset process is performed by driving in the direction of the restriction end by one exciting cycle (e.g., from the exciting position number 5 to the next exciting position number 5), so that the starting-time before image-capturing can be shortened at the time of turning power on. This is effective for an iris motor that does not rotate easily by the application of an external force to the imaging apparatus when electric power is not supplied or for a stepping motor for driving a light-weight lens. Especially preferably, following the movement to the exciting position where self-holding specific to a stepping motor is capable, the power is turned off.

INDUSTRIAL APPLICABILITY

The present invention is particularly effective for a digital still camera, a digital video camera or the like, which have been demanded to have a smaller size and higher performance.

The invention claimed is:

1. An imaging apparatus, comprising:
a power supply;
a lens barrel provided with a first lens unit and a second lens unit, each of which is movable in a direction of an optical axis;
a first driver that shifts the first lens unit in the direction of the optical axis;
a second driver that shifts the second lens unit in the direction of the optical axis;
a controller, when electric power is supplied from the power supply or when the power supply is shut off, making the first driver shift the first lens unit so as to perform predetermined process operations for supplying the electric power or shutting off the power supply; and
a storage that stores information different between a normal completion state and an abnormal completion state, in which in the normal completion state, the first lens unit and the second lens unit are shifted to storage positions in accordance with a predetermined process operation when the power supply is shut off from a state of the supplying the electric power, and in the abnormal completion state, the apparatus to which electric power is being supplied is completed in a state different from the normal completion state, wherein when electric power is supplied after the abnormal completion state, the first lens unit and the second lens unit are returned to the normal completion state in accordance with the information stored in the storage.

2. The imaging apparatus according to claim 1, wherein when electric power is supplied after the abnormal completion state, the first lens unit and the second lens unit are returned to the normal completion state in accordance with the information stored in the storage, and the first lens unit is shifted at least by the first driver so as to perform the predetermined process operation for supplying the electric power.

3. The imaging apparatus according to claim 1, wherein the storage is a nonvolatile memory or a volatile memory driven by a secondary power supply.

4. The imaging apparatus according to claim 1, wherein the first lens unit is a zoom lens unit, and the second lens unit is a focus lens unit.

* * * * *